US012517459B2

(12) United States Patent
Sato et al.

(10) Patent No.: US 12,517,459 B2
(45) Date of Patent: Jan. 6, 2026

(54) CARTRIDGE, MEMBER CONSTITUTING CARTRIDGE, AND IMAGE FORMING APPARATUS

(71) Applicant: CANON KABUSHIKI KAISHA, Tokyo (JP)

(72) Inventors: Masaaki Sato, Yokohama (JP); Yukio Kubo, Boise, ID (US); Hiroyuki Munetsugu, Yokohama (JP); Koji Wada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 18/648,736

(22) Filed: Apr. 29, 2024

(65) Prior Publication Data

US 2024/0280937 A1 Aug. 22, 2024

Related U.S. Application Data

(60) Division of application No. 18/201,828, filed on May 25, 2023, now Pat. No. 12,140,903, which is a (Continued)

(30) Foreign Application Priority Data

Nov. 28, 2014 (JP) ................................ 2014-242577
Nov. 28, 2014 (JP) ................................ 2014-242578
(Continued)

(51) Int. Cl.
*G03G 21/18* (2006.01)
*G03G 21/16* (2006.01)

(52) U.S. Cl.
CPC ..... *G03G 21/1842* (2013.01); *G03G 21/1619* (2013.01); *G03G 21/1817* (2013.01); (Continued)

(58) Field of Classification Search
CPC .......... G03G 21/1875; G03G 21/1878; G03G 21/1882; G03G 21/1885
See application file for complete search history.

(56) References Cited

U.S. PATENT DOCUMENTS 5,331,373 A 7/1994 Nomura et al.
5,452,056 A 9/1995 Nomura et al.
(Continued)

FOREIGN PATENT DOCUMENTS

CN 1354399 A 6/2002
CN 1523458 A 8/2004
(Continued)

OTHER PUBLICATIONS

International Search Report and Written Opinion for International Patent Application No. PCT/JP2015/083463.
(Continued)

*Primary Examiner* — Erika J. Villaluna
(74) *Attorney, Agent, or Firm* — Venable LLP

(57) ABSTRACT

A cartridge includes a developing roller rotatable about a rotational axis thereof. A frame is configured to support the developing roller. A lever is connected to the frame, with the lever being movable relative to the frame, and a part of the lever protruding beyond the frame. A surface of the developing roller extends a longer distance in a direction of the rotational axis than a distance that the lever extends in the direction of the rotational axis.

27 Claims, 57 Drawing Sheets

Related U.S. Application Data division of application No. 17/692,317, filed on Mar. 11, 2022, now Pat. No. 11,698,601, which is a division of application No. 16/734,760, filed on Jan. 6, 2020, now Pat. No. 11,307,529, which is a division of application No. 15/606,070, filed on May 26, 2017, now Pat. No. 11,131,960, which is a continuation of application No. PCT/JP2015/083463, filed on Nov. 27, 2015.

(30) Foreign Application Priority Data

Nov. 28, 2014 (JP) ................................ 2014-242601
Nov. 28, 2014 (JP) ................................ 2014-242602
Nov. 27, 2015 (JP) ................................ 2015-231356

(52) U.S. Cl.

CPC ..... *G03G 21/1821* (2013.01); *G03G 21/1885* (2013.01); *G03G 21/1647* (2013.01); *G03G 21/1825* (2013.01); *G03G 21/1857* (2013.01)

(56) References Cited

U.S. PATENT DOCUMENTS 5,528,341 A 6/1996 Shishido et al.
5,585,889 A 12/1996 Shishido et al.
5,870,654 A 2/1999 Sato et al.
5,911,096 A 6/1999 Batori et al.
5,940,658 A 8/1999 Yokoi et al.
5,966,566 A 10/1999 Odagawa et al.
5,974,288 A 10/1999 Sato
6,075,957 A 6/2000 Batori et al.
6,104,894 A 8/2000 Sato et al.
6,131,007 A 10/2000 Yamaguchi et al.
6,185,390 B1 2/2001 Higeta et al.
6,188,856 B1 2/2001 Sato
6,381,420 B1 4/2002 Sato et al.
6,640,066 B2 10/2003 Sato
6,714,749 B2 3/2004 Sato et al.
6,895,199 B2 5/2005 Sato et al.
6,898,399 B2 5/2005 Morioka et al.
6,922,534 B2 7/2005 Goto et al.
6,937,832 B2 8/2005 Sato et al.
7,149,457 B2 12/2006 Miyabe et al.
7,155,140 B2 12/2006 Arimitsu et al.
7,155,141 B2 12/2006 Sato et al.
7,158,736 B2 1/2007 Sato et al.
7,200,349 B2 4/2007 Sato et al.
7,218,882 B2 5/2007 Toba et al.
7,224,925 B2 5/2007 Sato et al.
7,283,766 B2 10/2007 Arimitsu et al.
7,349,657 B2 3/2008 Sato et al.
7,412,193 B2 8/2008 Sato et al.
7,499,663 B2 3/2009 Sato et al.
7,660,550 B2 2/2010 Mori et al.
7,689,146 B2 3/2010 Sato et al.
7,720,408 B2 5/2010 Ueno et al.
7,813,668 B2 10/2010 Ueno et al.
7,869,740 B2 1/2011 Yoshimura et al.
8,135,304 B2 3/2012 Abe et al.
8,160,478 B2 4/2012 Munetsugu et al.
8,165,493 B2 4/2012 Chadani et al.
8,559,849 B2 10/2013 Suzuki et al.
8,565,639 B2 10/2013 Nittani et al.
8,583,001 B2 11/2013 Kubo et al.
8,855,534 B2 10/2014 Jung et al.
8,874,010 B2 10/2014 Wada
9,134,696 B2 9/2015 Sato et al.
9,176,467 B2 11/2015 Gu et al.
9,207,581 B2 12/2015 Wada et al.
9,213,306 B2 12/2015 Morioka et al.
9,280,121 B2 3/2016 Xiao et al.
9,367,031 B2 6/2016 Wada
9,377,714 B2 6/2016 Nakazawa et al.
9,429,877 B2 8/2016 Sato et al.
9,429,906 B2 8/2016 Yoshimura et al.
9,488,958 B2 11/2016 Gu et al.
9,529,298 B2 12/2016 Sato et al.
9,632,451 B2 4/2017 Hayashi et al.
9,740,163 B2 8/2017 Xiao et al.
9,804,560 B2 10/2017 Sato et al.
9,836,020 B2 12/2017 Yoshimura et al.
9,885,974 B2 2/2018 Sato et al.
10,042,310 B2 8/2018 Ikeda et al.
10,139,777 B2 11/2018 Sato et al.
10,168,664 B2 1/2019 Yoshimura et al.
2001/0036373 A1 11/2001 Higeta et al.
2002/0054771 A1 5/2002 Higeta et al.
2002/0076235 A1 6/2002 Matsuzki
2004/0013446 A1 1/2004 Morioka et al.
2004/0184835 A1 9/2004 Pak
2005/0047820 A1 3/2005 Hoshi et al.
2005/0053394 A1 3/2005 Ishii et al.
2005/0135831 A1 6/2005 Kawaguchi et al.
2006/0008289 A1 1/2006 Sato et al.
2006/0045566 A1 3/2006 Kanno et al.
2006/0159487 A1 7/2006 Choi et al.
2007/0122205 A1 5/2007 Taguchi et al.
2007/0160388 A1 7/2007 Yoshimura et al.
2007/0212108 A1 9/2007 Hozono et al.
2007/0269234 A1 11/2007 Kurita et al.
2008/0159772 A1 7/2008 Koishi et al.
2008/0199204 A1 8/2008 Ishii et al.
2008/0240778 A1 10/2008 Ishikawa
2008/0240796 A1 10/2008 Morioka et al.
2008/0317499 A1 12/2008 Nishimura
2009/0003875 A1 1/2009 Toba et al.
2009/0003876 A1 1/2009 Maeshima et al.
2009/0129813 A1 5/2009 Nagashima et al.
2009/0252530 A1 10/2009 Nakashima
2010/0278559 A1 11/2010 Komatsu et al.
2011/0064461 A1 3/2011 Ishii et al.
2011/0110682 A1 5/2011 Yoshimura et al.
2011/0159970 A1 6/2011 Okabe
2011/0211867 A1 9/2011 Hashimo et al.
2012/0057899 A1 3/2012 Asanuma et al.
2012/0163859 A1 6/2012 Hashimoto et al.
2012/0269545 A1 10/2012 Morita et al.
2013/0114972 A1 5/2013 Takarada et al.
2013/0164028 A1 6/2013 Morioka et al.
2013/0164040 A1 6/2013 Matsushita et al.
2013/0287437 A1 10/2013 Miyabe et al.
2013/0308978 A1 11/2013 Nittani et al.
2013/0315622 A1 11/2013 Yoshimura et al.
2014/0020532 A1 1/2014 Van Alstine
2014/0205321 A1 7/2014 Jang et al.
2014/0270845 A1 9/2014 Kawakami et al.
2015/0093146 A1 4/2015 Sato et al.
2015/0205254 A1 7/2015 Fujii et al.
2017/0261926 A1 9/2017 Kashiide et al.
2018/0017936 A1 1/2018 Sato et al.
2018/0074454 A1 3/2018 Uneme et al.
2018/0253057 A1 9/2018 Koishi et al.
2018/0321637 A1 11/2018 Sato et al.
2018/0373199 A1 12/2018 Sugimoto et al.
2019/0064732 A1 2/2019 Sato et al.

FOREIGN PATENT DOCUMENTS

CN 1743978 A 3/2006
CN 2791703 Y 6/2006
CN 201170840 A 12/2008
CN 101371202 A 2/2009
CN 101689035 A 3/2010
CN 101715570 A 5/2010
CN 101963779 A 2/2011
CN 102193477 A 9/2011
CN 103080851 A 5/2013
CN 103207557 A 7/2013
CN 203365931 U 12/2013
CN 103576524 A 2/2014
CN 103930835 A 7/2014

(56) References Cited

FOREIGN PATENT DOCUMENTS

| | | | |
|---|---|---|---|
| CN | 103946752 | A | 7/2014 |
| CN | 203930340 | U | 11/2014 |
| CN | 204287742 | U | 4/2015 |
| CN | 104698798 | A | 6/2015 |
| CN | 104730896 | A | 6/2015 |
| EP | 1 207 437 | A2 | 5/2002 |
| EP | 1 326 144 | B1 | 8/2002 |
| EP | 1 542 996 | A | 6/2005 |
| EP | 2 144 121 | A2 | 1/2010 |
| EP | 1 696 284 | B1 | 7/2012 |
| EP | 2 530 532 | A | 12/2012 |
| EP | 2 530 532 | A1 | 12/2012 |
| EP | 2013-050496 | A | 3/2013 |
| EP | 2 595 004 | A | 5/2013 |
| EP | 2 595 004 | A2 | 5/2013 |
| EP | 2 087 407 | B1 | 7/2013 |
| EP | 1 363 169 | B1 | 11/2014 |
| EP | 1 965 272 | B1 | 11/2014 |
| EP | 2 045 668 | B1 | 12/2014 |
| JP | H11-15355 | A | 1/1999 |
| JP | 2000-066564 | A | 3/2000 |
| JP | 2001-249600 | A | 9/2001 |
| JP | 2005-049524 | A | 2/2005 |
| JP | 2006-146102 | A | 6/2006 |
| JP | 2009-086694 | A | 4/2009 |
| JP | 2009-162903 | A | 7/2009 |
| JP | 2010-026541 | A | 2/2010 |
| JP | 2011-039564 | A | 2/2011 |
| JP | 2012-027449 | A | 2/2012 |
| JP | 2012-118176 | A | 6/2012 |
| JP | 2013-050496 | A | 3/2013 |
| JP | 2013-200493 | A | 10/2013 |
| JP | 2014-067005 | A | 4/2014 |
| JP | 2014-119592 | A | 6/2014 |
| JP | 2014-170142 | A | 9/2014 |
| JP | 2001-312198 | A | 11/2021 |
| KR | 10-2005-0022859 | A | 3/2005 |
| KR | 10-2006-0107549 | A | 10/2006 |
| KR | 10-2007-0111324 | A | 11/2007 |
| KR | 10-2010-0023051 | A | 3/2010 |
| KR | 10-2010-129967 | A | 12/2011 |
| RU | 2 398 257 | C2 | 8/2010 |
| TW | 201209529 | A | 3/2012 |
| TW | 201333644 | A | 8/2013 |
| TW | 201337477 | A | 9/2013 |
| WO | 2013/187534 | A | 12/2013 |
| WO | 2013/187534 | A1 | 12/2013 |
| WO | 2014/080541 | A1 | 5/2014 |
| WO | 2014/156612 | A | 10/2014 |
| WO | 2014156612 | A1 | 10/2014 |

OTHER PUBLICATIONS

Decision on Grant in Russian Patent Application No. 2017122459, mailed Apr. 24, 2018 (with English translation).

Communication in European Patent Application No. 15 862 416.3, dated Apr. 9, 2018.

Dec. 4, 2017 Office Action in Australian Patent Application No. 2015354534.

Notice of Allowance in Taiwanese Patent Application No. 106111172, dated Aug. 31, 2018.

Examination Report in Australian Patent Application No. 2015354534, dated Aug. 15, 2018.

Aug. 20, 2018 Office Action in Chilean Patent Application No. 201701330.

Dec. 18, 2019 Examination Report in Australian Patent Application No. 2019201935.

Examination Report in Australian Patent Application No. 2015354534, dated Nov. 20, 2018.

Decision to Grant in Russian Patent Application No. 2018126309, mailed Mar. 12, 2019.

Notice of Allowance in Taiwanese Patent Application No. 107134586, mailed Feb. 20, 2019.

Mar. 11, 2019 Office Action in Chilean Patent Application No. 201701330.

Communication in European Patent Application No. 15 862 416.3, dated Apr. 18, 2019.

Examination Report in Indonesian Patent Application No. P00201704204, mailed Jun. 11, 2019 (with English translation).

Sep. 5, 2019 Office Action in Korean Patent Application No. 10-2017-7014522.

Aug. 26, 2020 Office Action in United Kingdom Patent Application No. GB1710248.4.

Aug. 19, 2020 Office Action in Taiwanese Patent Application No. 108110047.

Nov. 25, 2020 Search Report in European Patent Application No. 20 181 560.

Jan. 12, 2023 Office Action in European Patent Application No. 21 188 411.9.

Jan. 13, 2023 Office Action in European Patent Application No. 21 188 412.7.

Jul. 19, 2024 Written Opinion in Singapore Patent Application No. 10202011930Y.

Jul. 19, 2024 Written Opinion in Singapore Patent Application No. 10202011936W.

Mar. 4, 2020 Office Action in Chinese Patent Application No. 201580073447.4 (with English translation).

English translation of Chinese Patent Application Pub. No. 103576524 B (publication dated Apr. 27, 2016).

English translation of Chinese Patent Application Pub. No. 104698798 A (publication dated Jun. 10, 2015).

English translation of Chinese Patent Application Pub. No. 104730896 A (publication dated Jun. 24, 2015).

English translation of Chinese Patent Application Pub. No. 203930340 U (publication dated Nov. 5, 2014).

English translation of Chinese Patent Application Pub. No. 204287742 U (publication dated Apr. 22, 2015).

Apr. 24, 2020 Decision to Grant in Russian Patent Application No. 2010102192 (with English translation).

May 21, 2020 Notice of Allowance in Korean Patent Application No. 10-2017-7014522.

Jun. 8, 2020 Office Action in U.A.E. Patent Application No. UAE/P/6000623/2017.

Jun. 23, 2020 Office Action in Brazilian Patent Application No. BR112017011150-0 (with English translation).

Jun. 23, 2020 Office Action in Brazilian Patent Application No. BR122018074172-4 (with English translation).

Jun. 23, 2020 Office Action in Brazilian Patent Application No. BR122018074174-0 (with English translation).

Jun. 23, 2020 Office Action in Brazilian Patent Application No. BR122018074176-7 (with English translation).

Jun. 23, 2020 Office Action in Brazilian Patent Application No. BR122018074177-5 (with English translation).

Jun. 23, 2020 Office Action in Brazilian Patent Application No. BR122018074173-2 (with English translation).

Jan. 11, 2021 Decision to Grant in Russian Patent Application No. 2020122055 (with English translation).

Dec. 14, 2020 Office Action in United Kingdom Patent Application No. GB2017148.4.

Dec. 14, 2020 Office Action in United Kingdom Patent Application No. GB2017150.0.

Jan. 29, 2021 Office Action in United Kingdom Patent Application No. GB2100195.3.

Feb. 26, 2021 Office Action in Indian Patent Application No. 201747022093.

Aug. 19, 2020 Office Action in Taiwanese Patent Application No. 10811047.

Nov. 25, 2020 Extended Search Report in European Patent Application No. 20 18 1560.

Dec. 23, 2020 Notice of Allowance in Australian Patent Application No. 2019201935.

Oct. 25, 2021 Notice of Allowance in Korean Patent Application No. 10-2020-7022921.

Jun. 6, 2021 Office Action in Philippines Patent Application No. 1/2017/500985.

(56) References Cited

OTHER PUBLICATIONS

Jun. 30, 2021 Office Action in Vietnamese Patent Application No. 1-2017-02381 (with English translation).
Feb. 23, 2022 Office Action in Australian Patent Application No. 2020289742.
May 23, 2022 Office Action in Taiwanese Patent Application No. 110118515.
Jul. 28, 2022 Notice of Allowance in Korean Patent Application No. 10-2022-7002378.
Jul. 26, 2022 Office Action in Brazilian Patent Application No. 11207011150-0 (with English translation).
Sep. 27, 2022 Office Action in Brazilian Patent Application No. 122018074174-0 (with English translation).
Sep. 27, 2022 Office Action in Brazilian Patent Application No. 122018074176-7 (with English translation).
Sep. 27, 2022 Office Action in Brazilian Patent Application No. 122018074177-5 (with English translation).
Sep. 27, 2022 Office Action in Brazilian Patent Application No. 122018074172-4 (with English translation).
Sep. 27, 2022 Office Action in Brazilian Patent Application No. 122018074173-2 (with English translation).
Oct. 21, 2022 Search and Examination Report in United Arab Emirates Patent Application No. P6000623/2017.
Feb. 10, 2023 Office Action in Australian Patent Application No. 2020289742.
Apr. 3, 2023 Notice of Allowance in Korean Patent Application No. 10-2022-7037444.
May 2, 2023 Office Action in Brazilian Patent Application No. 122018074176-7 (with English translation).
Jan. 10, 2025 Notice of Acceptance in Australian Patent Application No. 2023200570.
Sep. 17, 2024 Extended Search Report in European Patent Application No. 24 169 662.4.
Sep. 27, 2024 Extended Search Report in European Patent Application No. 24 175 384.7.
1 Aug. 2, 2024 Office Action in Singapore Patent Application No. 10202011933X.
Sep. 23, 2023 Office Action in Chinese Patent Application No. 202011441301.X.
Sep. 23, 2023 Office Action in Chinese Patent Application No. 202011441328.9.
Sep. 23, 2023 Office Action in Chinese Patent Application No. 202011440485.8.
Sep. 27, 2023 Search Report in United Arab Emirates Patent Application No. P600623/2017.
Jul. 25, 2023 Notice of Acceptance in Korean Patent Application No. 10-2022-7037444.
May 16, 2023 Office Action in Brazilian Patent Application No. BR-1220-18074173-2 (with English translation).
May 16, 2023 Office Action in Brazilian Patent Application No. BR-1220-18074174-0 (with English translation).
May 16, 2023 Office Action in Brazilian Patent Application No. BR-1220-18074172-4 (with English translation).
Jul. 7, 2023 Office Action in Taiwanese Patent Application No. 111145496.
Jan. 6, 2024 Examination Report in Australian Patent Application No. 2023200570.
Jan. 20, 2025 Notice of Allowance in Korean Patent Application No. 10-2023-7036356.
Office Action in Columbian Patent Application No. NC/2017/0006223, dated Sep. 24, 2018 (with English translation).
Ninestar Announces "Non-Rotating" Workaround to Canon's Dongle Gear, Actionable Intelligence, Feb. 17, 2014.
Dec. 21, 2021 Communication in European Patent Application No. 20 181 560.2.
Dec. 22, 2021 Extended Search Report in European Patent Application No. 21 188 411.9.
Nov. 15, 2021 Office Action in Chinese Patent Application No. 201910975555.0 (with English translation).
Nov. 9, 2021 Office Action in Philippines Patent Application No. 1/2017/500985.
Dec. 8, 2021 Extended Search Report in European Patent Application No. 2188410.1.
Dec. 9, 2021 Extended Search Report in European Patent Application No. 2188412.7.
Oct. 31, 2025 Examination Report in Australian Patent Application No. 2024287255.

(a)

(b)

(c)

(a)

(b)

(c)

(a)

(b)

(a)

(b)

(a)

(b)

(a)

(b)

(a)

(b)

(a)

(b)

(a)

(b)

(a)

(b)

(a)

(b)

CARTRIDGE, MEMBER CONSTITUTING CARTRIDGE, AND IMAGE FORMING APPARATUS

TECHNICAL FIELD

The present invention relates to an image forming apparatus, a cartridge detachably mounted on an apparatus main body of the image forming apparatus, and members constituting the cartridge.

An image forming apparatus forms images on a recording medium. Examples of image forming apparatuses include electronic photocopiers, electrophotography printers (e.g., later beam printers, LED printers, etc.), facsimile devices, word processors, and so forth.

A cartridge is at least one of an electrophotography photosensitive drum that is an image bearing member (hereinafter referred to as photosensitive drum) and a process unit acting on the photosensitive drum (e.g., a developer bearing member (hereinafter referred to as developing roller)) that has been formed into a cartridge. The cartridge is detachably mountable to the image forming apparatus. Cartridges include those where a photosensitive drum and developing roller have been integrally formed into a cartridge, and those where a photosensitive drum and developing roller are formed into separate cartridges. Particularly, the former having a photosensitive drum and developing roller is referred to as a process cartridge. Further, in the latter arrangement, that having a photosensitive drum is referred to as a drum cartridge, and that having a developing roller is referred to as a developing cartridge.

The image forming apparatus main body is the part of the image forming apparatus remaining after removal of the cartridge(s).

BACKGROUND ART

Conventionally, a cartridge system has been employed in image forming apparatuses, where process cartridges, drum cartridges, and developing cartridges are detachably mounted to the apparatus main body of the image forming apparatus. The system of these cartridges enables the user him/herself to perform maintenance of image forming apparatuses without depending on a serviceman, which has markedly improved operability.

Accordingly, the cartridge system is in widespread use in image forming apparatuses.

Further, there is a contact developing system, where the photosensitive drum and developing roller are brought into contact to performed developing, when forming an image. There has been proposed a developing cartridge having a pressing unit in the developing cartridge, for bringing the photosensitive drum and the developing roller into contact (e.g., Japanese Patent Laid-Open No. 2011-39564 and Japanese Patent Laid-Open No. 2010-26541).

Now, the photosensitive drum and developing roller in a contact developing system preferably are spaced when not forming images, from the perspective of stability of image quality, and longevity of the photosensitive drum and developing roller.

CITATION LIST

Patent Literature

PTL 1: Japanese Patent Laid-Open No. 2011-39564
PTL 2: Japanese Patent Laid-Open No. 2010-26541

In Japanese Patent Laid-Open No. 2011-39564 and Japanese Patent Laid-Open No. 2010-26541, the pressing unit is a configuration operated from the apparatus main body only in the direction of the photosensitive drum and the developing roller coming closer. In a case of spacing the photosensitive drum and the developing roller from each other, there is the need to provide a spacing unit to move the developing roller so that the photosensitive drum and the developing unit are spaced from each other, at a different position from the pressing unit. The developing unit is moved at this time against the pressing pressure pressing the developing roller against the photosensitive drum.

Also, in Japanese Patent Laid-Open No. 2010-26541, a configuration is provided where a pressing unit is integrated in the axial direction of the developing roller. In doing so, the pressing unit has to be highly precise and highly rigid, in order to make the pressing state between the photosensitive drum and the developing roller uniform in the axial direction of the developing roller. That is to say, the pressing unit becomes more complicated in order to move the developing roller as to the photosensitive drum and press against the photosensitive drum with high precision.

SUMMARY OF INVENTION

It is an object of the present invention to enable movement of the developer bearing member in a precise manner.

Solution to Problem

In order to accomplish the object, the present invention provides a cartridge that is mountable to an apparatus main assembly of an image forming apparatus, the cartridge comprising a developing roller; a frame supporting the developing roller; a movable part movably supported by the frame and movable to a first position and to a second position relative to the frame; and an elastic part provided between the frame and the movable part to urge the movable part, wherein the movable part includes a first force receiving part that receives force from the apparatus main assembly, in a direction of moving from the first position to the second position, and a second force receiving part that receives force from the apparatus main assembly, in a direction of moving from the second position to the first position, and wherein when the movable part receives force from the apparatus main assembly at the first force receiving part and is at the second position, the movable part receives urging force from the elastic part in a direction of moving the movable part from the second position to the first position.

According to the present invention, it is possible to enable movement of the developer bearing member in a precise manner.

DESCRIPTION OF EMBODIMENTS

The cartridge and electrophotography image forming apparatus according to the present invention will be described by way of drawings. The electrophotography image forming apparatus will be described by way of an example of a laser beam printer main body, and a drum cartridge and developing cartridge detachably mountable to the laser beam printer main body. In the following description, the longitudinal direction of the drum cartridge and the developing cartridge is a direction generally parallel to a photosensitive drum rotational axis L1 and a developing roller rotational axis L0 (the rotational axis direction of the photosensitive drum 10 and developing roller). Note that the photosensitive drum rotational axis L1 and the developing roller rotational axis L0 are a direction orthogonal to the conveyance direction of the recording medium. The transverse direction of the drum cartridge and the developing cartridge is a direction generally orthogonal to the photosensitive drum rotational axis L1 and developing roller rotational axis L0. The direction of mounting/detaching the drum cartridge and developing cartridge to/from the laser beam printer main body is the transverse direction of each cartridge. Note that the symbols in the description are for referencing the drawings, and do not restrict the configuration. A side view in the description of the present embodiment is a diagram illustrating a state viewed from a direction parallel to the developing roller rotational axis L0.

First Embodiment (1) Overall Description of Image Forming Apparatus

Figure 2:
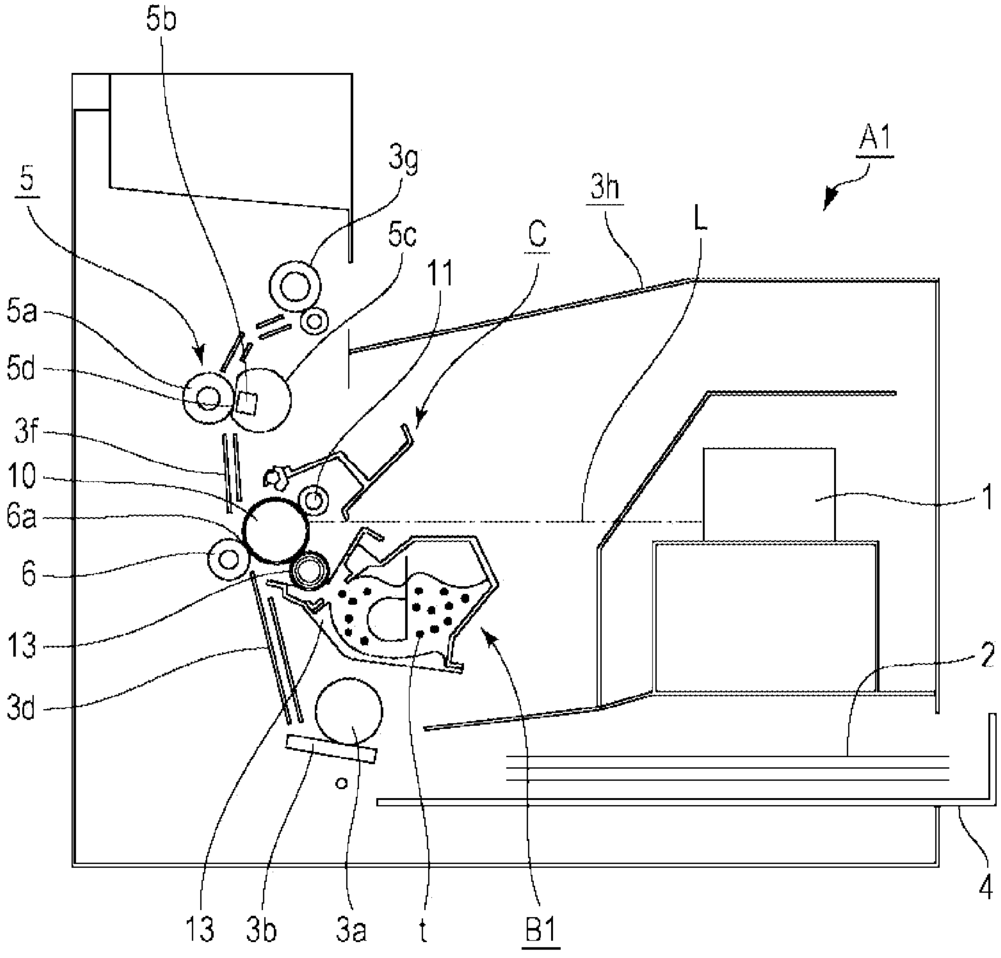
FIG. 2 is a side cross-sectional view of an image forming apparatus.

First, the overall configuration of an image forming apparatus to which an embodiment of the present invention has been applied will be described with reference to FIG. 2. FIG. 2 is a side cross-sectional view of the image forming apparatus.

The image forming apparatus illustrated in FIG. 2 forms images on a recording medium (sheet) 2 by an electrophotography image forming processing using a developer t, in accordance with image information communicated from an external device such as a personal computer or the like. The image forming apparatus has a developing cartridge B1 and a drum cartridge C provided to an apparatus main body A1 so as to be capable of mounting and detaching by a user. Examples of the recording medium 2 includes recording paper, label sheets, OHP sheets, cloth, and so forth. The developing cartridge B1 has a developing roller 13 and so forth as a developer bearing member, and the drum cartridge C has the photosensitive drum 10 and a charging roller 11 and so forth as an image bearing member.

Regarding the photosensitive drum 10, the surface of the photosensitive drum 10 is uniformly charged by the charging roller 11, by application of voltage from the apparatus main body A1. The charged photosensitive drum 10 is then irradiated by laser light L in accordance with image information from optical unit 1, thereby forming an electrostatic latent image on the photosensitive drum 10 in accordance with image information. This electrostatic latent image is developed by developer t, by a later-described developing unit, thereby forming a developer image on the surface of the photosensitive drum 10.

On the other hand, the recording medium 2 accommodated in a sheet feed tray 4 is separated and fed one sheet at a time, being regulated by a sheet feed roller 3*a* and a separating pad 3*b* in pressure contact therewith, synchronously with formation of the developer image. The recording medium 2 is then conveyed by a conveyance guide 3*d* to a transfer roller 6 that serves as a transfer. The transfer roller 6 is biased so as to come into contact with the surface of the photosensitive drum 10.

Next, the recording medium 2 passes a transfer nip portion 6*a* formed by the photosensitive drum 10 and transfer roller 6. Voltage of polarity inverse to that of the developer is applied to the transfer roller 6 at this time, whereby the developer image formed on the surface of the photosensitive drum 10 is transferred to the recording medium 2.

The recording medium 2 on which the developer image has been transferred is conveyed to a fixing unit 5 restricted by a conveyance guide 3*f*. The fixing unit 5 includes a drive roller 5*a*, and a fixing roller 5*c* in which is built a heater 5*b*. Heat and pressure are applied to the recording medium 2 as it passes a nip portion 5*d* formed by the drive roller 5*a* and fixing roller 5*c*, thereby fixing the developer image, transferred onto the recording medium 2, on the recording medium 2. Thus, the image is formed on the recording medium 2.

Thereafter, the recording medium 2 is conveyed by a discharge roller pair 3*g*, and discharged to a discharge part 3*h*.

(2) Description of Electrophotography Image Forming Process

Figure 3:
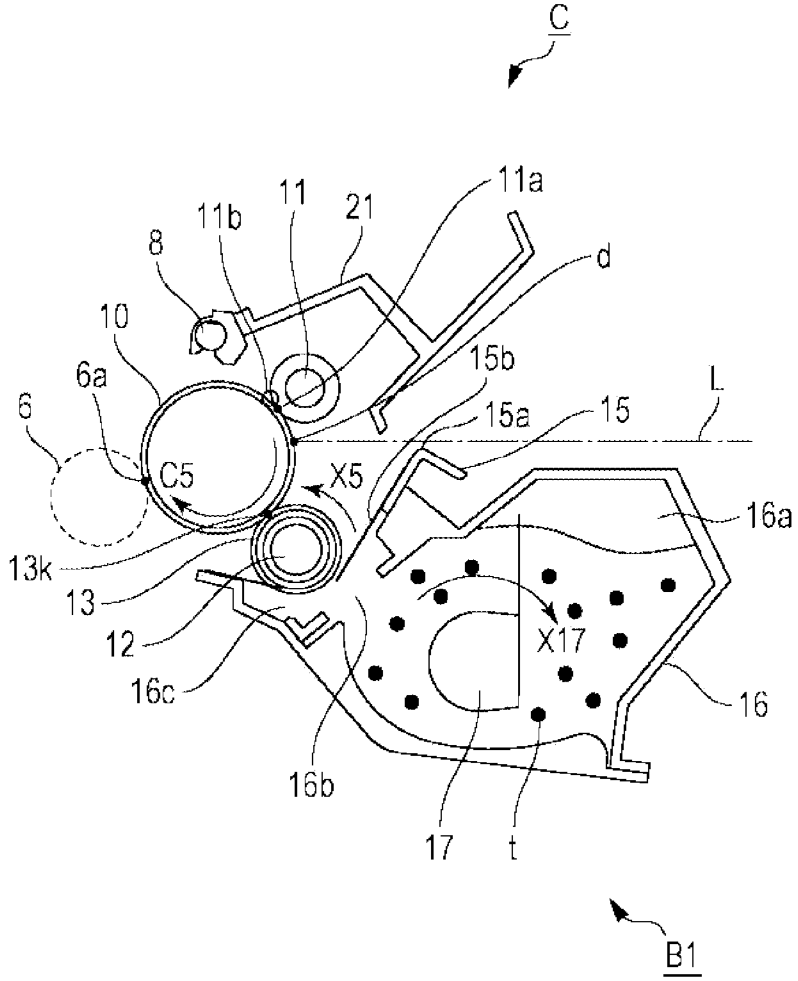
FIG. 3 is a cross-sectional view of a developing cartridge and drum cartridge.

Next, an electrophotography image forming process to which an embodiment of the present invention has been applied will be described with reference to FIG. 3. FIG. 3 is a cross-sectional explanatory diagram of the developing cartridge B1 and the drum cartridge C.

The developing cartridge B1 has the developing roller 13 serving as a developing unit, a developing blade 15, and so forth, in a developing container 16, as illustrated in FIG. 3. The developing cartridge B1 is a developing device that has been formed into a cartridge, and is detachably mounted to the apparatus main body of the image forming apparatus.

The drum cartridge C also has the photosensitive drum 10, charging roller 11, and so forth in a cleaning frame (photosensitive member supporting frame) 21. The drum cartridge C also is detachably mounted to the apparatus main body of the image forming apparatus.

The developer t stored in a developer accommodation part 16*a* of the developing container 16 is fed out from an opening 16*b* of the developing container 16 to a developing chamber 16*c*, by a developer conveyance member 17 rotatably supported by the developing container 16 rotating in the direction of an arrow X17. The developing roller 13 having a built-in magnet roller 12 is provided in the developing container 16. Specifically, the developing roller 13 is configured of a shaft part 13*e* and rubber part 13*d*. The shaft part 13*e* is an electroconductive slender cylindrical object of aluminum or the like, and the middle part in the longitudinal direction thereof is covered by the rubber part 13*d* (see FIGS. 6(*a*) and 6(*b*)). Now, the rubber part 13*d* covers the shaft part 13*e* so that the external shape thereof is concentric with the shaft part 13*e*. The developing roller 13 draws the developer t in the developing chamber 16*c* to the surface of the developing roller 13 by the magnetism of the magnet roller 12. The developing blade 15 is configured or a supporting member 15*a* made up of a metal plate, and an elastic member 15*b* made of urethane rubber, a SUS plate, or the like, with the elastic member 15*b* being disposed so as to be in elastic contact with the developing roller 13 at a certain contact pressure. The developing roller 13 rotates in a rotation direction X5, which regulates the amount of developer t adhering to the surface of the developing roller 13, and a frictional charge is imparted to the developer t. This forms a developer layer on the surface of the developing roller 13. Thus, the developing roller 13 that has received application of voltage from the apparatus main body A1 is then rotated in the rotational direction X5 in a state of being in contact with the photosensitive drum 10, whereby developer t can be supplied to a developing region on the photosensitive drum 10.

In a case of a contact developing system as in the present embodiment, there is a concern that deformation of the rubber part 13*b* of the developing roller 13 may occur if a state is maintained where the developing roller 13 such as illustrated in FIG. 3 is constantly in contact with the photosensitive drum 10. Accordingly, the developing roller 13 preferably is spaced from the photosensitive drum 10 when not developing.

The charging roller 11 rotatably supported by the cleaning frame 21, and biased in the direction of the photosensitive drum 10, is provided in contact with the peripheral face of the photosensitive drum 10. The detailed configuration will be described later. The charging roller 11 uniformly charges the surface of the photosensitive drum 10 by application of voltage from the apparatus main body A1. The voltage applied to the charging roller 11 is set to a value where the potential difference between the surface of the photosensitive drum 10 and the charging roller 11 is equal to or greater than discharge charging voltage, and specifically, DC voltage of −1300 V is applied as charging bias. At this time, the surface of the photosensitive drum 10 is uniformly charged by contact to charging potential (dark potential) of −700 V. The charging roller 11 is driven and rotates in accordance with rotations of the photosensitive drum 10 in the present example (described in detail later). The electrostatic latent image on the surface of the photosensitive drum 10 is formed by laser light L from the optical unit 1. Thereafter, the developer t is transferred in accordance with the electrostatic latent image on the photosensitive drum 10, visualizing the electrostatic latent image, thus forming a developer image on the photosensitive drum 10.

(3) Configuration Description of Cleanerless System

Next, a cleanerless system according to the present example will be described.

A so-called cleanerless system, where no cleaning member to remove transfer residual toner t2 remaining on the photosensitive drum 10 without being transferred is provided, is exemplified in the present embodiment.

The photosensitive drum 10 is rotationally driven in the direction of arrow C5, as illustrated in FIG. 3. There is a gap portion on the upstream side of a charging nip portion 11*a* where the charging roller 11 and photosensitive drum 10 come into contact (upstream gap portion 11*b*), as viewed from rotational direction C5 of the photosensitive drum 10. The transfer residual toner t2 remaining on the surface of the photosensitive drum 10 after the transfer process is charged to the same negative polarity as the photosensitive drum, by discharge at this upstream gap portion 11*b*. At this time, the surface of the photosensitive drum is charged to −700 V. The negatively-charged transfer residual toner t2 passes the charging nip portion 11*a* without adhering to the charging roller 11, due to the relationship in potential difference thereat (surface potential of photosensitive drum 10=−700 V, potential of charging roller 11=−1300 V).

The transfer residual toner t2 that has passed through the charging nip portion 11*a* reaches a laser irradiation position d. The transfer residual toner t2 is not of an amount sufficient to shield the laser light L from the optical unit, and accordingly does not affect the process of creating the electrostatic latent image on the photosensitive drum 10. The transfer residual toner t2 that has passed the laser irradiation position d and also is at non-exposed portions (the surface of the photosensitive drum 10 where laser irradiation has not been performed) is recovered by electrostatic force to the developing roller 13, at a developing nip portion 13*k* which is where the developing roller 13 and the photosensitive drum 10 come into contact. On the other hand, transfer residual toner t2 at exposed portions (the surface of the photosensitive drum 10 where laser irradiation has been performed) is not recovered by electrostatic force but continues to exist on the photosensitive drum 10. However, some of the transfer residual toner t2 may be recovered due to physical force due to the circumferential speed difference between the developing roller 13 and the photosensitive drum 10.

The transfer residual toner t2 that is not transferred onto paper but remains on the photosensitive drum 10 is this generally recovered to the developing container 16. The transfer residual toner t2 recovered to the developing container 16 is mixed with the developer t remaining in the developing container 16 and used.

The following two configurations are employed in the present embodiment to enable the transfer residual toner t2 to pass through the charging nip portion 11*a* without adhering to the charging roller 11. A first is that an optical destaticizing member 8 is provided between the transfer roller 6 and the charging roller 11. The optical destaticizing member 8 is situated on the upstream side of the charging nip portion 11*a* in the rotational direction of the photosensitive drum 10 (arrow C5). Optical destaticizing of the surface of the photosensitive drum 10 that has passed the transfer nip portion 6*a* is performed, in order to perform stable discharging at the upstream gap portion 11*b*. By setting the potential of the photosensitive drum 10 before charging to around-150 V in the entire longitudinal region by this optical destaticizing member 8, uniform discharge can be performed, and the transfer residual toner t2 can be uniformly negatively charged when charging.

The second is that the charging roller 11 is driven rotationally so as to have a predetermined circumferential difference as to the photosensitive drum 10. While almost all toner is negatively charged due to the discharge as described above, there is some transfer residual toner t2 remaining that was not completely negatively charged, and this transfer residual toner t2 may adhere to the charging roller 11 at the charging nip portion 11*a*. Rotationally driving the charging roller 11 and photosensitive drum 10 is a predetermined circumferential speed difference therebetween enables such transfer residual toner t2 to be negatively changed by friction between the photosensitive drum 10 and charging roller 11. This is effective in suppressing adhesion of the transfer residual toner t2 to the charging roller 11. A charging roller gear 69 (FIG. 16(*b*), details will be described later) is provided on one end of the charging roller 11 in the longitudinal direction, with the charging roller gear 69 engaging a driving side flange 24 (FIG. 16(*b*), details will be described later) provided on one end of the photosensitive drum 10 in the longitudinal direction. Accordingly, the charging roller 11 also is rotationally driven in conjunction with the rotational driving of the photosensitive drum 10. The circumferential speed of the surface of the charging roller 11 is set to be around 105 to 120% as to the circumferential speed of the surface of the photosensitive drum 10.

(4) Description of Configuration of Developing Cartridge B1

<Overall Configuration of Developing Cartridge B1>

Figure 4:
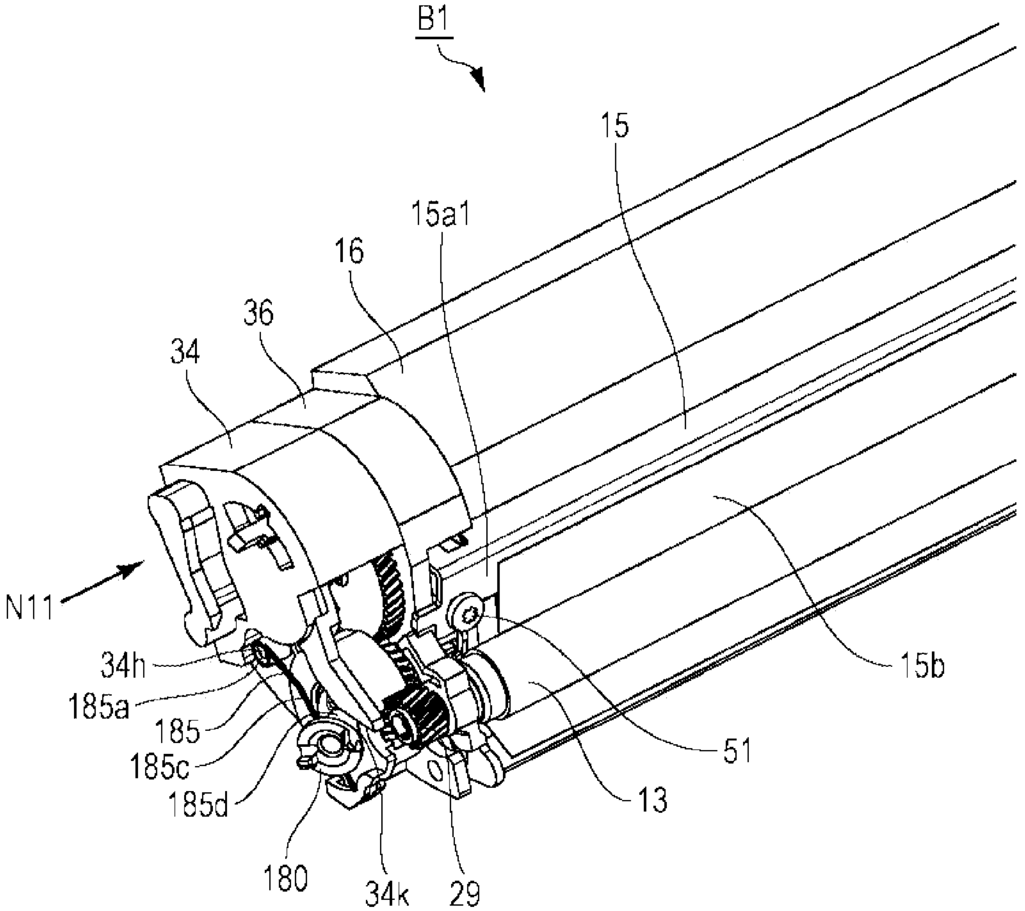
FIG. 4 is a perspective view of a driving side of a developing cartridge.
Figure 5:
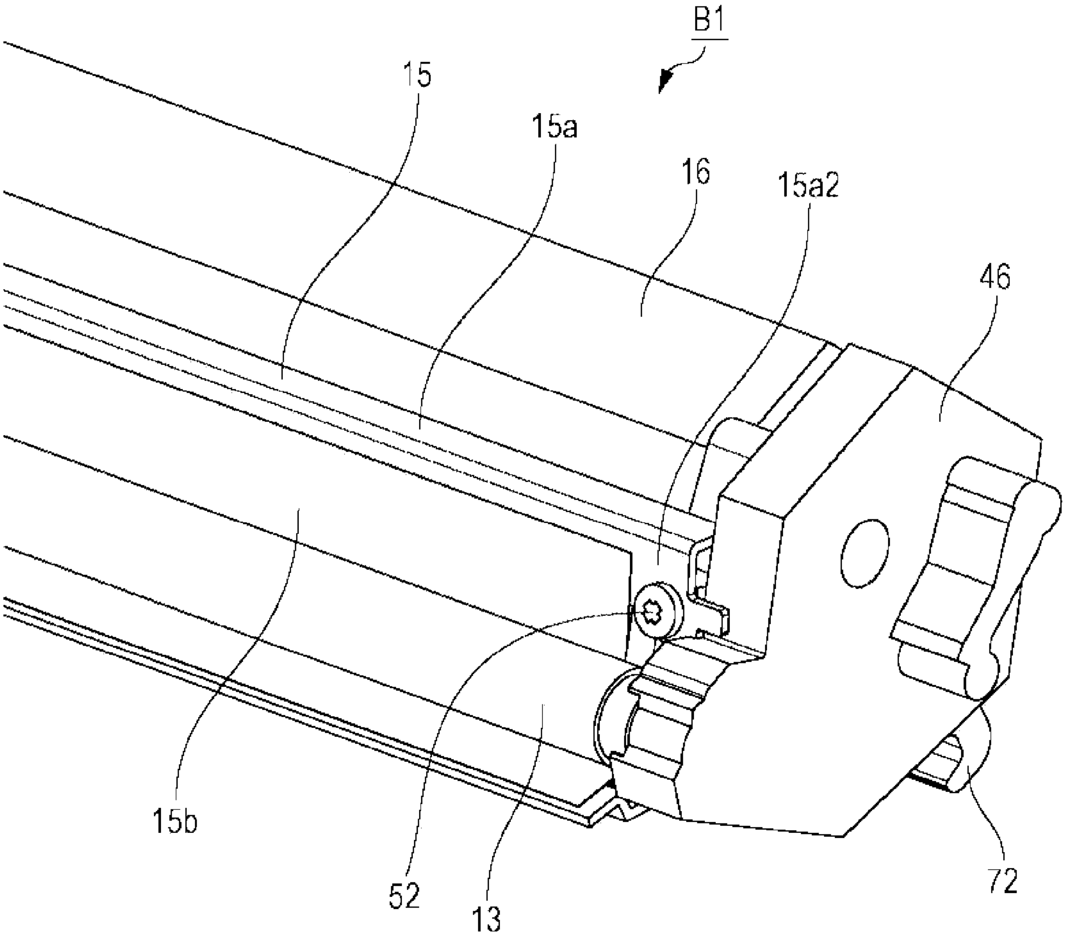
FIG. 5 is a perspective view of a non-driving side of a developing cartridge.
Figure 6:
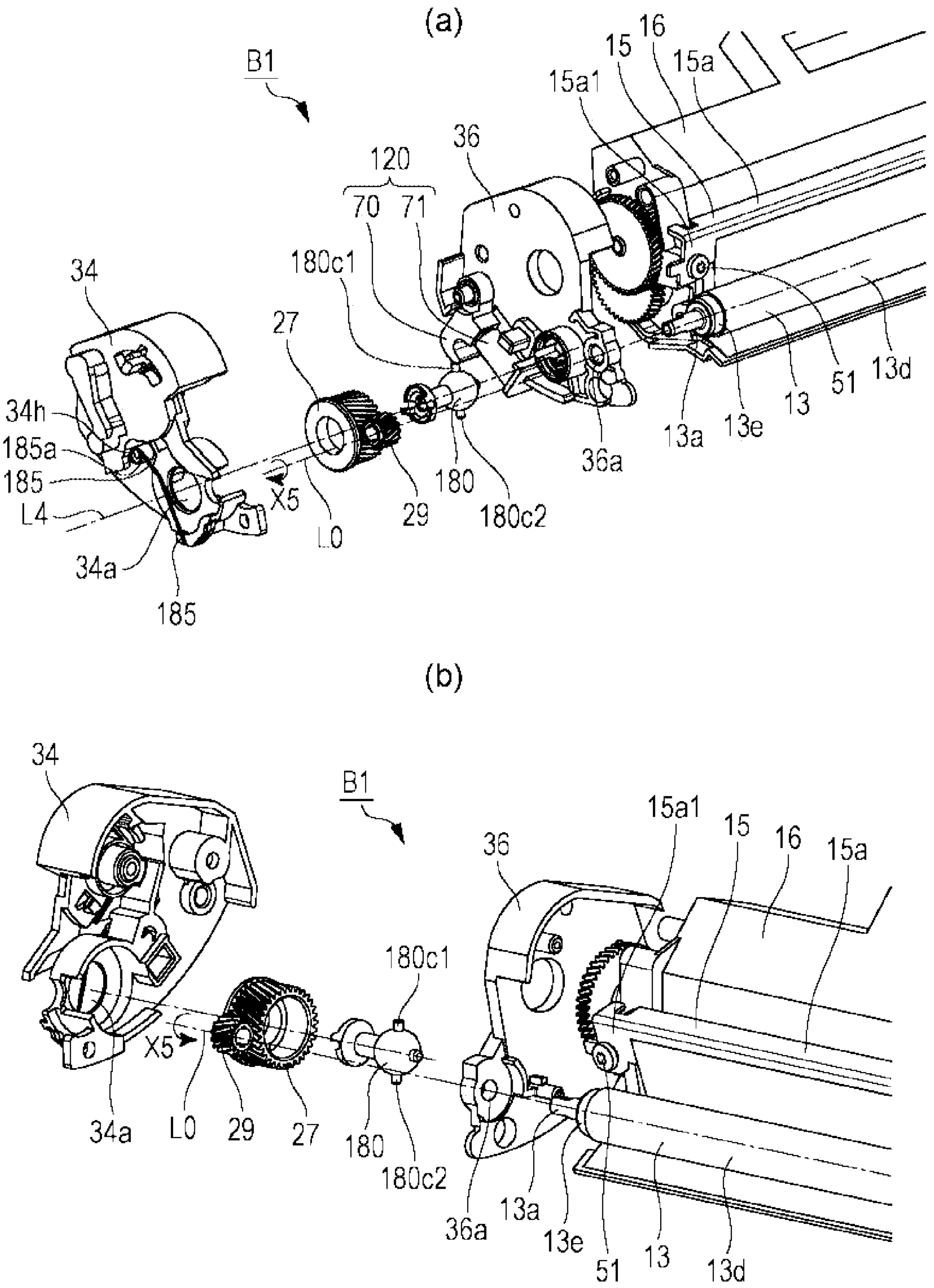
FIG. 6 includes disassembled perspective views of a driving side of a developing cartridge.
Figure 7:
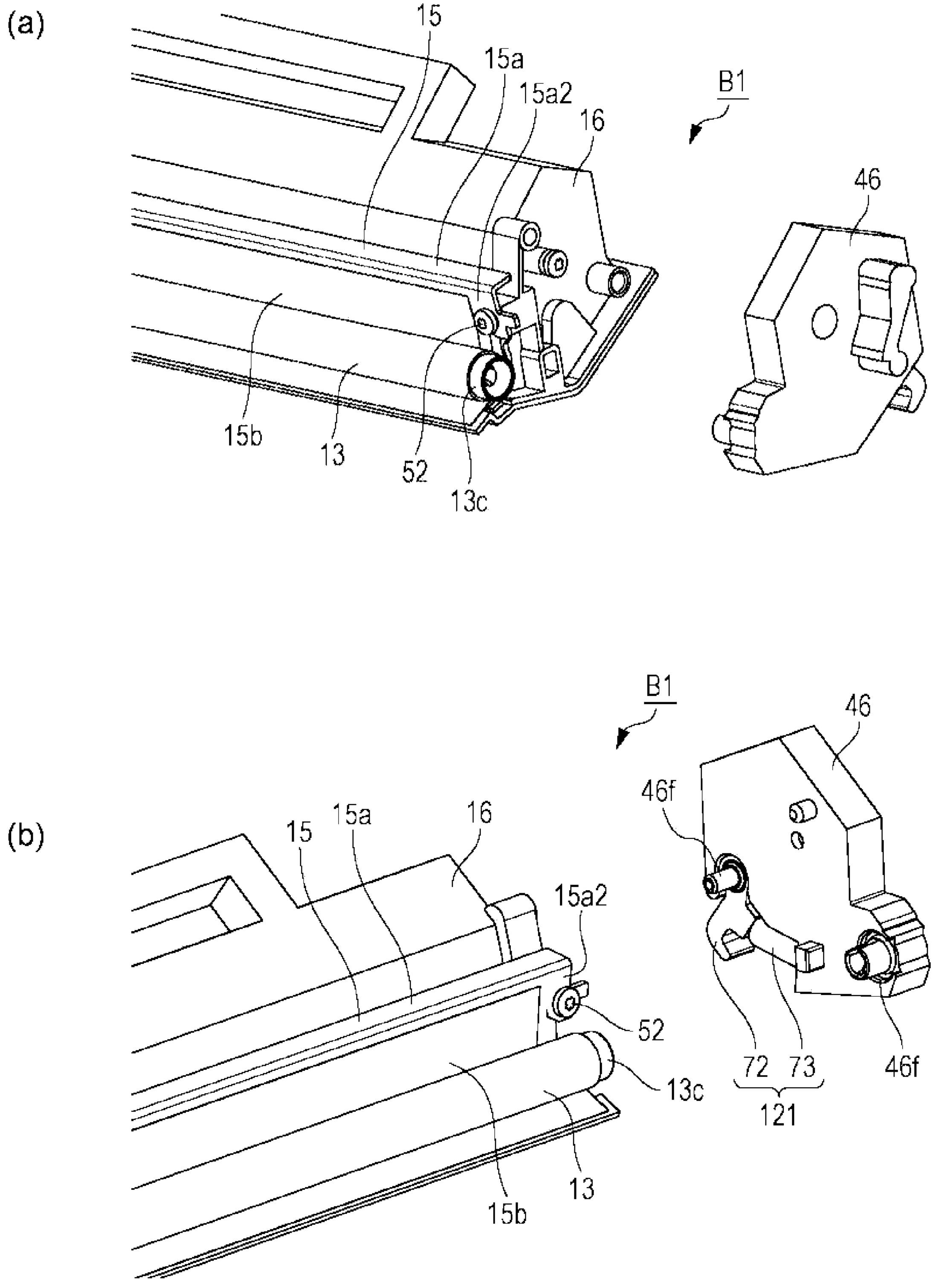
FIG. 7 includes disassembled perspective views of a non-driving side of a developing cartridge.

Next, the configuration of the developing cartridge B1 to which an embodiment of the present invention has been applied will be described. Note that in the following description, one end side of the developing cartridge B1 in the longitudinal direction where rotational force is transmitted from the apparatus main body A1 to the developing cartridge B1 will be referred to as driving side". The other side thereof is the other end of the developing cartridge B1, which will be referred to as the "non-driving side". FIG. 4 is a perspective explanatory view of the developing cartridge B1 as viewed from the driving side. FIG. 5 is a perspective explanatory view of the developing cartridge B1 as viewed from the non-driving side. FIGS. 6(*a*) and 6(*b*) are perspective explanatory diagrams from the driving side (FIG. 6(*a*)) and a perspective explanatory diagram from the non-driving side (FIG. 6(*b*)), with the driving side of the developing cartridge B1 disassembled. FIGS. 7(*a*) and 7(*b*) are perspective explanatory diagrams from the non-driving side (FIG. 7(*a*)) and a perspective explanatory diagram from the driving side (FIG. 7(*b*)), with the non-driving side of the developing cartridge B1 disassembled.

The developing cartridge B1 has the developing roller 13, developing blade 15, and so forth, as illustrated in FIGS. 6 and 7. The developing blade 15 has a driving-side end portion 15*a*1 and non-driving-side end portion 15*a*2 of in the longitudinal direction of the supporting member 15*a* fixed to the developing container 16 by a screw 51 and a screw 52. A driving-side developing bearing 36 and a non-driving-side developing bearing 46 are disposed on the respective longitudinal-direction ends of the developing container 16. The developing roller 13 has a driving-side end portion 13*a* fit to a hole 36*a* of the driving-side developing bearing 36. A non-driving-side end portion 13*c* is fit to a supporting part 46*f* of the non-driving-side developing bearing 46. Thus, the developing roller 13 is rotatably supported by the developing container 16. A developing roller gear 29 is concentrically disposed with the developing roller 13 on the driving-side end portion 13*a* of the developing roller 13, further on the outside in the longitudinal direction from the driving-side developing bearing 36, so that the developing roller 13 and the developing roller gear 29 are integrally rotatable (see FIG. 4). The developing roller gear 29 is a helical gear.

The driving-side developing bearing 36 rotatably supports a drive input gear 27 at the outer side in the longitudinal direction thereof. The drive input gear 27 and the developing roller gear 29 mesh. The drive input gear 27 also is a helical gear. The drive input gear 27 has more teeth than the developing roller gear 29 has teeth.

A coupling member 180 is also provided concentrically with the drive input gear 27.

A developing side cover 34 is provided at the farthest end of the developing cartridge B1 at the driving side, covering the drive input gear 27 and so forth from the outside in the longitudinal direction. The frame of the developing cartridge, made up of the developing container 16, non-driving-side developing bearing 46, driving-side developing bearing 36, and developing side cover 34, is referred to as a developing frame. Further, the coupling member 180 protrudes outwards in the longitudinal direction through a hole 34*a* in the developing side cover 34. The coupling member 180 serving as a drive input member is configured to engage a main body side drive member 100 provided to the apparatus main body A1, with rotational force being transmitted (input), which will be described in detail later. The configuration is such that the rotational force is transmitted to a rotational force reception part 27*dl* (see FIG. 8(*b*)) and rotational force reception part 27*d*2 (omitted from illustration) of the drive input gear 27, via rotational force transmission parts 180*cl* and 180*c*2 of the coupling member 180. Consequently, the configuration is such that the rotational force input to the coupling member 180 is transmitted to the developing roller 13 serving as a rotating member, via the drive input gear 27 and the developing roller gear 29.

A first movable member 120 is provided to the driving-side developing bearing 36. The first movable member 120 is configured including a driving-side coontacting/spacing lever 70 serving as a first main part, and a driving-side developing pressure spring 71 serving as a first elastic part (a part or member that elastically deforms). The driving-side coontacting/spacing lever 70 is a member that receives elastic force of the driving-side developing pressure spring 71.

Note that the first main part and the first elastic part are configured as separate members in the present embodiment. However, the first main part and the first elastic part may be integrally formed in the first movable member 120, and the configuration thereof is not restricted. Further, a second movable member 121 is provided to the non-driving-side developing bearing 46. The second movable member 121 is configured including a non-driving-side coontacting/spacing lever 72 serving as a second main part, and a non-driving-side developing pressure spring 73 serving as a second elastic part (a part or member that elastically deforms). The non-driving-side coontacting/spacing lever 72 is a member that receives elastic force of the non-driving-side developing pressure spring 73.

Note that the second main part and the second elastic part are configured as separate members in the present embodiment. However, the second main part and the second elastic part may be integrally formed in the second movable member 121, and the configuration thereof is not restricted.

Details will be described later.

<Coupling Member 180 and Peripheral Configurations>

The coupling member 180 and peripheral configurations will be described below in detail.

Figure 8:
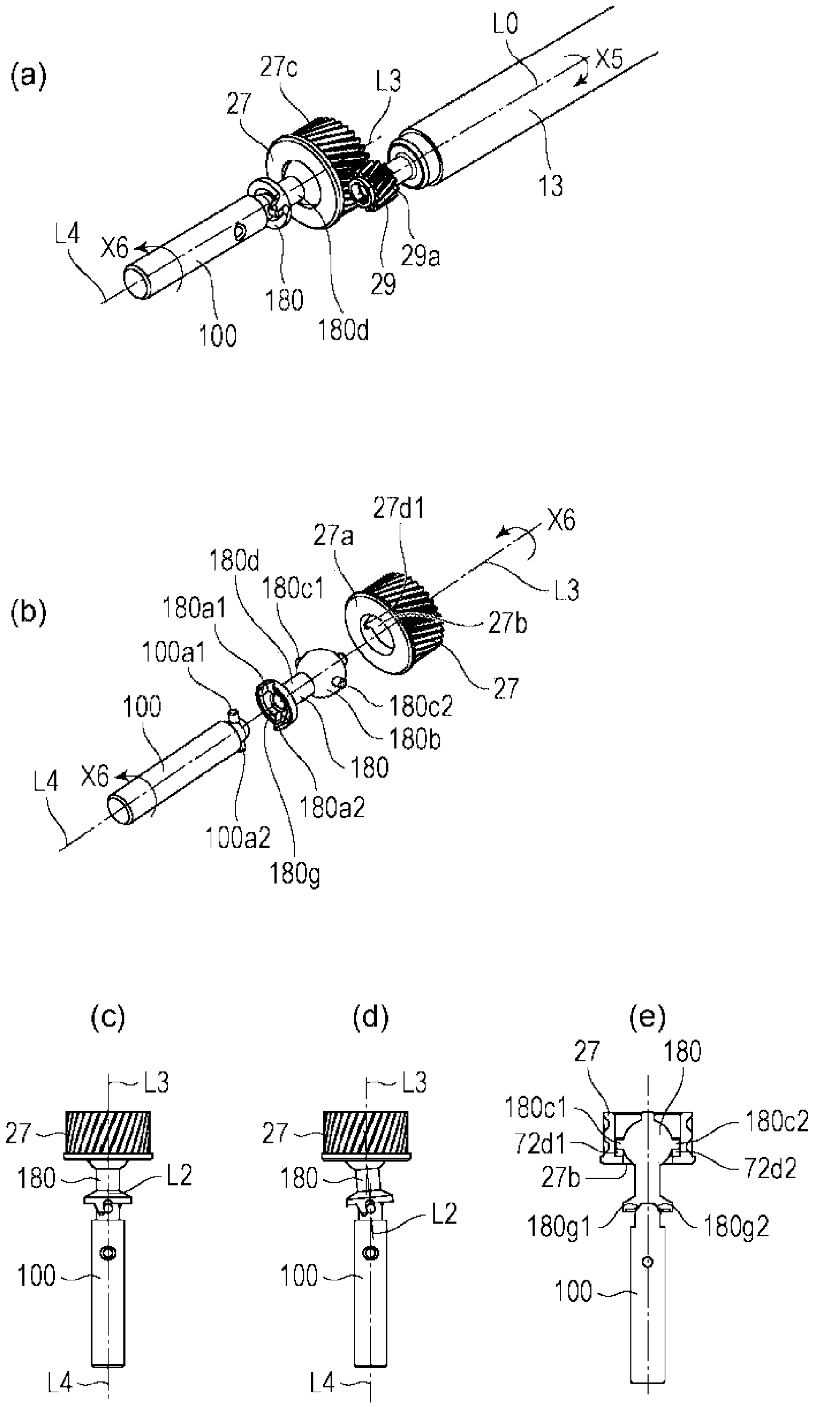
FIG. 8 includes perspective views of a drive input part of a developing cartridge.

The coupling member 180, the drive input gear 27, and a coupling spring 185 are provided on the driving side of the developing cartridge B1, as illustrated in FIGS. 6(*a*) and 6(*b*). The coupling member 180 engages the main body side drive member 100 provided to the apparatus main body A1, and rotational force is transmitted. Specifically, the coupling member 180 is configured primarily including rotational force receiving parts 180*a*1 and 180*a*2, a supported part 180*b*, rotational force transmitting parts 180*cl* and 180*c*2, and a guided part 180*d*, as illustrated in FIG. 8(*b*). The rotational force receiving parts 180*a*1 and 180*a*2 of the coupling member 180 are disposed further outside in the longitudinal direction from a driving-side end portion 27*a* of the drive input gear 27 (see FIGS. 8(*a*) and 8(*b*)). When the main body side drive member 100 rotates in the direction of arrow X6 (hereinafter, forward rotation X direction) around rotational axis L4, a rotational force applying part 100*a*1 of the main body side drive member 100 comes into contact with the rotational force receiving part 180*a*1. Also, a rotational force applying part 100*a*2 of the main body side drive member 100 comes into contact with the rotational force receiving part 180*a*2. Thus, the rotational force is transmitted from the main body side drive member 100 to the coupling member 180. The supported part 180*b* of the coupling member 180 is generally spherical in shape, as illustrated in FIGS. 8(*b*) and 8(*e*), with the supported part 180*b* being supported by a supporting part 27*b* on an inner circumferential face of the drive input gear 27. The rotational force transmitting parts 180*cl* and 180*c*2 are provided on the supported part 180*b* of the coupling member 180. The rotational force transmitting part 180*cl* comes into contact with the rotational force reception part 27*dl* of the drive input gear 27. In the same way, the rotational force transmitting part 180*c*2 comes into contact with the rotational force reception part 27*d*2 of the drive input gear 27. Accordingly, the drive input gear 27 is driven by the coupling member 180 that has been driven by the main body side drive member 100, so the drive input gear 27 rotates in the forward rotation direction X6 around the rotational axis L3.

Now, the rotational axis L4 of the main body side drive member 100 and the rotational axis L3 of the drive input gear 27 are set so as to be concentric, as illustrated in FIG. 8(*c*). However, there are cases where the rotational axis LA of the main body side drive member 100 and the rotational axis L3 of the drive input gear 27 are slightly shifted in parallel from being concentric, due to variance in dimensions of parts and so forth, as illustrated in FIG. 8(*d*). In such a case, the rotational axis L2 of the coupling member 180 rotates in a state of being inclined with respect to the rotational axis L3 of the drive input gear 27, and rotational force is transmitted from the main body side drive member 100 to the coupling member 180. Further, there also are cases where the rotational axis L3 of the drive input gear 27 is shifted from being concentric as to the rotational axis LA of the main body side drive member 100, with an angle therebetween. In this case, rotational force is transmitted from the main body side drive member 100 to the coupling member 180 in a state where the rotational axis L2 of the coupling member 180 is inclined with respect to the rotational axis LA of the main body side drive member 100.

As illustrated in FIG. 8(*a*), a gear portion 27*c* that is a helical gear or a spur gear is integrally formed with the drive input gear 27, concentrically with the rotational axis L3 of the drive input gear 27 (a helical gear is used in the present embodiment). The gear portion 27*c* meshes with a gear portion 29*a* of the developing roller gear 29. The developing roller gear 29 rotates integrally with the developing roller 13, and accordingly rotational force of the drive input gear 27 is transmitted to the developing roller 13 via the developing roller gear 29. The developing roller 13 rotates in rotational direction X5 around a rotational axis L9.

<Configuration of Electrode Portion at Non-Driving Side of Developing Cartridge>

Figure 33:
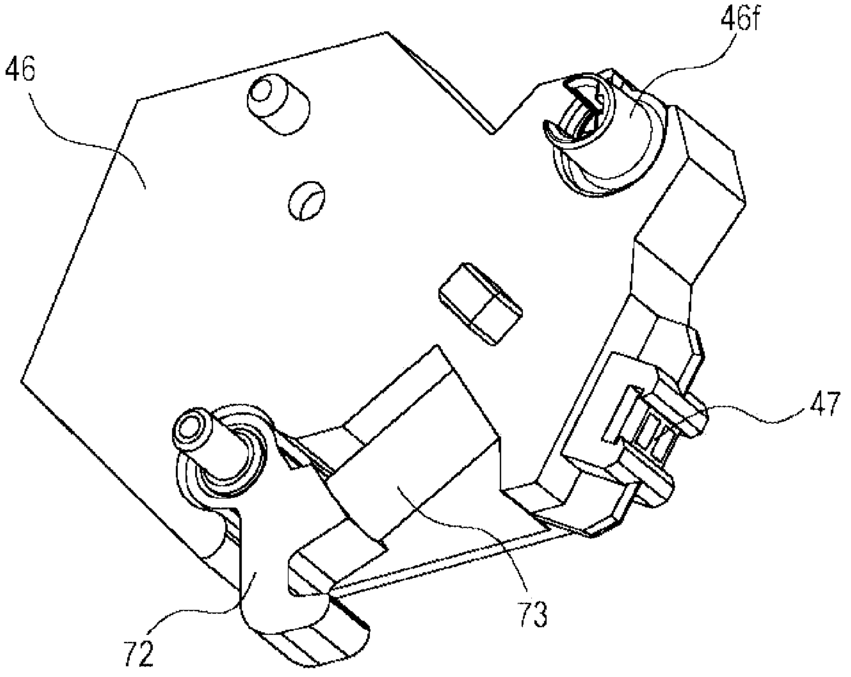
FIG. 33 includes perspective views of a non-driving-side bearing.
Figure 33:
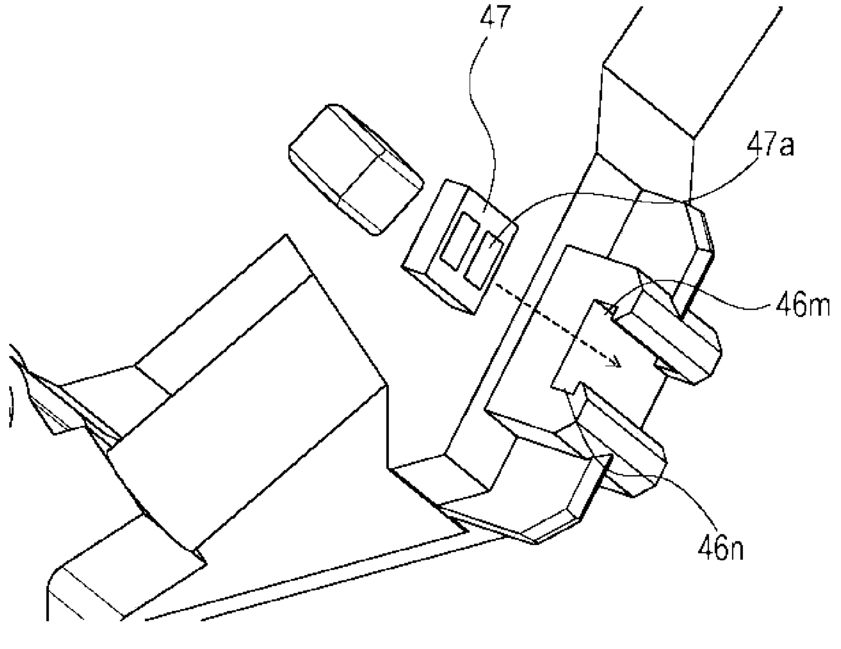

Next, a memory board 47 serving as a contact part, and an electrode portion 47*a* serving as an exposed face, that are provided at the non-driving side end portion of the developing cartridge B1, will be described with reference to FIGS. 33(*a*) and 33(*b*). The memory board 47 is provided on the outer circumference side of the non-driving-side developing bearing 46, and to the side of the supporting part 46*f* that rotatably supports the developing roller 13 as viewed from the non-driving-side coontacting/spacing lever 72. The memory board 47 stores the manufacturing lot and property information of the developing cartridge B1, which is used for image formation by the apparatus main body A1. The electrode portion 47*a*, made of metal such as iron, copper, or the like, is provided to the memory board 47, and when performing image formation, electrically connects to the apparatus main body A1 via the memory board 47 to perform communication.

Both ends of the memory board 47 are inserted into a first substrate supporting part 46*m* and a second substrate supporting part 46*n* provided on the non-driving-side developing bearing 46. The memory board 47 and the first substrate supporting part 46*m* and second substrate supporting part 46*n* are fixed by press fitting, adhesion, or the like.

The memory board 47 is provided with multiple electrode portions 47*a*. The direction in which these multiple electrode portions 47*a* are arrayed, and the direction of insertion of the memory board 47 to the first substrate supporting part 46*m* and second substrate supporting part 46*n* is the same direction.

<Assembling of Driving-Side Side Cover and Peripheral Parts>

Figure 9:
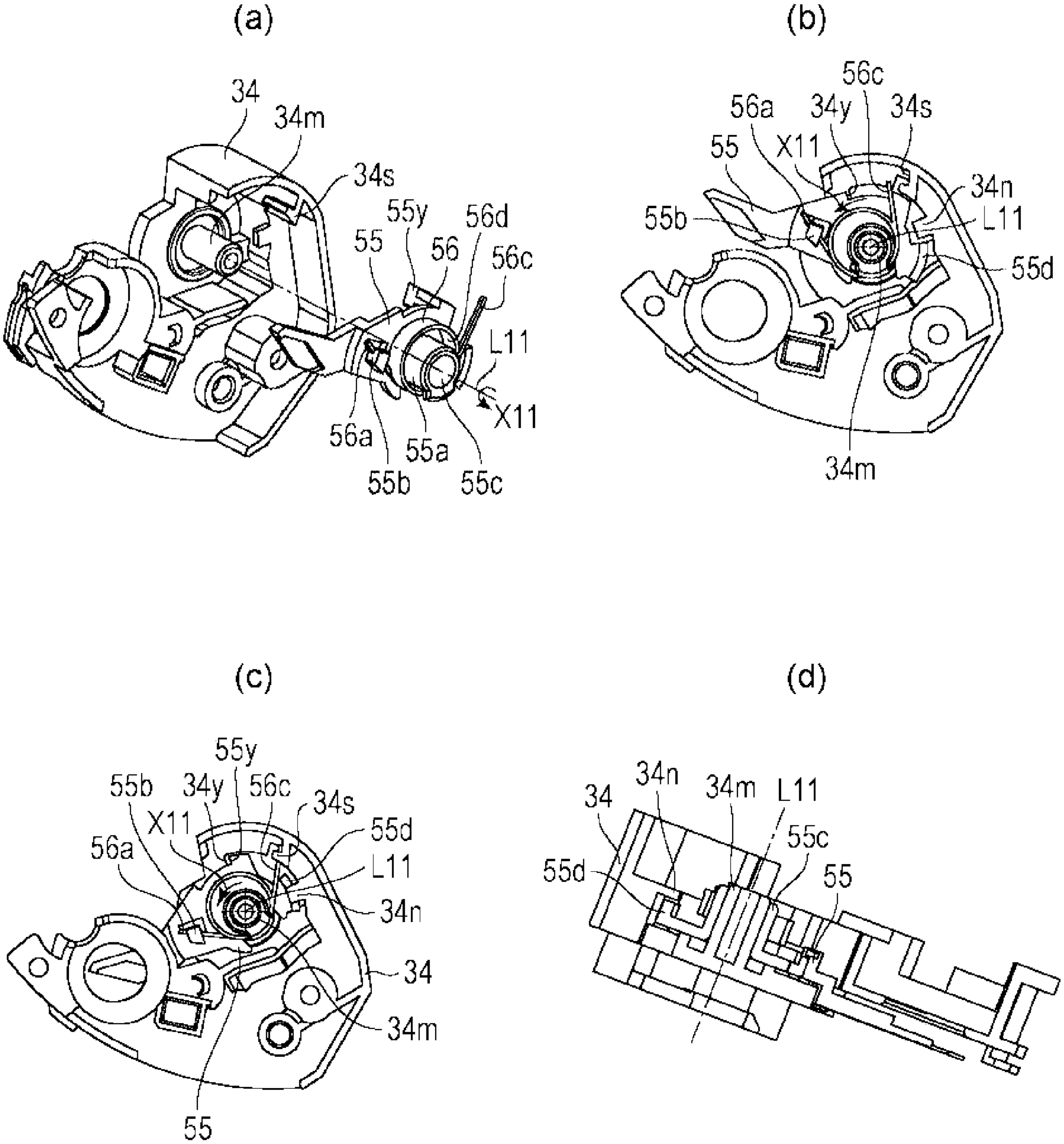
FIG. 9 includes explanatory diagrams of the periphery of a driving-side side cover.

Next, the configuration of the developing side cover 34 provided to the driving side end portion of the developing cartridge B1, and a coupling lever 55 will be described in detail. FIGS. 9(*a*) through 9(*d*) are a perspective explanatory diagram and side views illustrating the way in which the coupling lever 55 and a coupling lever spring 56 are assembled to the developing side cover 34.

The coupling lever 55 and coupling lever spring 56 are assembled on the inner side of the developing side cover 34 in the longitudinal direction. Specifically, a cylindrically-shaped lever positioning boss 34*m* of the developing side cover 34 and a hole 55*c* of the coupling lever 55 are fit together, and the coupling lever 55 is rotatably supported by the developing side cover 34 centered on a rotational axis L11. The coupling lever spring 56 is a torsion spring, with one end engaging the coupling lever 55 and the other end engaging the developing side cover 34. Specifically, an operating arm 56*a* of the coupling lever spring 56 engages a spring hook part 55*b* of the coupling lever 55, and a fixed arm 56*c* of the coupling lever spring 56 engages a spring hook part 34*s* of the developing side cover 34 (see FIG. 9(*c*)).

The coupling spring 185 is assembled on the outer side of the developing side cover 34 in the longitudinal direction, which will be described in detail later.

A method for assembling the coupling lever 55 and the coupling lever spring 56 to the developing side cover 34 will be described in order. First, a cylindrical part 56*d* of the coupling lever spring 56 is attached to a cylindrical boss 55*a* of the coupling lever 55 (FIG. 9(*a*)). The operating arm 56*a* of the coupling lever spring 56 engages the spring hook part 55*b* of the coupling lever 55 at this time. The fixed arm 56*c* of the coupling lever spring 56 is deformed in the direction of arrow X11 centered on the rotational axis L11. Next, the hole 55*c* of the coupling lever 55 is inserted onto the lever positioning boss 34*m* of the developing side cover 34 (FIGS. 9(*a*) and 9(*b*)). A locking part 55*d* of the coupling lever 55 is positioned so as to not interfere with a locked part 34*n* of the developing side cover 34. Specifically, the locking part 55*d* of the coupling lever 55 and the locked part 34*n* of the developing side cover 34 are positioned so as to not overlap when viewed from the longitudinal direction, as illustrated in FIG. 9(*b*).

In the state illustrated in FIG. 9(*b*), the fixed arm 56*c* of the coupling lever spring 56 is deformed in the direction of arrow X11, as described earlier. When the deformation of the fixed arm 56*c* of the coupling lever spring 56 is released from the state illustrated in FIG. 9(*b*), the fixed arm 56*c* engages the spring hook part 34*s* of the developing side cover 34. The configuration is such that the spring hook part 34*s* of the developing side cover 34 receives the biasing force of the deformed fixed arm 56*c* of the coupling lever spring 56. Consequently, the fixed arm 56*c* of the coupling lever spring 56 receives reactive force from the spring hook part 34*s* of the developing side cover 34 in the direction of arrow X11. Further, the coupling lever 55 receives biasing force from the coupling lever spring 56 at the spring hook part 55*b*. As a result, the coupling lever 55 rotates centered on the rotational axis L11 in the direction of arrow X11, and rotation is restricted at a position where a rotation restricting part 55*y* abuts a restricting face 34*y* of the developing side cover 34 (see FIGS. 9*a* through 9(*c*)). Thus, the assembling of the coupling lever 55 and coupling lever spring 56 to the developing side cover 34 ends.

Note that at this time, the locking part 55*d* of the coupling lever 55 is in a state of overlapping the locked part 34*n* of the developing side cover 34 as viewed in the longitudinal direction. That is to say, the coupling lever 55 is configured such that movement in the longitudinal direction is restricted, and only rotation centered on the rotational axis X11 is enabled. FIG. 9(*d*) is a cross-sectional view of the locking part 55*d* of the coupling lever 55.

<Assembly of Developing Side Cover 34>

Figure 10:
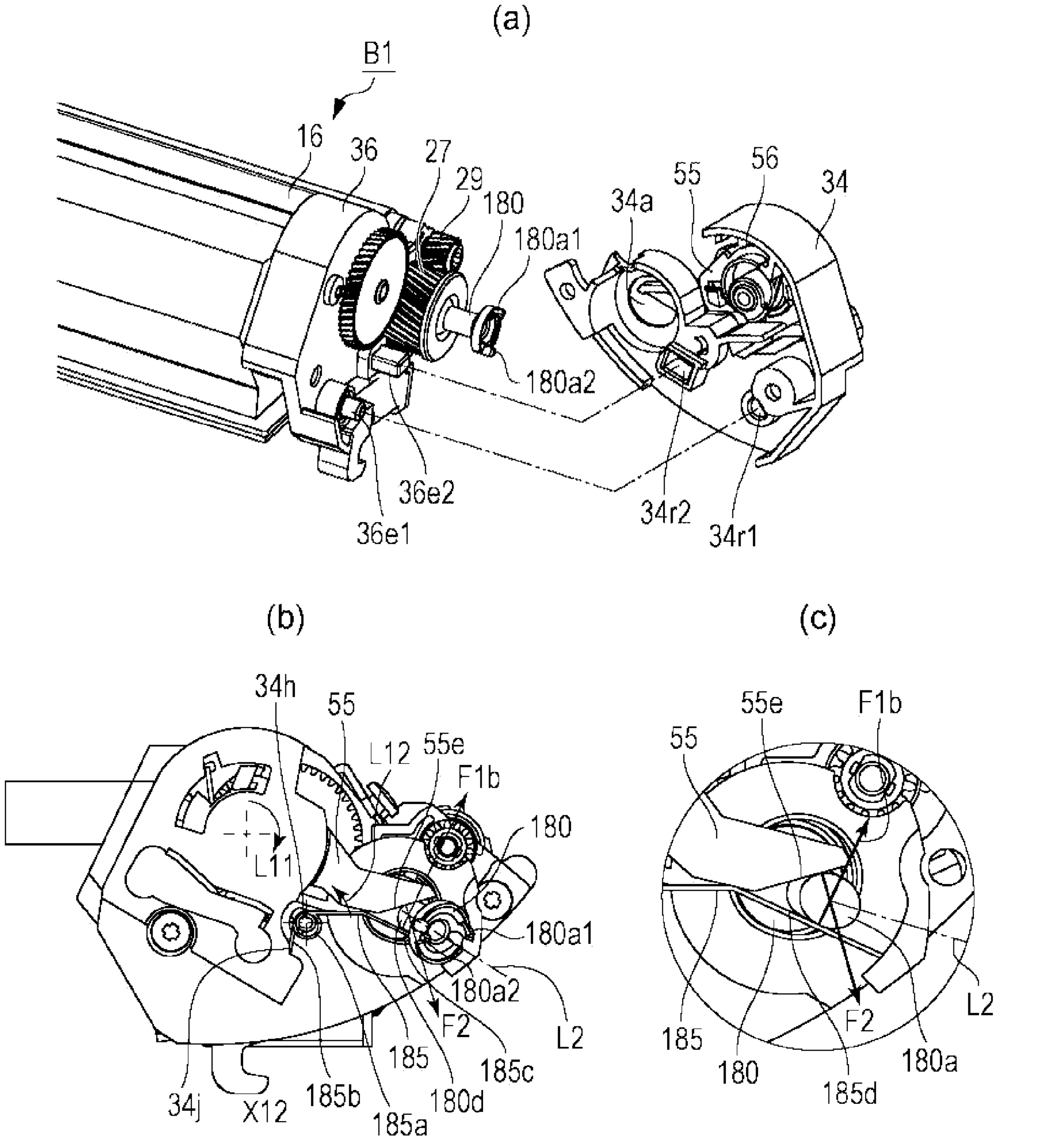
FIG. 10 includes explanatory diagrams of the periphery of a driving-side side cover.

The developing side cover 34 where the coupling lever 55 and coupling lever spring 56 are integral, is fixed on the outer side of the driving-side developing bearing 36 in the longitudinal direction, as illustrated in FIG. 10. Specifically, a positioning part 34*r1* of the developing side cover 34 and a positioned part 36*e*1 of the driving-side developing bearing 36 are engaged. The configuration is such that the developing side cover 34 is positioned as to the driving-side developing bearing 36 by the positioning part 34*r*2 and the positioned part 36*e*2 being engaged.

Note that the method of fixing to the driving-side developing bearing 36 of the developing side cover 34 may be by screwing, adhesive agent, or the like, and the configuration thereof is not restricted.

When the developing side cover 34 is assembled, the rotational force receiving parts 180*a*1 and 180*a*2 of the coupling member 180, guided part 180*d*, and so forth, pass through the hole 34*a* of the developing side cover 34. The coupling member 180 has a configuration that is exposed on the other side of the developing cartridge B1 in the longitudinal direction (see FIGS. 4, 6(*a*), and 6(*b*)). Further, the guided part 180*d* of the coupling member 180 (see FIGS. 8(*a*) through 8(*e*)) has a configuration that abuts a guide part 55*e* of the coupling lever 55.

As described above, the coupling lever 55 is configured such that biasing force acts in the direction of the arrow X11, centered on the rotational axis L11. Accordingly, the coupling member 180 receives biasing force F2 from the coupling lever 55 (see FIG. 10(*b*)).

Further, the coupling spring 185 is disposed at the developing side cover 34. The coupling spring 185 is a torsion coil spring, with one end abutting the developing side cover 34 and the other end abutting the coupling member 180. Specifically, a positioning part 185*a* of the coupling spring 185 is supported by a spring supporting part 34*h* of the developing side cover 34. A fixed arm 185*b* of the coupling spring 185 is fixed to a spring engaging part 34*j* of the developing side cover 34. Moreover, the configuration is such that an operating arm 185*c* of the coupling spring 185 abuts a guided member 180*d* of the coupling member 180. The operating arm 185*c* of the coupling spring 185 is configured such that biasing force acts in a direction of arrow L12 centered on rotational axis X12 that is centered on the positioning part 185*a*. Accordingly, the coupling member 180 receives biasing force Flb from the coupling spring 185 (see FIG. 10(*c*)).

The coupling member 180 that has received the biasing force F2 from the coupling lever 55 and the biasing force Flb from the coupling spring 185 is held at an attitude (rotational axis L2) included as to the rotational axis L3 of the drive input gear 27 (FIG. 10(*b*)). Detailed configuration will be described alter. The configuration of holding the inclined attitude of the coupling member 180 at this time and the operation of forces will be described later in "Relationship of Forces Acting on Coupling Member 180 when in Second Inclined Attitude D2" described later.

<Basic Operations of Coupling Member 180>

Next, the basic operations of the coupling member 180 in the state of the developing cartridge B1 will be described with reference to FIGS. 15(*a*) through 15(*c*).

Figure 15:
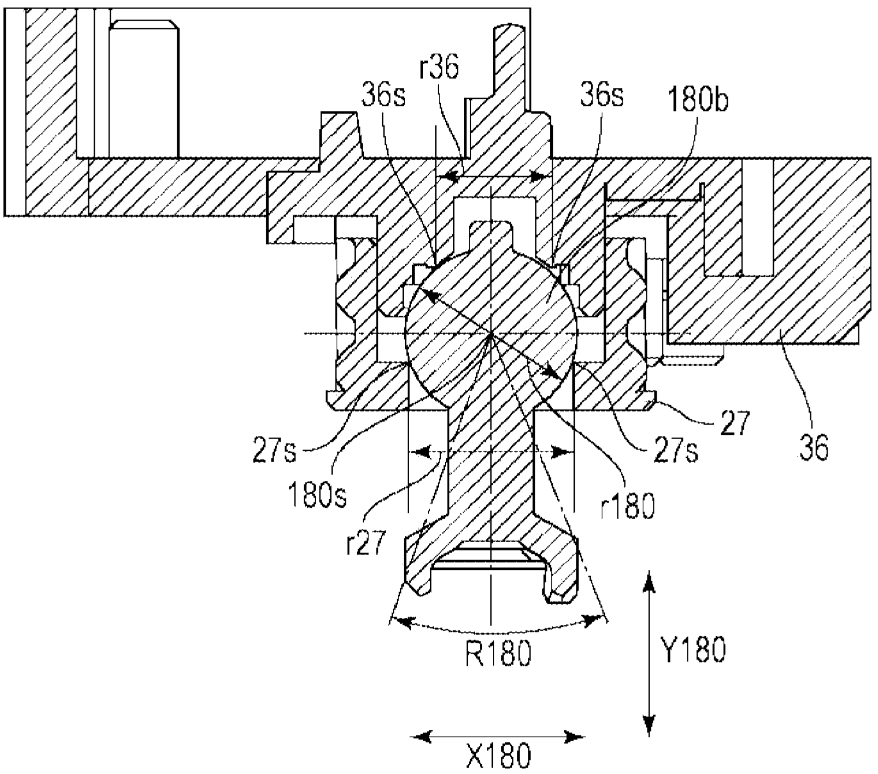
FIG. 15 includes a cross-sectional view and perspective views of the periphery of a coupling member.
Figure 15:
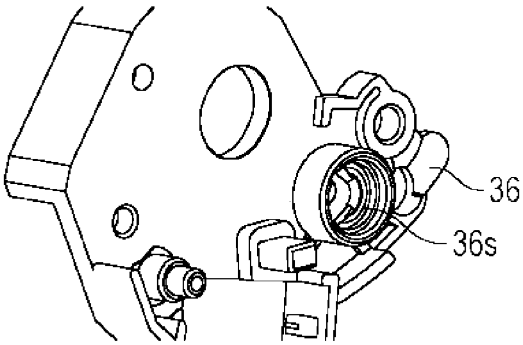
Figure 15:
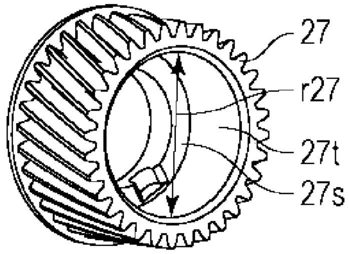

FIG. 15(*a*) is an enlarged diagram illustrating the relationship between the coupling member 180, drive input gear 27, and driving-side developing bearing 36, in a longitudinal-section view. FIG. 15(*b*) is a perspective view of the driving-side developing bearing 36. FIG. 15(*c*) is a perspective view of the drive input gear 27.

The supported part 180*b* of the coupling member 180 is disposed on an interior 27*t* of the drive input gear 27, and further is wedged between a restricting part 27*s* of the drive input gear 27 and a coupling restricting part 36*s* of the driving-side developing bearing 36. A diameter r180 of the supported part 180*b* of the coupling member 180 is in a relationship of being equal to or smaller than a width r27 of the restricting part 27*s* of the drive input gear 27 in the direction of X180 and a width r36 of the coupling restricting part 36*s* of the driving-side developing bearing 36 in the direction of X180.

diameter r180 of supported part 180*b*>(width r27 of restricting part 27*s* of the drive input gear 27 in direction of X180 diameter r180 of supported part 180*b*>width r36 of coupling restricting part 36*s* of driving-side developing bearing 36 in direction of X180.

According to this configuration, movement of the coupling member 180 in the direction of the longitudinal direction arrow Y180 is restricted by the supported part 180*b* being restricted by the restricting part 27*s* of the drive input gear 27 of the coupling restricting part 36*s* of the driving-side developing bearing 36. Further, the supported part 180*b* is restricted within the range of the interior 27*t* of the drive input gear 27 regarding the cross-sectional direction X180 of the coupling member 180. Accordingly, the coupling member 180 is configured so as to be capable of tilting in an R180 direction centered on center 180*s* of the supported part 180*b*, even though movement in the longitudinal direction Y180 and cross-sectional direction X180 is restricted.

<About Inclined Attitude of Coupling Member 180>

Next, inclining operations of the coupling member 180 will be described.

The coupling member 180 has a configuration that receives driving force from the main body side drive member 100 of the apparatus main body A1 and is capable of rotating on the rotational axis L2, as described above. Basically, the rotational axis L2 of the coupling member 180 is set to be concentric with the rotational axis L3 of the drive input gear 27 when transmitting driving force. Further description has been made that there are cases where the rotational axis L2 of the coupling member 180 and the rotational axis L3 of the drive input gear 27 are not concentric but slightly shifted, due to variance in dimensions of parts and so forth.

The present configuration enables the rotational axis L2 of the coupling member 180 to incline in the following directions. These can be generally classified into the following three attitudes.

Reference attitude D0: The rotational axis L2 of the coupling member 180 is concentric or parallel in attitude with respect to the rotational axis L3 of the drive input gear 27

First inclined attitude D1: The attitude where the developing cartridge B1 is mounted to the apparatus main body A1, and the developing cartridge B1 is moving from a state where the photosensitive drum 10 and the developing roller 13 are spaced toward a contact state where they are in contact. The rotational force receiving parts 180*a*1, 180*a*2 (hereinafter referred to as rotational force receiving part 180*a*) of the coupling member 180 and the supported part 180*b* face in the direction of the main body side drive member 100 of the apparatus main body A1. Details of the spaced state, contact state, and so forth, will be described later.

Second inclined attitude D2: The attitude where the rotational force receiving part 180*a* and supported part 180*b* of the coupling member 180 are facing in the direction of the main body side drive member 100 of the apparatus main body A1 when mounting the developing cartridge B1 to the apparatus main body A1. Details of attitude when mounting, and so forth, will be described later.

Now, the engaging relationship between the coupling member 180 and driving-side developing bearing 36 will be described.

Figure 13:
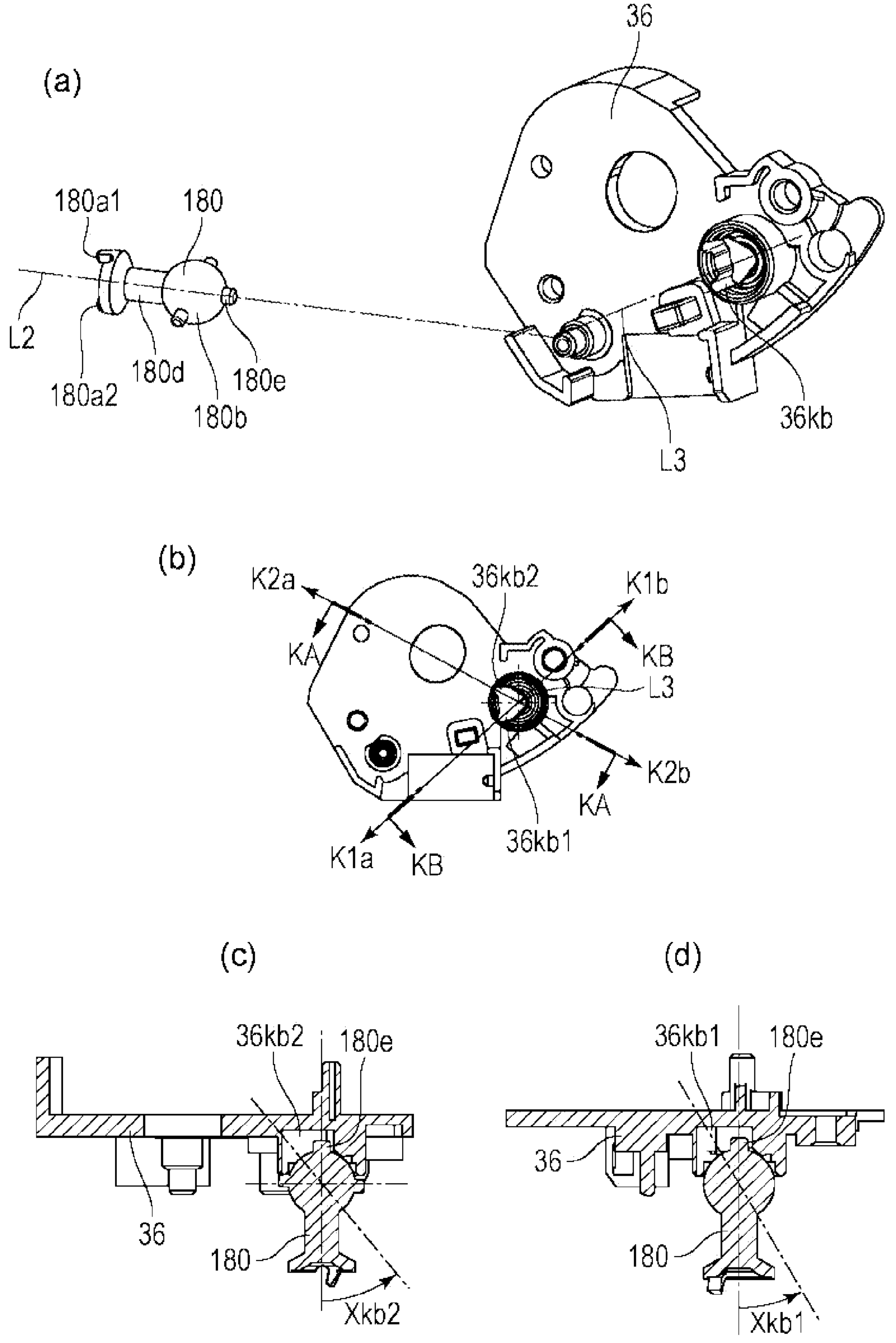
FIG. 13 includes disassembled perspective views of a bearing member and a coupling member.

FIG. 13 is diagrams illustrating the relationship between the driving-side developing bearing 36 and the coupling member 180.

FIG. 13(*a*) is a perspective view illustrating the positions of the driving-side developing bearing 36 and the coupling member 180. FIG. 13(*b*) is a diagram of the driving-side developing bearing 36 as viewed from the front at the driving side. FIG. 13(*c*) is a diagram where the coupling member 180 has been added to a view taken along a cross-section XIIIC in FIG. 13(*b*), and FIG. 13(*d*) is a diagram where the coupling member 180 has been added to a view taken along a cross-section XIIID in FIG. 13(*b*).

A phase-restricting boss 180*e* is provided on the coupling member 180, concentrically with the rotational axis L2 and on the inner side in the longitudinal direction, as illustrated in FIG. 13(*a*). On the other hand, a recessed phase-restricting part 36*kb* is provided to the driving-side developing bearing 36. The phase-restricting part 36*kb* particularly is provided with a first inclination restricting part 36*kb*1 that is recessed in the direction of arrow K1*a*, and a second inclination restricting part 36*kb*2 that is recessed in the direction of arrow K2*a*, from the center of the rotational axis L3 of the drive input gear 27. The phase-restricting boss 180*e* of the coupling member 180 is situated within the phase-restricting part 36*kb* of the driving-side developing bearing 36. That is to say, the phase-restricting boss 180*e* of the coupling member 180 is positionally restricted by the phase-restricting part 36*kb* of the driving-side developing bearing 36. In other words, the phase-restricting boss 180*e* of the coupling member 180 is capable of moving within the phase-restricting part 36*kb* of the driving-side developing bearing 36, and particularly can move to the first inclination restricting part 36*kb*1 and second inclination restricting part 36*kb*2. When the phase-restricting boss 180*e* of the coupling member 180 moves to the first inclination restricting part 36*kb*1, the rotational force receiving part 180*a* and guided part 180*d* of the coupling member 180 incline in the direction of arrow K1*b*, that is the opposite direction of arrow K1*a*. This is a state where the coupling member 180 is assuming the first inclined attitude D1. When the phase-restricting boss 180*e* of the coupling member 180 moves to the second inclination restricting part 36*kb*2, the rotational force receiving part 180*a* and guided part 180*d* of the coupling member 180 incline in the direction of arrow K2*b*, that is the opposite direction of arrow K2*a*. This is a state where the coupling member 180 is assuming the second inclined attitude D2 of the coupling member 180.

<Relationship of Forces Acting on Coupling Member 180 when in Reference Attitude D0>

The attitude of the coupling member 180 will be described in detail below with reference to FIGS. 21(*a*) through 22(*d*), regarding the reference attitude D0 of the coupling member 180.

Figure 22:
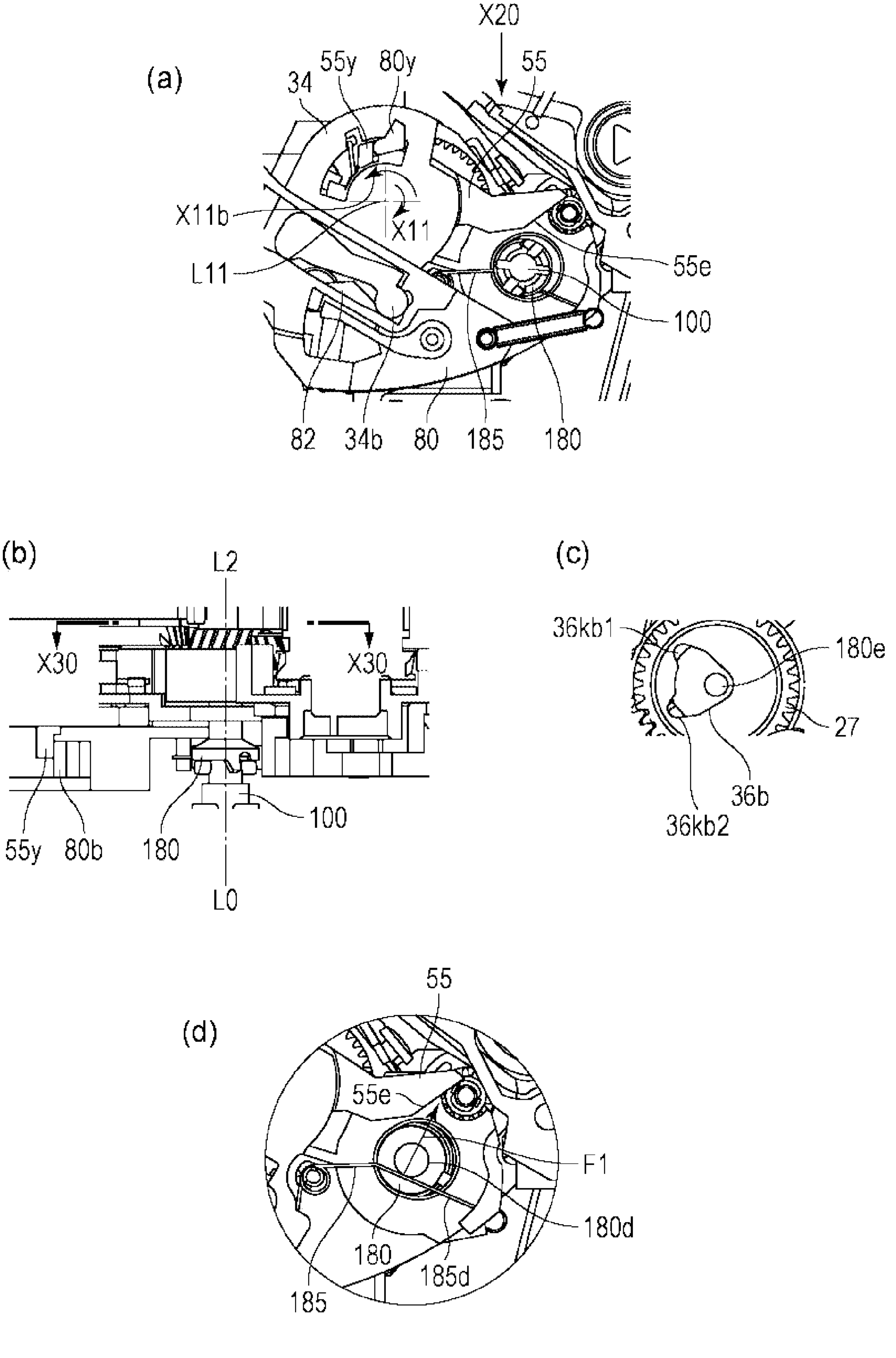
FIG. 22 includes side views of a driving side of a developing cartridge mounted to an apparatus main body.

FIG. 22 is diagrams illustrating the position of the coupling lever 55 and the coupling member 180 at a point where the mounting of the developing cartridge B1 to the apparatus main body A1 is complete. FIG. 22(*a*) is a side view as seen from the driving side, FIG. 22(*b*) is a side view as seen from the direction of arrow XXIIB in FIG. 22(*a*), FIG. 22(*c*) is a side view as seen from the non-driving side with a cutaway taken along cutaway line XXIIC in FIG. 22(*b*).

When mounting of the developing cartridge B1 to the apparatus main body A1 is complete, the coupling member 180 engages the main body side drive member 100. The rotational axis L2 of the coupling member 180, the rotational axis L4 of the main body side drive member 100, and the rotational axis L3 of the drive input gear 27, are concentrically disposed. In other words, the rotational force receiving part 180*a* of the coupling member 180 and the rotational force applying part 100*a* (rotational force applying part 100*a*1 and rotational force applying part 100*a*2) of the main body side drive member 100 are at positions capable of engaging each other (see FIG. 8(*b*) as well).

Figure 34:
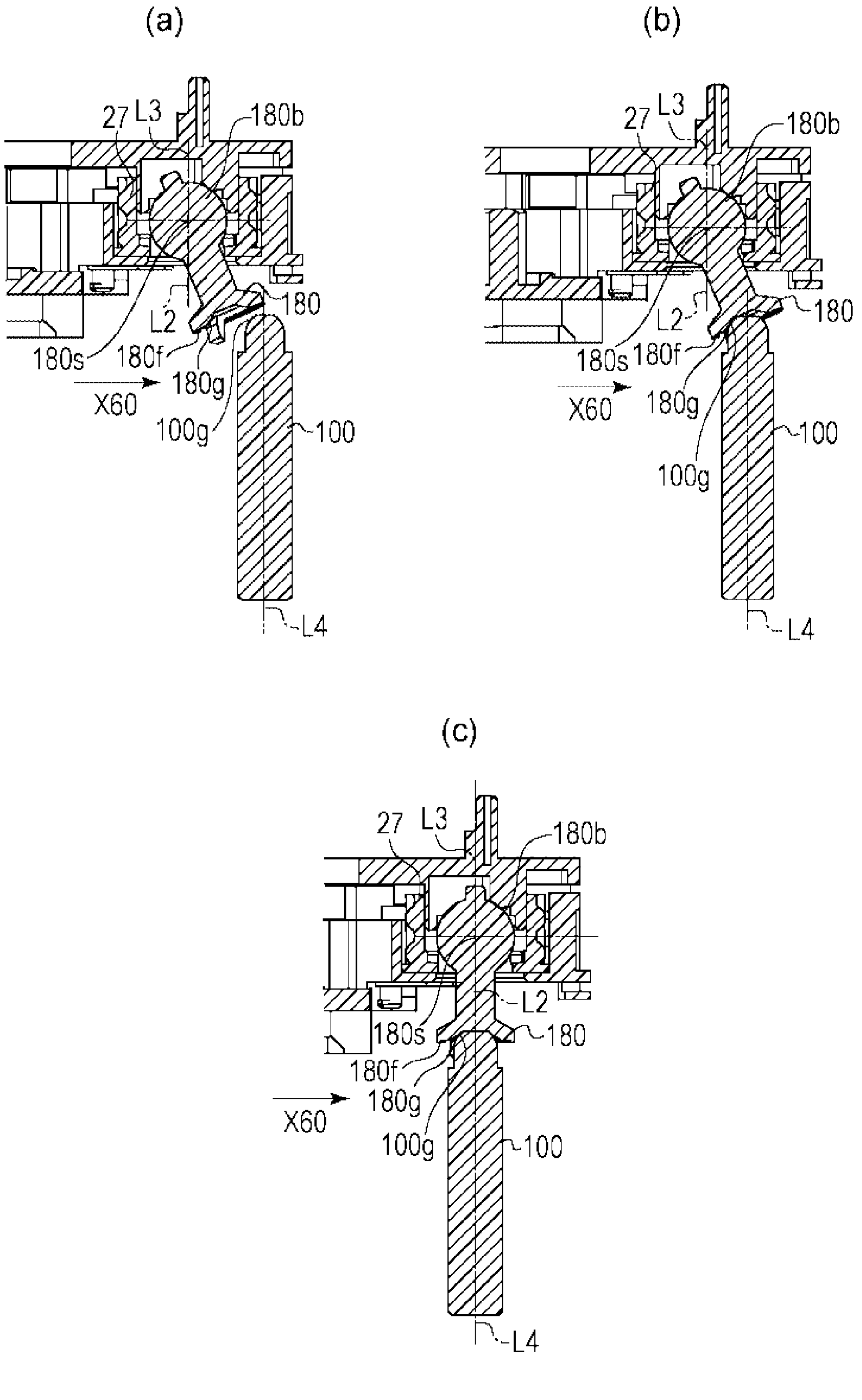
FIG. 34 includes cross-sectional diagrams of the periphery of a coupling member.

The motion of the coupling member 180 until the coupling member 180 becomes concentric with the main body side drive member 100 will be described with reference to FIGS. 34(*a*) through 34(*c*). FIGS. 34(*a*) through 34(*c*) are cross-sectional views illustrating the attitude of the coupling member until the coupling member 180 becomes concentric with the main body side drive member 100. FIG. 34(*a*) is a cross-sectional diagram illustrating a state where the coupling member 180 is not in contact with the main body side drive member 100, and FIG. 34(*b*) is a cross-sectional view illustrating a state of the instant of contact of the coupling member 180 with the main body side drive member 100. Further, FIG. 34(*c*) is a cross-sectional view of a state where the coupling member 180 is concentric with the main body side drive member 100.

In a state where the coupling member 180 is not in contact with the main body side drive member 100, the coupling member 180 is inclined in the direction of the main body side drive member 100, the inclination being centered on the center 180*s* of the supported part 180*b* of the coupling member 180, as illustrated in FIG. 34(*a*). The coupling member 180 advances in the direction of arrow X60, which is the direction in which the main body side drive member 100 exists, while maintaining this attitude. A recessed conical part 180*g* disposed on the inner side of a circular part 180*f* of the coupling member 180, and a protrusion 100*g* disposed on the axial tip of the main body side drive member 100, come into contact. As the coupling member 180 further moves in the direction of arrow X60, the coupling member 180 moves in a direction where the inclination of the coupling member 180 is reduced, the inclination being centered on the center 180*s* of the supported part 180*b* of the coupling member 180. As a result, the rotational axis L2 of the coupling member 180, the rotational axis LA of the main body side drive member 100, and the rotational axis L3 of the drive input gear 27, are concentrically arranged. Forces that the coupling member 180 is subjected to in this series of operations will be described in detail later, so description will be omitted here.

The state in which the rotational axis L3 of the drive input gear 27 and the rotational axis L2 of the coupling member 180 are concentrically arranged is the reference attitude D0 for the attitude of the coupling member 180 (coupling member 180 inclination angle $\theta 2=0°$). The phase-restricting boss 180*e* of the coupling member 180 detaches from the second inclination restricting part 36*kb*2 of the driving-side developing bearing 36, and is not in contact with any part of a phase restricting part 36*b* of the driving-side developing bearing 36 (see FIG. 22(*c*)). The guide part 55*e* of the coupling lever 55 is held at a state completely retracted from the guided part 180*d* of the coupling member 180 (FIG. 22(*a*)). That is to say, the coupling member 180 comes into contact with two parts, which are the coupling spring 185 and the main body side drive member 100, which decides the angle of inclination ($\theta 2$) thereof. In such a case, the inclination angle ($\theta 2$) of the coupling member 180 may not be $\theta 2=0°$ even in a state where the mounting of the developing cartridge B1 to the apparatus main body A1 is complete.

The inclination attitude (reference attitude D0) of the coupling member 180 in a case where mounting of the developing cartridge B1 to the apparatus main body A1 is complete will be described below in detail, with reference to FIG. 14.

Figure 14:
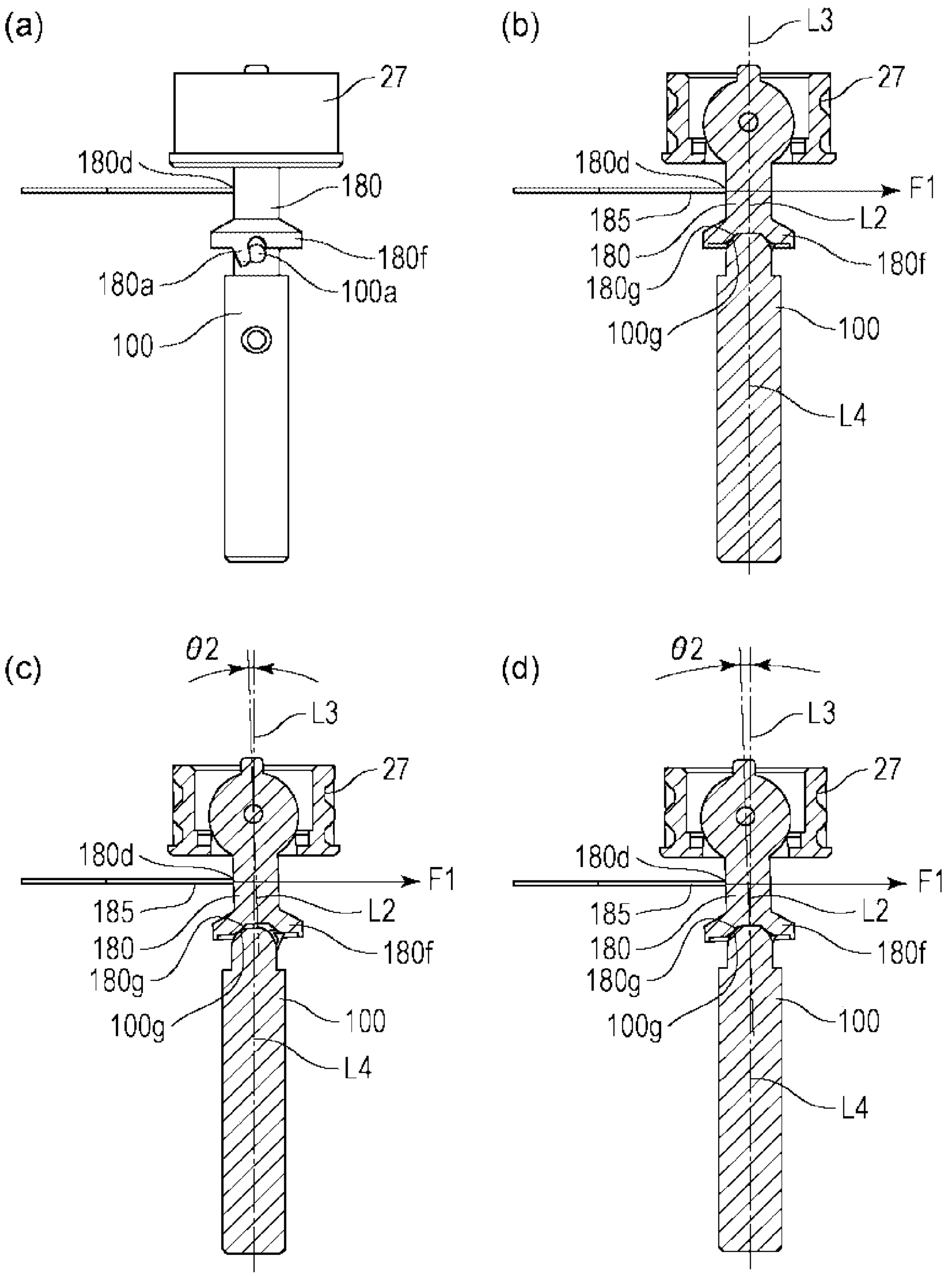
FIG. 14 includes perspective views of a drive input part of a developing cartridge.

FIG. 14 is diagrams illustrating the way in which the coupling member 180 and the main body side drive member 100 engage. The states illustrated in FIG. 14(*a*) and FIG. 14(*b*) are a side view and cross-sectional view of a case where the rotational axis L3 of the drive input gear 27 and the rotational axis LA of the main body side drive member 100 are concentrically arranged, and moreover the rotational axis L2 of the coupling member 180 also is concentric.

The guided part 180*d* of the coupling member 180 receives biasing force from the coupling spring 185 in the direction of arrow F1 (see FIG. 22(*d*)), with the conical part 180*g* abutting the protrusion 100*g* at points 180*g*1 and 180*g*2 (FIG. 8(*e*)). Consequently, the attitude of the coupling member 180 with respect to the main body side drive member 100 is restricted by the two points 180*g*1 and 180*g*2 of the conical part 180*g*. That is to say, the rotational axis L2 of the coupling member 180 is concentric with the rotational axis L4 of the main body side drive member 100.

When the main body side drive member 100 of the apparatus main body A1 performs rotational driving from this state, the rotational force applying part 100*a* of the apparatus main body A1 and the rotational force receiving part 180*a* of the coupling member 180 engage. The configuration is such that driving is transmitted from the apparatus main body A1 to the coupling member 180 (see FIGS. 8(*a*) through 8(*e*)).

The state illustrated in FIG. 14(*c*) is a state where the rotational axis L3 of the drive input gear 27 and the rotational axis LA of the main body side drive member 100 are disposed concentrically, but the rotational axis L2 of the coupling member 180 is inclined. Due to variance in dimensions of parts, the conical part 180*g* of the coupling member 180 abuts the protrusion 100*g* of the main body side drive member 100 and the point 180*g*1 of the conical part 180*g* but not the point 180*g*2 of the conical part 180*g*. The rotational axis L2 of the coupling member 180 inclines at this time, by the guided part 180*d* of the coupling member 180 receiving biasing force from the coupling spring 185 in the direction of arrow F1. Accordingly, the attitude of the coupling member 180 is restricted in FIG. 14(*c*) by the point 180*g*1 of the conical part 180*g* of the coupling member 180 coming into contact with the protrusion 100*g* of the main body side drive member 100. That is to say, the rotational axis L2 of the coupling member 180 tilts with respect to the rotational axis LA of the main body side drive member 100. In other words, the inclination angle (θ2) of the coupling member 180 is not θ2=0°.

Further, FIG. 14(*d*) illustrates a state where the rotational axis L2 of the coupling member 180 is included, in a case where the rotational axis L3 of the drive input gear 27 and the rotational axis LA of the main body side drive member 100 are not concentric, due to variance in the dimensions of parts (see FIG. 8(*d*)). In this case as well, the rotational axis L2 of the coupling member 180 includes by the guided part 180*d* of the coupling member 180 receiving biasing force from the coupling spring 185, as in the state illustrated in FIG. 14(*c*). That is to say, the inclination angle (θ2) of the coupling member 180 is not θ2=0°. However, the attitude of the coupling member 180 is restricted by the point 180*g*1 of the conical part 180*g* of the coupling member 180 coming into contact with the protrusion 100*g* of the main body side drive member 100, the same as in in FIG. 14(*c*).

However, in either state of FIG. 14(*c*) and FIG. 14(*d*), when the main body side drive member 100 of the apparatus main body A1 performs rotational driving, the rotational force applying part 100*a* of the apparatus main body A1 and the rotational force receiving part 180*a* of the coupling member 180 engage. The configuration is such that driving is transmitted from the apparatus main body A1 to the coupling member 180.

As described above, in a state where mounting of the developing cartridge B1 to the apparatus main body A1 is complete, there are cases where the rotational axis L2 of the coupling member 180 is concentric with the rotational axis L3 of the drive input gear 27, and cases where this is not concentric. However, in either case, when the main body side drive member 100 of the apparatus main body A1 performs rotational driving, the rotational force applying part 100*a* of the apparatus main body A1 and the rotational force receiving part 180*a* of the coupling member 180 engage. The configuration is such that driving is transmitted from the apparatus main body A1 to the coupling member 180. The attitude of the coupling member 180 in a state where mounting of the developing cartridge B1 to the apparatus main body A1 has been completed, and the coupling member 180 can receive driving force from the rotational force applying part 100*a* of the apparatus main body A1, is referred to as the reference attitude D0 of the coupling member 180. Note that the configuration is such that the inclination angle is within a range where the rotational force applying part 100*a* of the main body side drive member 100 and the rotational force receiving part 180*a* of the coupling member 180 do not come loose from each other.

The first inclined attitude D1 and second inclined attitude D2 of the coupling member 180 will be described in detail in order blow.

<Relationship of Forces Acting on Coupling Member 180 when in First Inclined Attitude D1>

First, the relationship of forces acting on the coupling member 180 when in the first inclined attitude D1 will be described with reference to FIGS. 11(*a*) through 11(*c*).

Figure 11:
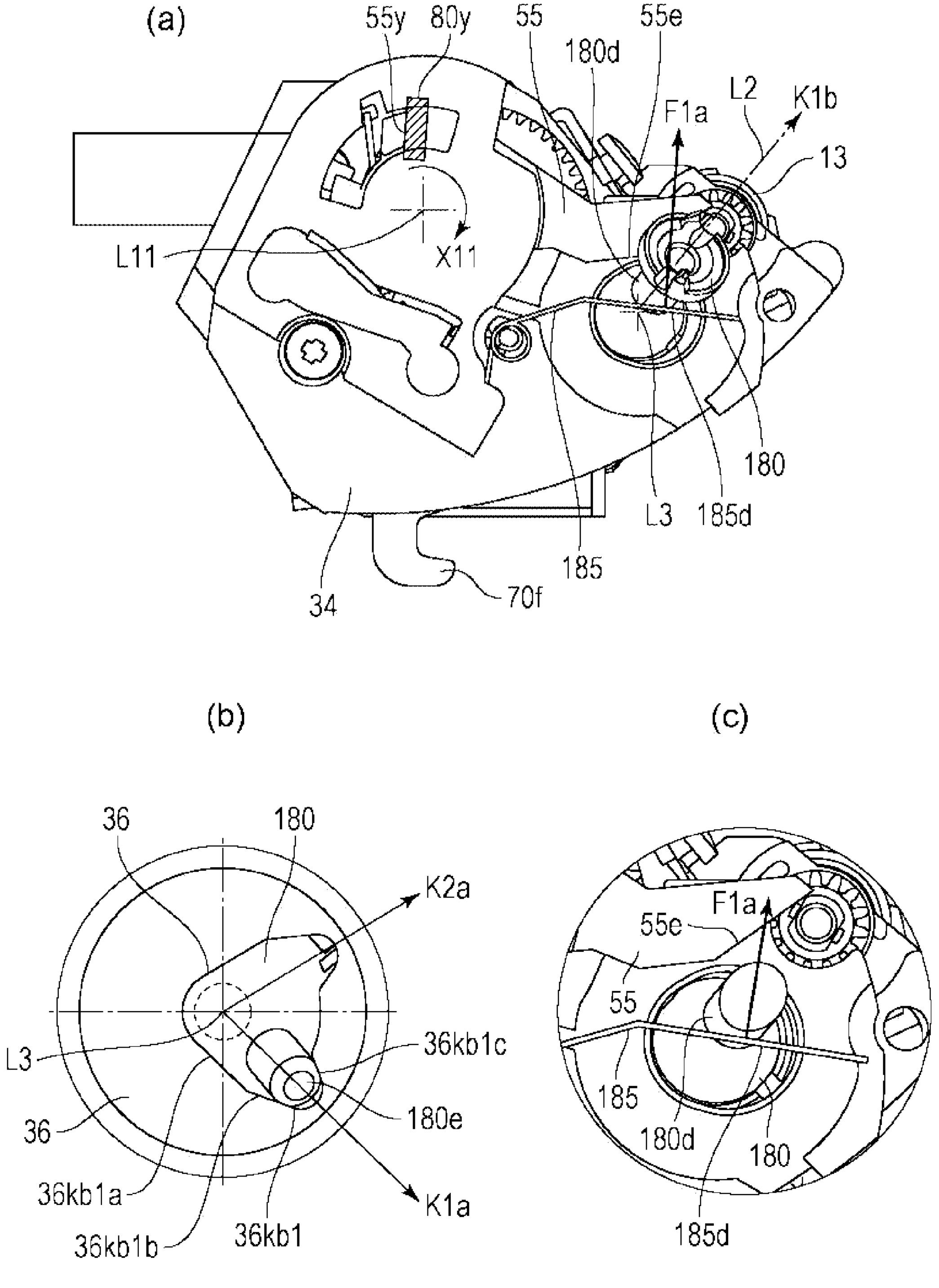
FIG. 11 includes explanatory diagrams of attitude of a coupling member.

FIG. 11(*a*) is a side view of the developing cartridge B1, in a state where the developing cartridge B1 is mounted within the apparatus main body A1 and in a spaced state where the photosensitive drum 10 and the developing roller 13 are spaced. FIG. 11(*b*) is a cross-sectional view of the phase-restricting boss 180*e* of the coupling member 180 within the phase-restricting part 36*kb* of the driving-side developing bearing 36, as seen from the non-driving side of the developing cartridge B1. Further, FIG. 11(*c*) is a cross-sectional view of the guided part 180*d* of the coupling member 180, cut away at the position of the guided part 180*d* of the coupling member 180, and viewed from the driving side in the longitudinal direction.

The coupling lever 55 receives biasing force from the coupling lever spring 56 (see FIG. 9(*a*)), to rotate in the direction of arrow X11 centered on rotational axis L11. On the other hand, in a state where the developing cartridge B1 is mounted within the apparatus main body A1, movement in the direction of arrow X11 is restricted by an abutting part 80*y* provided to the apparatus main body A1. Specifically, the position of the coupling lever 55 is restricted against the biasing force of the coupling lever spring 56, by the abutting part 80*y* and a rotation restricting part 55*y* of the coupling lever 55 coming into contact. Note that the abutting part 80*y* is formed integrally with a driving-side swing guide 80 (see FIG. 20(*b*)). The guide part 55*e* of the coupling lever 55 is in a retracted state from the guided part 180*d* of the coupling member 180. Contact between the coupling lever 55 and the abutting part 80*y* will be described in detail in the detaching process of the developing cartridge B1, described later.

On the other hand, force Fla acts on the guided part 180*d* of the coupling member 180, due to a guide part 185*d* of the coupling spring 185 coming into contact therewith. That is to say, the guided part 180*d* of the coupling member 180 receives force inclining in the direction of arrow Fla (see FIG. 11(*c*)). The phase-restricting boss 180*e* of the coupling member 180 is configured to be restricted by a guide part 36*kb*1*a*, guide part 36*kb*1*b*, and guide part 36*kb*1*c* of the driving-side developing bearing 36 at this time, and is configured to finally move to the first inclination restricting part 36*kb*1. That is to say, the configuration is such that the phase-restricting boss 180*e* of the coupling member 180 inclines in the direction of arrow K1*a* (FIG. 11(*b*)), while on the other hand, the rotational force receiving part 180*a* and guided part 180*d* of the coupling member 180 incline in the direction of arrow K1*b* (FIG. 11(*a*)). The above-described attitude of the coupling member 180 is referred to as first inclined attitude D1 of the coupling member 180.

The orientation of the guide part 185*d* of the coupling spring 185 (direction of arrow Fla) can be orthogonal in direction with respect to the direction of arrow K1*b* (see FIG. 11(*a*)), with respect to the guided part 180*d* of the coupling member 180. This direction is a direction of the phase-restricting boss 180*e* of the coupling member 180 abutting the first inclination restricting part 36*kb*1, thereby enabling reduction of the biasing force of the coupling spring 185 to maintain the first inclined attitude D1 of the coupling member 180. However, this is not restrictive, as long as the coupling member 180 can be maintained at the first inclined attitude D1 by adjusting the biasing force of the coupling spring 185 or the like.

<Relationship of Forces Acting on Coupling Member 180 when in Second Inclined Attitude D2>

Next, the relationship of forces acting on the coupling member 180 when in the second inclined attitude D2 will be described with reference to FIG. 12.

Figure 12:
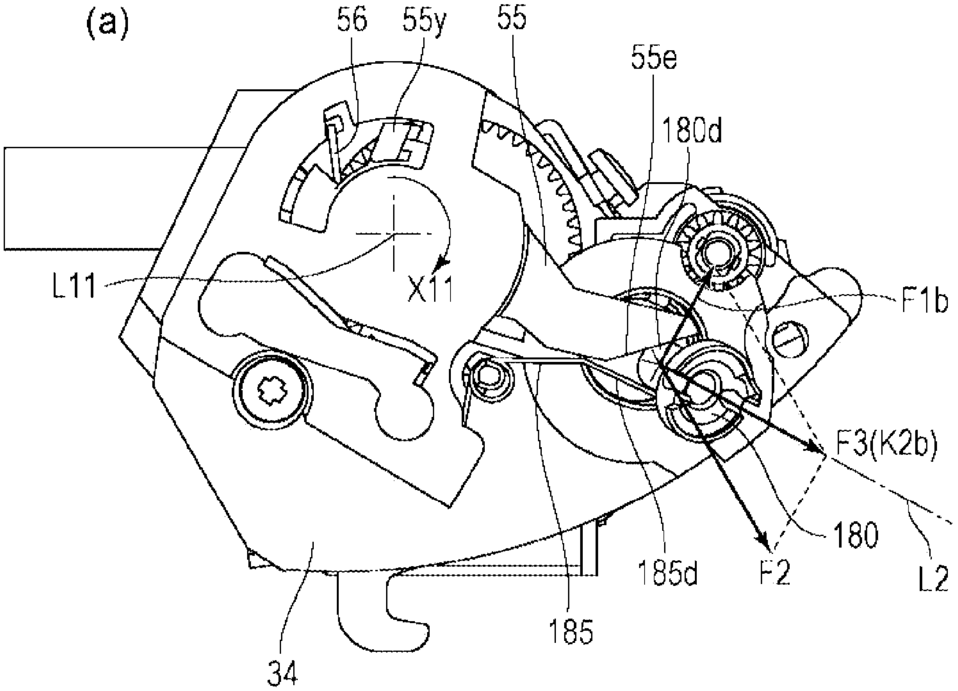
FIG. 12 includes explanatory diagrams of attitude of a coupling member.
Figure 12:
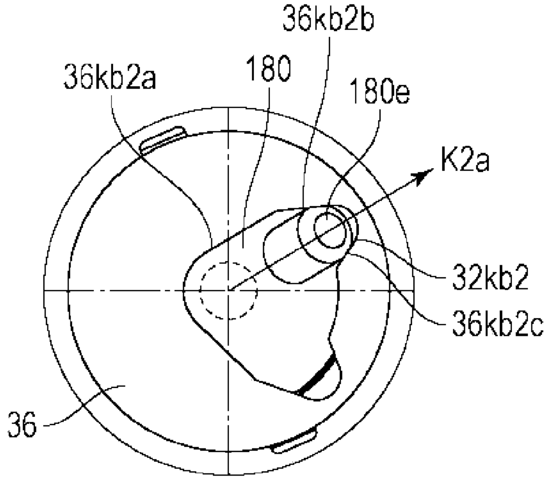
Figure 12:
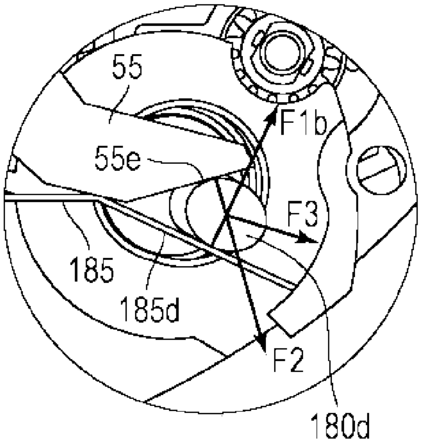

FIG. 12(*a*) is a side view of the developing cartridge B1, illustrating a state of the developing cartridge B1 before mounting to the apparatus main body A1, i.e., in a solitary state (natural state) of the developing cartridge B1. FIG. 12(*b*) is a cross-sectional view of the position of the phase-restricting boss 180*e* of the coupling member 180 within the phase-restricting part 36*kb* of the driving-side developing bearing 36, as viewed from the non-driving side of the developing cartridge B1. Further, FIG. 12(*c*) is a cross-sectional view where the guided part 180*d* of the coupling member 180 has been cut away, and viewed from the driving side in the longitudinal direction. FIG. 12(*a*) illustrates a state where there is no abutting part 80*y* provided to the apparatus main body A1 in FIG. 11(*a*). At this time, the coupling lever 55 receives biasing force from the coupling lever spring 56 in the direction of arrow X11 centered on rotational axis L11, and rotates to a position where the guide part 55*e* thereof comes into contact with the guided part 180*d* of the coupling member 180. That is to say, the guide part 55*e* of the coupling lever 55 and the guide part 185*d* of the coupling spring 185 both come into contact with the guided part 180*d* of the coupling member 180.

Now, the guided part 180*d* of the coupling member 180 receives force inclining in the direction of arrow F3, as described above. At this time, the phase-restricting boss 180*e* of the coupling member 180 is configured to be restricted by a guide part 36*kb*2*a*, guide part 36*kb*2*b*, and guide part 36*kb*2*c* of the driving-side developing bearing 36, and is configured to finally move to the second inclination restricting part 36*kb*2. That is to say, the configuration is such that the phase-restricting boss 180*e* of the coupling member 180 inclines in the direction of arrow K2*a* (FIG. 12(*b*)), while on the other hand, the rotational force receiving part 180*a* and guided part 180*d* of the coupling member 180 incline in the direction of arrow K2*b* (FIG. 12(*a*)). The above-described attitude of the coupling member 180 is referred to as second inclined attitude D2 of the coupling member.

(5) General Description of Drum Cartridge C

Figure 16:
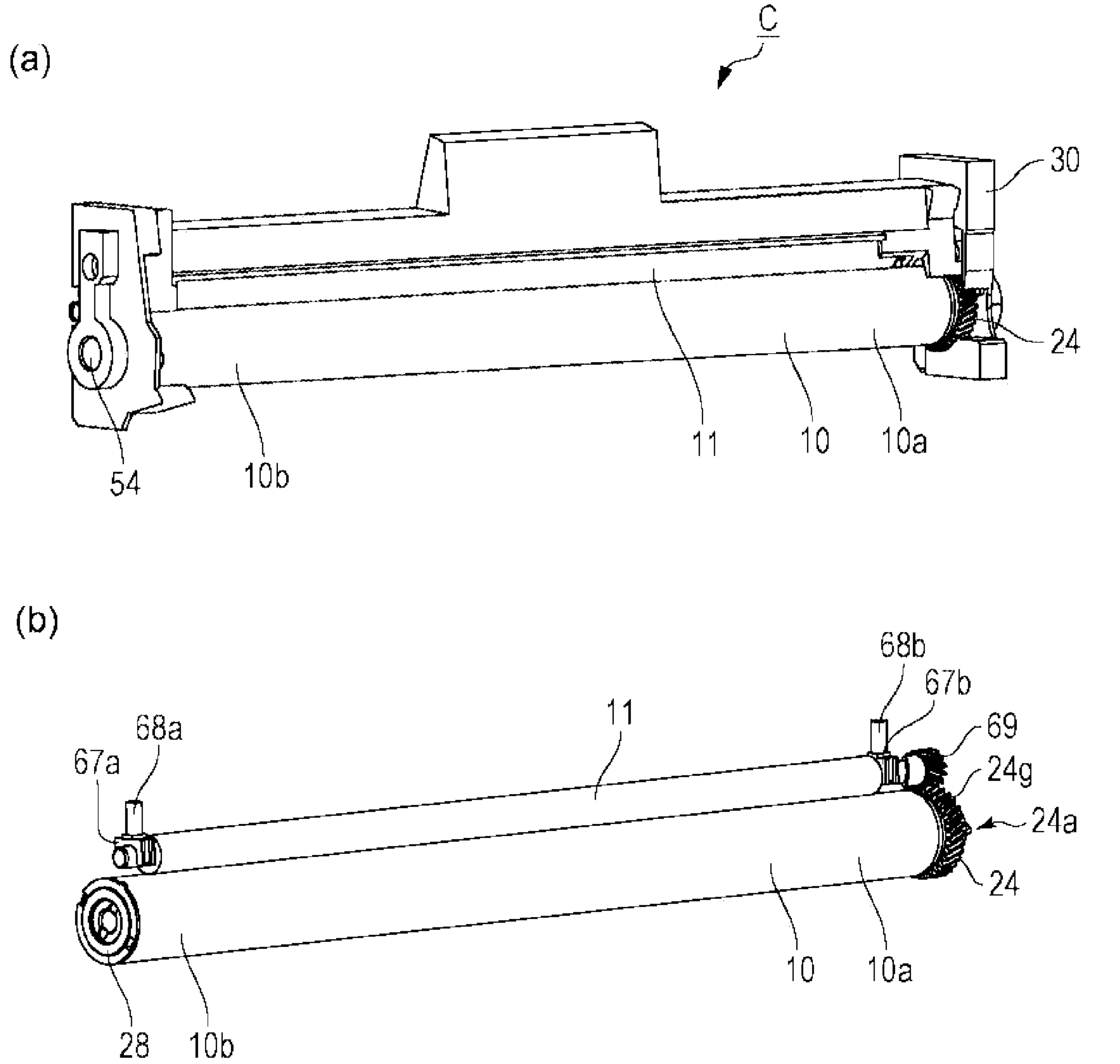
FIG. 16 includes perspective views of a drum cartridge.

Next, the configuration of the drum cartridge C will be described with reference to FIGS. 16(*a*) and 16(*b*). FIG. 16(*a*) is a perspective explanatory diagram of the drum cartridge C as viewed from the non-driving side thereof. FIG. 16(*b*) is a perspective explanatory diagram where the cleaning frame 21, drum bearing 30, drum shaft 54, and so forth, have been omitted from illustration to describe the periphery of the photosensitive drum 10 and charging roller 11.

The drum cartridge C has the photosensitive drum 10, charging roller 11, and so forth, as illustrated in FIG. 16. The charging roller 11 is rotatably supported by a charging roller bearing 67*a* and charging roller bearing 67*b*, and is biased as to the photosensitive drum 10 by a charging roller biasing member 68*a* and charging roller biasing member 68*b*.

The driving side flange 24 is integrally fixed to a driving-side end portion 10*a* of the photosensitive drum 10, and a non-driving side flange 28 is integrally fixed to a non-driving-side end portion 10*b* of the photosensitive drum 10. The driving side flange 24 and non-driving side flange 28 are concentrically fixed to the photosensitive drum 10 by swaging, adhesion, or the like. Means such as screwing, adhesion, press fitting, or the like are used to fix the drum bearing 30 to the driving-side end portion and the drum shaft 54 to the non-driving-side end portion, at both ends of the cleaning frame 21 in the longitudinal direction. The driving side flange 24, integrally fixed to the photosensitive drum 10, is rotatably supported by the drum bearing 30, and the non-driving side flange 28 is rotatably supported by the drum shaft 54.

The charging roller gear 69 is provided on one end of the charging roller 11 in the longitudinal direction, with the charging roller gear 69 meshing with a gear portion 24*g* of the driving side flange 24. The configuration is such that rotational force from the apparatus main body A1 side is transmitted to a driving-side end portion 24*a* of the driving side flange 24 (omitted from illustration). As a result, as the photosensitive drum 10 is rotationally driven, the charging roller 11 also is rotationally driven. The circumferential speed of the surface of the charging roller 11 is set to be around 105 to 120% as to the circumferential speed of the surface of the photosensitive drum 10, as described earlier.

(6) Description of Mounting/Detaching Configuration of Developing Cartridge B1 as to Apparatus Main Body A1

Next, the method of mounting/detaching the developing cartridge B1 to/from the apparatus main body A1 will be described with reference to the drawings.

Figure 17:
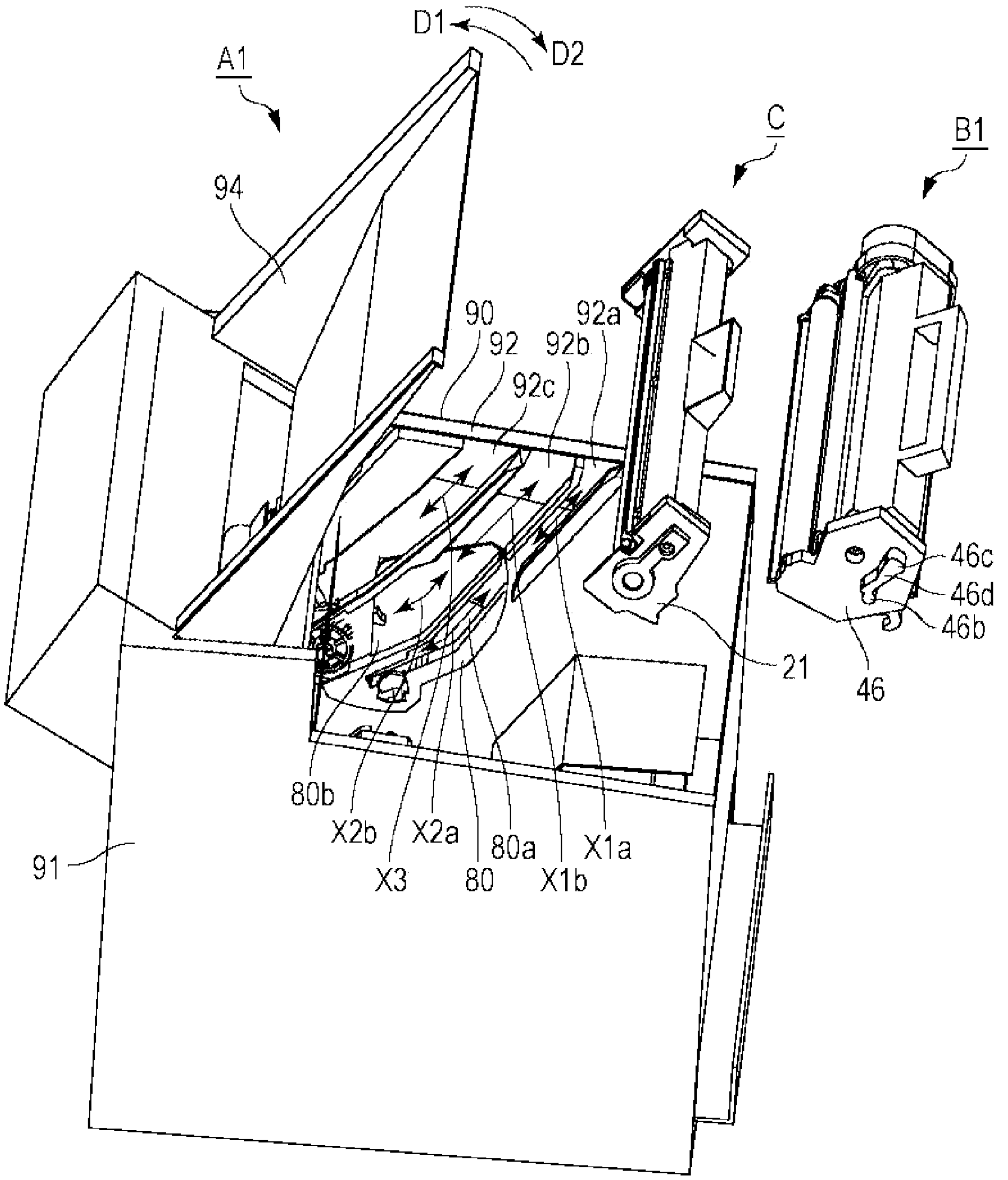
FIG. 17 is a perspective view of a non-driving side of an apparatus main body and cartridges.
Figure 18:
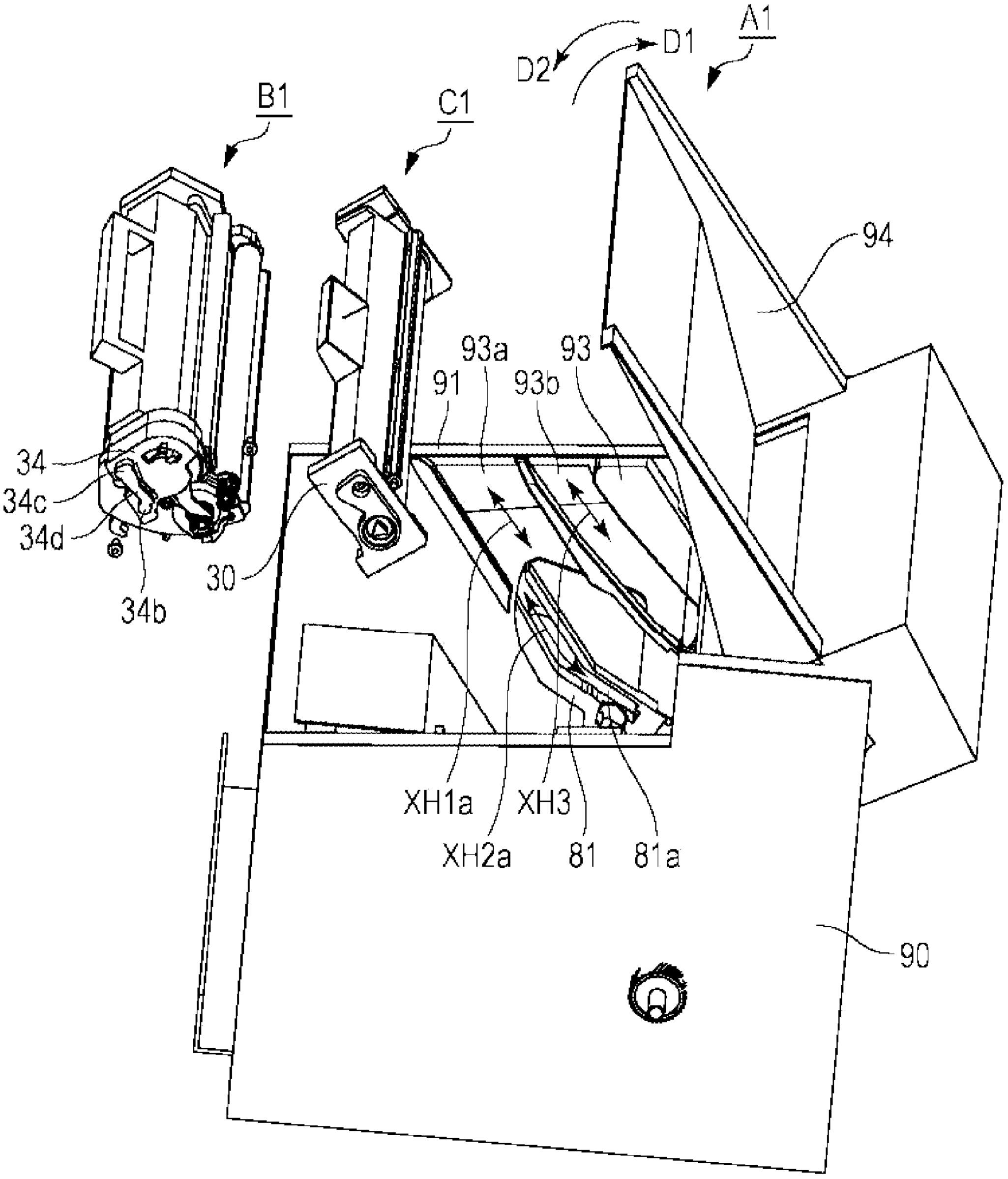
FIG. 18 is a perspective view of a driving side of an apparatus main body and cartridges.
Figure 19:
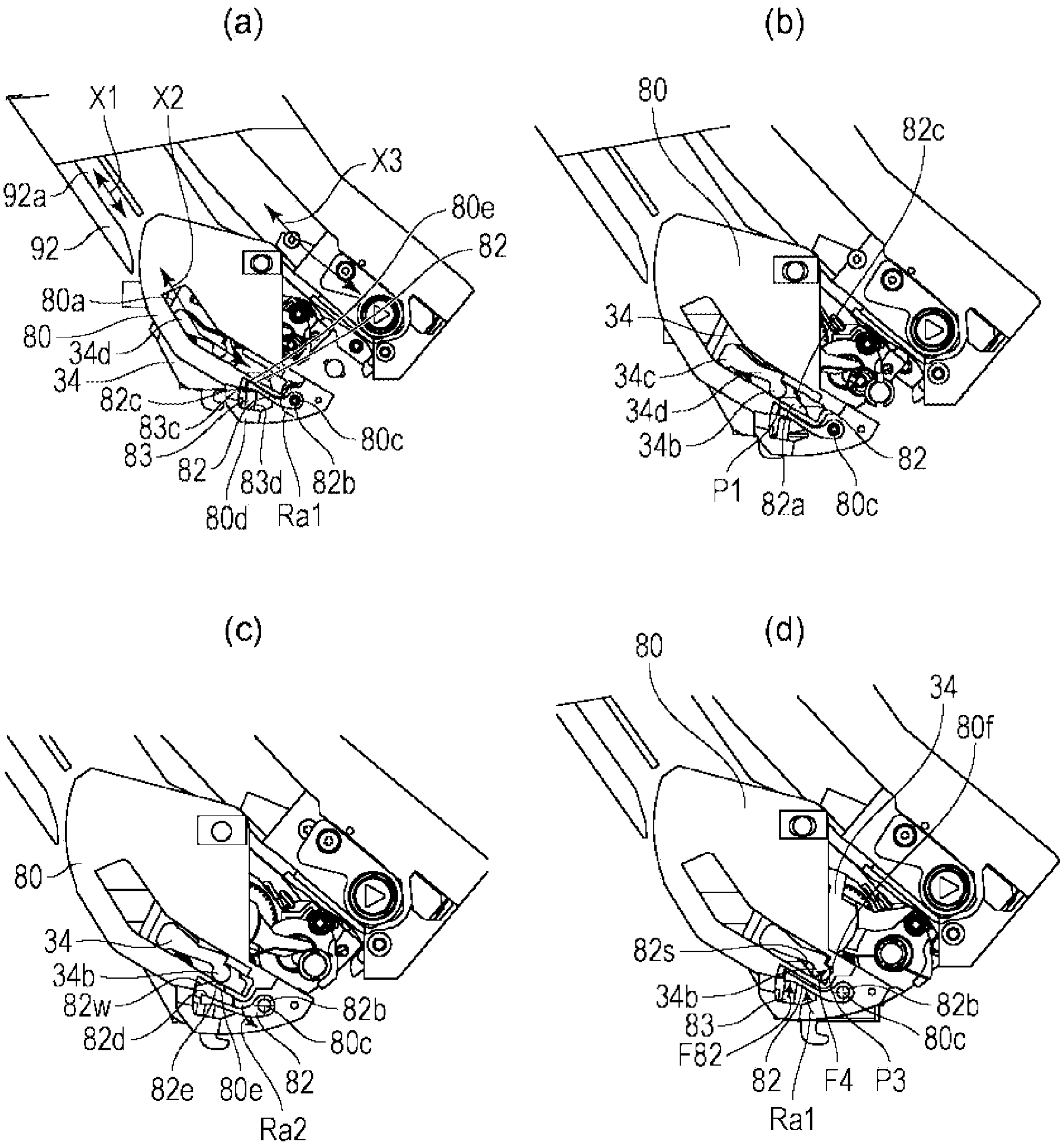
FIG. 19 includes side views at a driving side of a developing cartridge.

FIG. 17 is a perspective explanatory diagram viewing the apparatus main body A1 from the non-driving side, and FIG. 18 is a perspective explanatory diagram viewing the apparatus main body A1 from the driving side. FIGS. 19(*a*) through 19(*d*) are explanatory diagrams of the process of mounting the developing cartridge B1 to the apparatus main body A1, as viewed from the driving side.

A guided part 46*d* having a positioning part 46*b* and a rotation stopper 46*c* is provided to the non-driving-side developing bearing 46 at the developing cartridge B1, as illustrated in FIG. 17. A guided part 34*d* having a positioning part 34*b* and a rotation stopper 34*c* is provided to the developing side cover 34, as illustrated in FIG. 18.

On the other hand, a driving-side guide member 92, and further the driving-side swing guide 80 that moves integrally with the developing cartridge B1 within the apparatus main body A1, are provided to a driving-side side plate 90 configuring the casing of the apparatus main body A1 at the driving side at the apparatus main body A1, as illustrated in FIG. 17. Details of the driving-side swing guide 80 will be described later. The driving-side guide member 92 is provided with a first guide part 92*a*, a second guide part 92*b*, and a third guide part 92*c*. A groove for a mounting/detaching path Xla following the mounting/detaching path of the developing cartridge B1 is provided to the first guide part 92*a* of the driving-side guide member 92, and a groove for a mounting/detaching path X1*b* following the mounting/detaching path of the developing cartridge B1 is provided to the second guide part 92*b*. A groove for mounting/detaching path X3 following the mounting/detaching path of the drum cartridge C is provided to the third guide part 92*c* of the driving-side guide member 92. A first guide part 80*a* and a second guide part 80*b* are provided to the driving-side swing guide 80. The first guide part 80*a* of the driving-side swing guide 80 has formed therein a groove shape following a mounting/detaching path X2*a* of the developing cartridge B1 as an extension of the first guide part 92*a* of the driving-side guide member 92. The second guide part 80*b* of the driving-side swing guide 80 has formed therein a groove shape following a mounting/detaching path X2*b* of the developing cartridge B1 as an extension of the second guide part 92*b* of the driving-side guide member 92.

In the same way, a non-driving-side guide member 93, and a non-driving-side swing guide 81 that moves in the same way as the driving-side swing guide 80, are provided to a non-driving-side side plate 91 configuring the casing of the apparatus main body A1 at the non-driving side at the apparatus main body A1, as illustrated in FIG. 18. A first guide part 93*a* and a second guide part 93*b* are provided to the non-driving-side guide member 93.

A groove shape of a mounting/detaching path XH1*a* following the mounting/detaching path of the developing cartridge B1 is formed at the first guide part 93*a* of the non-driving-side guide member 93. A groove shape of a mounting/detaching path XH3 following the mounting/detaching path of the drum cartridge C is formed at the second guide part 93*b* of the non-driving-side guide member 93. A guide part 81*a* is provided to the non-driving-side swing guide 81. A groove shape of a mounting/detaching path XH2*a* following the mounting/detaching path of the developing cartridge B1 is provided to the guide part of the guide part 81*a* of the non-driving-side swing guide 81 as an extension of the first guide part 93*a* of the non-driving-side guide member 93.

Detailed configurations of the driving-side swing guide 80 and non-driving-side swing guide 81 will be described later.

<Description of Non-Driving-Side Electric Contacts>

Figure 35:
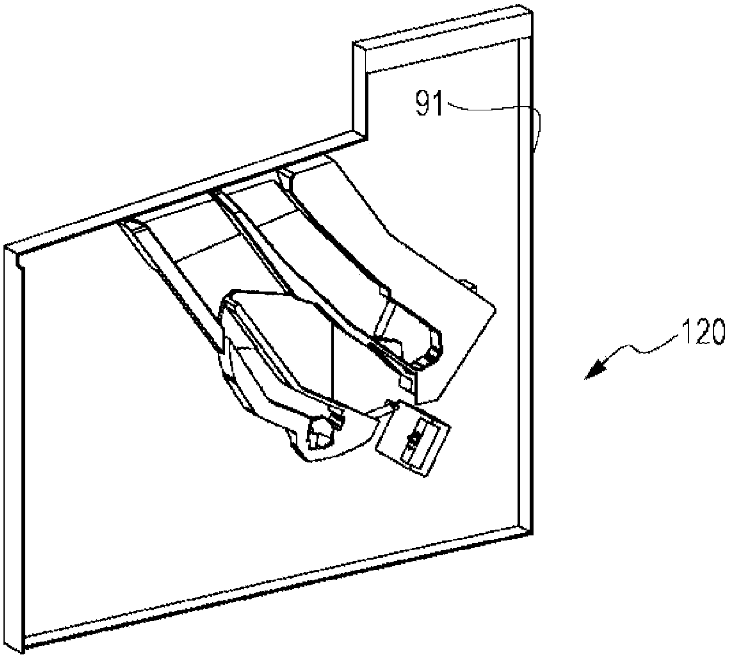
FIG. 35 includes perspective views at a non-driving side of an apparatus main body.
Figure 35:
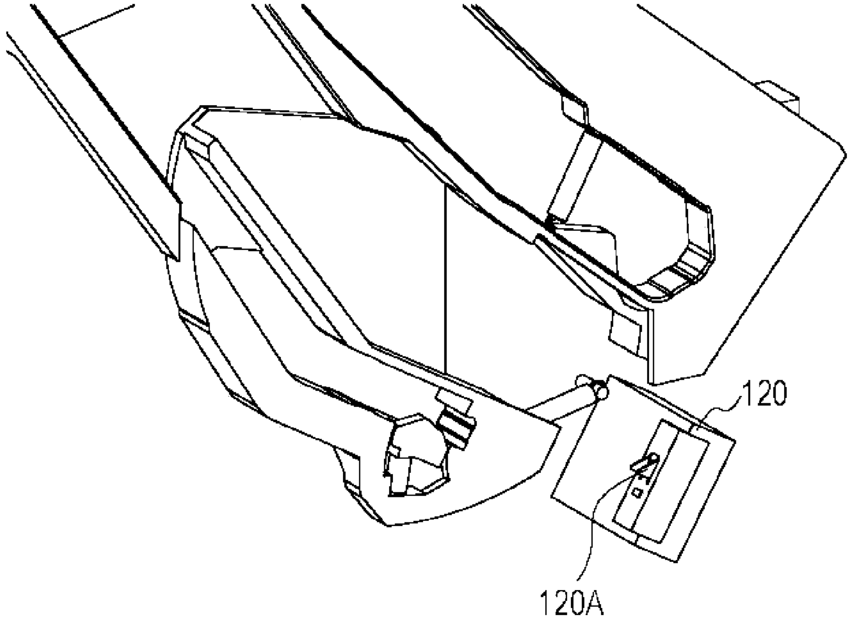

Next, the electric contact portion of the apparatus main body A1 will be described with reference to FIG. 35.

The non-driving-side side plate 91 is provided with an electric supply unit 120, at a position that faces the electrode portions 47*a* of the memory board 47 of the developing cartridge B1 when forming images. The electric supply unit 120 has an electric supply contact 120A, formed of wire spring or leaf spring or the like and having spring properties, protruding from the electric supply unit 120, the electric supply contact 120A being connected to an electric board that is omitted from illustration.

<Mounting Developing Cartridge B1 to Apparatus Main Body A1>

A method of mounting the developing cartridge B1 to the apparatus main body A1 will be described below. Rotating a main body cover 94 that is disposed at the upper part of the apparatus main body A1 and can be opened and closed, in an opening direction D1, exposes the inside of the apparatus main body A1, as illustrated in FIG. 17 and FIG. 18.

Thereafter, the guided part 46*d* of the non-driving-side developing bearing 46 of the developing cartridge B1 (FIG. 17) and the first guide part 93*a* of the non-driving-side guide member 93 of the apparatus main body A1 (FIG. 18) are engaged. Further, the guided part 34*d* of the developing side cover 34 of the developing cartridge B1 (FIG. 18) and the first guide part 92*a* of the driving-side guide member 92 of the apparatus main body A1 (FIG. 17) are engaged. Accordingly, the developing cartridge B1 is inserted into the apparatus main body A1 following the mounting/detaching path X1*a* and mounting/detaching path XH1*a* formed by the first guide part 92*a* of the driving-side guide member 92 and the first guide part 93*a* of the non-driving-side guide member 93.

When mounting the developing cartridge B1 to the apparatus main body A1, the coupling member 180 is in the state of the above-described second inclined attitude D2, as described earlier. The coupling member 180 is inserted into the second guide part 92*b* of the driving-side guide member 92 while maintaining the second inclined attitude D2. To describe in further detail, there is a gap between the coupling member 180 and the second guide part 92*b* of the driving-side guide member 92. Accordingly, while the developing cartridge B1 is being inserted into the apparatus main body A1 following the mounting/detaching paths X1*b* and XH1*a*, the coupling member 180 maintains the state of the second inclined attitude D2.

The developing cartridge B1 that is inserted into the apparatus main body A1 following the mounting/detaching paths X1*a* and XH1*a* is next inserted into the apparatus main body A1 following the mounting/detaching paths X2*a* and XH2*a*. The mounting/detaching paths X2*a* and XH2*a* are formed by the first guide part 80*a* of the driving-side swing guide 80 and the guide part 81*a* of the non-driving-side swing guide 81. To describe in further detail, first, the guided part 34*d* provided to the developing side cover 34 is guided by the first guide part 92*a* of the driving-side guide member 92 of the apparatus main body A1. The configuration is such that thereafter, as the mounting process proceeds, the guided part 34*d* is handed over to the first guide part 80*a* of the driving-side swing guide 80 of the apparatus main body A1. In the same way, at the non-driving side, the guided part 46*d* provided to the non-driving-side developing bearing 46 is guided by the first guide part 93*a* of the non-driving-side guide member 93 of the apparatus main body A1. The configuration is such that thereafter, as the mounting process proceeds, the guided part 46*d* is handed over to the guide part 81*a* of the non-driving-side swing guide 81 of the apparatus main body A1.

The coupling member 180 provided to the driving side end of the developing cartridge B1 is handed over from the second guide part 92*b* of the driving-side guide member 92 of the apparatus main body A1 to the second guide part 80*b* of the driving-side swing guide 80, while maintaining the second inclined attitude D2. Note that there is a gap between the coupling member 180 and the second guide part 80*b* of the driving-side swing guide 80, in the same way as that described above.

<Positioning of the Developing Cartridge B1>

Next, the configuration by which the developing cartridge B1 is positioned by the driving-side swing guide 80 and non-driving-side swing guide 81 of the apparatus main body A1 will be described. Note that the basic structure is the same for the driving side and the non-driving side, so hereinafter, description will be made by way of example of the driving side of the developing cartridge B1. FIGS. 19(*a*) through 19(*d*) illustrates the state of the developing cartridge B1 and the driving-side swing guide 80 during the process of the developing cartridge B1 being mounted to the apparatus main body A1.

FIG. 19(*a*) illustrates a state where the guided part 34*d* provided to the developing side cover 34 of the developing cartridge B1 is guided by the first guide part 80*a* of the driving-side swing guide 80, and the developing cartridge B1 is on the mounting/detaching path X2*a*.

FIG. 19(*b*) illustrates a state where mounting of the developing cartridge B1 has further progressed from the state in FIG. 19(*a*). The positioning part 34*b* of the guided part 34*d* of the developing side cover 34 abuts the positioning part 82*a* of the driving-side pressing member 82 provided on the driving-side swing guide 80 at point P1.

Figure 20:
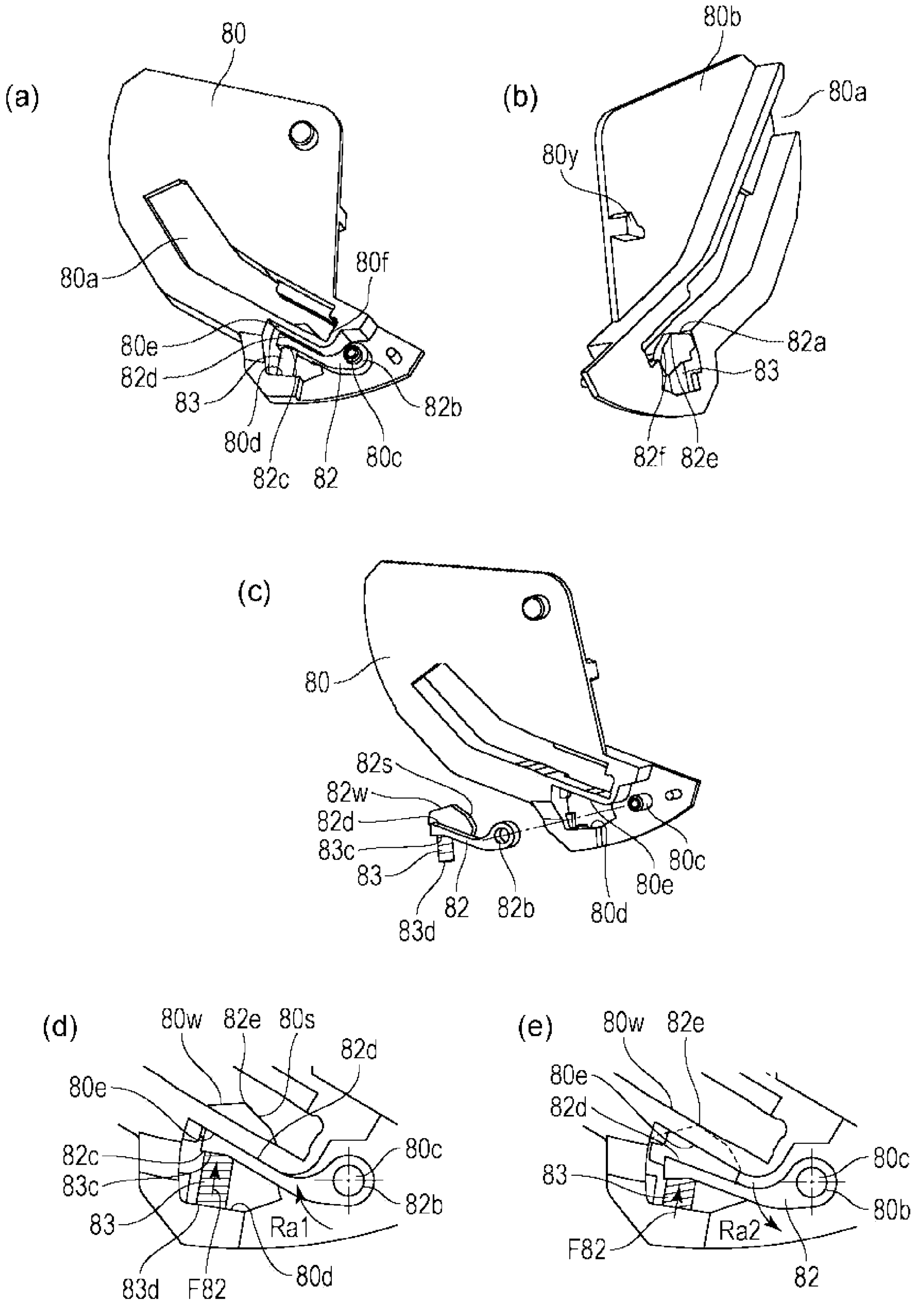
FIG. 20 includes perspective views of a driving side swing guide.

Further, FIG. 20 is perspective explanatory diagrams illustrating the peripheral forms of the driving-side swing guide 80 and driving-side pressing member 82. FIG. 20(*a*) is a perspective view as seen from the driving side in the longitudinal direction, and FIG. 20(*b*) is a perspective view as seen from the non-driving side in the longitudinal direction. FIG. 20(*c*) is a disassembled perspective view of the driving-side swing guide 80, driving-side pressing member 82, and driving-side pressing spring 83. FIG. 20(*d*) and FIG. 20(*e*) are enlarged detailed diagrams of around the driving-side pressing member 82.

Now, the driving-side pressing member 82 has, in addition to the positioning part 82*a*, a hole 82*b*, a seating face 82*c*, and a restricting part 82*d*, as illustrated in FIG. 20(*a*) and FIG. 20(*b*). The hole 82*b* engages with a boss 80*c* of the driving-side swing guide 80, and is rotatably supported centered on the boss 80*c*, as illustrated in FIG. 20(*c*). Further, one end portion 83*c* of the driving-side pressing spring 83 is in contact with the seating face 82*c*. Also, an other end portion 83*d* of the driving-side pressing spring 83 is in contact with the seating face 80*d* of the driving-side swing guide 80, as illustrated in FIG. 20(*d*). Accordingly, the driving-side pressing member 82 is configured to receive biasing force F82 in a direction of rotating in the direction of arrow Ra1 centered on the boss 80*c* of the driving-side swing guide 80. Note that rotation of the driving-side pressing member 82 in the direction of arrow Ra1 is restricted by the restricting part 82*d* thereof abutting a rotation restricting part 80*e* provided to the driving-side swing guide 80, thereby positioning the driving-side pressing member 82. Note that the driving-side pressing member 82 rotatably supported by the driving-side swing guide 80 is capable of rotating in the direction of arrow Ra2 against the biasing force F82 of the driving-side pressing spring 83, as illustrated in FIG. 20(*e*). Further, an upper end 82*e* of the driving-side pressing member 82 is capable of rotating in the direction of arrow Ra2 as far as a position where it does not protrude from a guide face 80*w* of the driving-side swing guide 80.

FIG. 19(*c*) is a state where mounting of the developing cartridge B1 has further progressed from the state in FIG. 19(*b*). A state is illustrated where the guided part 34*d*, in which the positioning part 34*b* and rotation stopper 34*c* of the developing side cover 34 are integrally formed, abuts a near-side slanted face 82*w* of the driving-side pressing member 82, thereby pressing the driving-side pressing member 82 downwards in the direction of arrow Ra2. To describe in detail, the guided part 34*d* of the developing side cover 34 abuts the near-side slanted face 82*w* of the driving-side pressing member 82 and presses the driving-side pressing member 82. This causes the driving-side pressing member 82 to rotate counterclockwise (direction of arrow Ra2) centered on the boss 80*c* of the driving-side swing guide 80 against the biasing force F82 of the driving-side pressing spring 83. FIG. 19(*c*) is a state where the positioning part 34*b* of the developing side cover 34 and the upper end 82*e* of the driving-side pressing member 82 are in contact. At this time, the restricting part 82*d* of the driving-side pressing member 82 is separated from the rotation restricting part 80*e* of the driving-side swing guide 80.

FIG. 19(*d*) is a state where mounting of the developing cartridge B1 has further progressed from the state in FIG. 19(*c*), illustrating a state in which the positioning part 34*d* of the developing side cover 34 and a positioning part 80*f* of the driving-side swing guide 80 are in contact. The driving-side pressing member 82 has a configuration that receives biasing force F82 in the direction of rotating in the direction of arrow Ra1 centered on the boss 80*c* of the driving-side swing guide 80, as described above. Accordingly, a far-side slanted face 82*s* of the driving-side pressing member 82 biases the positioning part 34*b* of the developing side cover 34 by a biasing force F4. Consequently, the positioning part 34*b* comes into contact with the positioning part 80*f* of the driving-side swing guide 80 at point P3 with no gap therebetween. Thus, the driving side of the developing cartridge B1 is positioned and fixed at the driving-side swing guide 80.

Figure 36:
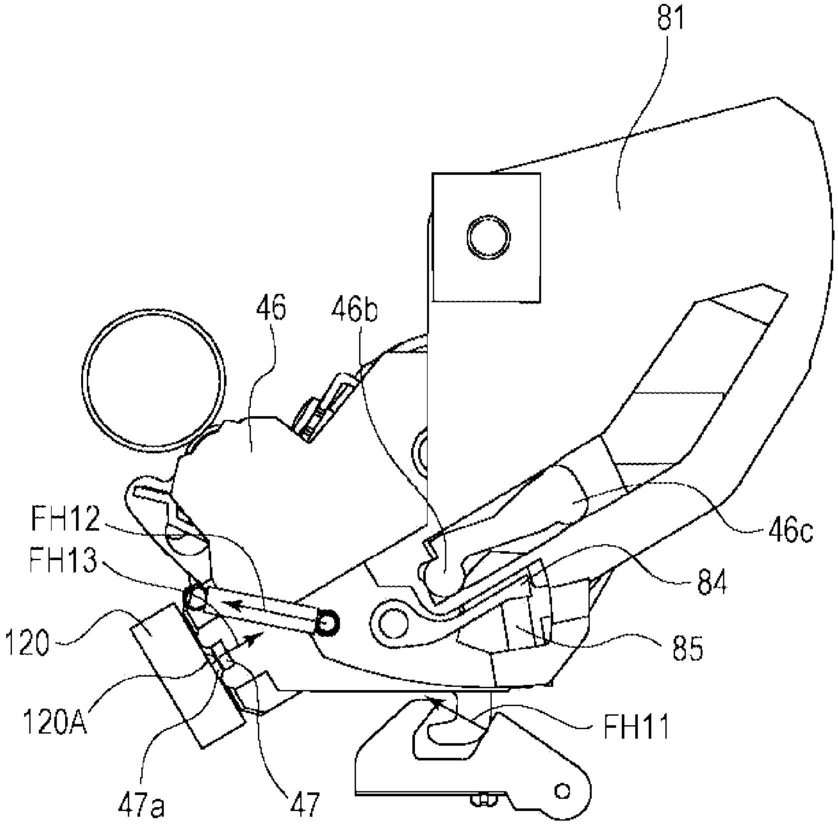
FIG. 36 is a side view at a non-driving side of an apparatus main body and cartridges.

The configuration of the non-driving side is the same as the driving side, with the non-driving-side swing guide 81, a non-driving-side pressing member 84, and a non-driving-side pressing spring 85 being provided corresponding to the driving-side swing guide 80, driving-side pressing member 82, and driving-side pressing spring 83, as illustrated in FIG. 36. Accordingly, positioning of the positioning part 46*b* of the non-driving-side developing bearing 46 and the non-driving-side swing guide 81 also is the same as at the driving side (description will be omitted). According to these, the developing cartridge B1 is positioned and fixed at the driving-side swing guide 80 and non-driving-side swing guide 81.

<Operations of Coupling Member 180 During Process of Mounting Developing Cartridge B1>

Figure 23:
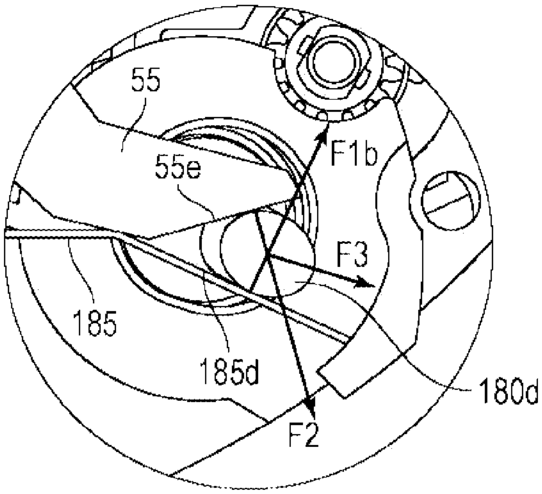
FIG. 23 includes cross-sectional views of a drive input part of a developing cartridge.
Figure 23:
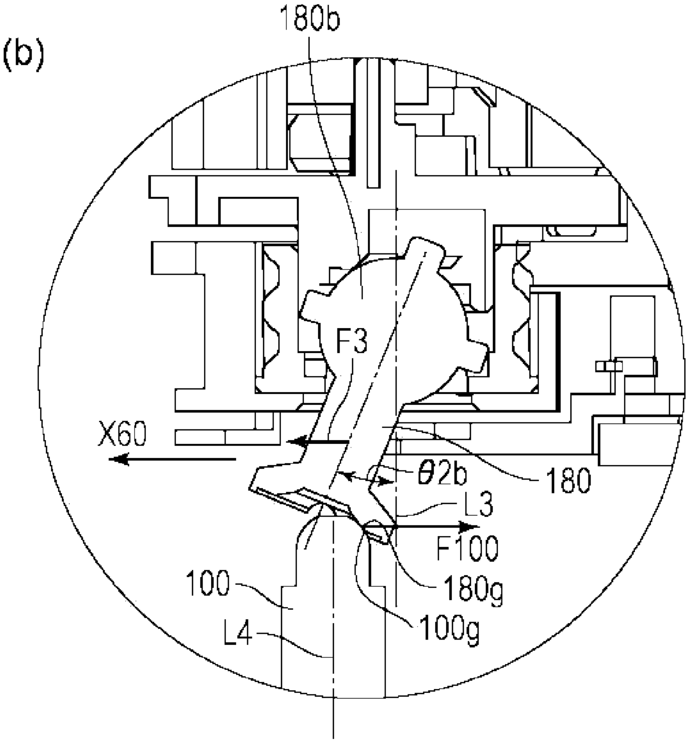

Next, the operations of the coupling member 180 in the process of mounting the developing cartridge B1 will be described with reference to FIGS. 21, 22 and 23.

In the state before mounting the developing cartridge B1 to the apparatus main body A1, the coupling member 180 assumes the second inclined attitude D2, as described above. The coupling member 180 is inserted into the apparatus main body A1 while maintaining the second inclined attitude D2. FIG. 21(*a*) illustrates a state of mounting the developing cartridge B1 to the apparatus main body A1, and being on the mounting/detaching path X2*a* formed at the driving-side swing guide 80 and non-driving-side swing guide 81. FIG. 21(*e*) is a diagram of the state in FIG. 21(*a*) as viewed from the direction of arrow XXIE in FIG. 21(*a*). The configuration is such that with regard to the second inclined attitude D2 of the coupling member 180, the rotational force receiving part 180a of the coupling member 180 faces in the direction of the main body side drive member 100 of the apparatus main body A1 while the developing cartridge B1 is on the mounting/detaching path X2a. More specifically, the coupling member 180 inclines in the direction of the main body side drive member 100 centered on the center 180s of the supported part 180b thereof, near where the coupling member 180 and main body side drive member 100 come into contact, which will be described later. The second inclination restricting part 36kb2 of the driving-side developing bearing 36 is formed so as to incline the coupling member 180 in this manner (see FIGS. 12(b), 13(a) through 13(d), and FIG. 15(a)).

FIG. 21(b) illustrates a state where the developing cartridge B1 has been further inserted to the mounting/detaching path X2a from the state illustrated in FIG. 21(a). FIG. 21(f) is a diagram viewed from the direction of arrow XXIF in FIG. 21(b). The state is such that the circular part 180f of the coupling member 180 and the main body side drive member 100 are in contact. The coupling member 180 is inclined in the direction of the main body side drive member 100 from the state illustrated in FIG. 21(a) to the state illustrated in FIG. 21(b), so the coupling member 180 and the main body side drive member 100 can be easily engaged. Note that the coupling member 180 maintains the second inclined attitude D2 by the guided part 180d thereof receiving total force F3 from the coupling lever spring 56 and the coupling spring 185, as described above (see FIGS. 12(a) through 12(c)). In the following description, the angle formed between the rotational axis L3 of the drive input gear 27 and the rotational axis L2 of the coupling member 180 (inclination angle) when the coupling member 180 is at the second inclined attitude D2 is $\theta 2a$ (see FIG. 21(b)).

FIG. 21(c) illustrates a state where the developing cartridge B1 has been further inserted to the mounting/detaching path X2a from the state illustrated in FIG. 21(b). FIG. 21(g) is a diagram viewed from the direction of arrow XXIG in FIG. 21(c). FIGS. 23(a) and 23(b) are cross-sectional diagrams illustrating the relationship of force at the periphery of the coupling member 180 when the circular part 180f of the coupling member 180 comes into contact with the main body side drive member 100.

The rotation restricting part 55y of the coupling lever 55 and the abutting part 80y disposed on the driving-side swing guide 80 are in a state of contact. The inclination angle of the coupling member 180 becomes $\theta 2b$ ($\leq \theta 2a$) from the state illustrated in FIG. 21(b) to the state illustrated in FIG. 21(c), by the circular part 180f thereof coming into contact with the main body side drive member 100. In more detail, the coupling member 180 receives force F100 at the contact part from the main body side drive member 100. In a case where the force F100 is in a direction against the force F3 that the coupling member 180 originally was receiving, and also is greater than F3, the inclination angle of the coupling member 180 becomes smaller, and nears a direction of being relatively parallel to the rotational axis L3 of the drive input gear 27. That is to say, the inclination angle changes centered on the center 180s of the supported part 180b, and becomes $\theta 2b < \theta 2a$ (see FIGS. 15(a), 21(b), 21(c), and 23(a)). The coupling member 180 comes into contact with four parts, which are the coupling lever 55, the coupling spring 185, the main body side drive member 100, and the phase-restricting part 36kb of the driving-side developing bearing 36, which decides the inclination angle thereof ($\theta 2b$).

FIG. 21(d) illustrates a state where the developing cartridge B1 has been further inserted to the mounting/detaching path X2a from the state illustrated in FIG. 21(c). FIG. 21(h) is a diagram viewed from the direction of arrow XXIH in FIG. 21(d). The rotation restricting part 55y of the coupling lever 55 is in contact with the abutting part 80y of the driving-side swing guide 80. Accordingly, the coupling lever 55 rotates in the direction of arrow X11b centered on the rotational axis L11 relatively within the developing cartridge B1, in conjunction with the insertion of the developing cartridge B1 in the direction of the mounting/detaching path X2a. At this time, the guide part 55e of the coupling lever 55 also rotates in the direction of arrow X11b centered on the rotational axis L11. As a result, the coupling member 180 the inclination angle $\theta 2c$ of the coupling member 180 decreases ($\theta 2c < \theta 2b$) along the guide part 55e of the coupling lever 55 as biasing force is received from the coupling spring 185. The coupling member 180 comes into contact with three parts, which are the coupling spring 185, the main body side drive member 100, and the phase-restricting part 36kb of the driving-side developing bearing 36, which decides the inclination angle ($\theta 2c$) thereof.

FIGS. 22(a) through 22(d) illustrate a state where the developing cartridge B1 has been further inserted in the direction of the mounting/detaching path X2a from the state illustrated in FIG. 21(d), and also illustrates a state where mounting of the developing cartridge B1 to the apparatus main body A1 has been completed.

The coupling member 180 engages the main body side drive member 100, and assumes the reference attitude D0 (coupling member 180 inclination angle $\theta 2 = 0°$).

The phase-restricting boss 180e of the coupling member 180 is separated from the second inclination restricting part 36kb2 of the driving-side developing bearing 36 at this time, and is not in contact with any part of the phase restricting part 36b of the driving-side developing bearing 36 (see FIG. 22(c)). The guide part 55e of the coupling lever 55 is held in a state completely retracted from the guided part 180d of the coupling member 180. That is to say, the coupling member 180 is in contact with two parts, which are the coupling spring 185 and the main body side drive member 100, which decides the inclination angle ($\theta 2$) thereof (see the above-described reference attitude D0 of the coupling member 180 for details).

<Operations of Coupling Member 180 During Process of Removing Developing Cartridge B1>

Next, the operations of the coupling member 180 in the process of removing the developing cartridge B1 from the apparatus main body A1 will be described.

The operations of removing the developing cartridge B1 from the apparatus main body A1 are the reverse operations from the above-described mounting.

First, the user rotates the main body cover 94 of the apparatus main body A1 in the opening direction D1 (see FIG. 17 and FIG. 18) in the same way as when mounting, and exposes the inside of the apparatus main body A1. The developing cartridge B1 is held in a contact attitude where the developing roller 13 and photosensitive drum 10 are in contact, by the driving-side swing guide 80, non-driving-side swing guide 81, and also a configuration omitted from illustration.

The developing cartridge B1 is then moved in the removing direction following the mounting/detaching path XH2 provided to the driving-side swing guide 80 and non-driving-side swing guide 81.

Figure 21:
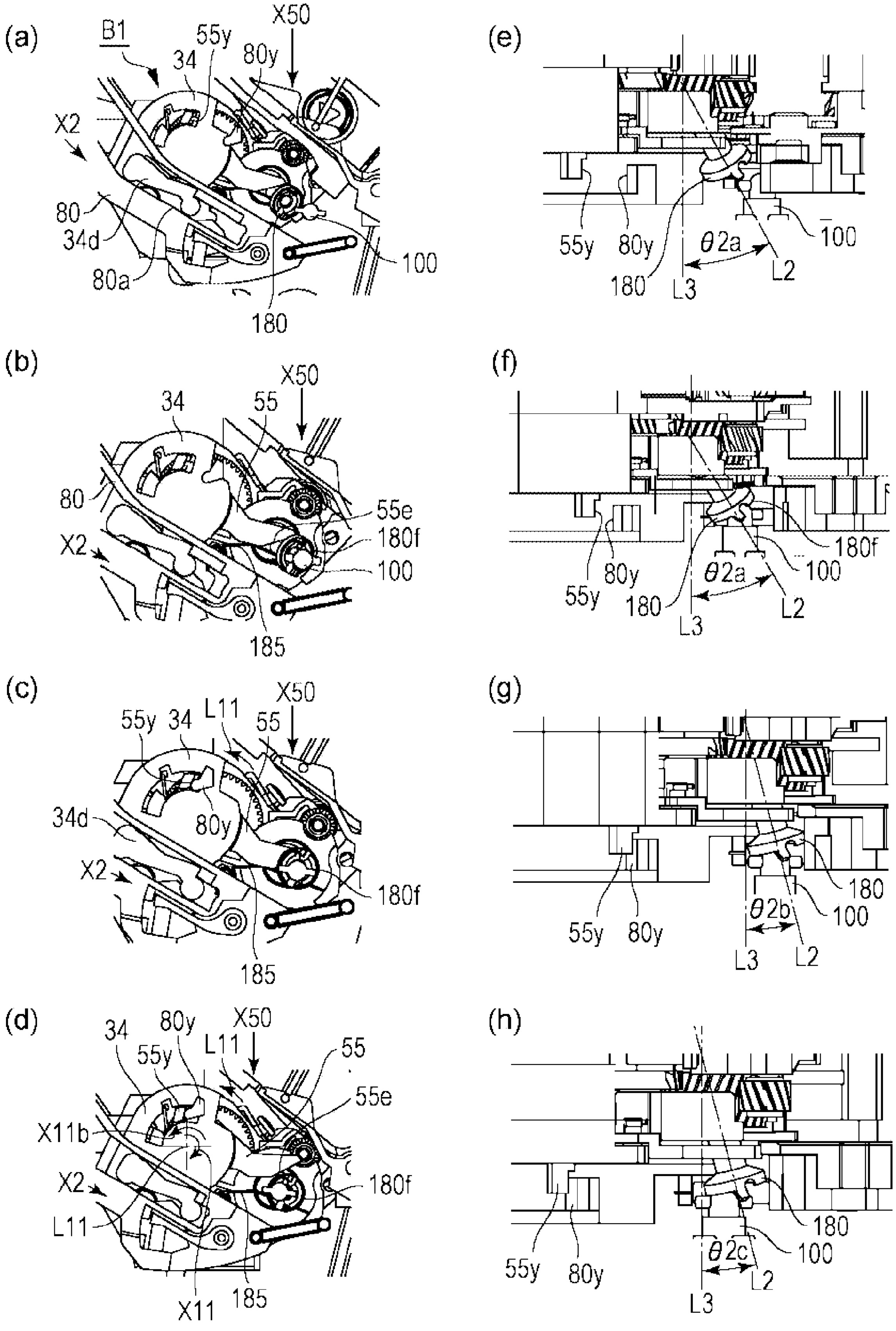
FIG. 21 includes side views of a driving side, illustrating a process of mounting a developing cartridge to an apparatus main body.

As the developing cartridge B1 moves, the abutting part 80y of the driving-side swing guide 80 that had been in contact with the rotation restricting part 55y of the coupling lever 55 moves (from state illustrated in FIG. 21(d) to state illustrated in FIG. 21(*c*)). In conjunction with this, the coupling lever 55 rotates in the direction of arrow X11 centered on the rotational axis L11. Further moving the developing cartridge B1 causes the coupling lever 55 to rotate in the direction of arrow X11, and the guide part 55*e* of the coupling lever 55 comes into contact with the guided part 180*d* of the coupling member 180 (state illustrated in FIG. 21(*c*)). The coupling member 180 that receives biasing force from both the coupling lever 55 and the coupling spring 185 starts moving in the direction of the second inclined attitude D2, as described earlier. Finally, the phase-restricting boss 180*e* of the coupling member 180 is restricted by the guide part 36*kb*2*a*, guide part 36*kb*2*b*, and guide part 36*kb*2*c* of the driving-side developing bearing 36, and engages the second inclination restricting part 36*kb*2. The coupling member 180 maintains the state of the second inclined attitude D2.

Thereafter, the developing cartridge B1 is removed to the outside of the apparatus main body A1, by being moved in the removing direction following the mounting/detaching path XH1 provided to the driving-side guide member 92 and non-driving-side guide member 93.

As described above, the developing cartridge B1 that applies biasing force to the coupling member 180 is provided with the coupling lever 55 and coupling lever spring 56, which enables the coupling member 180 to be inclined at the second inclined attitude D2. The direction of inclination in which the coupling member 180 is inclined by the coupling lever 55 is the direction of the mounting/detaching path X2*a* of the developing cartridge B1, and further, the configuration is such that the rotating operation of the coupling lever 55 occurs in conjunction with mounting/detaching operations of the developing cartridge B1 by the user.

(7) Regarding Contact/Separation Lever as Movable Member

Figure 1:
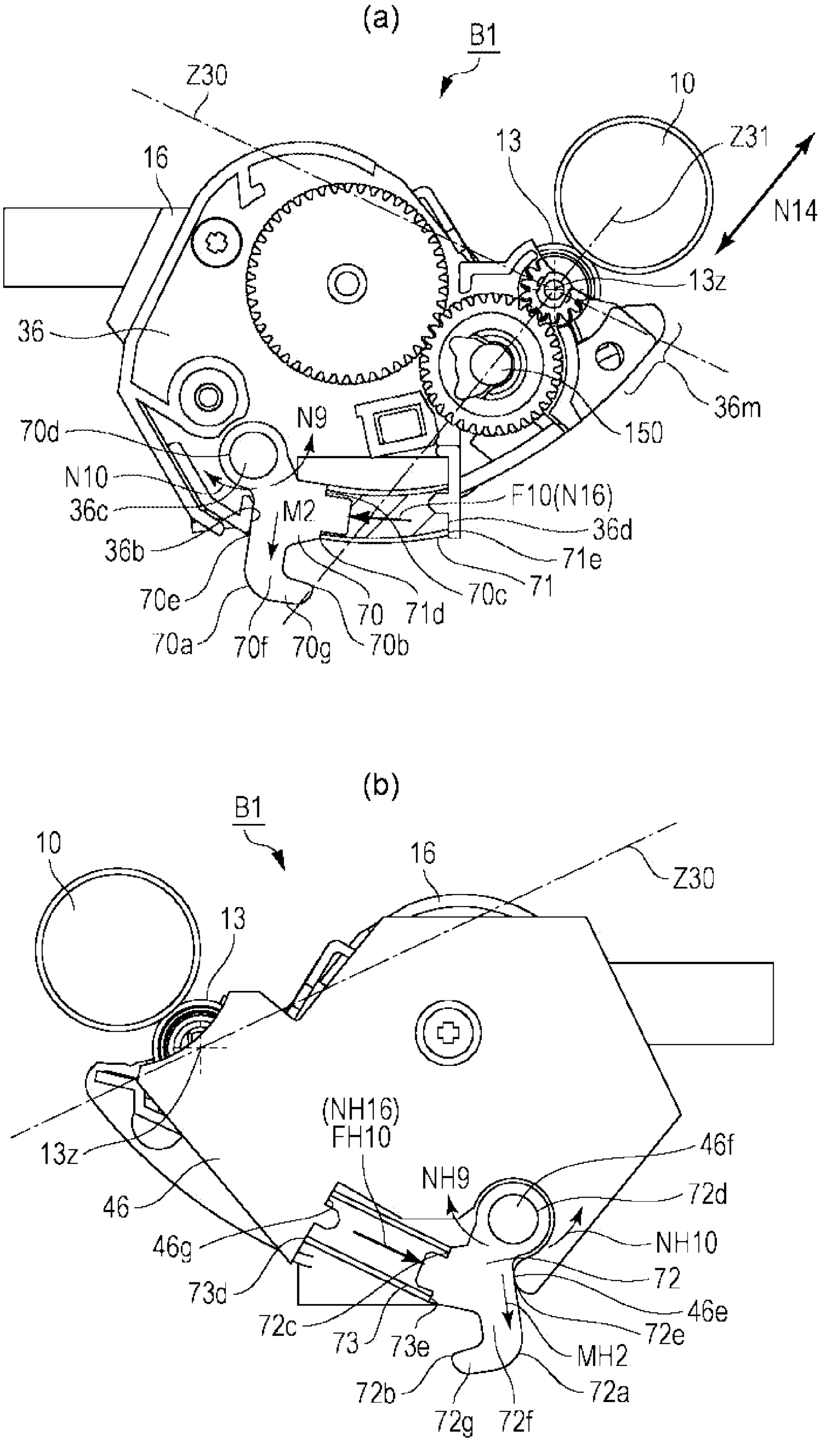
FIG. 1 includes side views of a developing cartridge.

The driving-side coontacting/spacing lever 70 serving as a driving-side movable member will be described with reference to FIG. 1. FIG. 1(*a*) is an explanatory diagram of the driving-side coontacting/spacing lever 70 and peripheral form, and is a cross-sectional view of the developing cartridge B1 as seen from the driving side.

The driving-side coontacting/spacing lever 70 includes a first contact face 70*a*, a second contact face 70*b*, a third contact face 70*c*, a supported part 70*d*, a driving-side restricting contact part 70*e*, and a first protrusion (one end side protrusion) 70*f*. The supported part 70*d* of the driving-side coontacting/spacing lever 70 is rotatably supported by the driving-side developing bearing 36, by a supporting part 36*c* of the driving-side developing bearing 36. Specifically, a boss of the supporting part 36*c* of the driving-side developing bearing 36 fits to a hole in the supported part 70*d* of the driving-side contacting/spacing lever 70, whereby the driving-side contacting/spacing lever 70 is supported to be capable of rotation (in the directions of arrows N9 and N10) centered on the boss of the supporting part 36*c*. That is to say, the supporting part 36*c* serves as the rotational center of the driving-side coontacting/spacing lever 70. The supporting part 36*c* of the driving-side developing bearing 36 is parallel to the rotational axis L0 of the developing roller 13. That is to say, the driving-side coontacting/spacing lever 70 can rotate on a plane orthogonal to the rotational axis L0 of the developing roller 13.

Further, at the third contact face 70*c*, the driving-side coontacting/spacing lever 70 is in contact with one end 71*d* of the driving-side developing pressure spring 71 that is compression spring serving as a first elastic part. An other end 71*e* of the driving-side developing pressure spring 71 is in contact with a contact face 36*d* of the driving-side developing bearing 36. Consequently, the driving-side coontacting/spacing lever 70 receives force in the direction of arrow N16 at the third contact face 70*c*, from the driving-side developing pressure spring 71. The driving-side developing pressure spring 71 biases (urges) the first contact face 70*a* of the driving-side coontacting/spacing lever 70 in a direction of moving away from the developing roller 13 (N16). In the solitary state of the developing cartridge B1, i.e., in the state before the developing cartridge B1 is mounted to the apparatus main body A1, the driving-side restricting contact part 70*e* is in contact with the restricting part 36*b* provided to the driving-side developing bearing 36.

Figure 37:
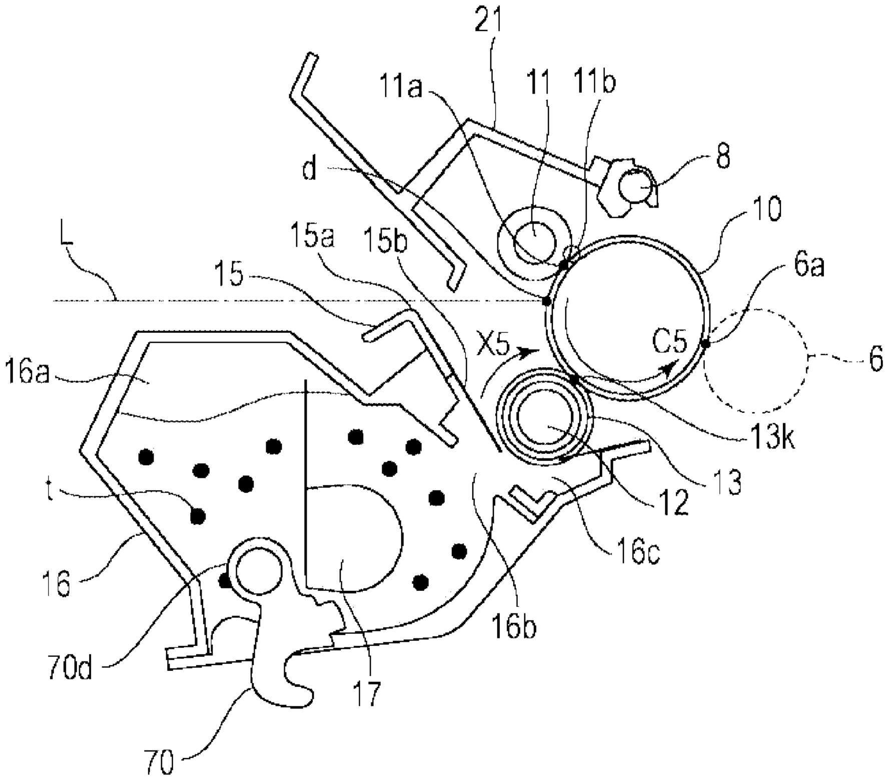
FIG. 37 is a schematic cross-sectional view of a developing cartridge.

Now, FIG. 37 is a diagram where the driving-side coontacting/spacing lever 70 has been projected on a cross-sectional view of the developing cartridge B1. The supported part 70*d* (the center of rotation of the driving-side coontacting/spacing lever 70) is at a position overlapping the developer accommodation part 16*a* (i.e., within the developer accommodation part 16*a*) in FIG. 37. That is to say, when the developing cartridge B1 is viewed following the direction of arrow N11 (see FIG. 4) that is a direction parallel to the rotational axis L0 of the developing roller 13, the supported part 70*d* of the driving-side coontacting/spacing lever 70 is at a position overlapping the developer accommodation part 16*a* of the developing container 16. The non-driving-side coontacting/spacing lever 72 has the same configuration, although omitted from illustration.

Accordingly, the amount of protrusion of the driving-side coontacting/spacing lever 70 and non-driving-side coontacting/spacing lever 72 from the developer accommodation part 16*a* can be reduced, and the size of the developing cartridge B1 as viewed from the rotational axis direction of the developing roller 13 can be made compact.

The non-driving-side coontacting/spacing lever 72 serving as a non-driving-side movable member will be described with reference to FIG. 1(*b*). Note that the non-driving side has a similar configuration to the driving side.

FIG. 1(*b*) is a side view of the developing cartridge B1 from the non-driving side. Note however, that some of the parts have been omitted from illustration, for description of the configuration of the non-driving-side coontacting/spacing lever 72.

As illustrated in FIG. 1(*b*), the non-driving-side coontacting/spacing lever 72 has a non-driving-side first contact face 72*a*, a non-driving-side second contact face 72*b*, a non-driving-side third contact face 72*c*, a supported part 72*d*, a non-driving-side restricting contact part 72*e*, and a non-driving side first protrusion 72*f* (other end side protrusion). The supported part 72*d* of the non-driving-side coontacting/spacing lever 72 is supported by the supporting part 46*f* of the non-driving-side developing bearing 46. Specifically, a boss of the supporting part 46*f* of the non-driving-side developing bearing 46 is fit to a hole of the supported part 72*d* of the non-driving-side coontacting/spacing lever 72, whereby the non-driving-side coontacting/spacing lever 72 can rotate (directions of arrows NH9 and NH10) centered on the boss of the supporting part 46*f*. That is to say, the supporting part 46*f* is the center of rotation of the non-driving-side coontacting/spacing lever 72. The supporting part 46*f* of the non-driving-side developing bearing 46 also is parallel to the rotational axis L0 of the developing roller 13 in the present embodiment. That is to say, the non-driving-side coontacting/spacing lever 72 is capable of rotating on a plane orthogonal to the rotational axis L0 of the developing roller 13.

Further, the non-driving-side coontacting/spacing lever 72 comes into contact with one end 73*e* of the non-driving-side developing pressure spring 73 that is a compression spring serving as a second elastic part, at the non-driving-side third contact face 72*c*. An other end 73*d* of the non-driving-side developing pressure spring 73 is in contact with a contact face 46*g* of the non-driving-side developing bearing 46. Consequently, the non-driving-side coontacting/spacing lever 72 receives force FH10 in the direction of arrow NH16 from the non-driving-side developing pressure spring 73, at the non-driving-side third contact face 72*c*. The non-driving-side developing pressure spring 73 biases (urges) the non-driving-side first contact face 72*a* of the non-driving-side coontacting/spacing lever 72 in a direction of moving away from the developing roller 13 (arrow NH16). In the solitary state of the developing cartridge B1, i.e., in the state before the developing cartridge B1 is mounted to the apparatus main body A1, the non-driving-side restricting contact part 72*e* is in contact with the restricting part 46*e* provided to the non-driving-side developing bearing 46.

The restricting part 36*b* and restricting part 46*e* are each configured to partially overlap the driving-side developing pressure spring 71 and non-driving-side developing pressure spring 73 in the biasing direction of the driving-side developing pressure spring 71 and non-driving-side developing pressure spring 73, as illustrated in FIG. 1. In other words, the driving-side contacting/spacing lever 70 is sandwiched between the restricting part 36*b* and driving-side developing pressure spring 71, and is configured to receive compression force. That is to say, the position of a separated part 70*g* after the separated part 70*g* of the driving-side coontacting/spacing lever 70 has come into contact with the restricting part 36*b* can be precisely positioned. This holds true for the non-driving side as well. As a result, spacing force by a spacing mechanism of the apparatus main body, which will be described later, can be received at a highly precise timing.

The restricting part 36*b* and the restricting part 46*e* restrict the respective driving-side coontacting/spacing lever 70 and non-driving-side coontacting/spacing lever 72 from moving in a direction away from the developing roller 13. In other words, the restricting part 36*b* and the restricting part 46*e* are provided at positions where they can restrict the driving-side coontacting/spacing lever 70 and non-driving-side coontacting/spacing lever 72 from moving in a direction away from the developing roller 13. When spacing the developing roller 13 from the photosensitive drum 10, the driving-side contacting/spacing lever 70 and non-driving-side coontacting/spacing lever 72 are tuned in the rotating directions N10 and NH10 respectively, to come into contact with the restricting part 36*b* and the restricting part 46*e*. Accordingly, the state is such that a spacing force by a spacing mechanism of the apparatus main body is transmitted from the driving-side coontacting/spacing lever 70 and non-driving-side coontacting/spacing lever 72 to the driving-side developing bearing 36 and non-driving-side developing bearing 46 of the developing frame via the restricting part 36*b* and restricting part 46*e*.

Figure 44:
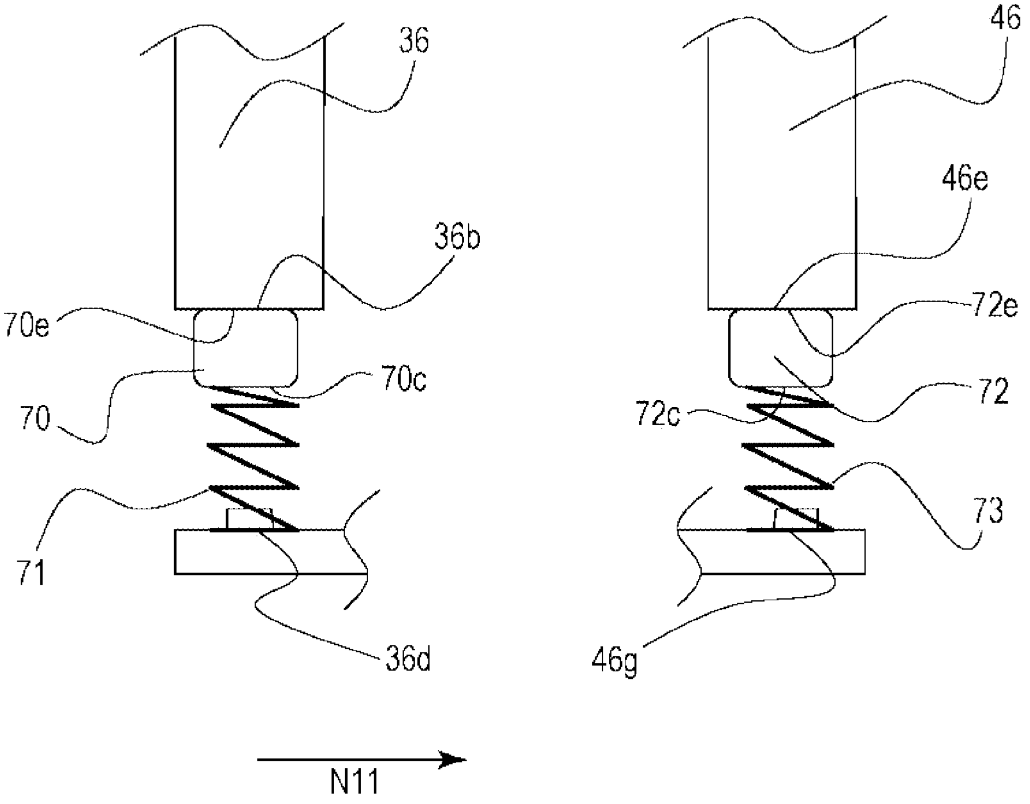
FIG. 44 is a schematic view illustrating the position of a coontacting/spacing lever and a developing pressure spring.

FIG. 44 is a schematic diagram illustrating the position relationship of the restricting part 36*b*, restricting part 46*e*, driving-side coontacting/spacing lever 70, non-driving-side coontacting/spacing lever 72, driving-side developing pressure spring 71, and non-driving-side developing pressure spring 73, in the longitudinal direction of the developing roller 13. FIG. 44 is a diagram viewed from a direction orthogonal to the longitudinal direction of the developing roller 13 (direction of rotational axis L0). The restricting part 36*b* is configured so as to overlap at least partially the driving-side developing pressure spring 71 and driving-side third contact face 70*c*, with regard to a direction N11 that is parallel to the longitudinal direction of the developing roller 13 (direction of rotational axis L0). In the same way, the restricting part 46*e* is configured so as to overlap at least partially the non-driving-side developing pressure spring 73 and non-driving-side third contact face 72*c*, with regard to the direction N11. Accordingly, the spacion force by the later-described spacing mechanism of the apparatus main body can be received at a highly precise timing.

The restricting part 36*b* is also configured so as to at least partially overlap the driving-side developing pressure spring 71 and the driving-side third contact face 70*c* with regard to the direction of arrow M2 as well, as illustrated in FIG. 1. In the same way, the restricting part 46*e* is also configured so as to at least partially overlap the non-driving-side developing pressure spring 73 and the non-driving-side third contact face 72*c* with regard to the direction of arrow M2. Note however, that it is sufficient that the above-described placement relationship of the restricting part 36*b* and restricting part 46*e* be realized regarding one or the other direction of the direction of N11 and the direction of arrow M2.

Now, the biasing force F10 of the driving-side developing pressure spring 71 and the biasing force FH10 of the non-driving-side developing pressure spring 73 are set differently. Also, the driving-side third contact face 70*c* and non-driving-side third contact face 72*c* are disposed at different angles. These may be selected as appropriate, taking in to consideration the properties of the peripheral configuration, so that the later-described pressing force of the developing roller 13 as to the photosensitive drum 10 is appropriate. A relationship where

Figure 27:
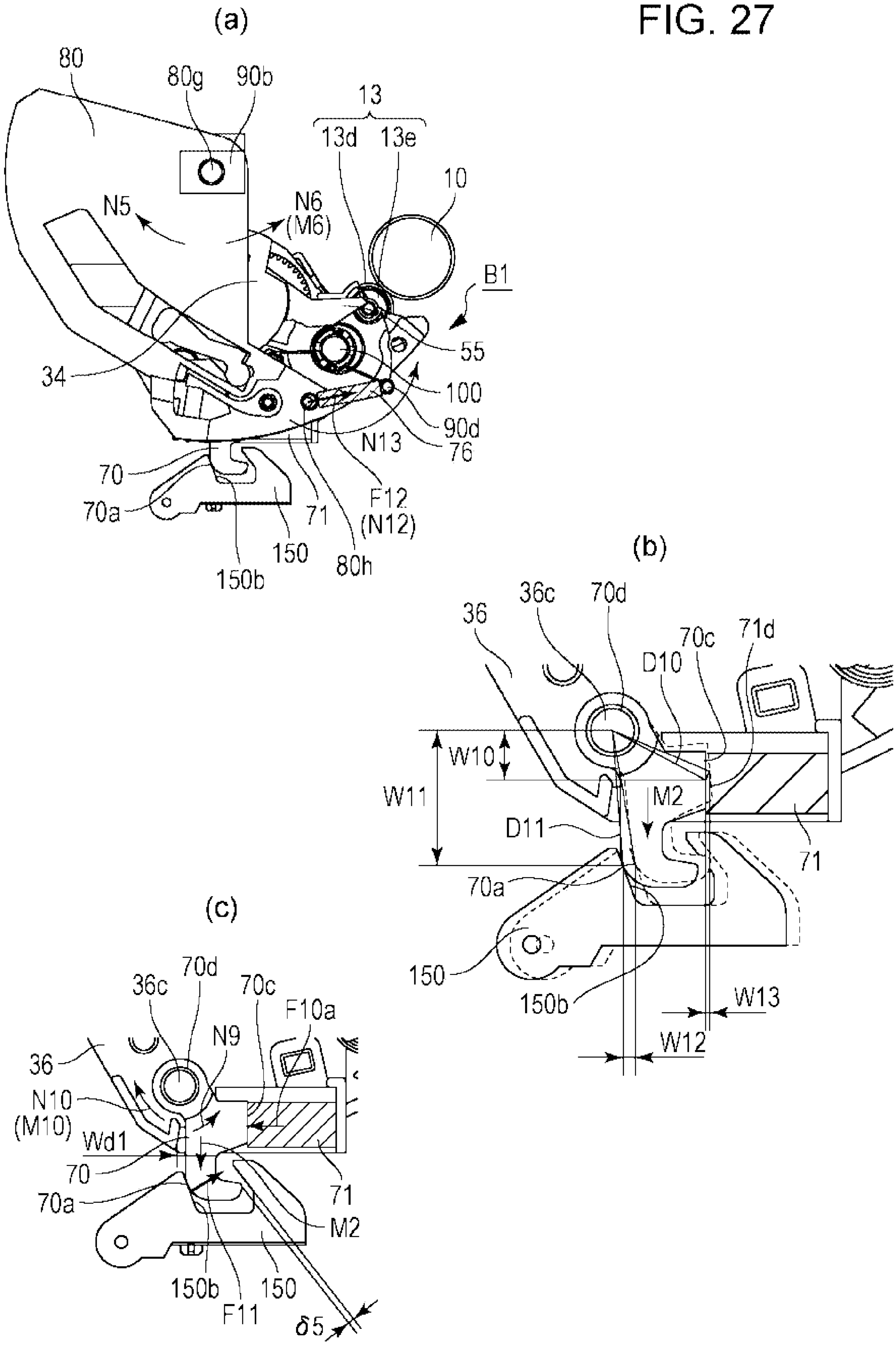
FIG. 27 includes side views at a driving side of a developing cartridge and driving-side swing guide.

F10<FH10 is set in the present embodiment, taking into consideration moment M6 (see FIG. 27(*a*)) occurring at the developing cartridge B1 when receiving drive transmission from the apparatus main body A1, to rotationally drive the developing roller 13.

That is to say, at the driving side, the coupling member 180 rotates in the direction of arrow X6 as illustrated in FIG. 8(*b*). The developing cartridge B1 that has received this rotational force rocks in the direction of arrow N6 illustrated in FIG. 27(*a*) integrally with the driving-side swing guide 80, centered on a supporting part 80*g* (see FIG. 27(*a*)). In a case where the rotational force (torque) that the coupling member 180 receives from the main body side drive member 100 is sufficient, the moment in the direction of arrow N6 is generated by the torque of the coupling member 180 alone, generating force pressuring the developing roller 13 against the photosensitive drum 10. Accordingly, the biasing force F10 of the driving-side developing pressure spring 71 may be made to be smaller than the biasing force FH10 of the non-driving-side developing pressure spring 73.

Now, a straight line Z30 that passes through the center 13*z* of the developing roller 13 and is parallel to the mounting/detaching direction X2 (FIG. 17) of the developing cartridge B1 to/from the apparatus main body A1 is defined, as illustrated in FIG. 1(*a*). The driving-side coontacting/spacing lever 70 is disposed on the opposite side of the straight line Z30 from the photosensitive drum 10 (the lower side in the direction of gravity in the present embodiment). The degree of freedom of placement with regard to the drum cartridge C increases due to this configuration, for mounting/detaching the developing cartridge. Specifically, the configuration where the driving-side coontacting/spacing lever 70 does not protrude in the direction of the drum cartridge C increases the degree of freedom of placement of the drum cartridge C. There is no need for a placement avoiding interference with the protruding driving-side coontacting/spacing lever 70 or the like.

The first protrusion 70*f* of the driving-side coontacting/spacing lever 70 protrudes further than the developing container 16, driving-side developing bearing 36, and developing side cover 34 (see FIG. 10(*a*)), as viewed from the driving side of the developing cartridge in the longitudinal direction (rotational axis direction).

That is to say, the first protrusion (one end side protrusion) 70*f* of the driving-side coontacting/spacing lever 70 is exposed from the developing frame (16, 46, 36, 34) when viewing the developing cartridge from the driving side (one end side) in the longitudinal direction (direction of rotational axis L0), as illustrated in FIG. 11(*a*).

However, the driving-side coontacting/spacing lever 70 does not necessarily have to be exposed from the developing frame (16, 46, 36, 34) when viewing the developing cartridge B1 in the longitudinal direction (direction of rotational axis L0). A configuration is conceivable where the first protrusion 70*f* is not exposed (cannot be seen), the driving-side coontacting/spacing lever 70 being hidden behind the developing frame when the developing cartridge B1 is viewed from the driving side or non-driving side.

That is to say, it is sufficient for the first protrusion 70*f* to protrude from the developing frame (16, 46, 36, 34) in a cross-section (see FIG. 1(*a*)) of the developing cartridge that passes through the driving-side coontacting/spacing lever 70 (particularly the first protrusion 70*f*) and is orthogonal to the developing direction (rotational axis L0 of the developing roller 13). According to this configuration, a later-described driving-side apparatus pressing member 150 (see FIGS. 27(*a*) through 27(*c*)) can engage the first protrusion 70*f*.

In other words, it is sufficient to form the external form of the developing cartridge so that the first protrusion 70*f* protrudes from the developing frame at a position where the driving-side coontacting/spacing lever 70 is disposed in the longitudinal direction of the developing roller 13. In the present embodiment, the first protrusion 70*f* protrudes with respect to the driving-side developing bearing 36, at the position where the driving-side coontacting/spacing lever 70 is disposed. A configuration may also be made where the first protrusion 70*f* is covered by the developing side cover 34 situated further outwards in the longitudinal direction than the driving-side coontacting/spacing lever 70, or covered by the developing container 16 situated further inwards in the longitudinal direction than the driving-side coontacting/spacing lever 70.

To summarize, the driving-side coontacting/spacing lever 70 protrudes so as to form the outer shape of the developing cartridge B1 when viewed at a cross-section at the position of the driving-side coontacting/spacing lever 70 in the direction of the rotational axis L0 of the developing roller 13.

Further, the protruding direction of the first protrusion 70*f* (direction of arrow M2) intersects the directions in which the driving-side coontacting/spacing lever 70 can move (movement directions: directions of arrows N9 and N10), and the direction in which the developing cartridge B1 can move (movement direction: direction of arrow N6 (see FIG. 27(*a*)).

The first protrusion 70*f* has the first contact face 70*a* in a direction away from of the developing roller 13 as seen from the supported part 70*d* of the driving-side coontacting/spacing lever 70. The configuration is such that a second contact face 150*b* of the driving-side apparatus pressing member 150 comes into contact with the first contact face 70*a* of the driving-side coontacting/spacing lever 70 when the developing roller 13 is pressured against the photosensitive drum 10 (see FIG. 27(*a*)), which will be described in detail later. Further, the spaced part 70*g* that intersects the direction of protrusion of the first protrusion 70*f* (direction of arrow M2) and protrudes at the side toward the developing roller 13 is provided on the tip of the first protrusion 70*f*. The spaced part 70*g* has the second contact face 70*b*. The configuration is such that a first contact face 150*a* of the driving-side apparatus pressing member 150 comes into contact with the second contact face 70*b* of the driving-side coontacting/spacing lever 70 when the developing roller 13 is spaced from the photosensitive drum 10 (see FIGS. 28(*a*) through 28(*d*)), which will be described in detail later.

Next, the shape of the non-driving-side coontacting/spacing lever 72 will be described in detail with reference to FIG. 1(*b*). The non-driving-side coontacting/spacing lever 72 is disposed on the opposite side from the photosensitive drum 10 across the straight line Z30 that passes through the center 13*z* of the developing roller 13 and is parallel to the mounting/detaching direction X2 of the developing cartridge B1 to/from the apparatus main body A1 (the lower side in the direction of gravity in the present embodiment), in the same way as with the driving side, described above. The degree of freedom of placement with regard to the drum cartridge C increases due to this configuration, for mounting/detaching the developing cartridge. Specifically, the configuration where the non-driving-side coontacting/spacing lever 72 does not protrude in the direction of the drum cartridge C increases the degree of freedom of placement of the drum cartridge C. There is no need for a placement avoiding interference with the protruding non-driving-side coontacting/spacing lever 72 or the like.

The first protrusion 72*f* of the non-driving-side coontacting/spacing lever 72 protrudes out further than the developing container 16 and non-driving-side developing bearing 46 when viewed from the longitudinal direction. The first protrusion (other end side protrusion) 72*f* of the non-driving-side coontacting/spacing lever 72 is exposed from the developing frame (16, 46, 36, 34) when viewing the developing cartridge in the longitudinal direction (direction of rotational axis L0) from the non-driving side (other end side) (see FIG. 5).

Note however, that in the same way as with the first protrusion 70*f*, the first protrusion 72*f* does not need to be exposed when viewing the developing cartridge B1 in the longitudinal direction (direction of rotational axis L0).

That is to say, it is sufficient for the first protrusion 72*f* to protrude from the developing frame (16, 36, 34) in a cross-section of the developing cartridge that passes through the non-driving-side coontacting/spacing lever 72 (particularly the protrusion 72*f*) and is orthogonal to the developing direction (rotational axis L0 of the developing roller 13), in the same way as with the first protrusion 70*f*. According to this configuration, a later-described non-driving-side apparatus pressing member 151 (see FIG. 29(*a*)) can engage the protrusion 72*f*.

In other words, it is sufficient to form the external form of the developing cartridge B1 so that the protrusion 72*f* protrudes from the developing frame (the non-driving-side side cover 46 in the present embodiment) at a position where the non-driving-side coontacting/spacing lever 72 is disposed in the longitudinal direction of the developing roller 13. A configuration may also be made where the developing frame covers the first protrusion 72*f* at the outer side in the longitudinal direction or inner side in the longitudinal direction where the non-driving-side coontacting/spacing lever 72 is disposed.

To summarize, the non-driving-side coontacting/spacing lever 72 protrudes so as to form the outer shape of the developing cartridge B1 when viewed at a cross-section at the position of the non-driving-side coontacting/spacing lever 72 in the direction of the rotational axis L0 of the developing roller 13.

Further, the protruding direction of the first protrusion 72*f* (direction of arrow MH2) intersects the directions in which the non-driving-side coontacting/spacing lever 72 can move (movement directions: directions of arrows NH9 and NH10), and the direction in which the developing cartridge B1 can move (movement direction: direction of arrow M1 (see FIG. 27(*a*)). The first protrusion 72*f* has the first contact face 72*a* in a direction away from the developing roller 13 as seen from the supported part 72*d* of the non-driving-side coontacting/spacing lever 72. The configuration is such that a second contact face 151*b* of the non-driving-side apparatus pressing member 151 comes into contact with the first contact face 72*a* of the non-driving-side coontacting/spacing lever 72 when the developing roller 13 is pressured against the photosensitive drum 10 (see FIG. 29), which will be described in detail later.

Further, the spacing part 72*g* that intersects the direction of protrusion of the first protrusion 72*f* from the developing container 16 (direction of arrow MH2) and protrudes at the side toward the developing roller 13 is provided on the tip of the first protrusion 72*f*. The spacing part 72*g* has the second contact face 72*b*. The configuration is such that a first contact face 151*a* of the non-driving-side apparatus pressing member 151 comes into contact with the second contact face 72*b* of the non-driving-side coontacting/spacing lever 72 when the developing roller 13 is spaced from the photosensitive drum 10 (see FIG. 29(*b*)), which will be described in detail later.

The driving-side coontacting/spacing lever 70 and the non-driving-side coontacting/spacing lever 72 are provided on both ends of the developing cartridge, with regard to the axis direction (longitudinal direction) of the developing roller 13, as described earlier. The driving-side coontacting/spacing lever 70 and non-driving-side coontacting/spacing lever 72 may be disposed further outwards than the width of the media being used to form images, such as recording paper, label sheets, OHP sheets, and so forth. In this case, the driving-side coontacting/spacing lever 70 and so forth, the media, and conveyance members and the like provided to the apparatus main body to convey the media, may be disposed at an intersecting position, when viewing the apparatus main body along a plate of which the longitudinal direction is a normal line. As a result, the size of the apparatus main body can be reduced.

Figure 24:
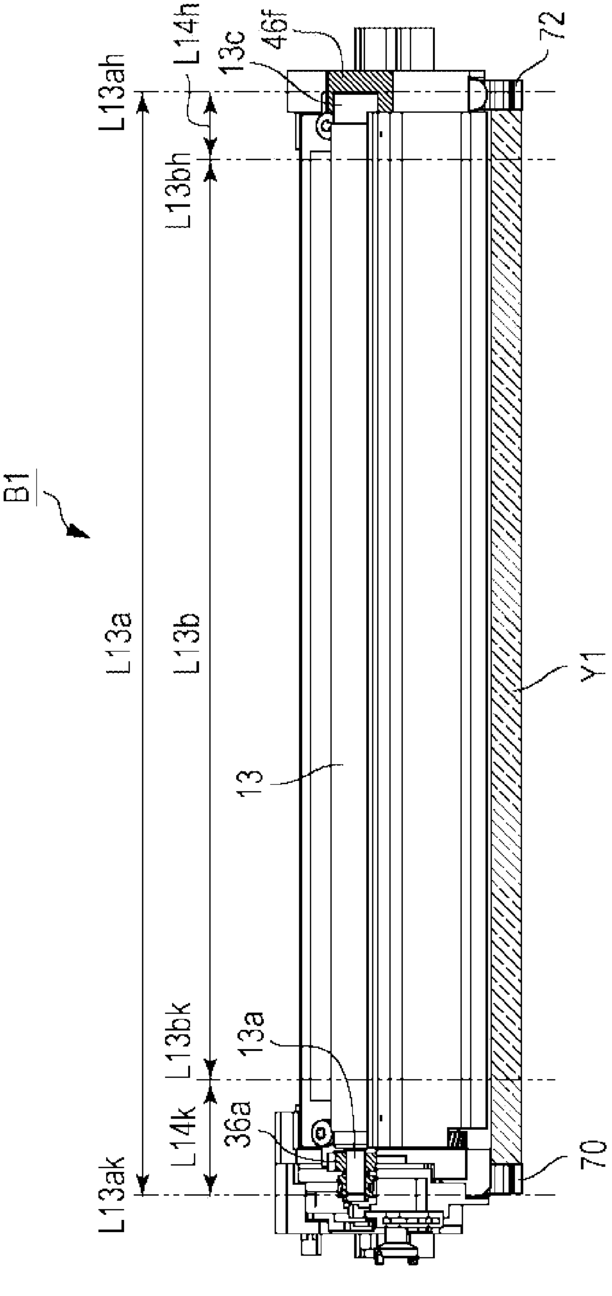
FIG. 24 is a front view of a developing cartridge.

Next, the placement of the driving-side coontacting/spacing lever 70 and non-driving-side coontacting/spacing lever 72 will be described with reference to FIG. 24. FIG. 24 is a frontal view where the developing cartridge B1 has been viewed from the developing roller 13 side. Note however, that a cross-sectional view has been taken around the supporting part 36*a* of the driving-side developing bearing 36 that supports the driving-side supported part 13*a* of the developing roller 13, and the supporting part 46*f* of the non-driving-side developing bearing 46 that supports the non-driving-side supported part 13*c* of the developing roller 13.

The driving-side coontacting/spacing lever 70 is provided on the driving-side end of the developing cartridge B1 in the longitudinal direction, as described above. Also, the non-driving-side coontacting/spacing lever 72 is provided on the non-driving-side end of the developing cartridge B1 in the longitudinal direction. The rotating operations of the driving-side coontacting/spacing lever 70 and the non-driving-side coontacting/spacing lever 72 (directions of arrows N9 and N10 in FIG. 1(*a*), and directions of arrows NH9 and NH10 in FIG. 1(*b*)) can be independently rotated without influencing each other.

Now, the driving-side supported part 13*a* of the developing roller 13 is supported by the supporting part 36*a* of the driving-side developing bearing 36 further outside longitudinally than a driving-side end L13*bk* of an image forming range L13*b*. Further, the non-driving-side supported part 13*c* of the developing roller 13 is supported by the supporting part 46*f* of the non-driving-side developing bearing 46 further outside longitudinally than a non-driving-side end L13*bh* of the image forming range L13*b*. The driving-side coontacting/spacing lever 70 and non-driving-side coontacting/spacing lever 72 are disposed overlapping at least partially with the range of a total length L13*a* of the developing roller 13. Further, driving-side coontacting/spacing lever 70 and non-driving-side coontacting/spacing lever 72 are disposed further outside of the image forming range L13*b* of the developing roller 13.

That is to say, the driving-side coontacting/spacing lever 70 and the driving-side supported part 13*a* of the developing roller 13 are disposed so as to at least partially overlap a region L14*k* sandwiched between the driving-side end L13*bk* of an image forming range L13*b* and a driving-side end L13*ak* of the total length L13*a* of the developing roller 13. Accordingly, the driving-side coontacting/spacing lever 70 and the driving-side supported part 13*a* of the developing roller 13 are at near positions in the longitudinal direction.

Also, the non-driving-side contacting/spacing lever 72 and the non-driving-side supported part 13*c* of the developing roller 13 are disposed so as to at least partially overlap a region L14*h* sandwiched between the non-driving-side end L13*bh* of the image forming range L13*b* and a non-driving-side end L13*ah* of the total length L13*a* of the developing roller 13. The non-driving-side coontacting/spacing lever 72 and the non-driving-side supported part 13*c* of the developing roller 13 are disposed so as to satisfy this relationship. Accordingly, the non-driving-side coontacting/spacing lever 72 and the driving-side supported part 13*c* of the developing roller 13 are at near positions in the longitudinal direction.

(Description of Contact/Separation Mechanism)

(Developing Pressuring of Apparatus Main Body, and Development Spacing Configuration)

Next, developing pressuring of the apparatus main body, and a development spacing configuration will be described.

Figure 25:
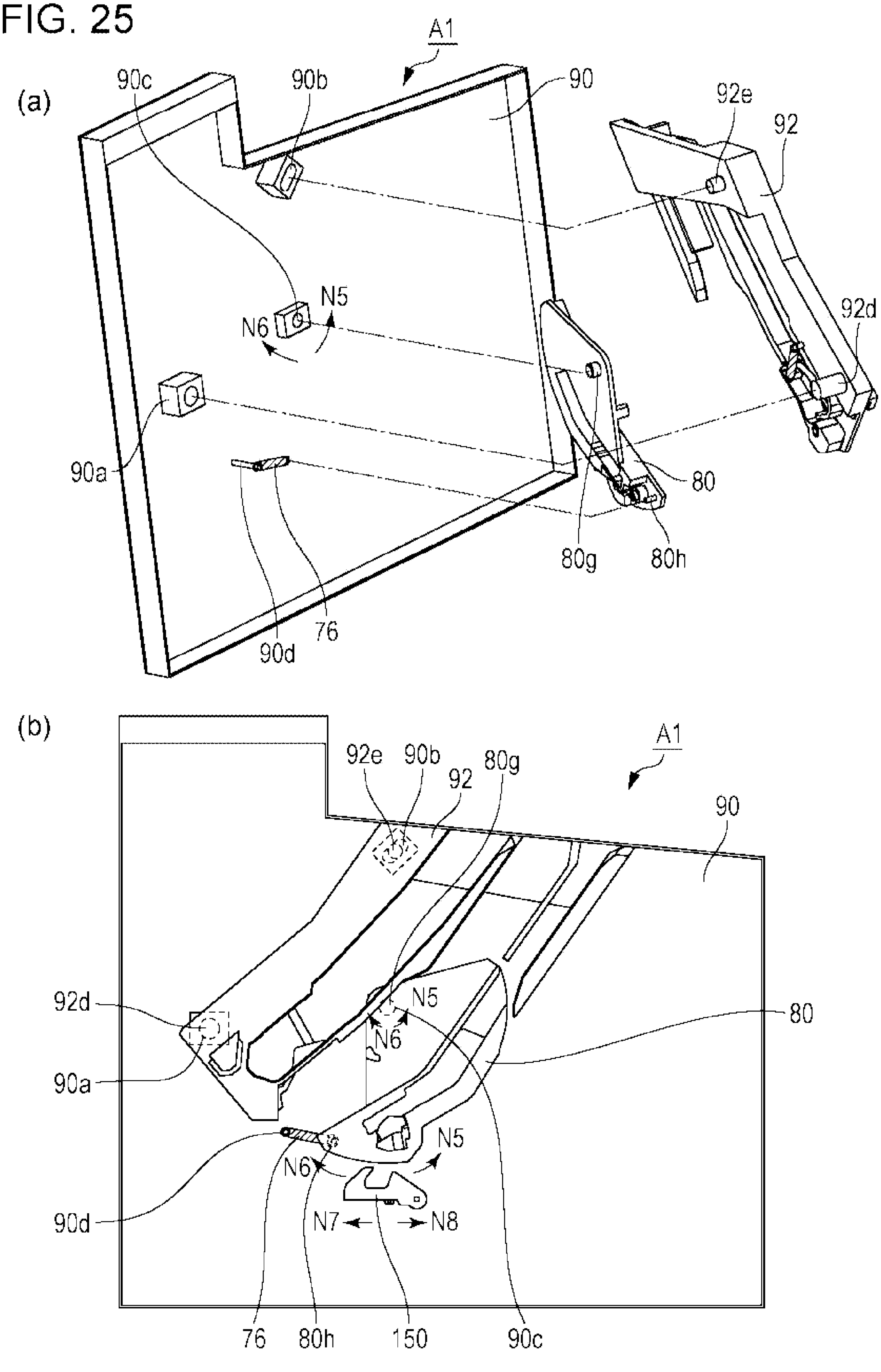
FIG. 25 includes perspective views of a driving-side side plate.
Figure 26:
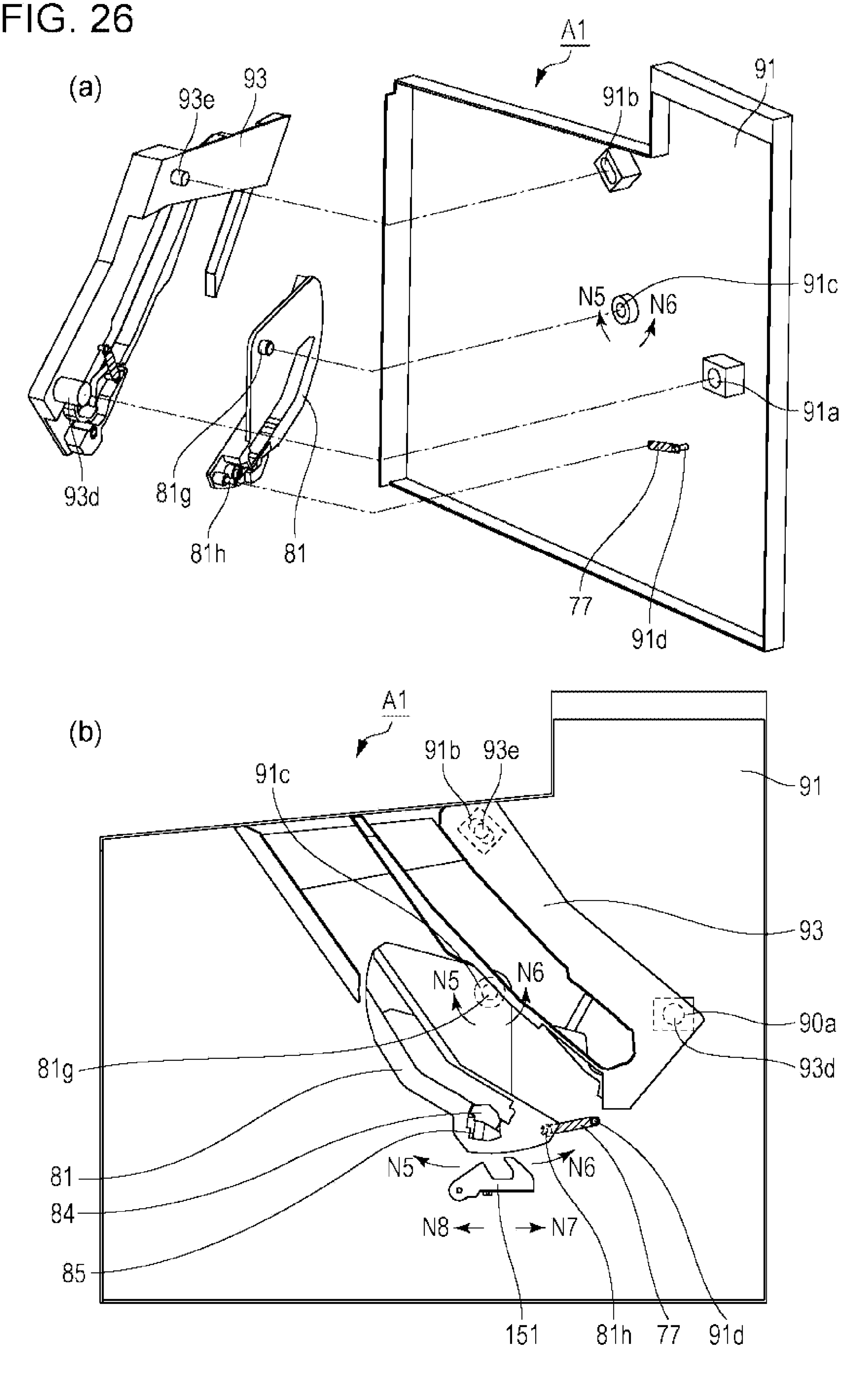
FIG. 26 includes perspective views of a side plate at a non-driving side.

FIG. 25(*a*) is a disassembled perspective view of the driving-side side plate 90 of the apparatus main body A1 as viewed from the non-driving side, and FIG. 25(*b*) is a side view as viewed from the non-driving side. FIG. 26(*a*) is a disassembled perspective view of the non-driving-side side plate 91 of the apparatus main body A1 as viewed from the driving side, and FIG. 26(*b*) is a side view as viewed from the driving side.

The driving-side guide member 92 and the driving-side swing guide 80 for mounting/detaching the developing cartridge B1 to/from the apparatus main body A1, are provided to the apparatus main body A1, as illustrated in FIG. 25. The driving-side guide member 92 and driving-side swing guide 80 guide the driving-side guided part 34*d* of the developing cartridge B1 at the time of mounting the developing cartridge B1 within the apparatus main body (see FIG. 18).

The driving-side guide member 92 has a boss-shaped positioned part 92*d* protruding from the driving-side guide member 92, and a rotation restricted part 92*e*, supported by a hole-shaped positioning part 90*a* provided to the driving-side side plate 90, and a rotation restricting part 90*b*, as illustrated in FIG. 25(*a*). The driving-side guide member 92 is then positioned and fixed to the driving-side side plate 90 by fixing devices such as screws (omitted from illustration). The driving-side swing guide 80 is supported by a cylindrical supported protrusion 80*g* fitting to a hole-shaped supporting part 90*c* provided to the driving-side side plate 90. Accordingly, the driving-side swing guide 80 is supported by the driving-side side plate 90 so as to be capable of rotating in the direction of arrow N5 and the direction of arrow N6.

Note that while description has been made above where the supporting part 90*c* provided to the driving-side side plate 90 is hole-shaped (recess-shaped), and the supported protrusion 80*g* provided to the driving-side swing guide 80 is protrusion-shaped, the recessed/protruding relationship thereof is not restricted to this, and the recessed/protruding relationship may be reversed.

Further, a driving-side biasing unit 76 that is a tension spring are provided between a protrusion 80*h* of the driving-side swing guide 80 and a protrusion 90*d* of the driving-side side plate 90. The driving-side swing guide 80 is biased by the driving-side biasing unit 76 in the direction of arrow N6, which draws the protrusion 80*h* of the driving-side swing guide 80 and the protrusion 90*d* of the driving-side side plate 90 closer together. The apparatus main body A1 is provided with the driving-side apparatus pressing member 150 that brings the surface of the photosensitive drum 10 and developing roller 13 into contact, and spaces the two. The driving-side apparatus pressing member 150 is supported by a base plate (omitted from illustration) in a state of being movable in the direction of arrow N7 and the direction of arrow N8.

On the other hand, the non-driving-side guide member 93 and the non-driving-side swing guide 81 for mounting/detaching the developing cartridge B1 to/from the apparatus main body A1 are provided to the apparatus main body A1, as illustrated in FIGS. 26(*a*) and 26(*b*). The non-driving-side guide member 93 and non-driving-side swing guide 81 guide the non-driving-side guided part 46*d* of the developing cartridge B1 at the time of mounting the developing cartridge B1 within the apparatus main body (see FIG. 18).

The non-driving-side guide member 93 has a boss-shaped positioned part 93*d* protruding from the non-driving-side guide member 93, and a rotation restricted part 93*e*, as illustrated in FIG. 26(*a*). The positioned part 93*d* and rotation restricted part 93*e* are supported by a hole-shaped positioning part 91*a* provided to the non-driving-side side plate 91, and a rotation restricting part 91*b*. The non-driving-side guide member 93 is then positioned and fixed to the non-driving-side side plate 91 by fixing devices such as screws (omitted from illustration). The non-driving-side swing guide 81 is supported by a cylindrical supported protrusion 81*g* fitting to a hole-shaped supporting part 91*c* provided to the non-driving-side side plate 91. Accordingly, the non-driving-side swing guide 81 is supported by the non-driving-side side plate 91 so as to be capable of rotating in the direction of arrow N5 and the direction of arrow N6.

Note that while description has been made above where the supporting part 91*c* provided to the non-driving-side side plate 91 is hole-shaped (recess-shaped), and the supported protrusion 81*g* provided to the non-driving-side swing guide 81 is protrusion-shaped, the recessed/protruding relationship thereof is not restricted to this, and the recessed/protruding relationship may be reversed.

Further, a non-driving-side biasing unit 77 that is a tension spring is provided between a protrusion 81*h* of the non-driving-side swing guide 81 and a protrusion 91*d* of the non-driving-side side plate 91. The non-driving-side swing guide 81 is biased by the non-driving-side biasing unit 77 in the direction of arrow N6, which draws the protrusion 81*h* of the non-driving-side swing guide 81 and the protrusion 91*d* of the non-driving-side plate 91 closer together.

The apparatus main body A1 is provided with the non-driving-side apparatus pressing member 151 that brings the surface of the photosensitive drum 10 and developing roller 13 into contact, and spaces the two, in the same way as at the driving side. The non-driving-side apparatus pressing member 151 is supported by a base plate (omitted from illustration) in a state of being movable in the direction of arrow N7 and the direction of arrow N8.

(Developing Pressuring and Development Spacing Relative to Photosensitive Drum)

Next, pressuring and spacing of the developing roller 13 as to the photosensitive drum 10 will be described.

<Pressuring Mechanism>

The configuration of the developing roller 13 will be described below.

FIG. 27(*a*) is a side view illustrating a state where the developing roller 13 that the developing cartridge B1, supported by the driving-side swing guide 80, has, in a state in contact with the photosensitive drum 10. FIG. 27(*c*) is a detailed diagram of the periphery of the driving-side coontacting/spacing lever 70 in FIG. 27(*a*), with the driving-side swing guide 80 and developing side cover 34 being omitted from illustration for the sake of description.

The so-called contact developing system, where the developing roller 13 bearing developer t is brought into direct contact with the photosensitive drum 10 to develop an electrostatic latent image in the photosensitive drum 10, is used in the present embodiment.

The developing roller 13 is configured of the shaft part 13*e* and rubber part 13*d*. The shaft part 13*e* is an electroconductive slender cylindrical object of aluminum or the like, and the middle portion thereof is covered by the rubber part 13*d* in the longitudinal direction thereof (see FIGS. 6(*a*) and 6(*b*)). Now, the rubber part 13*d* covers the shaft part 13*e* so that the external shape thereof is concentric with the shaft part 13*e*. A magnet roller 12 is built in within the cylinder of the shaft part 13*e*. The rubber part 13*d* bears the developer t on the circumferential face thereof, and a bias is applied to the shaft part 13*e*. An electrostatic latent image on the photosensitive drum 10 is then developed by bringing the rubber part 13*d* in the state of bearing the developer t into contact with the surface of the photosensitive drum 10.

Next, the configuration of bringing the developing roller 13 into contact with the photosensitive drum 10 at a predetermined contact pressure will be described.

As described earlier, the driving-side swing guide 80 is supported by the driving-side side plate 90 so as to be capable of rocking in the directions of arrow N5 and arrow N6. Also, the non-driving-side swing guide 81 is supported by the non-driving-side side plate 91 so as to be capable of rocking in the directions of arrow N5 and arrow N6. The developing cartridge B1 is positioned to the driving-side swing guide 80 and the non-driving-side swing guide 81, as described earlier. Accordingly, the developing cartridge B1 is in a state of being capable of rocking in the directions of arrow N5 and arrow N6 within the apparatus main body A1 (see FIGS. 29(*a*) and 29(*b*)).

In this state, the second contact face **150*b* of the driving-side apparatus pressing member 150 and the first contact face 70*a* of the driving-side coontacting/spacing lever 70 come into contact, as illustrated in FIG. 27**(*a*) and FIG. 27(*c*). Accordingly, the driving-side coontacting/spacing lever 70 is in a state of having rotated in the direction of arrow N9 in FIG. 27(*c*) against the biasing force of the driving-side developing pressure spring 71. The third contact face **70*c* of the driving-side coontacting/spacing lever 70 then compresses the driving-side developing pressure spring 71, and receives biasing force F10*a* from the driving-side developing pressure spring 71. As a result, moment M10 in the direction of arrow N10 acts on the driving-side coontacting/spacing lever 70. At this time, the second contact face 150*b* of the driving-side apparatus pressing member 150 and the first contact face 70*a* of the driving-side coontacting/spacing lever 70 are in contact. Accordingly, the first contact face 70*a* of the driving-side coontacting/spacing lever 70 receives force F11 from the second contact face 150*b* of the driving-side apparatus pressing member 150 so that moment, which is balanced with the moment M10, acts on the driving-side coontacting/spacing lever 70. Thus, the external force of force F11 is acting on the developing cartridge B1. Also, the driving-side biasing unit 76 is provided between the protrusion 80*h* of the driving-side swing guide 80 and the protrusion 90*d* of the driving-side side plate 90, as described earlier, biasing in the direction of arrow N12. Accordingly, the external force of force F12 in the direction of arrow N12 is acting on the developing cartridge B1 positioned by the driving-side swing guide 80**.

That is to say, the developing cartridge B1 receives moment M6 in the direction of the developing roller 13 and photosensitive drum 10 coming closer (direction of arrow N6), by the force F11 from the driving-side developing pressure spring 71 and the force F12 from the driving-side biasing unit 76. The elastic layer **13*d* of the developing roller 13 can be pressured against the photosensitive drum 10 at a predetermined pressure by this moment M6**.

Figure 29:
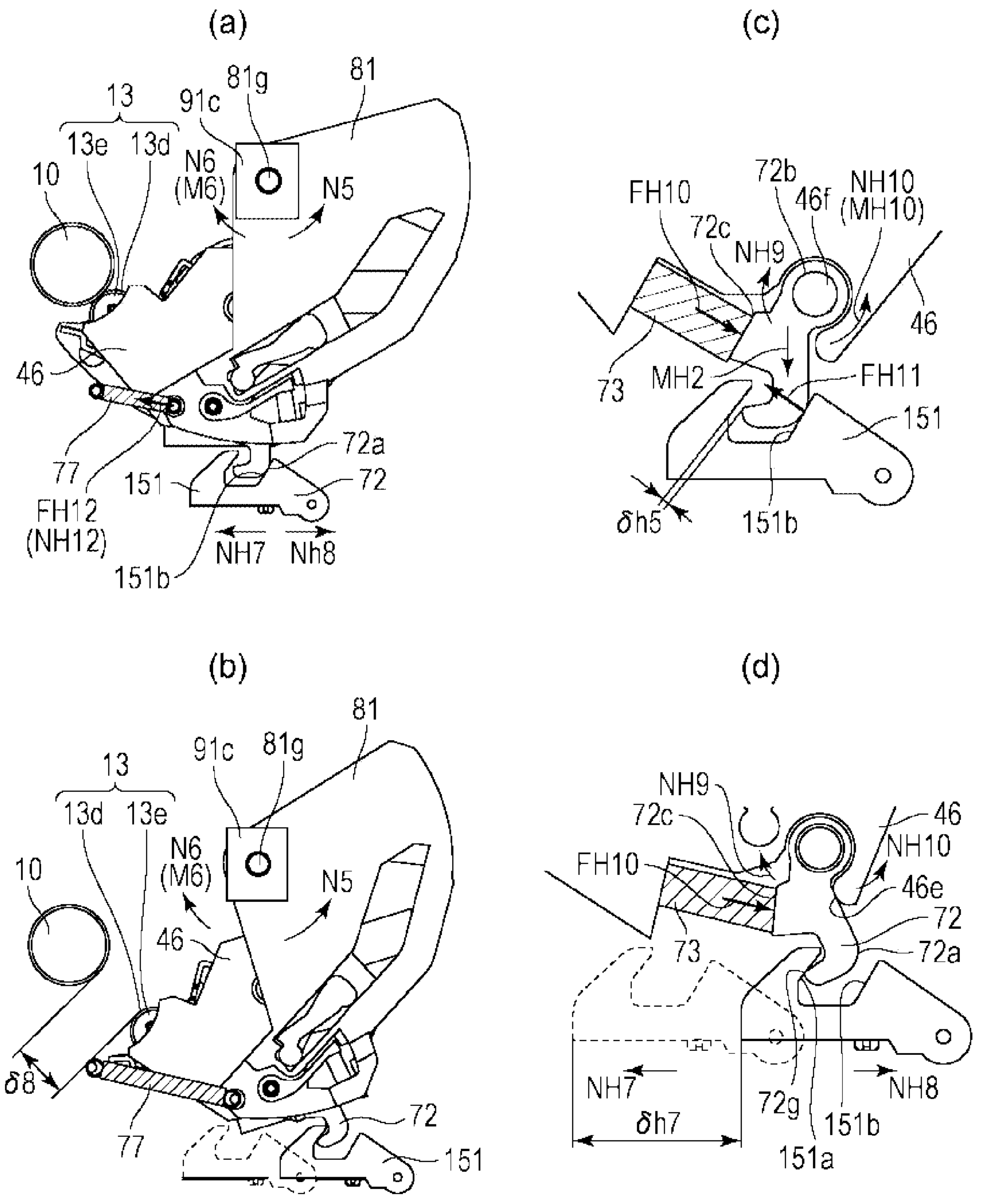
FIG. 29 includes side views at a non-driving side of a developing cartridge and non-driving-side swing guide.

Next, FIG. 29(*a*) is a side view illustrating a state where the developing roller 13, which the developing cartridge B1 supported by the non-driving-side swing guide 81 has, is in contact with the photosensitive drum 10. FIG. 29(*c*) is a detailed diagram of the periphery of the non-driving-side coontacting/spacing lever 72 in FIG. 29(*a*), with the non-driving-side swing guide 81 and non-driving-side developing bearing 46 being partially omitted from illustration for the sake of description.

The non-driving side has the same configuration as the driving side, and external forces FH11 and FH12 act on the developing cartridge B1 by the non-driving-side developing pressure spring 73 and non-driving-side biasing unit 77, as illustrated in FIG. 29(*a*) and FIG. 29(*c*). Accordingly, the developing cartridge B1 receives moment (M6) in the direction of the developing roller 13 and photosensitive drum 10 coming closer (direction of arrow N6), and the elastic layer **13*d* of the developing roller 13 can be pressured against the photosensitive drum 10** at a predetermined pressure.

Now, the distance from the center of the supported part **70*d* to the center of the third contact face 70*c* as viewed from the direction of the rotational axis of the developing roller 13 is denoted by D10, as illustrated in FIG. 27**(*b*). In the same way, the distance from the center of the supported part **70*d* to the part of the first contact face 70*a* that is pressed by the driving-side apparatus pressing member 150 is D11. The relationship between distance D10 and distance D11** is $$D10<D11.$$

Accordingly, the third contact face **70*c* of the driving-side coontacting/spacing lever 70 that comes into contact with one end 71*d* of the driving-side developing pressure spring 71 is disposed between the supported part 70*d* and the first contact face 70*a* of the driving-side coontacting/spacing lever 70 in the direction of protruding direction M2. That is to say, the relationship between distance W10 from the supported part 70*d* to the third contact face 70*c* and distance W11 from the supported part 70*d* to the first contact face 70*a*** is $$W10<W11.$$

Thus, the relationship between W12, which is the amount of movement of the first contact face **70*a*, and the amount of movement W13 of the third contact face 70*c***, is $$W13<W12$$

where $$W13 = W12\times(W10/W11).$$

Accordingly, even in a case where there is error in the positional precision of the driving-side apparatus pressing member 150, the change in the amount of compression of the driving-side developing pressure spring 71 is smaller than the error of the positional precision of the driving-side apparatus pressing member 150. Consequently, the precision of the pressing force to pressure the developing roller 13 against the photosensitive drum 10 can be improved. The non-driving side has the same configuration, and accordingly the same advantages can be had.

Also, the driving-side coontacting/spacing lever 70 and non-driving-side coontacting/spacing lever 72 are disposed overlapping at least partially with the range of the total length L**13*a* of the developing roller 13 in the longitudinal direction, as described earlier (see FIG. 24). Accordingly, positional difference in the longitudinal direction of the first contact faces 70*a* and 72*a* of the driving-side coontacting/spacing lever 70 and non-driving-side coontacting/spacing lever 72, and the driving-side supported part 13*a* and non-driving-side supported part 13*c* of the developing roller 13, can be reduced. The driving-side coontacting/spacing lever 70 receives force F11 (see FIG. 27**(*a*)), and the non-driving-side coontacting/spacing lever 72 receives external force FH11 (see FIG. 29(*c*)). As a result of having reduced the above-described positional difference, the moment acting on the driving-side developing bearing 36 and non-driving-side developing bearing 46 can be suppressed. Thus, the developing roller 13 can be efficiently pressed into contact with the photosensitive drum.

Also, as described above, the rotating operations of the driving-side coontacting/spacing lever 70 and the non-driving-side coontacting/spacing lever 72 (directions of arrows N9 and N10 in FIG. 27(*a*), and directions of arrows NH9 and NH10 in FIGS. 29(*c*) and 29(*d*)) can be independently rotated without influencing each other. Thus, when the developing roller 13 is in a state of being pressured against the photosensitive drum 10, the position of the driving-side apparatus pressing member 150 in the direction of arrows N7 and N8 (see FIGS. 25(*a*) and 25(*b*)) and position of the non-driving-side apparatus pressing member 151 in the direction of arrows N7 and N8 (see FIG. 26(*b*)) can be independently set. Further, there is no need to match the direction of rotating of the driving-side contacting/spacing lever 70 and non-driving-side coontacting/spacing lever 72 (directions of arrows N9 and N10 in FIG. 27(*a*), and directions of arrows NH9 and NH10 in FIGS. 29(*c*) and 29(*d*)). As a result, the magnitudes and directions of the pressing forces F11 and FH11 to pressure the developing roller 13 against the photosensitive drum 10 at the driving side and non-driving side can each be optimized. Further, even in a case where there is relative error in the positions of the driving-side apparatus pressing member 150 and non-driving-side apparatus pressing member 151, this does not influence the pressing forces F11 and FH11 of each other. Consequently, the contact pressure of the developing roller 13 as to the photosensitive drum 10 can be made to be highly precise.

Note that the position of the developing cartridge B1 at which the photosensitive drum 10 and developing roller 13 can come into contact to develop an electrostatic latent image on the photosensitive drum 10 will be referred to as a contact position. On the other hand, the position of the developing cartridge B1 at which the photosensitive drum 10 and developing roller 13 are spaced will be referred to as a spaced position. The developing cartridge B1 has a configuration whereby the developing cartridge B1 can select between the contact position and spaced position, by a later-decided mechanism.

<Configuration of Electric Connection Between Developing Cartridge and Apparatus Main Body by Pressuring Mechanism>

Figure 38:
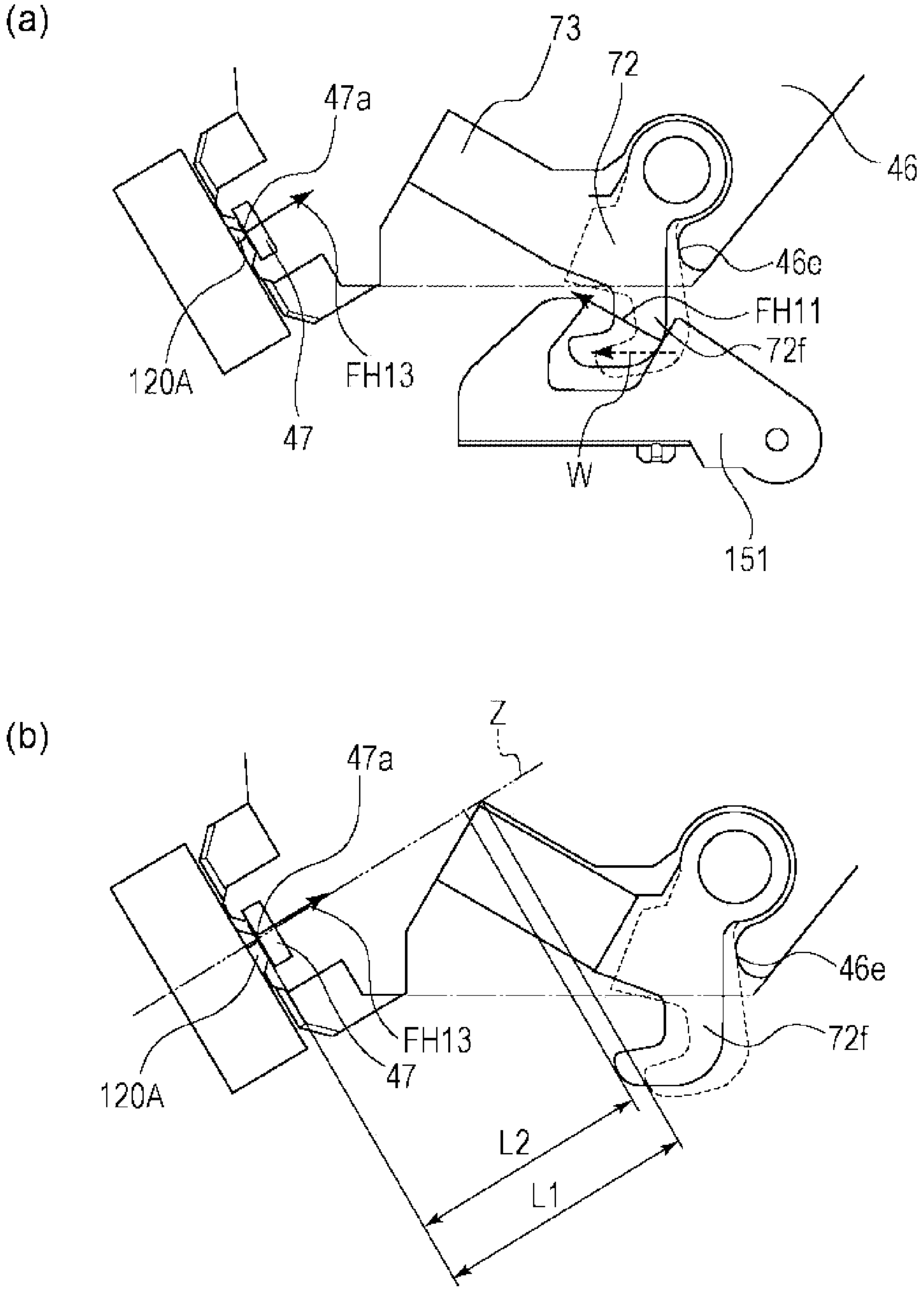
FIG. 38 includes side views illustrating a non-driving-side coontacting/spacing lever, and a memory board.
Figure 39:
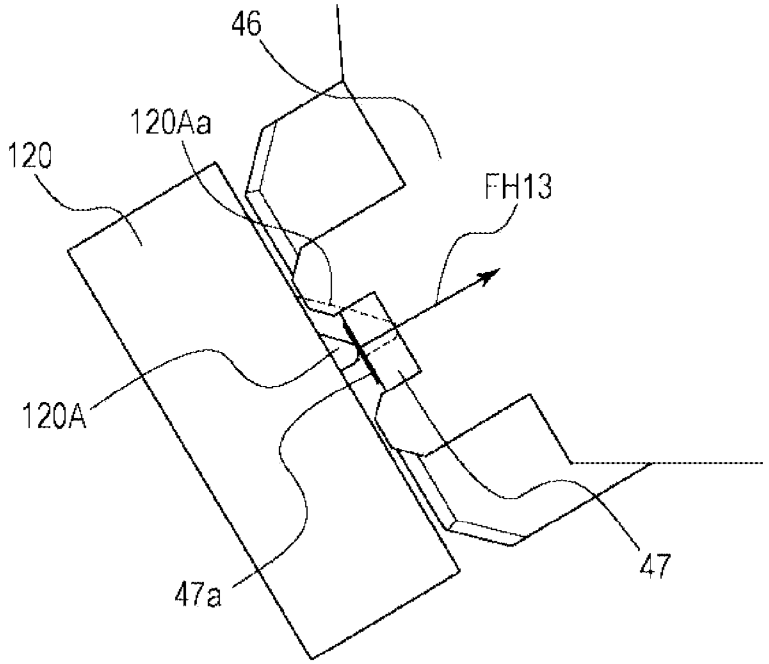
FIG. 39 is a side view illustrating a memory board.
Figure 40:
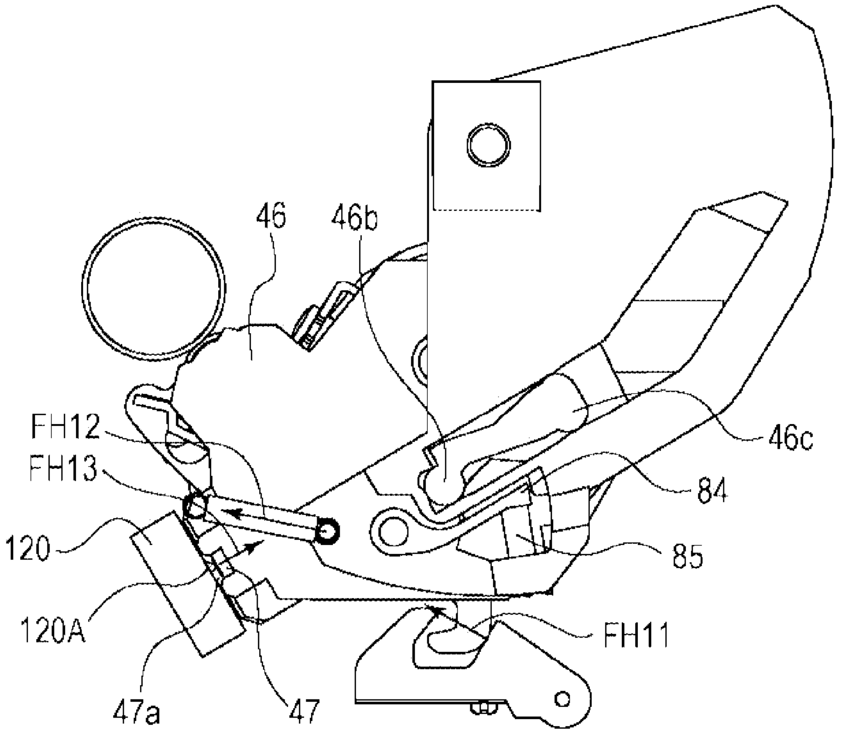
FIG. 40 is a side view illustrating a non-driving-side coontacting/spacing lever, and a memory board.

Next, the configuration of electrical connection between the developing cartridge B1 and apparatus main body A1 will be described with reference to FIGS. 38(*a*) and 38(*b*). When the developing cartridge B1 is in the aforementioned contact position, the electrode portions 47*a* of the memory board 47 of the developing cartridge B1 are in contact with the electric supply contact 120A of the apparatus main body A1. The electric supply contact 120A has spring properties, and accordingly is pressed inwards by the electrode portions 47*a*, by a predetermined amount from a shape 120Aa before mounting the developing cartridge B1, as illustrated in FIG. 39. Accordingly, the electric supply contact 120A imparts the developing cartridge B1 with contact pressure FH13 in the direction of the developing roller 13 and photosensitive drum 10 moving away from each other. On the other hand, the force FH11 that brings the developing roller 13 and the photosensitive drum 10 closer together is acting on the developing cartridge B1, as illustrated in FIG. 38(*a*). At this time, the non-driving-side coontacting/spacing lever 72 is pressed from a first position in contact with the contact face 46*e* of the non-driving-side developing bearing 46, to a second position where the protrusion 72*f* has been brought closer to the developing roller 13 by the non-driving-side apparatus pressing member 151, as illustrated in FIG. 38(*a*). The electrode portions 47*a* are at the downstream side of the movement direction W from the first position to the second position, with the movement direction W and the surface (exposed face) of the electrode portions 47*a* intersecting.

Accordingly, the force FH11 that moves the non-driving-side coontacting/spacing lever 72 in the direction W, and the contact pressure FH13, have opposite force components. Now, a certain level of contact pressure FH13 or higher is necessary to stabilize the electric contact between the electrode portions 47*a* and the electric supply contact 120A. The present configuration has the magnitude of the force FH11 of the non-driving-side developing pressure spring 73 set, taking the contact pressure F13 into consideration, in addition to for pressuring the elastic layer of the developing roller 13 against the photosensitive drum 10 in a stable manner. That is to say, both ensuring contact pressure FH13 where the electric contact is stable, and pressuring the developing roller 13 against the photosensitive drum 10, can be realized by the force FH11. Accordingly, the electrode portions 47*a* and electric supply contact 120A are electrically connected, so communication between the electric board (omitted from illustration) of the apparatus main body and the electrode portion 47*a* is enabled.

Now, a case may be conceived where the external force FH12 of the non-driving-side biasing unit 77 is raised to secure contact pressure FH13. However, in this case, there is the need to increase the biasing force of the non-driving-side pressing spring 85 so that the developing cartridge B1 does not come loose from the non-driving-side swing guide 81 (See FIGS. 26(*a*) and 26(*b*)). On the other hand, the non-driving-side pressing spring 85 is pressed down by operating force of the user when the developing cartridge B1 is mounted to the non-driving-side swing guide 81, as described earlier. Accordingly, there user will need to mount the developing cartridge B1 using a greater force. As described above, attempting to ensure the contact pressure FH13 by the force FH12 of the non-driving-side biasing unit 77 may load to poorer operability for the user. Accordingly, securing the contact pressure FH13 by the force FH11 of the non-driving-side developing pressure spring 73, as in the present embodiment, enables the developing cartridge B1 to be positioned without making the operability poor for the user.

Also, the relationship between the electrode portion 47*a* and the non-driving-side contacting/spacing lever 72 in the present embodiment can be rephrased as follows. For example, the distance between the electrode portion 47*a* and the non-driving-side coontacting/spacing lever 72 will be referred to as L1 in the first position, and L2 in the second position, in the normal line direction Z of the electrode portion 47*a* at the contact part of the electric supply contact 120A, as illustrated in FIG. 38(*b*). The electrode portion 47*a* at this time is situated so that L2<L1 holds. Accordingly, the force to move the non-driving-side coontacting/spacing lever 72 from the first position to the second position can be used to secure the contact pressure FH13.

Further, the non-driving-side coontacting/spacing lever 72, non-driving-side developing pressure spring 73, and memory board 47 are each attached to the non-driving-side developing bearing 46 in the present embodiment, as illustrated in FIG. 38(*a*). That is to say, the positions of the electrode portion 47*a* that is the operating part for the contact pressure F13 and the non-driving-side coontacting/spacing lever 72 that is the operating part for the force FH11 are disposed on the same plane orthogonal to the axis L0 of the developing roller 13. In other words, the electrode portion 47*a* and non-driving-side coontacting/spacing lever 72 are at least partially overlapping with regard to the direction of axis L0 of the developing roller 13. Accordingly, the attitude of the developing cartridge B1 can be stabilized even further, since occurrence of moment between the contact pressure F13 and force FH11, having a rotational axis T in a direction orthogonal to the axis of the developing roller, can be reduced.

Also, the memory board 47 is attached not to the driving side but to the bearing 46 at the non-driving-side. If the memory board 47 were to be provided to the driving side, the memory board 47 might be affected by the driving force acting on the coupling member 180. However, the memory board 47 is provided to the non-driving-side developing bearing 46 in the present embodiment, and thus is less readily affected by the driving force, thereby stabilizing the contact pressure FH13.

<Spacing Mechanism>

Figure 28:
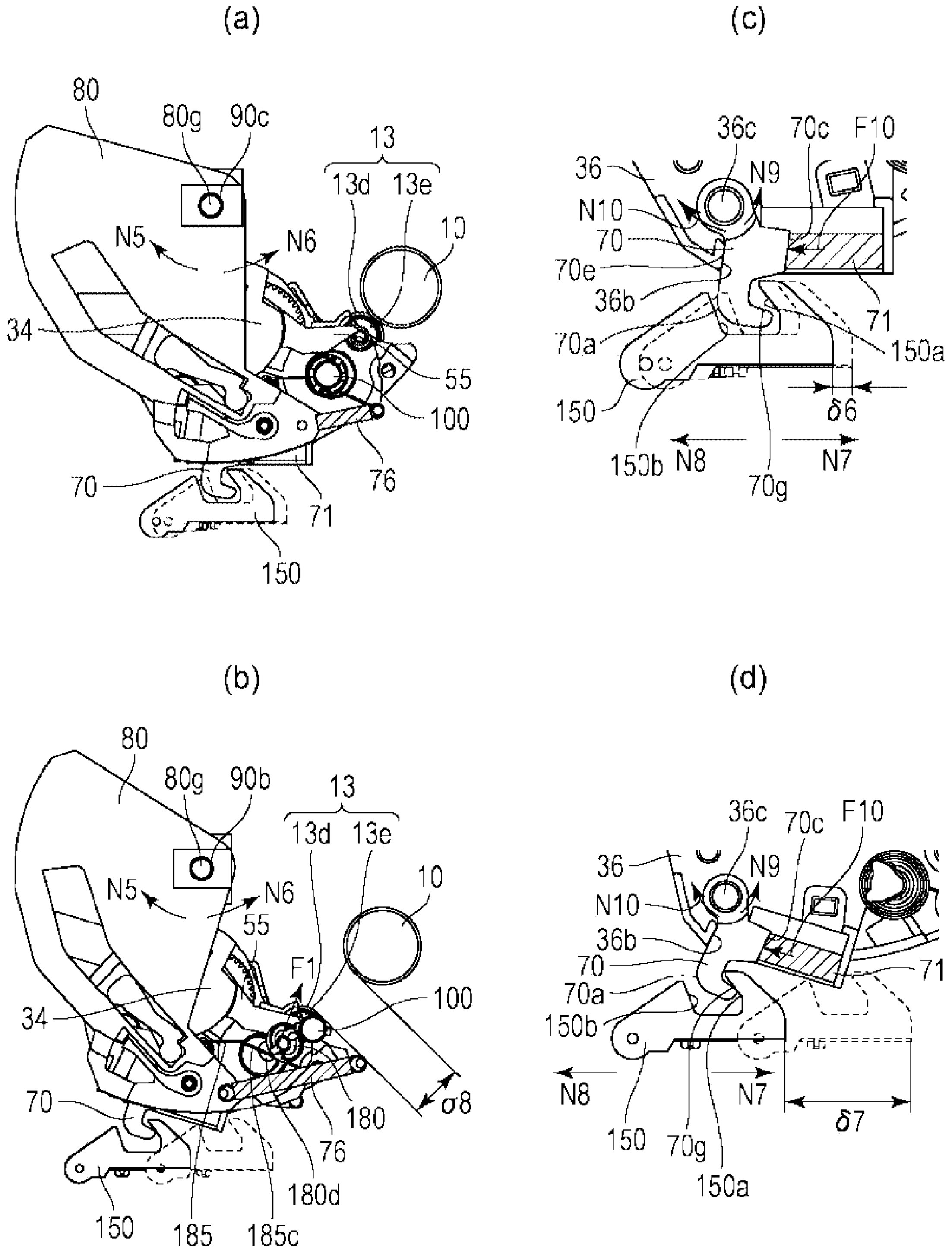
FIG. 28 includes side views at a driving side of a developing cartridge and driving-side swing guide.

FIG. 28(*a*) is an explanatory diagram for describing the state of the developing cartridge B1 when transitioning from the contact state between the developing roller 13 and photosensitive drum 10 to the spaced state. FIG. 28(*c*) is a detailed diagram of the periphery of the driving-side coontacting/spacing lever 70 in FIG. 28(*a*), with the driving-side swing guide 80 and developing side cover 34 being omitted from illustration for the sake of description.

FIG. 28(*b*) is an explanatory diagram explaining the spaced state of the developing cartridge B1 where the developing roller 13 and the photosensitive drum 10 are spaced. FIG. 28(*d*) is a detailed diagram of the periphery of the driving-side coontacting/spacing lever 70 in FIG. 28(*b*), with the driving-side swing guide 80 and developing side cover 34 being omitted from illustration for the sake of description.

Now, in the case of the contact developing system as in the present embodiment, there is concern that the rubber part 13*b* of the developing roller 13 might become deformed if the state where the developing roller 13 is in contact with the photosensitive drum 10, as in FIG. 27(*a*), is constantly maintained. Accordingly, the developing roller 13 is preferably spaced from the photosensitive drum 10 when not developing. That is to say, a state where the developing roller 13 is in contact with the photosensitive drum 10 as illustrated in FIG. 27(*a*), and a state where the developing roller 13 is spaced from the photosensitive drum 10 as illustrated in FIG. 28(*b*), is preferable.

The spaced part 70*g*, protruding in the direction of the developing roller 13, is provided to the driving-side coontacting/spacing lever 70. The spaced part 70*g* has a configuration capable of engaging the first contact face 150*a* provided to the driving-side apparatus pressing member 150 provided to the apparatus main body A1. Further, the driving-side apparatus pressing member 150 has a configuration that can move in the directions of arrow N7 and arrow N8 under driving force from a motor omitted from illustration.

Next, operations of the developing roller 13 and photosensitive drum 10 transitioning to the spaced state will be described. In the contact state between the developing roller 13 and photosensitive drum 10 illustrated in FIG. 27(*a*), the first contact face 150*a* and the spaced part 70*g* are spaced in a state where there is a gap of distance 85 therebetween.

On the other hand, FIG. 28(*a*) illustrates a state where the driving-side apparatus pressing member 150 has moved in the direction of arrow N8 by a distance 86, which is a state where contact between the first contact face 70*a* of the driving-side coontacting/spacing lever 70 and the second contact face 150*b* of the driving-side apparatus pressing member 150 is separated. At this time, the first contact face 70*a* of the driving-side coontacting/spacing lever 70 rotates in the direction of arrow N10 centered on the supported part 70*d*, under biasing force F10 of the driving-side developing pressure spring 71, and the driving-side restricting contact part 70*e* of the driving-side coontacting/spacing lever 70 comes into contact with the restricting part 36*b* of the driving-side bearing member 36. Accordingly, the driving-side coontacting/spacing lever 70 and driving-side bearing member 36 are positioned. FIG. 28(*b*) illustrates a state where the driving-side apparatus pressing member 150 has moved in the direction of arrow N8 by a distance 87. The driving-side apparatus pressing member 150 having moved in the direction of arrow N8 brings the separated face 70*g* of the driving-side coontacting/spacing lever 70 and the first contact face 150*a* of the driving-side apparatus pressing member 150 into contact. At this time, the driving-side restricting contact part 70*e* of the driving-side coontacting/spacing lever 70 and the restricting part 36*b* of the driving-side bearing member 36 are in contact, wo the developing cartridge B1 is moved in the direction of the arrow N8. Now, the developing cartridge B1 is positioned to the driving-side swing guide 80 that is supported by the driving-side side plate 90 so as to be capable of sliding in the direction of arrow N3 and direction of arrow N4 and capable of rocking in the directions of arrow N5 and arrow N6, which will be described later with reference to FIGS. 41(*a*) through 41(*d*). Accordingly, moving the driving-side apparatus pressing member 150 in the direction of the arrow N8 rocks the developing cartridge B1 in the direction of arrow N5. At this time, the developing roller 13 and photosensitive drum 10 are spaced with a gap of distance δ8 therebetween.

The non-driving side also has the same configuration as the driving side, with the non-driving-side apparatus pressing member 151 moving in the direction of arrow NH8 by a distance δh7 in a state where the non-driving-side coontacting/spacing lever 72 and are in contact, as illustrated in FIG. 29(*b*) and FIG. 29(*d*). Accordingly, the developing cartridge B1 is of a configuration to rotate in the direction of arrow N5 centered on the supported protrusion 81*g* of the swing guide 81, with the developing roller 13 and the photosensitive drum 10 being spaced from each other by a distance δ8.

Thus, the contact state and spaced state of the photosensitive drum 10 and developing roller 13 are selected as necessary, by the position of the driving-side apparatus pressing member 150 and non-driving-side apparatus pressing member 151 provided to the apparatus main body A1.

The driving-side coontacting/spacing lever 70 protrudes from the developing container 16 so as to form the outer shape of the developing cartridge B1 when viewed at a cross-section at the position of the driving-side coontacting/spacing lever 70, and as viewed from the rotational axis L0 of the developing roller 13, which is illustrated in FIG. 27(*a*). Accordingly, engaging of the driving-side coontacting/spacing lever 70 and the driving-side apparatus pressing member 150 is facilitated. The configuration also is such that a part of the driving-side coontacting/spacing lever 70 can be used to move the developing cartridge B1 between the contact position and spaced position. The same holds true of the non-driving side as well.

When transitioning from the contact state of the developing roller 13 and photosensitive drum 10 illustrated in FIG. 27(*a*) to the spaced state of the developing roller 13 and photosensitive drum 10 illustrated in FIG. 28(*b*), the driving-side swing guide 80 and the developing cartridge B1 rotate integrally. Accordingly, the state of the guide part 55*e* of the coupling lever 55 being retracted from the guided part 180*d* of the coupling member 180 is maintained (FIG. 28(*b*)).

Further, when the developing roller 13 and the photosensitive drum 10 are in the spaced state illustrated in FIG. 28(*b*), the guided part 180*d* of the coupling member 180 and the guide part 185*d* of the coupling spring 185 come into contact. Accordingly, the coupling member 180 receives the force F1, and assumes the above-described first inclined attitude D1.

As described above, the driving-side coontacting/spacing lever 70 and non-driving-side coontacting/spacing lever 72 each have a pressured face (first contact faces 70*a* and 72*a*) and a separated face (second contact faces 70*g* and 72*g*). Pressuring faces (second contact faces 150*b* and 151*b*) and separating faces (150*a* and 151*a*) of the driving-side apparatus pressing member 150 and non-driving-side apparatus pressing member 151 act upon these, respectively. Accordingly, the contact state and spaced state of the photosensitive drum 10 and developing roller 13 can be selected as necessary (see FIGS. 27(*a*), 28(*a*), and 28(*b*)), by the solitary parts of the driving-side coontacting/spacing lever 70 and the non-driving-side contacting/spacing lever 72. As a result, the configuration of the developing cartridge B1 can be simplified. Also, the contact state and spaced state can be controlled by the solitary parts, so the timing of transitioning from the contact state to the spaced state, for example, can be made highly precise.

The driving-side coontacting/spacing lever 70 and the non-driving-side coontacting/spacing lever 72 are provided independently at the ends of the developing cartridge B1 in the longitudinal direction, as illustrated in FIG. 24. Accordingly, there is no need to provide a coontacting/spacing lever over the entire longitudinal direction, so the size of the developing cartridge B1 can be reduced (region Y1 in FIG. 24). Accordingly, the region Y1 can be used for space for component parts of the apparatus main body A1, so the size of the apparatus main body A1 can also be reduced.

<Movement of Coupling Member in Conjunction with Operation from Separated State to Contact State>

Next, the movement of the coupling member 180 in conjunction with the contact operation and spacing operation of the photosensitive drum 10 and developing roller 13 will be described with reference to FIGS. 30 and 31.

First, the disengagement operation of the coupling member 180 and the main body side drive member 100 when the developing cartridge B1 moves from the spaced state to the contact state will be described.

Figure 30:
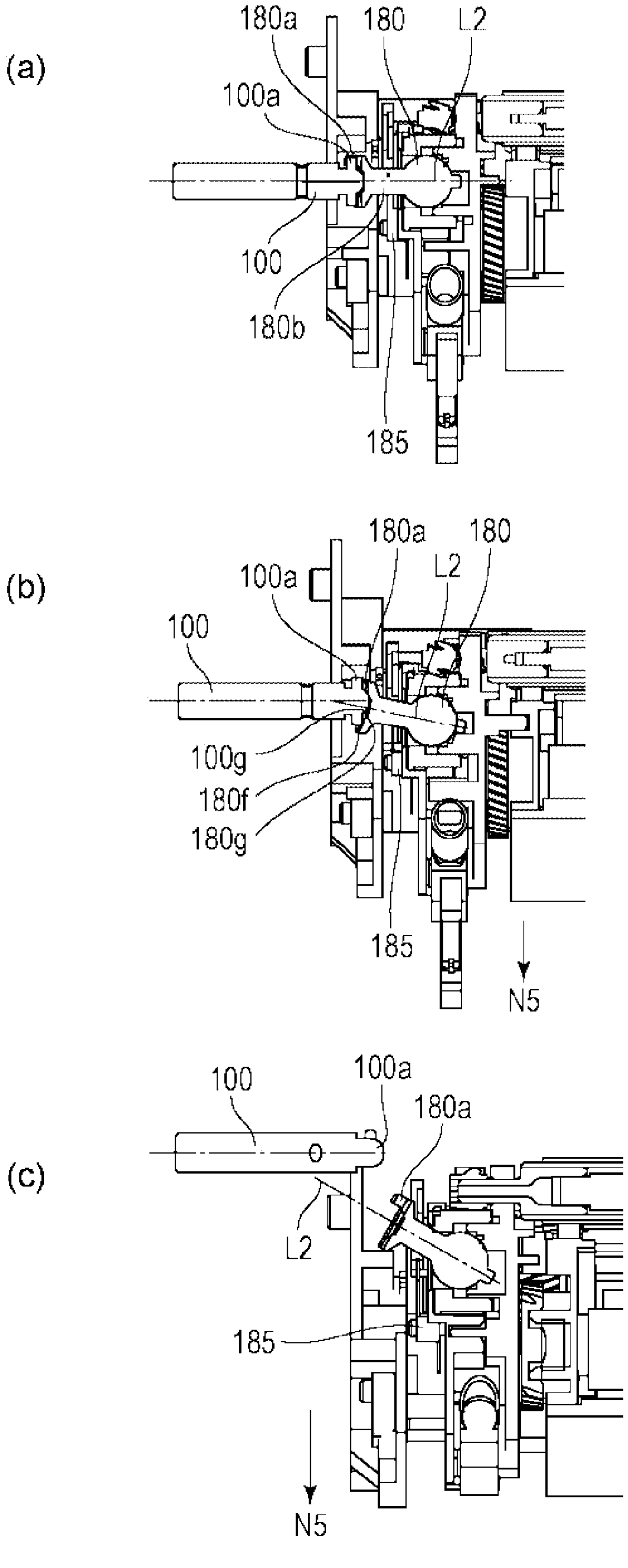
FIG. 30 includes cross-sectional views of the periphery of a coupling member.

FIG. 30 is explanatory diagrams illustrating the engagement state of the coupling member 180 and main body side drive member 100 in the developing contact state and the developing spaced state.

Figure 31:
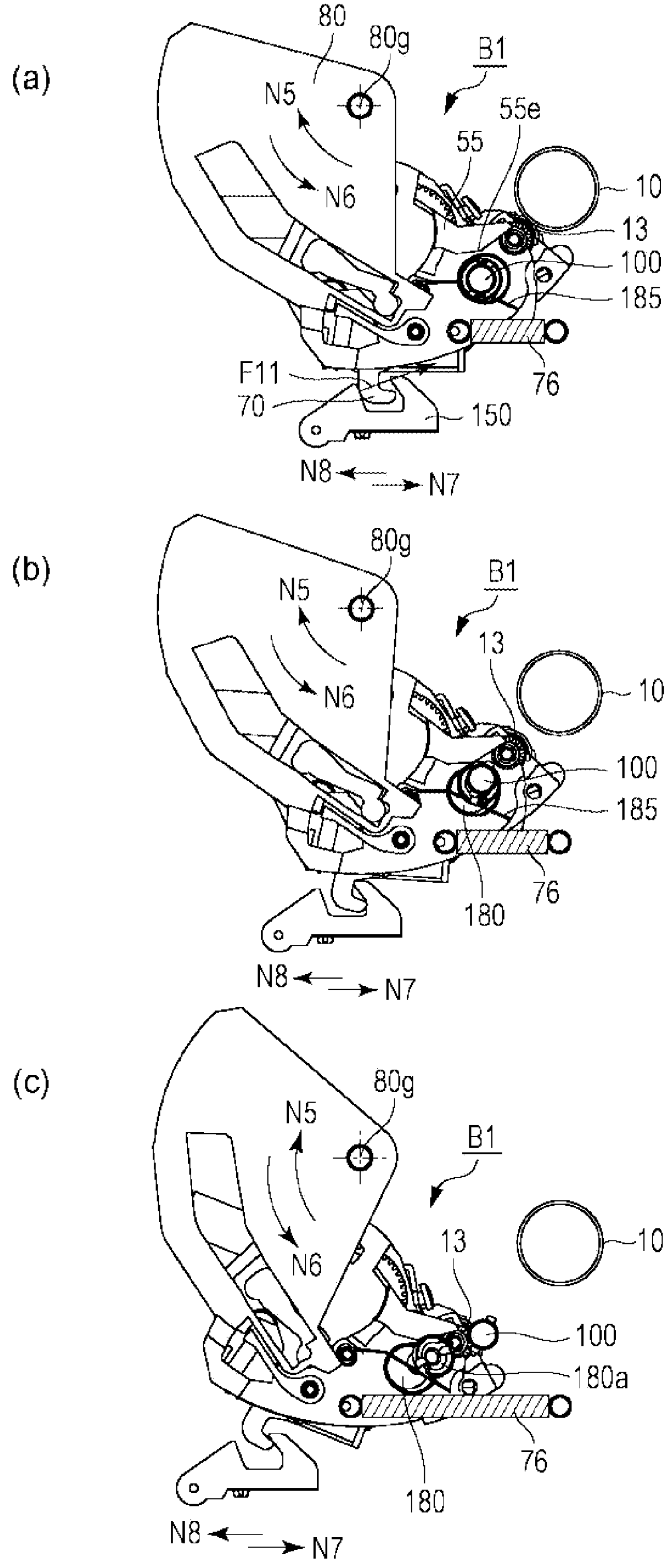
FIG. 31 includes side views at a driving side of a developing cartridge and driving-side swing guide.

FIG. 31 is explanatory diagrams illustrating the engagement state of the coupling member 180 and main body side drive member 100 in the developing contact state and the developing spaced state, as viewed from the side at the driving side.

While forming images, the driving-side coontacting/spacing lever 70 is pressed by biasing force F11 by the driving-side apparatus pressing member 150, as illustrated in FIG. 31(*a*). The developing roller 13 of the developing cartridge B1 and the photosensitive drum 10 are in the developing contact state, in contact at a predetermined pressure. The coupling member 180 is at the reference attitude D0 as illustrated in FIG. 30(*a*). The developing cartridge B1 at this time is situated at an engaged position where the rotational force receiving part 180*a* of the coupling member 180 and the rotational force applying part 100*a* of the main body side drive member 100 are engaged. The developing cartridge B1 is in a state where driving can be transmitted from the main body side drive member 100 to the coupling member 180, by force from a rotating motor (omitted from illustration).

Further, the guide part 55*e* of the coupling lever 55 is held in a state completely retracted from the guided part 180*b* of the coupling member 180 (see FIGS. 11(*a*) through 11(*c*)). The reason is that the rotation restricting part 55*y* of the coupling lever 55 abuts the abutting part 80*y* of the driving-side swing guide 80, and the rotation in the direction of arrow X11 centered on the rotational axis L11 thereof is restricted, as described above (see FIGS. 11(*a*) through 11(*c*) for this as well).

Next, the attitude of the coupling member 180 in the process of the developing cartridge B1 moving from the developing contact state to the developing spaced state will be described.

As illustrated in FIG. 31(*b*), when image forming ends, the driving-side apparatus pressing member 150 and the non-driving-side apparatus pressing member 151 (omitted from illustration) move in the direction of arrow N8. When the driving-side apparatus pressing member 150 moves in the direction of arrow N8, the driving-side coontacting/spacing lever 70 rotates in the direction of arrow N10, by the biasing force of the driving-side developing pressure spring 71 (see FIG. 28(*b*)). From this state where the driving-side restricting contact part 70*e* of the driving-side coontacting/spacing lever 70 and the positioning part 36*b* of the driving-side developing bearing 36 are in contact, the driving-side apparatus pressing member 150 further moves in the direction of arrow N8. The developing cartridge B1 then, integrally with the driving-side swing guide 80, rotates in the direction of arrow N5 centered on the supported protrusion 80*g* of the driving-side swing guide 80. This holds true with the non-driving side as well, with developing cartridge B1 integrally with the non-driving-side swing guide 81 rotating in the direction of arrow N5 centered on the supported protrusion 81*g* of the non-driving-side swing guide 81 (omitted from illustration). This state is the developing spaced state, where the developing roller 13 and the photosensitive drum 10 are spaced. The developing cartridge B1 and the driving-side swing guide 80 move integrally, so the guide part 55*e* of the coupling lever 55 is held in the state completely retracted from the guided part 180*b* of the coupling member 180 in the state illustrated in FIG. 31(*b*) as well. This is because the abutting part 80*y* is integrally formed with the driving-side swing guide 80, as described earlier (see FIG. 20(*b*)). On the other hand, the biasing force of the coupling spring 185 is acting upon the coupling member 180. Accordingly, in conjunction with the developing cartridge B1 moving from the contact state to the spaced state, the axis L2 of the coupling member 180 gradually includes from the state of the reference attitude D0 to the direction of the first inclined attitude D1, as illustrated in FIG. 30(*b*). The developing cartridge B1 then further rotates in the direction of arrow N5, and when the state in FIG. 31(*c*) is reached, the inclining motion of the coupling member 180 ends. At this time, the phase-restricting boss 180*e* of the coupling member 180 engages the first inclination restricting part 36*kb*1 of the driving-side developing bearing 36 (see FIG. 11(*b*)), and the axis L2 of the coupling member 180 is held at the first inclined attitude D1. As described earlier, the first inclined attitude D1 of the coupling member 180 is an attitude where the rotational force receiving part 180*a* of the coupling member 180 is facing in the direction of the main body side drive member 100 of the apparatus main body A1. In the state illustrated in FIG. 31(*c*), the developing cartridge B1 is situated at a disengaged position, where the engagement of the rotational force receiving part 180*a* of the coupling member 180 and the rotational force applying part 100*a* of the main body side drive member 100 has been disengaged. Accordingly, the state is such that there is no driving transmission of the force of the motor (omitted from illustration) from the main body side drive member 100 to the coupling member.

The state illustrated in FIG. 31(*a*) is the attitude of the developing cartridge B1 when forming images in the present embodiment. The coupling member 180 and the main body side drive member 100 are engaged, and driving force is being input from the apparatus main body A1. The configuration is such that when the developing cartridge B1 moves from the state illustrated in FIG. 31(*a*) to FIG. 31(*b*), and to FIG. 31(*c*), the engagement between the coupling member 180 and the main body side drive member 100 is disengaged. In other words, the configuration is such that, in the process of the developing cartridge B1 moving from the contact state to the spaced state, driving input from the apparatus main body A1 to the developing cartridge B1 is cut off. The main body side drive member 100 of the apparatus main body A1 is rotating while the developing roller 13 and the photosensitive drum 10 are spaced, with regard to the developing cartridge B1. This means that the configuration is such that the developing roller 13 can be spaced from the photosensitive drum 10 while rotating.

<Movement of Coupling Member in Conjunction with Operation from Contact State to Separated State>

Next, the engaging operations of the coupling member 180 and main body side drive member 100 at the time of the developing cartridge B1 moving from the contact state to the spaced state will be described.

The developing contact operations of the developing cartridge B1 are the opposite from the above-described developing spacing operations. In the state illustrated in FIG. 31(*b*), the developing cartridge B1 is situated at a disengaged position whether engagement between the rotational force receiving part 180*a* of the coupling member 180 and the rotational force applying part 100*a* of the main body side drive member 100 is disengaged. The state illustrated in FIG. 31(*b*) is a state where the driving-side apparatus pressing member 150 and the non-driving-side apparatus pressing member 151 have moved in the direction of arrow N7 from the state illustrated in FIG. 31(*c*). The developing cartridge B1 and the driving-side swing guide 80 are integrally rotated in the direction of arrow N6 by the biasing force of the above-described driving-side biasing unit 76 (see FIGS. 25(*a*), 25(*b*) 27(*a*), and 27(*c*)). This holds true for the non-driving side as well. Accordingly, the developing cartridge B1 moves from the spaced state to the contact state. FIG. 30(*b*) is a partway stage of the developing cartridge B1 transitioning from the spaced state to the contact state. This also is a state where the circular part 180*f* of the coupling member 180 and the main body side drive member 100 are in contact. Specifically, the recessed conical part 180*g* disposed on the inner side of the circular part 180*f* of the coupling member 180, and the protrusion 100*g* disposed on the axial tip of the main body side drive member 100, are in contact. The rotational axis L2 of the coupling member 180 is inclined in the direction of the main body side drive member 100 from the state illustrated in FIG. 30(*c*) to the state illustrated in FIG. 30(*b*), so the coupling member 180 and the main body side drive member 100 can be readily engaged.

Further moving the driving-side apparatus pressing member 150 and non-driving-side apparatus pressing member 151 in the direction of arrow N7 from the state illustrated in FIG. 30(*b*) completes engagement of the coupling member 180 and the main body side drive member 100, as illustrated in FIG. 30(*a*). At this time, the developing cartridge B1 is situated in an engaged position where the rotational force receiving part 180*a* of the coupling member 180 and the rotational force applying part 100*a* of the main body side drive member 100 are engaged, and the coupling member 180 assumes the reference attitude D0. The process of the coupling member 180 transitioning from the first inclined attitude D1 to the reference attitude D0 is the same as the process of the coupling member 180 transitioning from the second inclined attitude D2 to the reference attitude D0 at the time of mounting the developing cartridge B1 to the apparatus main body A1 (see FIGS. 21(*a*) through 21(*h*)).

In the present embodiment, the main body side drive member 100 is made to rotate by driving signals from the apparatus main body A1 before engagement of the coupling member 180 and main body side drive member 100 is started in the state illustrated in FIG. 31(*b*). Accordingly, the configuration is such that the coupling member 180 and main body side drive member 100 engage partway through the developing cartridge B1 moving from the state illustrated in FIG. 31(*c*) to the state in FIG. 31(*b*), and in FIG. 31(*a*), whereby driving is input to the developing cartridge B1. In other words, the configuration is such that in the process of the developing cartridge B1 moving from the spaced state to the contact state, driving is input from the apparatus main body A1 to the developing cartridge B1. This is because the configuration is such that the coupling member 180 is movable in the direction of N9 that is the movement direction of the driving-side coontacting/spacing lever 70 and non-driving-side coontacting/spacing lever 72 (see FIGS. 27(*a*) through 27(*c*)). The main body side drive member 100 of the apparatus main body A1 is rotating before the developing roller 13 and the photosensitive drum 10 come into contact. As a result, the configuration is such that the developing roller 13 can be brought into contact with the photosensitive drum 10 while rotating. Thus, the speed difference of the circumferential faces of the photosensitive drum 10 and the developing roller 13 can be reduced with the developing roller 13 and the photosensitive drum 10 come into contact, so wear of the photosensitive drum 10 and the developing roller 13 can be reduced.

In a case where the motor that the apparatus main body A1 has is solitary, a clutch mechanism is necessary to cut off transmission of rotational force to the developing roller 13 while transmitting rotational force to the photosensitive drum 10. That is to say, there is a need to provide a clutch mechanism that can selectively cut off driving transmission at the driving transmission mechanism that transmits rotational force from the motor to the developing roller 13. However, in the present embodiment, engaging and disengaging of the coupling member 180 and main body side drive member 100 is selected in the process of the developing cartridge B1 moving from the contact state to the spaced state, or moving from the spaced state to the contact state. Accordingly, there is no need to provide a clutch mechanism to the apparatus main body A1 or developing cartridge B1, so a developing cartridge B1 and apparatus main body A1 that is less expensive and consumes less space can be realized.

(Contact of Separated Face of Driving-Side Contact/Separation Lever)

Figure 41:
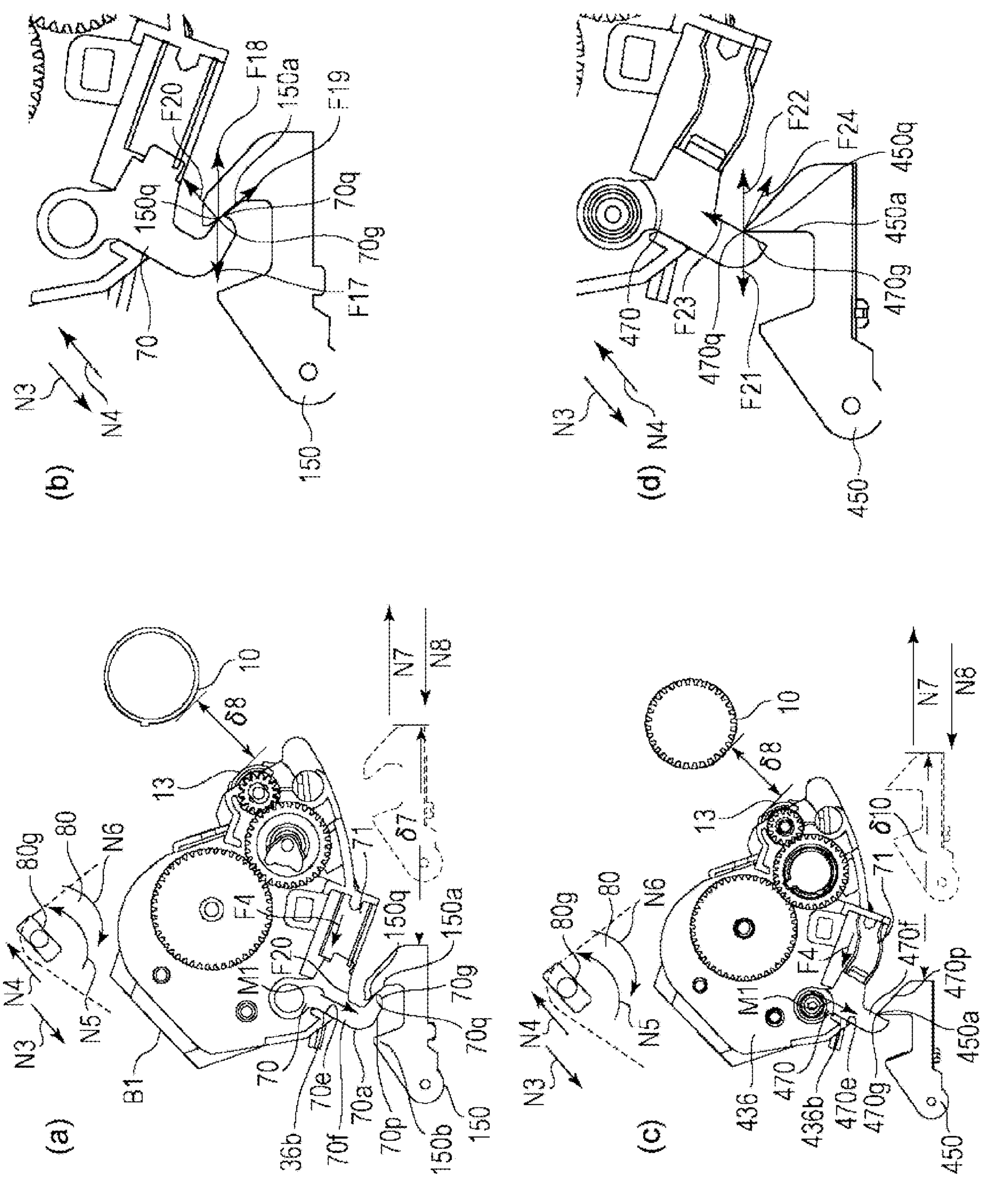
FIG. 41 includes side views illustrating a driving-side coontacting/spacing lever.

The driving-side coontacting/spacing lever 70 has the separated face 70*g* protruding toward the developing roller 13 side from a tip part 70*p* in the protrusion direction of the first protrusion 70*f*, as illustrated in FIG. 41(*a*). From another perspective, the tip of the first protrusion 70*f* has a shape curved toward the developing roller 13 side, and the separated face 70*g* is formed on this curved tip part.

FIGS. 41(*a*) through 41(*d*) are explanatory diagrams regarding whether or not there is the protruding separated face 70*g*. FIG. 41(*a*) illustrates the present embodiment having the separated face 70*g* protruding toward the developing roller 13 side from the tip part 70*p* in the protrusion direction of the first protrusion 70*f*. FIG. 41(*b*) is an enlarged diagram of the periphery of the driving-side coontacting/spacing lever 70 in FIG. 41(*a*). FIG. 41(*c*) illustrates an example of a separated face 470*g* not protruding toward the developing roller 13 side from the tip part 70*p* in the protrusion direction of the first protrusion 70*f*. FIG. 41(*d*) is an enlarged diagram of the periphery of a driving-side coontacting/spacing lever 470 in FIG. 41(*c*).

The separated face 70*g* of the driving-side coontacting/spacing lever 70 and the first contact face 150*a* of the driving-side apparatus pressing member 150 come into contact, and the developing roller 13 and photosensitive drum 10 are separated by a gap of δ8, as illustrated in FIG. 41.

The point at which the driving-side coontacting/spacing lever 70 comes into contact with the first contact face 150*a* of the driving-side apparatus pressing member 150 at the separated face 70*g* is a contact point 70*q*, as illustrated in FIG. 41(*a*) and FIG. 41(*b*). The point at which the driving-side apparatus pressing member 150 comes into contact with the separated face 70*g* of the driving-side coontacting/spacing lever 70 at the first contact face 150*a* is a contact point 150*q*.

The first contact face 150*a* of the driving-side apparatus pressing member 150 applies a spacing force F17 to the separated face 70*g* of the driving-side coontacting/spacing lever 70 by the contact point 150*q*, as illustrated in FIG. 41(*b*). Accordingly, the separated face 70*g* of the driving-side coontacting/spacing lever 70 receives reactive force F18 at the contact point 70*q*. At this time, the reactive force F18 is divided into a force component F19 that is parallel to the first contact face 150*a*, and a force component F20 that is perpendicular to the first contact face 150*a*.

The direction of the force component F19 is in a direction parallel to the first contact face 150*a* of the driving-side apparatus pressing member 150, so the separated face 70*g* of the driving-side contacting/spacing lever 70 receives force in the direction of the force component F19 while in contact with the first contact face 150*a* of the driving-side apparatus pressing member 150.

As illustrated in FIG. 41(*a*), the developing cartridge B1 is positioned to the driving-side swing guide 80 that can rock in the directions of arrow N5 and arrow N6, centered on the supported protrusion 80*g* at the driving-side side plate (omitted from illustration). Further, the driving-side swing guide 80 is supported by the driving-side side plate (omitted from illustration) so as to be capable of sliding in the direction of arrow N3 and in the direction or arrow N4 when the developing roller 13 is in contact with the photosensitive drum 10, such that the axis of the developing roller 13 can be corrected to be parallel to the axis of the photosensitive drum 10. The same holds true for the non-driving side as well, so the developing cartridge B1 is capable of rotating in the directions of arrow N5 and arrow N6 centered on the supported protrusion 80*g*, and capable of sliding in the direction of arrow N3 and in the direction of arrow N4.

Further, the position of the driving-side coontacting/spacing lever 70 is decided by the driving-side restricting contact part 70*e* of the driving-side coontacting/spacing lever 70 and the restricting part 36*b* of the driving-side bearing member 36 coming into contact, as described earlier. Accordingly, driving-side coontacting/spacing lever 70 receives the force component F19, causing the developing cartridge B1 to attempt to rotate in the direction of arrow N5 centered on the supported protrusion 80*g*, and to slide in the direction of arrow N11.

Accordingly, the driving-side coontacting/spacing lever 70 attempts to move in the direction of force component F19. This direction of movement is a direction of movement of the driving-side coontacting/spacing lever 70 towards the base side of the first contact face 150*a* of the driving-side apparatus pressing member 150, and is the direction whereby the driving-side coontacting/spacing lever 70 is engaged by the driving-side apparatus pressing member 150.

On the other hand, as illustrated in FIG. 41(*d*), the first contact face 450*a* of the driving-side apparatus pressing member 450 applies a spacing force F21 to the separated face 470*g* of the driving-side coontacting/spacing lever 470 by the contact point 450*q*. Accordingly, the separated face 470*g* of the driving-side coontacting/spacing lever 470 receives reactive force F22 at the contact point 470*q*. At this time, the reactive force F22 is divided into a force component F23 that is parallel to the separated face 470*g*, and a force component F24 that is perpendicular to the separated face 470*g*.

The positions of the driving-side coontacting/spacing lever 470 and a driving-side bearing member 436 are decided by the driving-side restricting contact part 470*e* of the driving-side coontacting/spacing lever 470 and a restricting part 436*b* of the driving-side bearing member 436 coming into contact. Accordingly, driving-side coontacting/spacing lever 470 receives the force component F23, causing the developing cartridge B1 to attempt to rotate in the direction of arrow N5 centered on the supported protrusion 80*g*, and to slide in the direction of arrow N4.

Accordingly, the driving-side coontacting/spacing lever 470 attempts to move in the direction of force component F23. Thus, the driving-side coontacting/spacing lever 470 comes into contact with the first contact face 450*a* of the driving-side apparatus pressing member 450 at a tip part 470*p* side in the protruding direction of a first protrusion 470*f*, and the amount of engagement of the driving-side coontacting/spacing lever 470 as to the driving-side apparatus pressing member 450 decreases.

Thus, the amount of protrusion for the first protrusion 470*f* of the driving-side contacting/spacing lever 470 needs to be increased by an amount equivalent to the amount of movement in the direction of force component F23, requiring space.

From the above, the amount of engagement can be set smaller in a case of being provided with the separated face 70*g* protruding toward the developing roller 13 side from the tip part 70*p* in the protrusion direction of the first protrusion 70*f*. That is to say, in this case, the driving-side coontacting/spacing lever 70 engages the driving-side apparatus pressing member 150 more at the time of the developing roller 13 spacing from the photosensitive drum 10, as compared with a case where a protruding separated face 70*g* is not provided. As a result, the engaged state of the driving-side coontacting/spacing lever 70 to the driving-side apparatus pressing member 150 can be maintained even if the amount of engagement is set to be small. Reducing the amount of engagement of the driving-side coontacting/spacing lever 70 and the driving-side apparatus pressing member 150 leads to reduction in size of the developing cartridge B1.

<Effects of Placement of Driving-Side Contact/Separation Lever 70, Driving-Side Developing Pressure Spring 71, and Restricting Part 36*b* of Driving-Side Developing Bearing 36>

The configuration is such that the biasing force F10 of the driving-side developing pressure spring 71 is generated by the driving-side developing pressure spring 71 being compressed between the third contact face 70*c* of the driving-side coontacting/spacing lever 70 and the contact face 36*d* of the driving-side developing bearing 36, which has been described so far (see FIGS. 1(*a*) and 1(*b*)). The same holds true for the non-driving side as well.

Particularly, the compression is such that when performing developing pressuring, the developing roller 13 and photosensitive drum 10 come into contact using the biasing force F10*a* generated by the driving-side coontacting/spacing lever 70 rotating in the direction of arrow N9 centered on the supporting part 36*c* of the driving-side developing bearing 36 (see FIG. 27(*c*)).

Further, when performing developing spacing, the driving-side coontacting/spacing lever 70 is rotated in the direction of arrow N10 centered on the boss of the supporting part 36*c* of the driving-side developing bearing 36 using the biasing force F10, bringing the restricting contact part 70*e* of the driving-side coontacting/spacing lever 70 into contact with the restricting part 36*b* of the driving-side developing bearing 36. This restricts the position of the driving-side coontacting/spacing lever 70. Further, the driving-side apparatus pressing member 150 moves in the direction of arrow N8 with the second contact face 70*b* of the driving-side coontacting/spacing lever 70 and the first contact face 150*a* of the driving-side apparatus pressing member 150 in contact. The configuration is such that this spaces the developing roller 13 and the photosensitive drum 10 (see FIG. 28(*b*)). That is to say, when performing developing spacing, the configuration is such that the position of the driving-side coontacting/spacing lever 70 is restricted using the driving-side developing pressure spring 71 used for developing pressuring.

Particularly, the developing cartridge B1 is of a configuration detachably mountable to the apparatus main body A1, so the position of the driving-side coontacting/spacing lever 70 is preferably precisely positioned in order for the driving-side coontacting/spacing lever 70 and the driving-side apparatus pressing member 150 (see FIG. 25(*b*)) to be engaged in a sure manner. The reason is that, in a case where the positioning precision of the driving-side coontacting/spacing lever 70 is poor, measures such as those described below, for example, need to be taken to engage the driving-side coontacting/spacing lever 70 and the driving-side apparatus pressing member 150.

1. Provide a greater distance (gap) between the first contact face 150*a* and second contact face 150*b* of the driving-side apparatus pressing member 150.
2. Provide a smaller distance (thickness) between the first contact face 70*a* and second contact face 70*b* of the driving-side coontacting/spacing lever 70.

However, these measures increase the amount of movement of the driving-side apparatus pressing member 150 of the apparatus main body A1 in the directions N8 and N9, resulting in a larger size of the apparatus main body A1.

According to the present configuration, the configuration is such that the position of the driving-side coontacting/spacing lever 70 when mounting the developing cartridge B1 to the apparatus main body A1 is restricted using the driving-side developing pressure spring 71 used when performing developing pressuring. This contributes to reduction in size of the apparatus main body A1, and also enables timing of spacing the photosensitive drum 10 and developing roller 13, and the amount of spacion of the developing roller 13 from the photosensitive drum 10, to be controlled with good precision.

Also, according to the present configuration, the configuration is such that the position of the driving-side coontacting/spacing lever 70 when performing developing spacing can be positioned with good precision, using the driving-side developing pressure spring 71 used for developing pressuring when mounting the developing cartridge B1, when performing development spacing as well. Also, the driving-side developing pressure spring 71 used for performing developing pressuring is used to restrict the position of the driving-side coontacting/spacing lever 70, so no new parts are required in particular.

Both the first contact face 70*a* of receiving force to bring the developing roller 13 into contact with the photosensitive drum 10, and the second contact face 70*b* to receive force for spacing, are provided on the solitary part that is the driving-side coontacting/spacing lever 70. Consolidating functions in this way enables the number of parts of the developing cartridge B1 to be reduced.

Also, according to the present embodiment, the driving-side coontacting/spacing lever 70 and non-driving-side coontacting/spacing lever 72 receive force from pressing members provided to the image forming apparatus main body, thereby enabling contact and spacing of the developing roller to and from the photosensitive drum to be performed while conserving space. This reduces the size of the image forming apparatus and developing cartridge. Also, increase in pressure applied to the electrode portion of the developing cartridge that electrically connects to the image forming apparatus main body when spacing the developing roller from the photosensitive drum can be suppressed. Reducing the load applied to the electrode portion improves durability of the electrode portion. The strength of the electrode portion can be suppressed, so reduced costs can be achieved for the developing cartridge having the electrode portion and the image forming apparatus having the developing cartridge.

Description has been made in the present embodiment where the developing cartridge B1 and the drum cartridge C are separated. That is to say, the configuration is such that in the developing device, the photosensitive drum 10 is formed into a cartridge separate from the developing cartridge B1, and is mounted/detached to/from the apparatus main body of the image forming apparatus. However, application of the present embodiment is not restricted to such configurations.

The configuration of the present embodiment is applicable to configurations where the developing cartridge B1 and drum cartridge C are not separated, for example. A configuration may be made where a process cartridge, configured by rotatably joining the developing cartridge B1 (developing device) to the drum cartridge C, is mounted/detached to/from the apparatus main body of the image forming apparatus. That is to say, a configuration is conceivable where a cartridge, having the photosensitive drum 10 and developing device (process cartridge), has the driving-side coontacting/spacing lever 70 and non-driving-side coontacting/spacing lever 72 disclosed in the present embodiment.

<Relationship Between Coupling Member 180, Driving-Side Contact/Separation Lever 70, and Non-Driving-Side Contact/Separation Lever 72>

The coupling member 180 has a configuration where it is able to move at least in the direction of N9 (see FIG. 27(*c*)), that is the movement direction of the driving-side coontacting/spacing lever 70 and non-driving-side coontacting/spacing lever 72. Accordingly, when the driving-side coontacting/spacing lever 70 and non-driving-side coontacting/spacing lever 72 move in the directions N9 and N10, smooth action can be realized without affecting the engagement between the coupling member 180 and the main body side drive member 100.

Also, an arrangement is made where the direction of N6 that is the direction in which the developing roller 13 comes into contact with the photosensitive drum 10, and N13 that is the rotation direction of the coupling member 180 (direction X6 in FIG. 8(*b*)), are the same direction, as illustrated in FIG. 27(*a*). According to this configuration, the force couple that the coupling member 180 receives from the main body side drive member 100 acts as moment rotating the developing cartridge B1 in the direction N6, centered on the supported protrusion 80*g*. The moment in the direction N6, which is pressuring force pressuring the developing roller 13 against the photosensitive drum 10, thus acts on the developing roller 13.

Assuming a case where the rotational direction of the coupling member 180 was the opposite direction from the direction N6, moment would act in the direction of the developing roller 13 escaping from the photosensitive drum 10 (the direction N5 in FIG. 27(*a*)) due to the rotational force of the coupling member 180, so loss of pressuring force would occur. However, such loss of pressuring force does not readily occur in the present configuration.

Also, the moment in direction N6 generated by the rotational force of the coupling member 180 is generated from negative torque necessary to rotate the coupling member 180. The load torque of the cartridge changes through part dimensions and endurance, so the moment in the direction N6 generated by the rotational force of the coupling member 180 also changes. On the other hand, the present embodiment also is a configuration where the coontacting/spacing levers 70 and 72 receive force from the apparatus main body A1, and bring the developing roller 13 into contact with the photosensitive drum 10. The pressuring force in the direction N6 due to the coontacting/spacing levers 70 and 72 is stipulated only be dimensions of parts, and there is no durability change.

Accordingly, the following arrangement is preferable in order to bring the developing roller 13 into more stable contact with the photosensitive drum 10. That is to say, the moment in the direction of N6 that occurs due to the rotational force of the coupling member 180 is preferably smaller than the moment in the direction N6 generated due to the coontacting/spacing levers 70 and 72 receiving force from the apparatus main body A1. To this end, the distance connecting the supported protrusion 80*g* and the coupling member 180 is shorter than the distance between the supported protrusion 80*g* of the driving-side swing guide 80 and the driving-side coontacting/spacing lever 70 in the present embodiment, as illustrated in FIG. 27(*a*). According to this configuration, the moment in the direction N6 occurring due to the rotational force of the coupling member 180 can be effectively used as pressuring force of the developing roller 13. Further, this configuration suppresses the effects of fluctuation in moment in the direction N6 occurring due to the rotational force of the coupling member 180, so the developing roller 13 can be brought into contact with the photosensitive drum 10 in a more stable manner.

Further, a direction parallel to a straight line Z31 connecting the rotational center 13Z of the developing roller 13 and the rotational center of the coupling member 180 as viewed from the rotational axis direction of the developing roller 13 is the direction N14 (first direction), as illustrated in FIGS. 1(*a*) and 1(*b*). When viewing the developing frame from the rotational axis direction of the developing roller 13, the developing roller 13 is disposed at one end side of the developing frame with regard to the direction N14, and the first protrusion 70*f* of the driving-side coontacting/spacing lever 70 (the first contact face 70*a* and second contact face 70*b* in particular) is disposed at the other end side of the developing frame. That is to say, the first protrusion 70*f* (first contact face 70*a* and second contact face 70*b* in particular) is situated at a position somewhat away from the developing roller 13.

Thus, space for disposing members such as the coupling member 180 and so forth, that are appropriate to be situated near the developing roller 13, can be secured at the one end side of the developing frame. This improves the degree of freedom of layout for members that are appropriate to be situated near the developing roller 13 within the developing cartridge B1. Accordingly, the coupling member 180 is disposed at a position closer to the developing roller 13 as compared to the first protrusion 70*f* (first contact face 70*a* and second contact face 70*b*) with regard to the direction N14 in the present embodiment, as viewed from the rotational axis direction of the developing roller 13.

The driving-side developing bearing 36 also has a recording medium contact part 36*m* that is capable of coming into contact with the recording medium 2 conveyed toward the transfer nip portion 6*a* in the conveyance guide 3*d* inside the apparatus main body A1, in a state where the developing cartridge B1 is mounted to the apparatus main body A1.

This will be described. As described above, the position of the first protrusion 70*f* (first contact face 70*a* and second contact face 70*b* in particular) is disposed at a position away from the developing roller 13 with regard to the direction N14. Accordingly, the driving-side apparatus pressing member 150 can be disposed at a position in the apparatus main body A1 away from the developing roller 13, so the developing-roller-side part of the developing cartridge B1 that comes into contact with the photosensitive drum 10 can be disposed near the conveyance guide 3*d*. This enables dead space between the developing cartridge B1 and the conveyance guide 3*d* to be reduced within the apparatus main body A1.

Thus, the developing cartridge B1 is disposed near the conveyance guide 3*d* in the present embodiment. Accordingly, the recording medium contact part 36*m* is disposed at a position on the driving-side developing bearing 36 close to the developing roller 13 than the first protrusion 70*f* (first contact face 70*a* and second contact face 70*b*) with regard to the direction N14, when viewed from the rotational axis direction of the developing roller 13.

<Details of Developing Side Cover 34>

Figure 45:
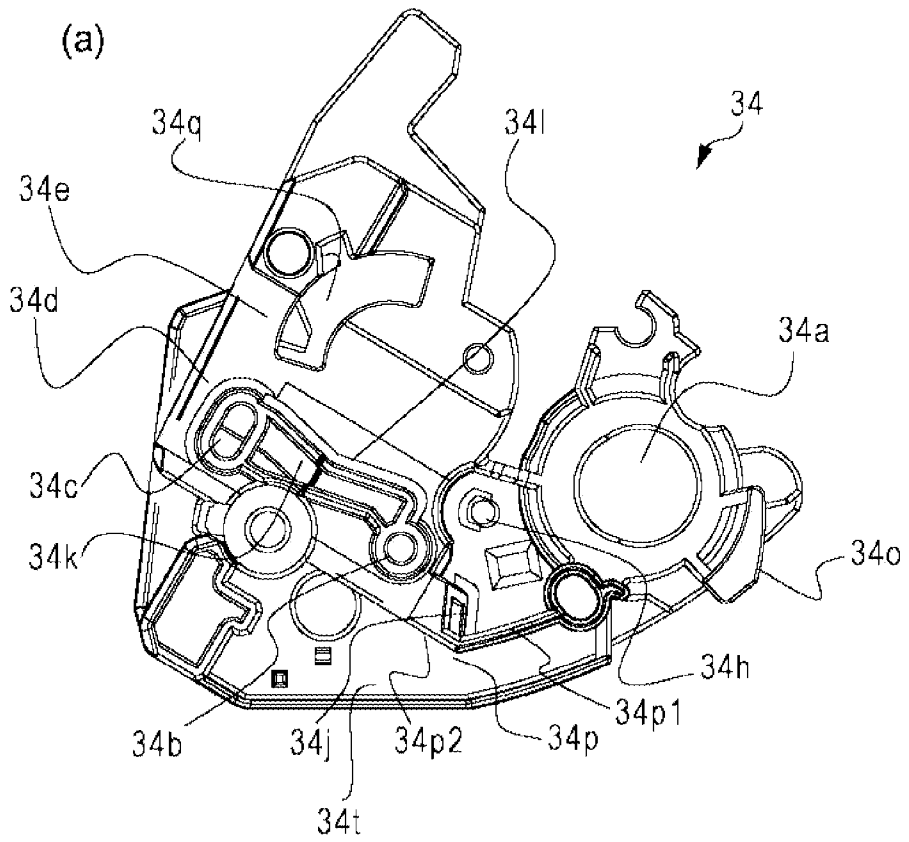
FIG. 45 includes a front view and a rear view illustrating a developing side cover.
Figure 45:
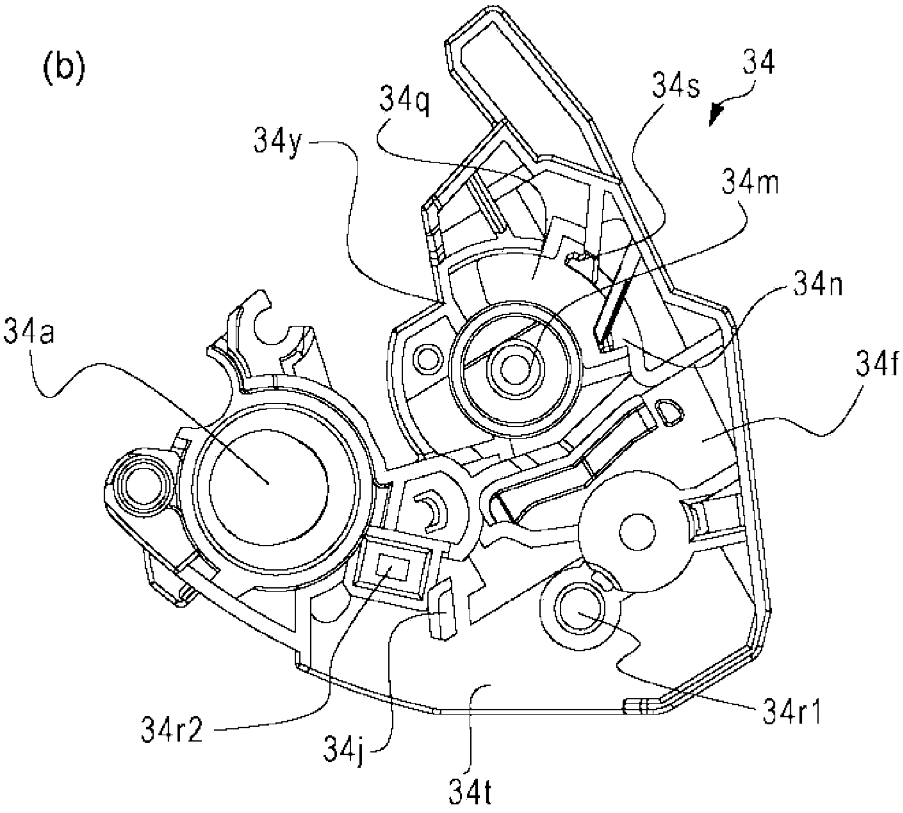
Figure 46:
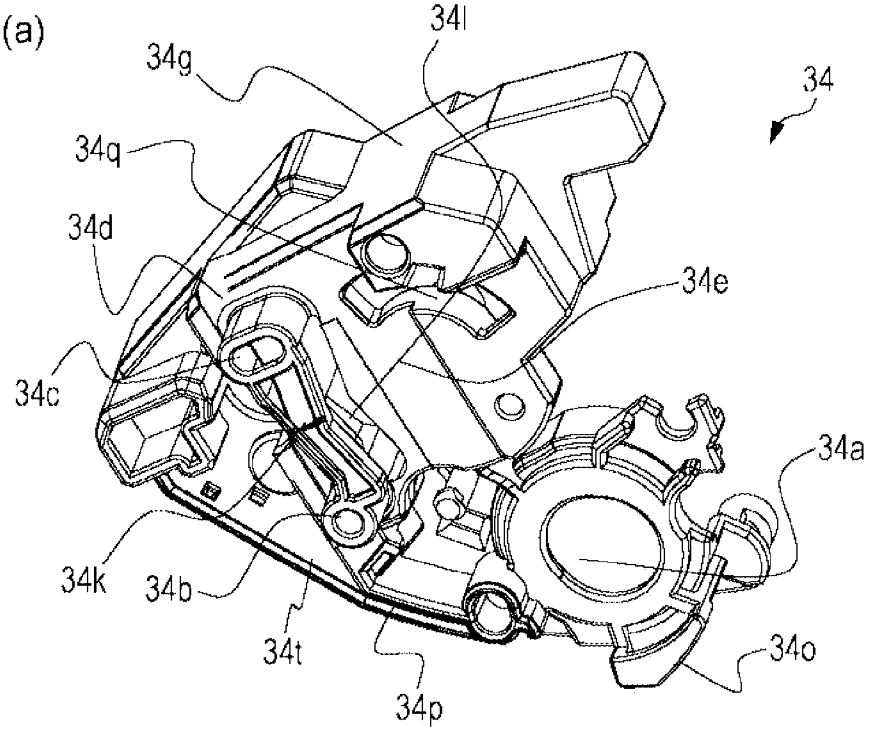
FIG. 46 includes perspective views illustrating a developing side cover.
Figure 46:
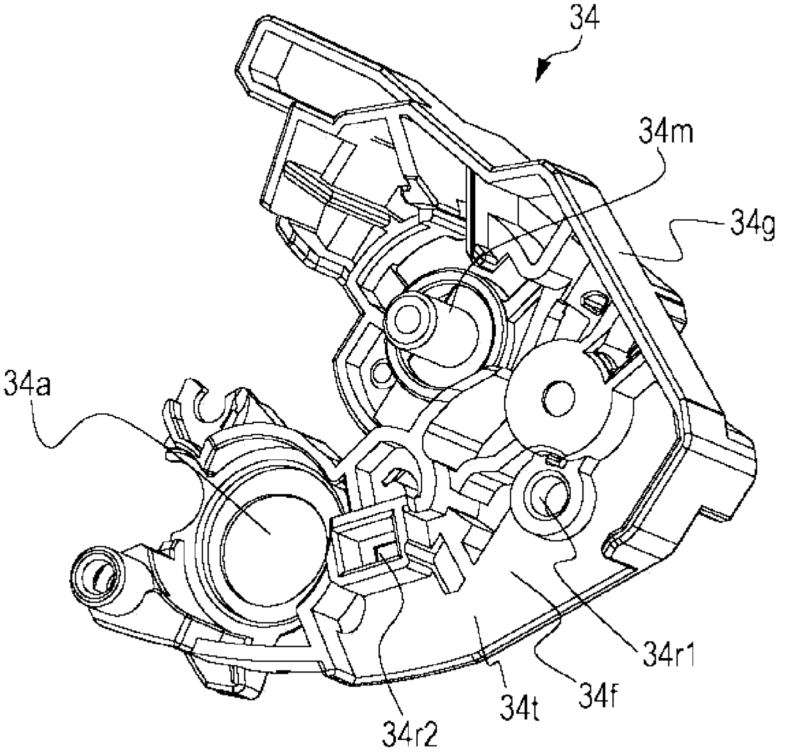

FIGS. 45(*a*) through 46(*b*) are diagrams illustrating the developing side cover 34 in detail. FIG. 45(*a*) is a frontal view of the developing side cover 34 from the outer side, FIG. 45(*b*) is a rear view of the developing side cover 34 from the inner side, and FIGS. 46(*a*) and 46(*b*) are perspective views as viewed from the front and rear, respectively.

The developing side cover 34 is one frame member making up the developing frame of the developing cartridge B1. The developing side cover 34 is made up of a plate-shaped frontal part 34*e*, and a rear part 34*f* that is the rear side thereof. The edge of the frontal part 34*e* has an edge part 34*g* surrounding the rear part 34*f* provided protruding from the frontal part 34*e*.

A hole 34*a* in which the coupling member 180 is situated on the inner side is provided passing through the frontal part 34*e* and the rear part 34*f*.

A first protrusion (positioning part) 34*b* is provided on the side of the hole 34*a*, protruding beyond the frontal part 34*e*. A second protrusion (rotation stopper) 34*c* that is larger in the radial direction than the first protrusion (positioning part) 34*b* and also protrudes beyond the frontal part 34*e*, is similarly provided on the side of the first protrusion (positioning part) 34*b*. The second protrusion (rotation stopper) 34*c* is at a position farther away from the hole 34*a* than the first protrusion (positioning part) 34*b*.

A connecting part 34*k* is provided between the first protrusion (positioning part) 34*b* and the second protrusion (rotation stopper) 34*c*, connecting the two, with a first groove 341 being provided between the connecting part 34*k* and the frontal part 34*e*.

A third protrusion (spring supporting part) 34*h* is provided between the hole 34*a* and the first protrusion (positioning part) 34*b*. The height of the third protrusion (spring supporting part) 34*h* is lower than the first protrusion (positioning part) 34*b* and the second protrusion (rotation stopper) 34*c*.

The opposing side of the third protrusion (spring supporting part) 34*h* across the hole 34*a* is a second groove (340) where a groove is extending in the circumferential direction. The second groove (340) guides the coupling spring 185.

A fourth protrusion (34*p*) made up of ridges 34*p*1 and 34*p*2 is provided beneath the first protrusion (positioning part) 34*b*. The ridges 34*p*1 and 34*p*2 intersect each other, the angle of intersection forming an obtuse angle. The height of the fourth protrusion (34*p*) is lower than the first protrusion (positioning part) 34*b* and the second protrusion (rotation stopper) 34*c*.

An arc-shaped groove 34*q* that passes through the frontal part 34*e* and the rear part 34*f* is provided above the first protrusion (positioning part) 34*b* and the second protrusion (rotation stopper) 34*c*. The arc-shaped groove 34*q* is provided to externally expose the rotation restricting part 55*y* of the coupling lever 55 (see FIG. 12(*a*)).

The developing side cover 34 also has a cover part 34*t*. The cover part 34*t* covers at least one of the driving-side coontacting/spacing lever 70 and at least part of the spring 71, so as to not be exposed externally in the longitudinal direction of the developing roller 13 (the direction of the rotational axis of the driving-side coontacting/spacing lever 70). Accordingly, the driving-side coontacting/spacing lever 70 and the spring 71 can be protected from external shock, and also the driving-side coontacting/spacing lever 70 and the spring 71 can be prevented from coming loose from the driving-side developing bearing 36. Note that it is sufficient for the cover part 34*t* to cover at least part of the driving-side coontacting/spacing lever 70, or at least part of the spring 71, so as to not be exposed externally in the longitudinal direction of the developing roller 13 (the direction of the rotational axis of the driving-side coontacting/spacing lever 70).

Thus, consolidating various functional parts in the developing side cover 34 enables the size to be reduced. The driving-side coontacting/spacing lever 70 can also be protected from external shock.

<Details of Driving-Side Developing Bearing 36>

Figure 47:
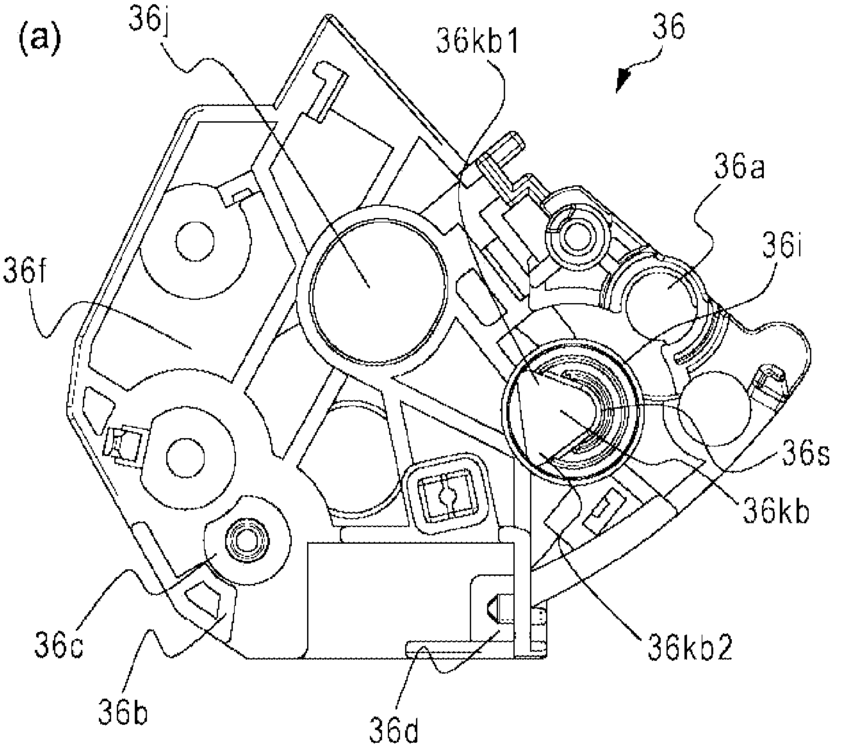
FIG. 47 includes a front view and a rear view illustrating a driving-side developing bearing.
Figure 47:
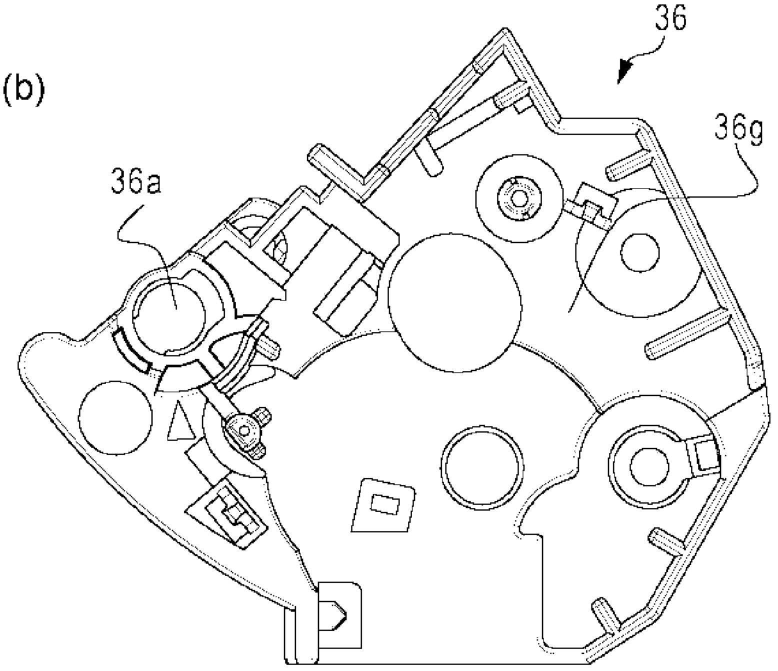
Figure 48:
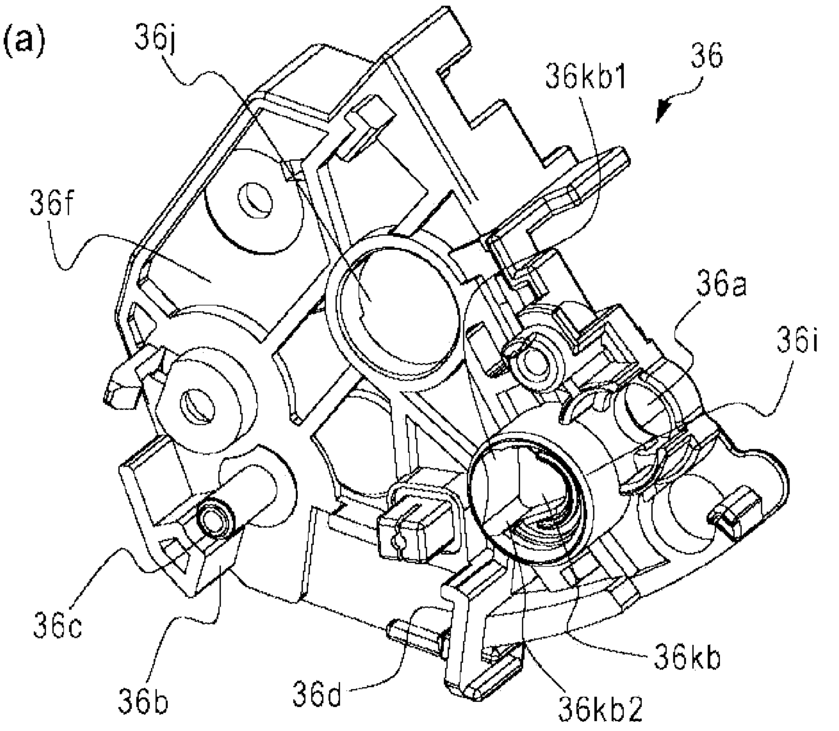
FIG. 48 includes perspective views illustrating a driving-side developing bearing.
Figure 48:
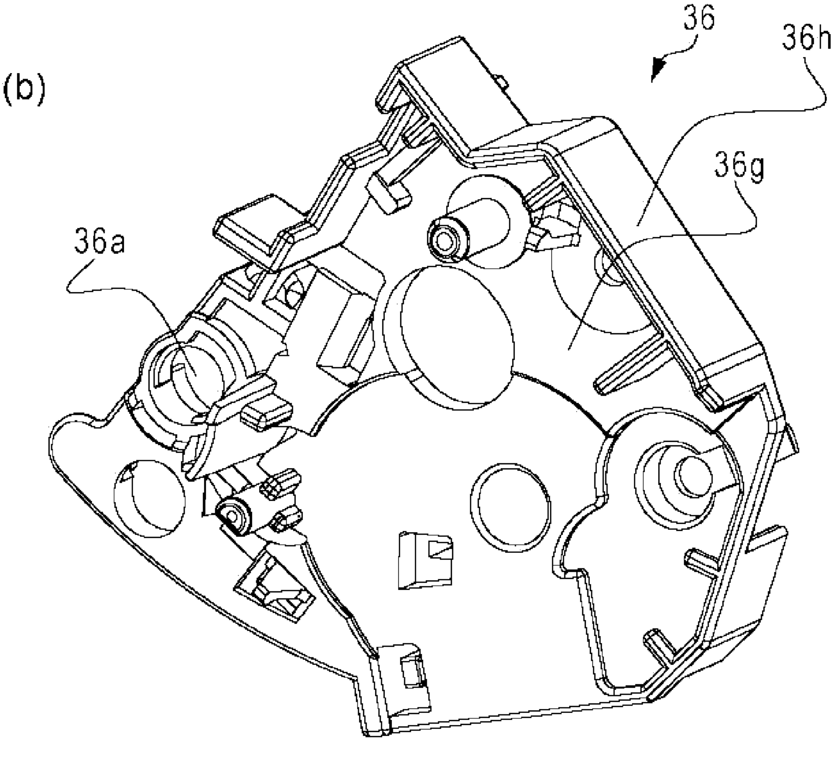

FIGS. 47 and 48 are diagrams illustrating the driving-side developing bearing 36 in detail. FIG. 47(*a*) is a frontal view of the driving-side developing bearing 36 from the outer side, FIG. 47(*b*) is a rear view of the driving-side developing bearing 36 from the inner side, and FIGS. 48(*a*) and 48(*b*) are perspective views as viewed from the front and rear, respectively.

The driving-side developing bearing 36 is one frame member, that is separate from the developing side cover 34 making up the developing frame of the developing cartridge B1. The driving-side developing bearing 36 is made up of a plate-shaped frontal part 36*f*, and a rear part 36*g* on the rear side thereof. The edge of the frontal part 36*f* has an edge rear part 36*h* surrounding the rear part 36*g* provided protruding from the frontal part 36*f*.

A hole 36*a* is provided passing through the frontal part 36*f* and the rear part 36*g*. The developing roller 13 is disposed on the inner side of the hole 36*a*, supporting the developing roller 13. Supporting may be performed directly by the hole 36*a*, or supporting may be performed via a member.

A protrusion 36*i* is provided to the side of the hole 36*a*. The protrusion 36*i* has a cylindrical shape. The phase-restricting part 36*kb* that restricts the position of the phase-restricting boss 180*e* of the coupling member 180 is provided on the inner side of the protrusion 36*i*. The phase-restricting part 36*kb* has a hole-shaped part that is generally triangular in shape, in which the coupling member 180 is disposed. The phase-restricting part 36*kb* is made up of the first inclination restricting part 36*kb*1 and the second inclination restricting part 36*kb*2, each making up part of a groove.

The supporting part 36*c* for supporting the driving-side coontacting/spacing lever 70 is provided at a position facing the hole 36*a* across the protrusion 36*i*. The supporting part 36*c* has a protruding cylindrical shape.

The restricting part 36*b* of the driving-side coontacting/spacing lever 70 is provided below the supporting part 36*c*. The restricting part 36*b* has the form of a wall protruding from the frontal part 36*f*, and is situated at the edge of the driving-side developing bearing 36.

The contact face 36*d* for coming into contact with the driving-side developing pressure spring 71 is provided below the protrusion 36*i* across the restricting part 36*b*. The contact face 36*d* also has the form of a wall protruding from the frontal part 36*f*, in the same way as the restricting part 36*b*.

A hole 36*j* is provided sandwiched between the restricting part 36*b* and contact face 36*d* as viewed from the frontal direction in FIG. 47(*a*), with regard to the direction in which the restricting part 36*b* and contact face 36*d* are arrayed. The hole 36*j* is provided to expose a driving gear and so forth.

Thus, the position of the coupling member 180 and the position of the driving-side contacting/spacing lever 70 can be maintained with high precision by the driving-side developing bearing 36. The position of the developing roller 13 and the position of the driving-side coontacting/spacing lever 70 can also be maintained with high precision.

Second Embodiment

Figure 32:
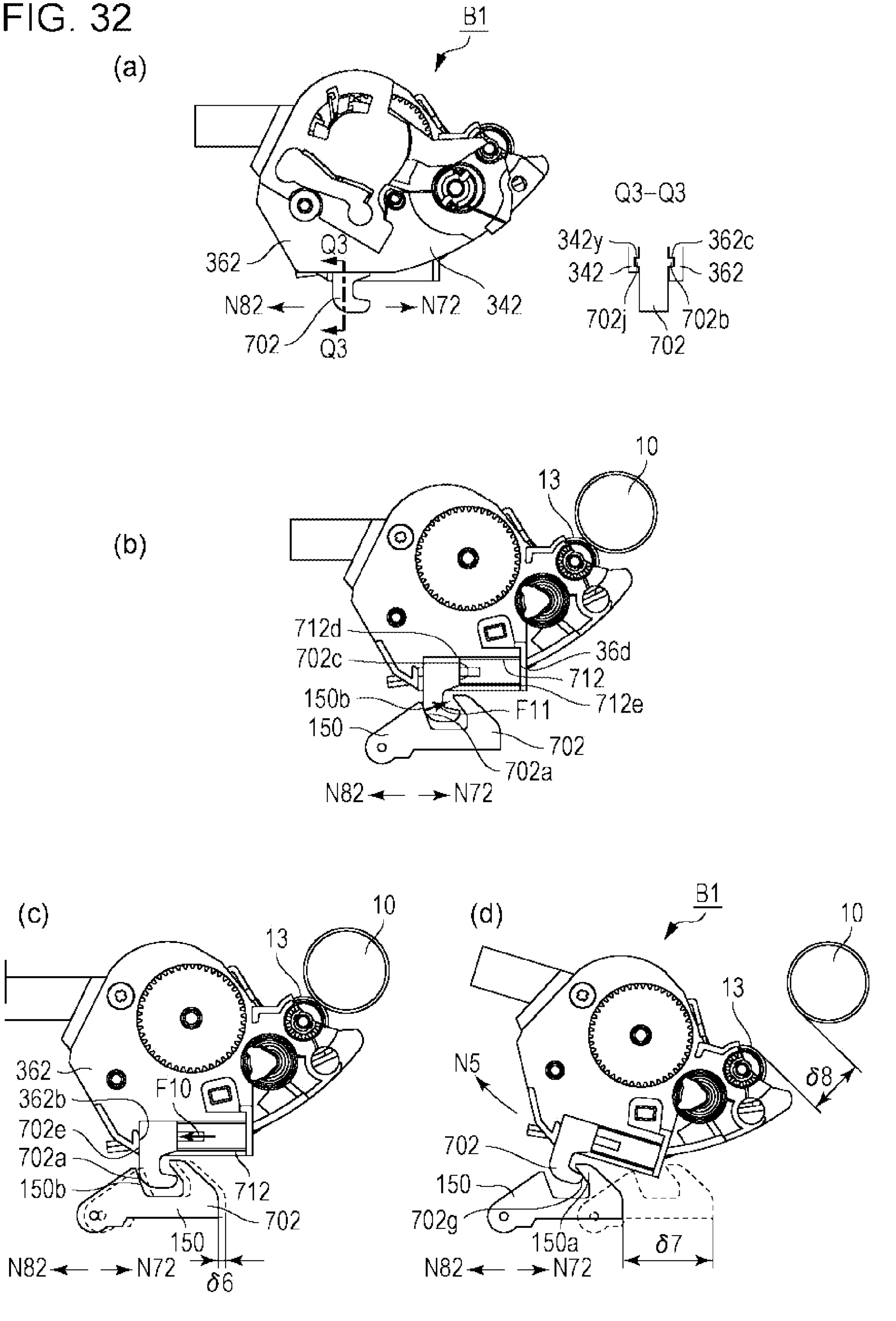
FIG. 32 includes a side views at a driving side of a developing cartridge and driving-side swing guide.

Next, a second embodiment will be described with reference to FIG. 32. FIG. 32 is side views viewing the developing cartridge B1 from the driving side.

Description has been made in the first embodiment regarding a configuration where the driving-side coontacting/spacing lever 70 is rotatably provided as to the driving-side developing bearing 36. However, a configuration may be made where a driving-side coontacting/spacing lever 702 is slidably provided as to a driving-side developing bearing 362, as illustrated in FIGS. 32(*a*) through 32(*d*). Descriptions which are not explained are of the same configuration as the first embodiment.

FIG. 32(*a*) is a side view viewing a state where the developing roller 13 is in contact with the photosensitive drum 10 from the driving side, and a cross-sectional view around the driving-side coontacting/spacing lever 702. A protrusion 702*b* of the driving-side coontacting/spacing lever 702 further engages a groove 362*c* of the driving-side developing bearing 362. A protrusion 702*j* of the driving-side coontacting/spacing lever 702 engages a groove 342*y* of a developing side cover 342. Accordingly, the driving-side coontacting/spacing lever 702 is capable of sliding (linear motion) in directions of arrows N72 and N82 with respect to the driving-side developing bearing 362 and developing side cover 342. A driving-side developing pressure spring 712 is provided with one end 712*d* in contact with a third contact face 702*c* of the driving-side coontacting/spacing lever 702 and the other end 712*e* in contact with a contact face 362*d* of the driving-side developing bearing 362. In this configuration, the developing cartridge B1 receives external force F11 by the second contact face 150*b* of the driving-side apparatus pressing member 150 and a first contact face 702*a* of the driving-side coontacting/spacing lever 702 coming into contact, in the same way as in the first embodiment, as illustrated in FIG. 32(*b*). As a result, the developing roller 13 comes into contact with the photosensitive drum 10 at a predetermined pressure.

Next, the operations of transitioning to a state where the developing roller 13 and the photosensitive drum 10 are spaced will be described. FIG. 32(*c*) illustrates a state where the driving-side apparatus pressing member 150 has moved in the direction of arrow N82 by a distance 86, and the first contact face 702*a* of the driving-side coontacting/spacing lever 702 and the second contact face 150*b* of the driving-side apparatus pressing member 150 have separated. At this time, the driving-side coontacting/spacing lever 702 receives biasing force F10 of the driving-side developing pressure spring 71, slides in the direction of arrow N82, and a restricting contact part 702*e* of the driving-side coontacting/spacing lever 702 comes into contact with the restricting part 362*b* of the driving-side developing bearing 362. Thus, the driving-side contacting/spacing lever 702 is positioned.

FIG. 32(*d*) illustrates a state where the driving-side apparatus pressing member 150 has moved in the direction of arrow N82 by a distance 87. Due to the driving-side apparatus pressing member 150 having further moved in the direction of arrow N82, a separated face 702*g* of the driving-side coontacting/spacing lever 702 comes into contact with the first contact face 150*a* of the driving-side apparatus pressing member 150, further moving the developing cartridge B1 in the direction of arrow N82. As a result, the developing cartridge B1 rocks in the direction of arrow N5, centered on the supported protrusion 80*g* of the swing guide 80 (omitted from illustration). At this time, the developing roller 13 and photosensitive drum 10 are in a spaced state, with a gap of distance δ8 therebetween.

The non-driving side is of the same configuration as the driving side. Other configurations are the same as those of the first embodiment, and the same advantages as the first embodiment can be yielded (excluding, however, the relationship between the positional error of the driving-side apparatus pressing member 150 and the amount of compression of the driving-side developing pressure spring 71 described in the first embodiment).

Third Embodiment

Next, a third embodiment to which the present invention has been applied will be described with reference to FIGS. 42(*a*) through 42(*d*). Descriptions which are not explained are of the same configuration as the first embodiment.

Figure 42:
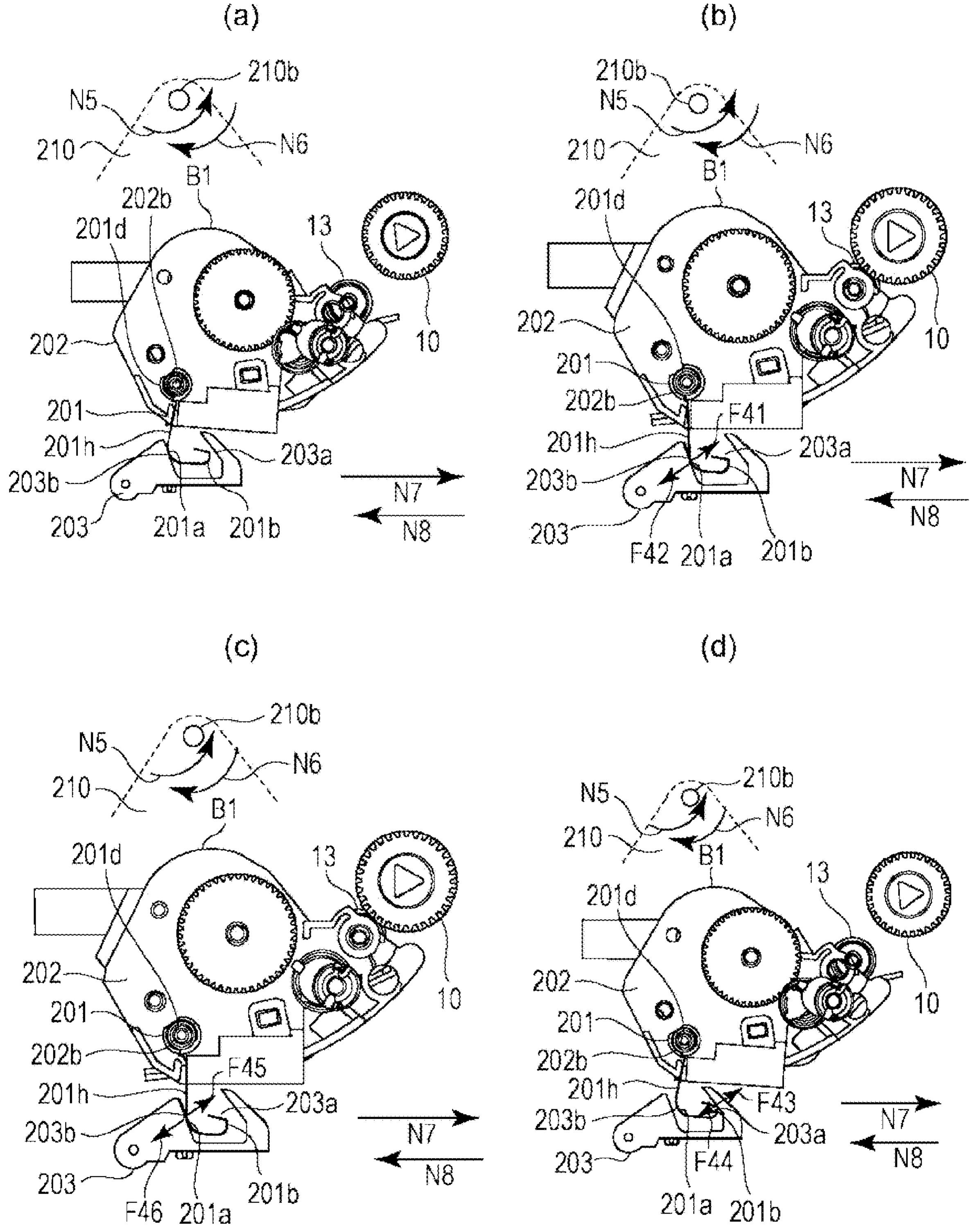
FIG. 42 includes side views at a driving side of a developing cartridge mounted to an apparatus main body.

FIG. 42 is schematic diagrams where a driving-side coontacting/spacing lever 201 is a leaf spring.

The driving-side coontacting/spacing lever 201 illustrated in FIGS. 42(*a*) through 42(*d*) is an elastic part formed of material such as stainless steel or the like. The driving-side coontacting/spacing lever 201 has a first contact face 201*a*, a second contact face 201*b*, a supporting part 201*d*, and an elastic deformation part 201*h*, with the supporting part 201*d* being supported by a supported part 202*b* of a bearing 202.

A driving-side apparatus pressing member 203 is provided with a first contact face 203*a* and a second contact face 203*b*, and is capable of sliding in the direction of arrow N7 and the direction of arrow N8.

The developing cartridge B1 is positioned by a driving-side swing guide 210 supported at a driving-side side plate (omitted from illustration) so as to be able of rocking in the directions of arrow N5 and arrow N6 centered on a supported part 210*b*. The non-driving side is the same, so the developing cartridge B1 is rotatable in the directions of arrow N5 and arrow N6 centered on the supported part 210*b*.

When pressuring the photosensitive drum 10 and developing roller 13 together, the driving-side apparatus pressing member 203 moves in the direction of arrow N7, as illustrated in FIG. 42(*a*). The second contact face 203*b* of the driving-side apparatus pressing member 203 comes into contact with the first contact face 201*a* of the driving-side coontacting/spacing lever 201.

Further, when the driving-side apparatus pressing member 203 moves in the direction of arrow N7, the second contact face 203*b* of the riving-side apparatus pressing member 203 deforms the elastic deformation part 201*h* of the driving-side coontacting/spacing lever 201, as illustrated in FIG. 42(*b*). In this state, the second contact face 203*b* of the driving-side apparatus pressing member 203 applies force F41 to the first contact face 201*a* of the driving-side coontacting/spacing lever 201. At this time, the second contact face 203*b* of the driving-side apparatus pressing member 203 receives reactive force F42. Now, the developing cartridge B1 is capable of rotating in the directions of the arrow N5 and arrow N6 centered on the supported part 201*b*, so the developing cartridge B1 is moved by the external force of force F41 in the direction of arrow N5. Accordingly, the developing roller 13 comes into contact with the photosensitive drum 10.

Further, when the driving-side apparatus pressing member 203 moves in the direction of arrow N7, the second contact face 203*b* of the driving-side apparatus pressing member 203 deforms the elastic deformation part 201*h* of the driving-side coontacting/spacing lever 201, as illustrated in FIG. 42(*c*). In this state, the second contact face 203*b* of the driving-side apparatus pressing member 203 applies force F45 to the first contact face 201*a* of the driving-side coontacting/spacing lever 201. At this time, the second contact face 203*b* of the driving-side apparatus pressing member 203 receives reactive force F46 from the first contact face 201*a* of the driving-side coontacting/spacing lever 201. Since the developing roller 13 is in contact with the photosensitive drum 10 and the attitude of the developing cartridge B1 is set,

F45>F41 holds, and the developing roller 13 is pressured against the photosensitive drum 10 as illustrated in FIG. 42(*c*).

In a case of spacing the photosensitive drum 10 and the developing roller 13, the driving-side apparatus pressing member 203 moves in the direction of arrow N8, as illustrated in FIG. 42(*d*). The first contact face 203*a* of the driving-side apparatus pressing member 203 comes into contact with the second contact face 201*b* of the driving-side coontacting/spacing lever 201.

Further, when the driving-side apparatus pressing member 203 moves in the direction of arrow N8, the first contact face 203*a* of the driving-side apparatus pressing member 203 applies force F44 to the second contact face 201*b* of the driving-side coontacting/spacing lever 201 while deforming the elastic deformation part 201*h* of the driving-side coontacting/spacing lever 201.

At this time, the first contact face 203*a* of the driving-side apparatus pressing member 203 receives reactive force F43 from the second contact face 201*b* of the driving-side coontacting/spacing lever 201. Now, the developing cartridge B1 is capable of rotating in the directions of arrow N5 and arrow N6 centered on the supported part 210*b*, so the developing cartridge B1 moves in the direction of arrow N6 centered on the supported part 210*b*, and the developing roller 13 is spaced from the photosensitive drum 10.

In this way, the elastic deformation part (elastic part) 201*h* and a part (movable part) having the first contact face 201*a* and second contact face 201*b* are integrally formed as a part of a single member in the present embodiment. Specifically, the driving-side coontacting/spacing lever 201 is formed of a leaf spring. Accordingly, there is no need for the driving-side developing pressure spring 71 (see FIG. 41(*a*)) serving as a biasing member that is a compression spring, illustrated in the first embodiment. Thus, space can be secured, so the degree of freedom of design of the developing cartridge B1 increases, or this leads to reduction in size.

Further, the driving-side contacting/spacing lever 201 has a pressured face (first contact face 201*a*) and separated face (second contact face 201*b*), as indicated in the first embodiment. The pressuring face (second contact face 203*b*) and separating face (first contact face 203*a*) of the driving-side apparatus pressing member 203 act thereupon, respectively. Accordingly, the contact state and the spaced state of the photosensitive drum 10 and developing roller 13 can be selected as necessary by the single part that is the driving-side coontacting/spacing lever 201. As a result, the configuration of the developing cartridge B1 can be simplified.

Although the driving side has been representatively described in the above description, the non-driving side may have the same configuration as well. Also, the driving-side coontacting/spacing lever 201 may be a member formed of an elastically deformable resin material or the like.

In any of the above-described embodiments, a configuration where the movable part and elastic part of the present embodiment are integrally formed as one part of one member can be applied.

Fourth Embodiment

Next, a fourth embodiment where the present invention has been applied will be described with reference to FIGS. 43(*a*) and 43(*b*). The placement of the part of the coontacting/spacing lever that receives biasing force from the spring according to the present embodiment differs from the above-described embodiments. Descriptions which are not explained are of the same configuration as the first embodiment.

Figure 43:
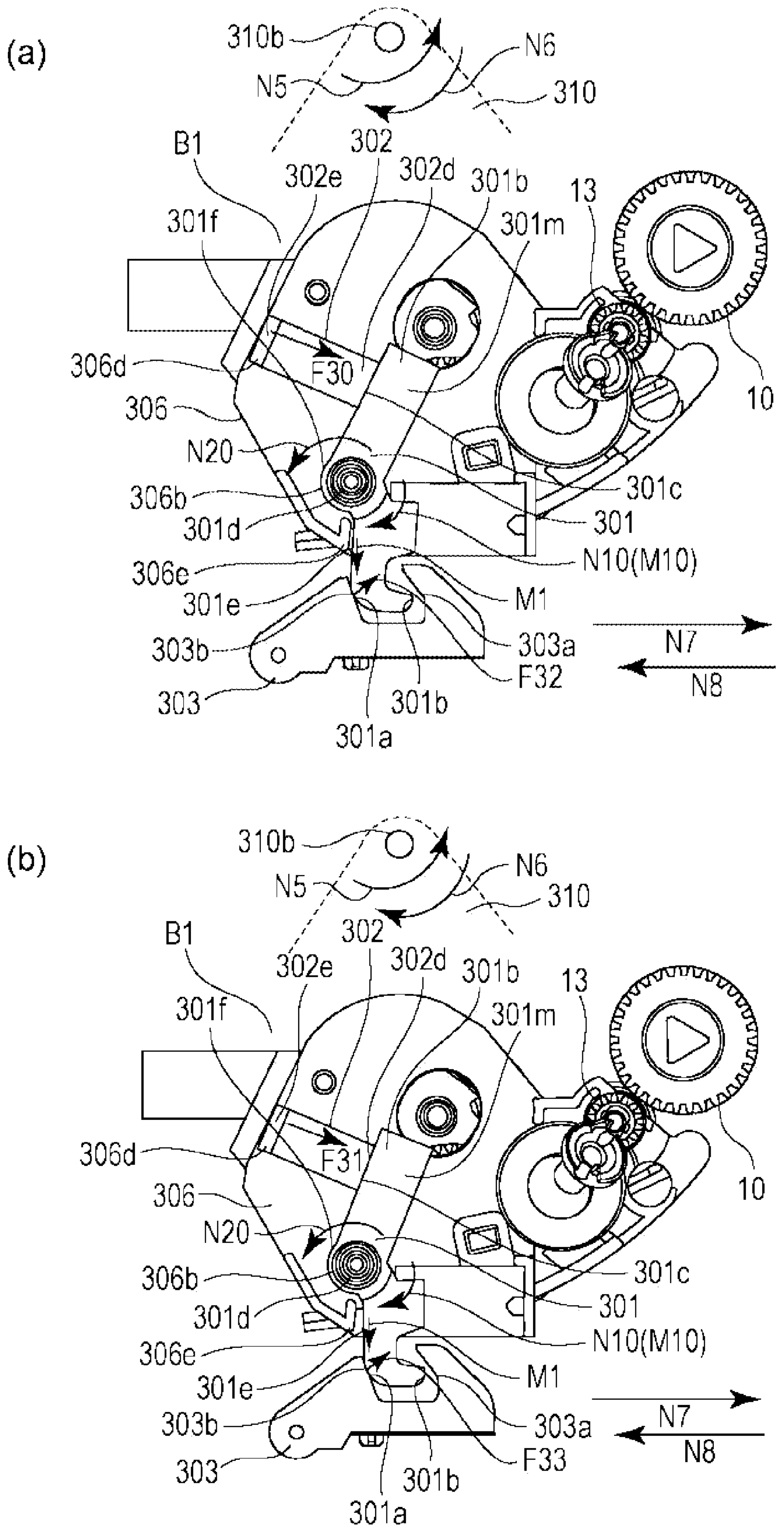
FIG. 43 includes side views at a driving side of a developing cartridge mounted to an apparatus main body.

FIG. 43 is schematic diagrams where a driving-side developing pressure spring 302 is disposed on the opposite side of a line that passes through the center of a supported part 301*d* of a driving-side coontacting/spacing lever 301 and is perpendicular to the direction of arrow M1 that is the direction of protrusion of a first protrusion 301*f*, in the direction of arrow M1.

As illustrated in FIG. 43(*a*), the driving-side coontacting/spacing lever 301 has a first contact face 301*a*, a second contact face 301*b*, a third contact face 301*c*, a supported part 301*d*, a restricting contact part 301*e*, and an other end portion 301*m*. The driving-side coontacting/spacing lever 301 is rotatably supported by a supporting part 306*b* as to a driving-side developing bearing 306 by a supported part 301*d*.

The driving-side developing pressure spring 302 is a compression spring, where one end portion 302*d* is in contact with the third contact face 301*c*, while an other end portion 302*e* is in contact with a contact face 306*d* provided to the driving-side developing bearing 306.

Now, in a solitary state of the developing cartridge B1, the driving-side coontacting/spacing lever 301 receives force at the third contact face 301*c*, in the direction of arrow F30 from the driving-side developing pressure spring 302. At this time, rotation occurs in the direction of arrow N10 centered on the supporting part 306*b*, and the restricting contact part 301*e* comes into contact with a restricting part 306*e* of the driving-side developing bearing 306.

Also, the developing cartridge B1 is positioned by the driving-side swing guide 310 that is supported so as to be capable of rocking in the directions of arrow N5 and arrow N6 centered on a supported part 310*b* of a driving-side side plate (omitted from illustration). The non-driving side is also the same, so the developing cartridge B1 is rotatable in the directions of arrow N5 and arrow N6 centered on the supported part 310*b*.

A first contact face 303*a* and a second contact face 303*b* are provided to a driving-side apparatus pressing member 303, capable of sliding in the directions of arrow N7 and arrow N8.

In a case of pressuring the photosensitive drum 10 and developing roller 13, the driving-side apparatus pressing member 303 moves in the direction of arrow N7. The second contact face 303*b* of the driving-side apparatus pressing member 303 then comes into contact with the first contact face 301*a* of the driving-side coontacting/spacing lever 301. The driving-side coontacting/spacing lever 301 is rotatable centered on the supporting part 306*b*, so the driving-side coontacting/spacing lever 301 rotates in the direction of N20, and the restricting contact part 301*e* separates from the restricting part 306*e*.

At this time, the third contact face 301*c* of the driving-side coontacting/spacing lever 301 receives the biasing force F30 of the driving-side developing pressure spring 302, and moment M10 in the direction of arrow N10 acts on the driving-side coontacting/spacing lever 301. At this time, the second contact face 303*b* of the driving-side apparatus pressing member 303 and the first contact face 301*a* of the driving-side coontacting/spacing lever 301 are in contact. Accordingly, the first contact face 301*a* of the driving-side coontacting/spacing lever 301 receives force F32 from the second contact face 303*b* of the driving-side apparatus pressing member 303, so that a moment balanced with the moment M10 will act on the driving-side coontacting/spacing lever 301. Accordingly, this means that an external force of the force F32 is acting on the developing cartridge B1.

Further, the developing cartridge B1 is capable of rotating in the directions of arrow N5 and arrow N6 centered on the supported part 310*b*, so the developing cartridge B1 moves in the direction of arrow N5 due to the external force of force F32. At this time, the developing roller 13 comes into contact with the photosensitive drum 10. The rotational attitude in the direction of arrow N5 of the developing cartridge B1 is decided by the developing roller 13 coming into contact with the photosensitive drum 10.

Further, when the driving-side apparatus pressing member 303 moves in the direction of arrow N7, the driving-side coontacting/spacing lever 301 rotates in the direction of N20 centered on the supporting part 306*b*, since the developing cartridge B1 cannot rotate in the direction of arrow N5. The third contact face 301*c* of the driving-side coontacting/spacing lever 301 then receives biasing force F31 of the driving-side developing pressure spring 302 (see FIG. 43(*b*)).

Now, the driving-side developing pressure spring 302 is further compressed, so

F31>F30 holds. The developing cartridge B1 is already incapable of rotating in the direction of arrow N5, so the developing roller 13 is pressured against the photosensitive drum 10.

In a case of spacing the photosensitive drum 10 and the developing roller 13, the driving-side apparatus pressing member 303 moves in the direction of arrow N8, and the first contact face 303*a* comes into contact with the second contact face 301*b*. The driving-side coontacting/spacing lever 301 is capable of rotating in the direction of arrow N10 centered on the supporting part 306*b*, so the restricting contact part 301*e* comes in contact with the restricting part 306*e* of the bearing 306, and the driving-side coontacting/spacing lever 301 is positioned.

When the driving-side apparatus pressing member 303 further moves in the direction of arrow N8, the developing cartridge B1 is rotatable in the directions of arrow N5 and arrow N6 centered on the supported part 310*b*, so the developing cartridge B1 moves in the direction of arrow N6 centered on the supported part 310*b*. The developing roller 13 is then spaced from the photosensitive drum 10.

In the present embodiment, the distance between the first contact face (force receiving part) 301*a* and third contact face (biasing force receiving part) 301*c* is longer than the distance between the first contact face 301*a* and the supported part 301*d*, when viewed from the rotational axis direction of the developing roller 13, as illustrated in FIGS. 43(*a*) and 43(*b*). Accordingly, the degree of freedom increases for placement of the positioning of a member equivalent to the driving-side developing pressure spring 71 serving as a biasing member that is a compression spring, described in the first embodiment, so freedom of design also increases.

Further, the driving-side coontacting/spacing lever 301 has the pressured face (first contact face 301*a*) and the separated face (second contact face 301*g*), as described in the first embodiment. The pressuring face (second contact face 303*b*) and the separating face (first contact face 303*a*) of the driving-side apparatus pressing member 303 act upon these, respectively. Accordingly, the contact state and the spaced state of the photosensitive drum 10 and developing roller 13 can be selected as necessary by the single part that is the driving-side coontacting/spacing lever 301. As a result, the configuration of the developing cartridge B1 can be simplified.

Figure 54:
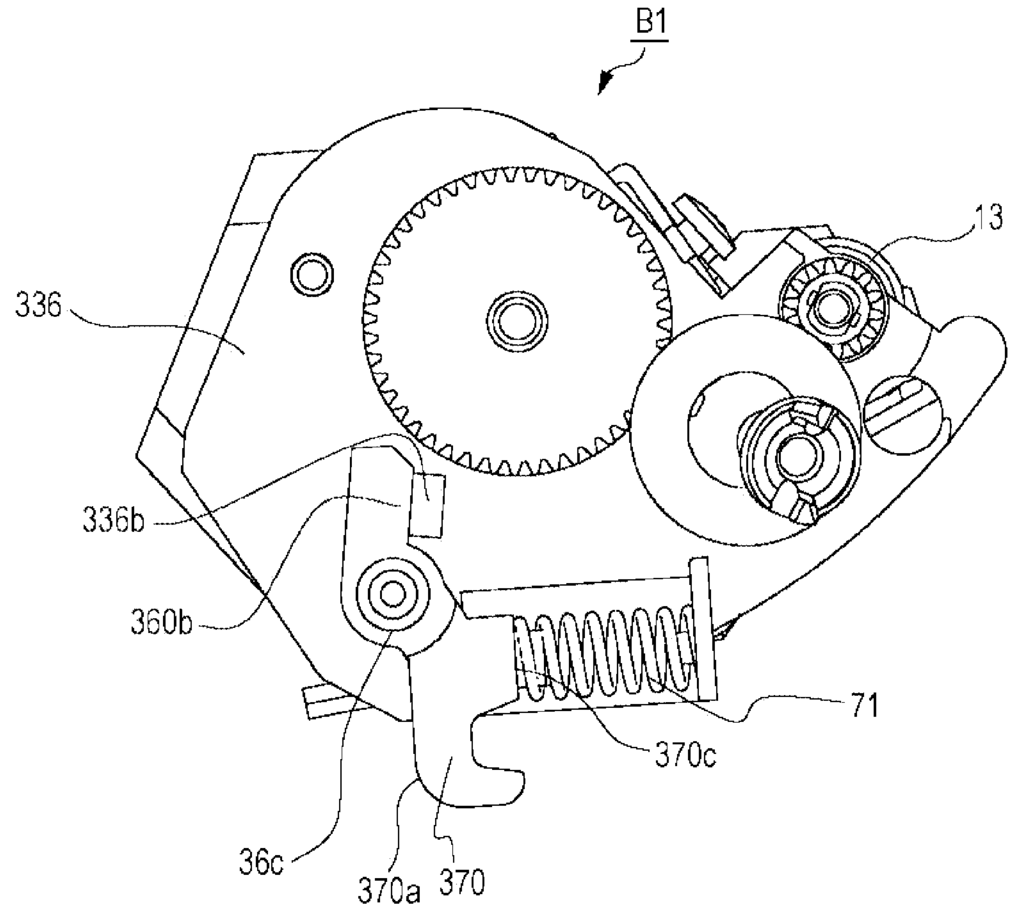
FIG. 54 is a side view at a driving side of a developing cartridge.

The following configuration may be made as a modification of the fourth embodiment. In the present modification, a restricting part 336*b* is provided to a driving-side developing bearing 336, as illustrated in FIG. 54. The position of the pressure spring 71 is the same as the first embodiment in the present embodiment, with a configuration where a protrusion (restricted part) 360*b* is provided across from the supporting part 36*c* so that the protrusion 360*b* comes into contact with the restricting part 336*b*. The configuration where the biasing force from the driving-side developing pressure spring 71 is received at a biasing force receiving part 370*c* is the same as in the first embodiment.

According to the present embodiment, the freedom of placement of the restricting part 336*b* within the driving-side developing bearing 336 increases. Increasing the distance from the supporting part 36*c* enables force applied to the restricting part 336*b* to be reduced, enabling suppression of container deformation. That is to say, the relationship between the first contact face 370*a* pressured from the second contact face 150*b* of the driving-side apparatus pressing member 150, the supporting part 36*c*, and the protrusion 360*b*, is as follows. The distance between the first contact face 370*a* and the protrusion 360*b* is longer than the distance between the first contact face 370*a* and the supporting part 36*c*, when viewed from the axis direction of the developing roller 13. Although the driving side has been representatively described in the above description, the non-driving side may have the same configuration as well.

Also, the placement of the third contact face (force receiving part) 301*c* according to the present embodiment and/or the restricting part 336*b* according to the present modification can be applied to any of the above-described embodiments.

Fifth Embodiment

Next, a fifth embodiment where the present invention has been applied will be described with reference to FIG. 50. The point of the present embodiment that the non-driving-side coontacting/spacing lever 72 is disposed at the non-driving side of the developing cartridge B1 alone differs from the above-described embodiments. Descriptions which are not explained are of the same configuration as the first embodiment.

Figure 50:
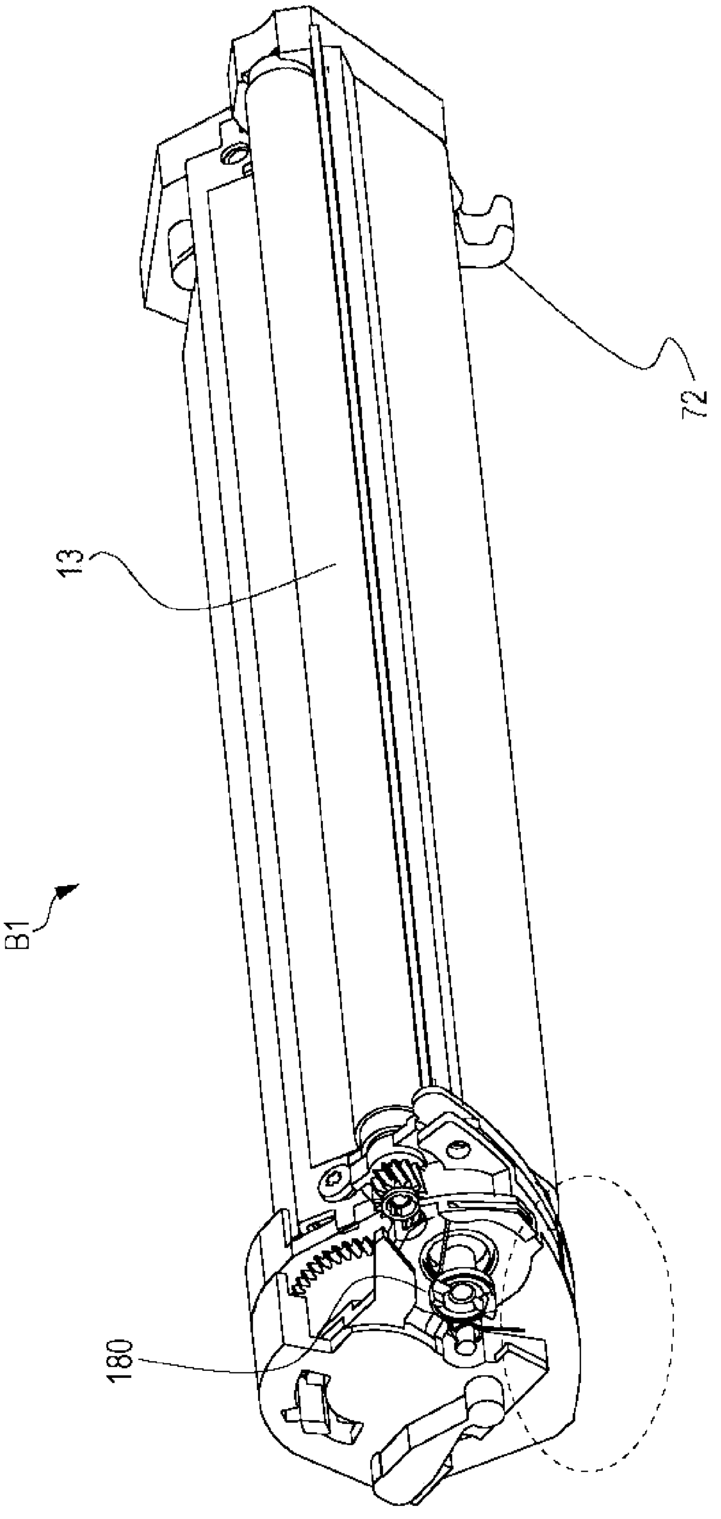
FIG. 50 is a perspective view of a developing cartridge.

The driving-side coontacting/spacing lever 70 and driving-side developing pressure spring 71 are not provided to the driving side of the developing cartridge B1 according to the present embodiment, as illustrated in FIG. 50 (part in dotted line). On the other hand, the non-driving-side coontacting/spacing lever 72 and non-driving-side developing pressure spring 73 (omitted from illustration) are provided just to the non-driving side. That is to say, the non-driving-side coontacting/spacing lever 72 and non-driving-side developing pressure spring 73 are disposed only at the side where the coupling member 180 of the developing frame is not disposed, with regard to the direction of the rotational axis of the developing roller 13. Note that the side where the coupling member 180 of the developing frame is not disposed with regard to the direction of the rotational axis of the developing roller 13 refers to the side from the middle of the cartridge B1 on which the coupling member 180 is not disposed, with regard to the direction of the rotational axis of the developing roller 13.

The coupling member 180 rotates in the direction of arrow X6 at the driving side, as illustrated in FIG. 8. The developing cartridge B1 that has received the rotational force thereof rocks centered on the supporting part 90*c* (see FIG. 27(*a*)) in the direction of arrow N6 illustrated in FIG. 27(*a*), integrally with the driving-side swing guide 80. When there is sufficient moment in the direction N6 generated by the driving force that the coupling member 180 receives, this alone is sufficient to pressure the developing roller 13 against the photosensitive drum 10 at the driving side.

On the other hand, the moment in the direction N6 generated by the driving force that the coupling member 180 receives obtained at the non-driving side as not a great as that at the driving side, so the configuration uses the non-driving-side coontacting/spacing lever 72 in the same way as in the first embodiment.

The configuration according to the present embodiment where the non-driving-side coontacting/spacing lever 72 is provided at only the non-driving side can be applied to any of the above-described embodiments. Application of the present embodiment can realize reduced costs due to reduction in the number of parts from having omitted the driving-side coontacting/spacing lever 70.

Sixth Embodiment

A sixth embodiment where the present invention has been applied will be described with reference to FIGS. 51(*a*) through 52(*b*). The point of the present embodiment that a first force receiving part that receives force when bringing the developing roller 13 into contact is provided at only one end of the cartridge B1, and a second force receiving part that receives force at the time of spacing the developing roller 13 is provided only at the other end, differs from the above-described embodiments. Descriptions which are not explained are of the same configuration as the first embodiment.

Figure 51:
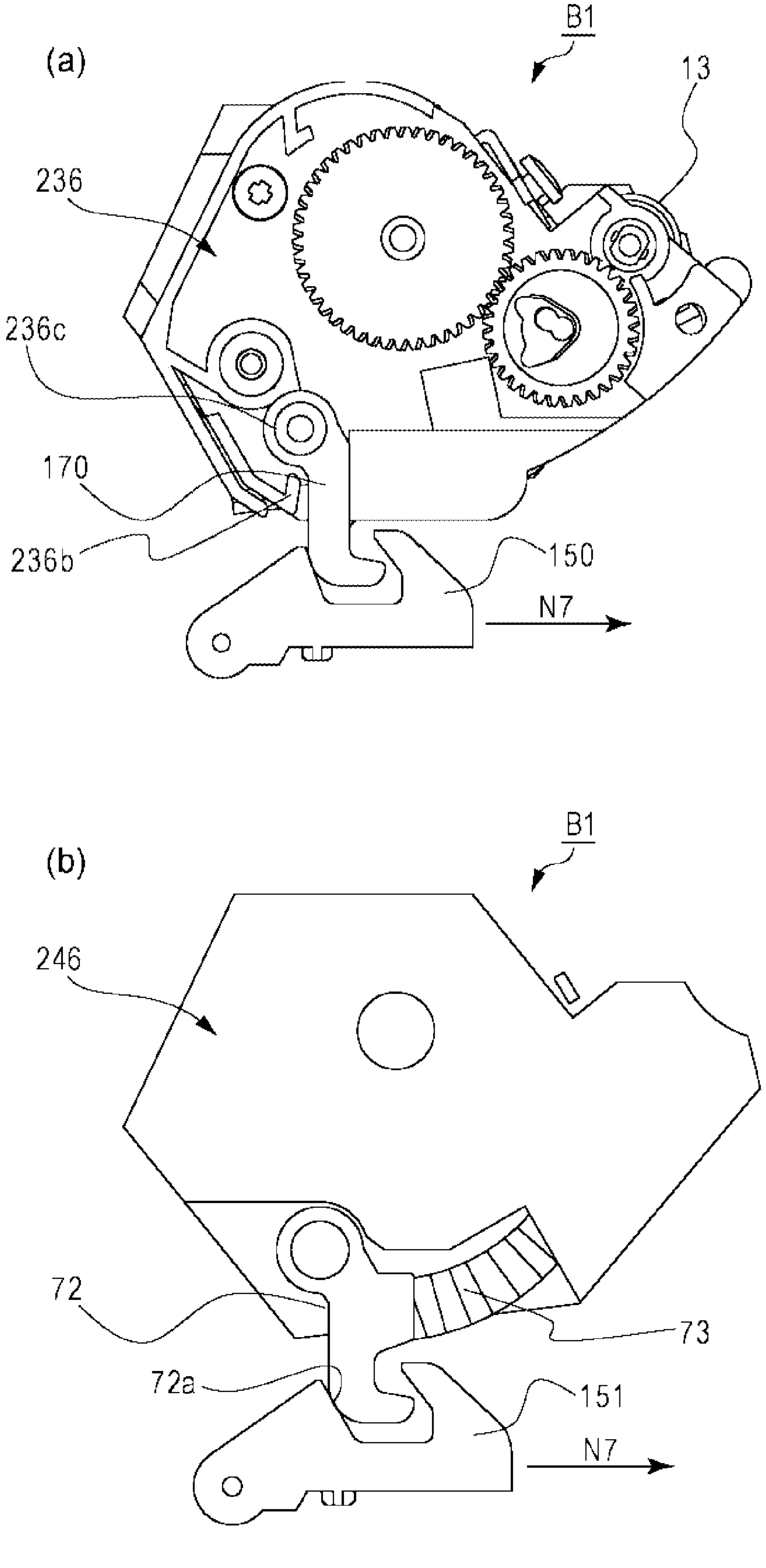
FIG. 51 includes a side view at a driving side and a side view at a non-driving side, of a developing cartridge mounted to an apparatus main body.

FIG. 51 is diagrams illustrating the developing roller 13 being in contact with the photosensitive drum 10. FIG. 51(*a*) is a diagram illustrating a driving-side coontacting/spacing lever 170 and a driving-side bearing 236 that supports it, and FIG. 51(*b*) is a diagram illustrating the non-driving-side coontacting/spacing lever 72 and a non-driving-side developing bearing 246 that supports it.

The driving-side coontacting/spacing lever 170 is rotatably supported by the driving-side bearing 236 at the driving side, which is the other end with regard to the direction of the rotational axis of the developing roller 13, as illustrated in FIG. 51. However, the driving-side developing pressure spring 71 such as illustrated in the first embodiment is not provided. Accordingly, when the driving-side apparatus pressing member 150 moves in the direction of arrow N7, the driving-side coontacting/spacing lever 170 rotates in the counterclockwise direction centered on a supporting part 236*c*. However, force pressing the developing roller 13 against the photosensitive drum 10 cannot be imparted to the driving-side developing bearing 236 for operation of the driving-side coontacting/spacing lever 170. However, the driving side receives moment in the direction that brings the developing roller 13 into contact with the photosensitive drum 10, due to the coupling member 180 receiving driving force, as in the fifth embodiment. Accordingly, the developing roller 13 can be pressured against the photosensitive drum 10 by this moment.

On the other hand, the non-driving-side contacting/spacing lever 72, the same as in the first embodiment, is provided to the non-driving side, which is the other end with regard to the direction of the rotational axis of the developing roller 13. The first contact face 72*a* of the non-driving-side coontacting/spacing lever 72 presses the non-driving-side developing pressure spring 73 by being pressed by the non-driving-side apparatus pressing member 151 that moves in the direction of N7 and rotating, thereby pressuring the developing roller 13 against the photosensitive drum 10.

Figure 52:
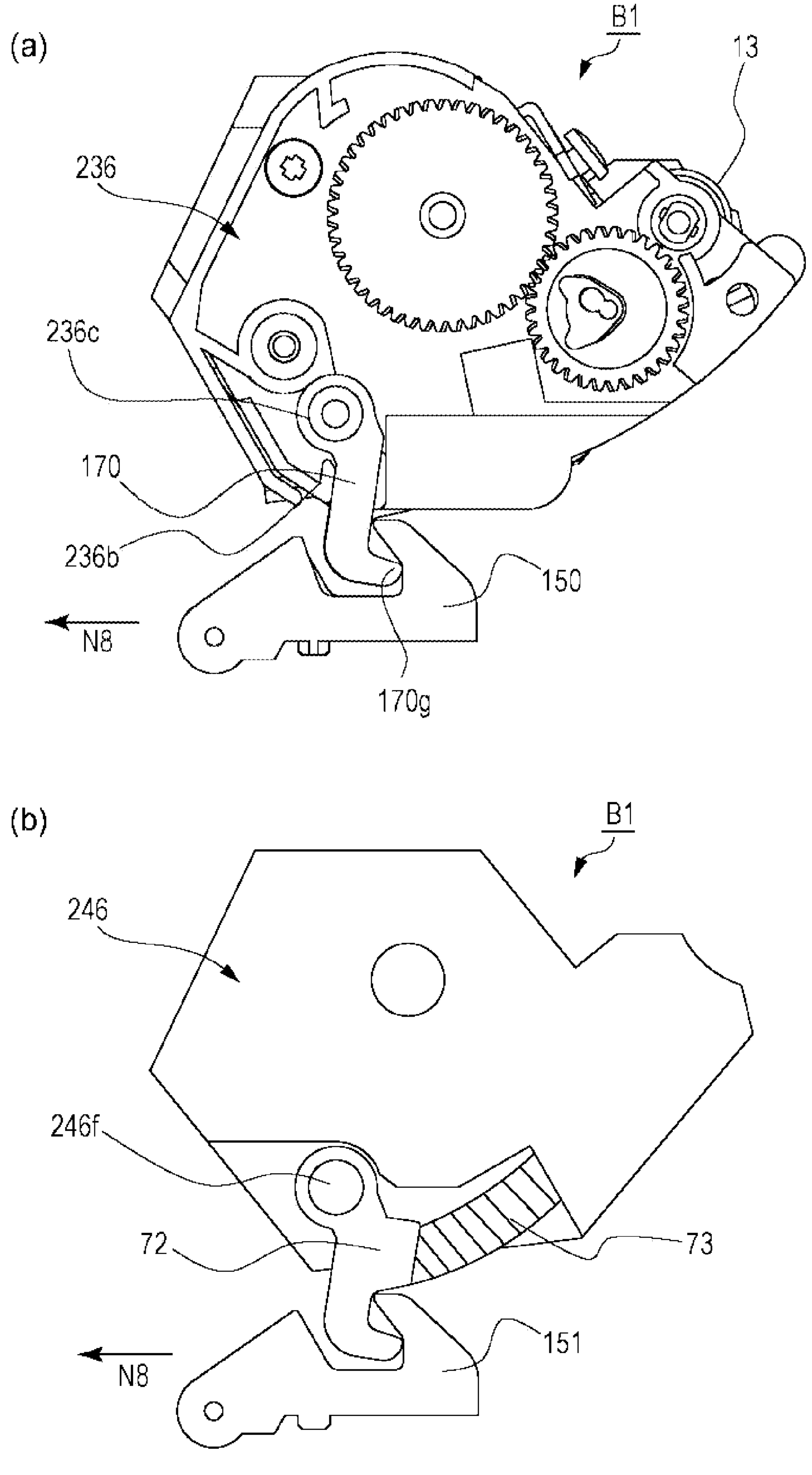
FIG. 52 includes a side view at a driving side and a side view at a non-driving side, of a developing cartridge mounted to an apparatus main body.

FIG. 52 is diagrams illustrating the developing roller 13 being spaced from the photosensitive drum 10.

The driving-side apparatus pressing member 150 moving in the direction of arrow N8 brings the driving-side coontacting/spacing lever 170 into contact with a restricting part 236*b* of the driving-side developing bearing 236. The driving-side apparatus pressing member 150 further moving in the direction of arrow N8 presses a separated part 170*g* of the driving-side coontacting/spacing lever 170, which moves the developing cartridge B1, and spaces the developing roller 13 from the photosensitive drum 10.

Note that a configuration may be made where the driving-side coontacting/spacing lever 170 is fixed to the driving-side bearing 236, or a part equivalent to the separated part 170*g* may be formed integrally with the driving-side developing bearing 236.

On the other hand, the non-driving side does not have the restricting part 46*e* for the non-driving-side coontacting/spacing lever 72 illustrated in the first embodiment. Accordingly, moving the non-driving-side apparatus pressing member 151 in the direction of arrow N8 only rotates the non-driving-side coontacting/spacing lever 72 in the clockwise direction centered on a supporting part 246*f*, and does not act to space the developing roller 13 from the photosensitive drum 10. The non-driving-side developing pressure spring 73 is at its natural length at this time. The non-driving-side developing pressure spring 73 may be separated from the non-driving-side coontacting/spacing lever 72 at this time.

However, force for spacing is being received at the driving side, so spacing can be performed at the non-driving side as well, by setting the rigidity of the driving-side bearing 236 to a certain level or higher. At the time of this spacing, the developing roller 13 may be spaced from the photosensitive drum 10 in an oblique manner. That is to say, the developing roller 13 spaces greatly from the photosensitive drum 10 at the driving side, but the amount of spacing at the non-driving side is smaller than at the driving side. Accordingly, the rigidity of the driving-side bearing 236 is increased so that the spacing amount is equal to or greater than a minimal value for the spacing amount necessary between the developing roller 13 and the photosensitive drum 10. Thus, the first force receiving part (first contact face 72*a*) that receives force at the time of bringing the developing roller 13 into contact is provided only at one end of the cartridge B1 in the present embodiment. Further, the second force receiving part (separated part 170*g*) receiving force when spacing the developing roller 13 is only provided at the other end of the cartridge B1. That is to say, two parts (first force receiving part and second force receiving part) that receive force from different directions (opposite directions) from the apparatus main body, which are the force at the time of bringing the developing roller 13 into contact and the force at the time of spacing the developing roller 13, are provided to the developing cartridge B1. Further, these two parts (the first force receiving part and the second force receiving part) as provided to one end and the other end of the developing cartridge B1, with respect to the direction of the rotational axis of the developing roller 13.

The configuration of the first force receiving part and the second force receiving part according to the present embodiment can be applied to any of the above-described embodiments as well, excluding the fifth embodiment.

According to the present embodiment, the driving-side developing pressure spring 71 becomes unnecessary, so reduced costs can be realized as compared to the first embodiment. Also, the amount of motion of the developing cartridge B1 when spacing can be smaller at the non-driving side, so wear on the non-driving-side swing guide 81 movably supporting the developing cartridge B1 can be suppressed.

Seventh Embodiment

Figure 53:
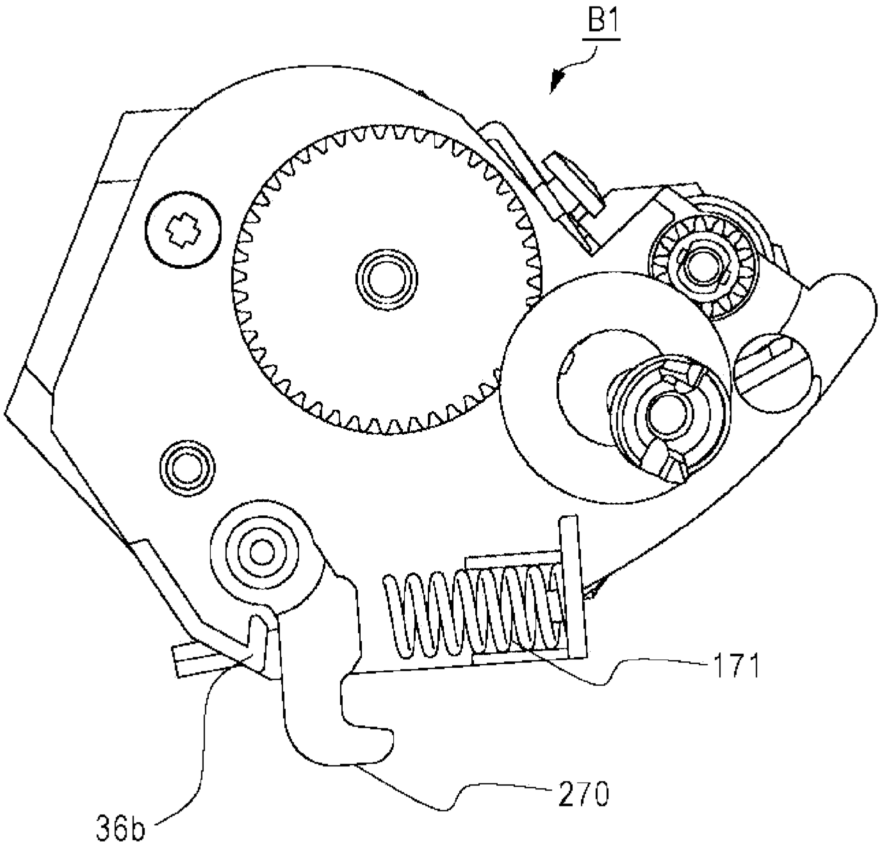
FIG. 53 is a side view at a driving side of a developing cartridge.

Next, a seventh embodiment where the present invention has been applied will be described with reference to FIG. 53. Descriptions which are not explained are of the same configuration as the first embodiment.

A configuration has been described in the first embodiment where the driving-side coontacting/spacing lever 70 and the non-driving-side coontacting/spacing lever 72 are positioned in a state of being held between the restricting parts 36*b* and 46*e* and the pressure springs 71 and 73. However, a configuration may be made where a driving-side coontacting/spacing lever 270 is not positioned between a driving-side developing pressure spring 171 and the restricting part 36*b* (the same configuration may be made at the non-driving side as well), as illustrated in FIG. 53. According to this configuration, application can be made to a case where the free length of the driving-side developing pressure spring 171 is short.

The spacing lever 270 comes into contact with the restricting part 36*b* due to the action of the driving-side apparatus pressing member 150 moving in the direction N7 (see FIG. 28). The spacing lever 270 also compresses the pressure spring 171 due to the action of moving in the direction N8. Now, the restricting part 36*b* is provided at a position where it can restrict the driving-side coontacting/spacing lever 70 from moving in a direction away from the developing roller 13.

The configuration of the present embodiment can be applied to any of the above-described embodiments.

Eighth Embodiment

An eighth embodiment where the present invention has been applied will be described with reference to FIGS. 55(*a*) through 56(*b*). The configuration of the coupling member according to the present embodiment differs from that in the above-described embodiments. Descriptions which are not explained are of the same configuration as the first embodiment.

In the first embodiment, the coupling member 180 can be engaged with the main body drive member 100 that is rotating, and the coupling member 180 disengaged from the main body drive member 100 that is rotating, without providing a clutch mechanism at the apparatus main body A1 side. As for a specific configuration to this end, this has been achieved by a configuration where the coupling member 180 can be inclined.

A coupling configuration will be described in the present embodiment that can engage and disengage the main body drive member 100 that is rotating, without providing a clutch mechanism at the apparatus main body A1 side, as in the first embodiment.

Figure 55:
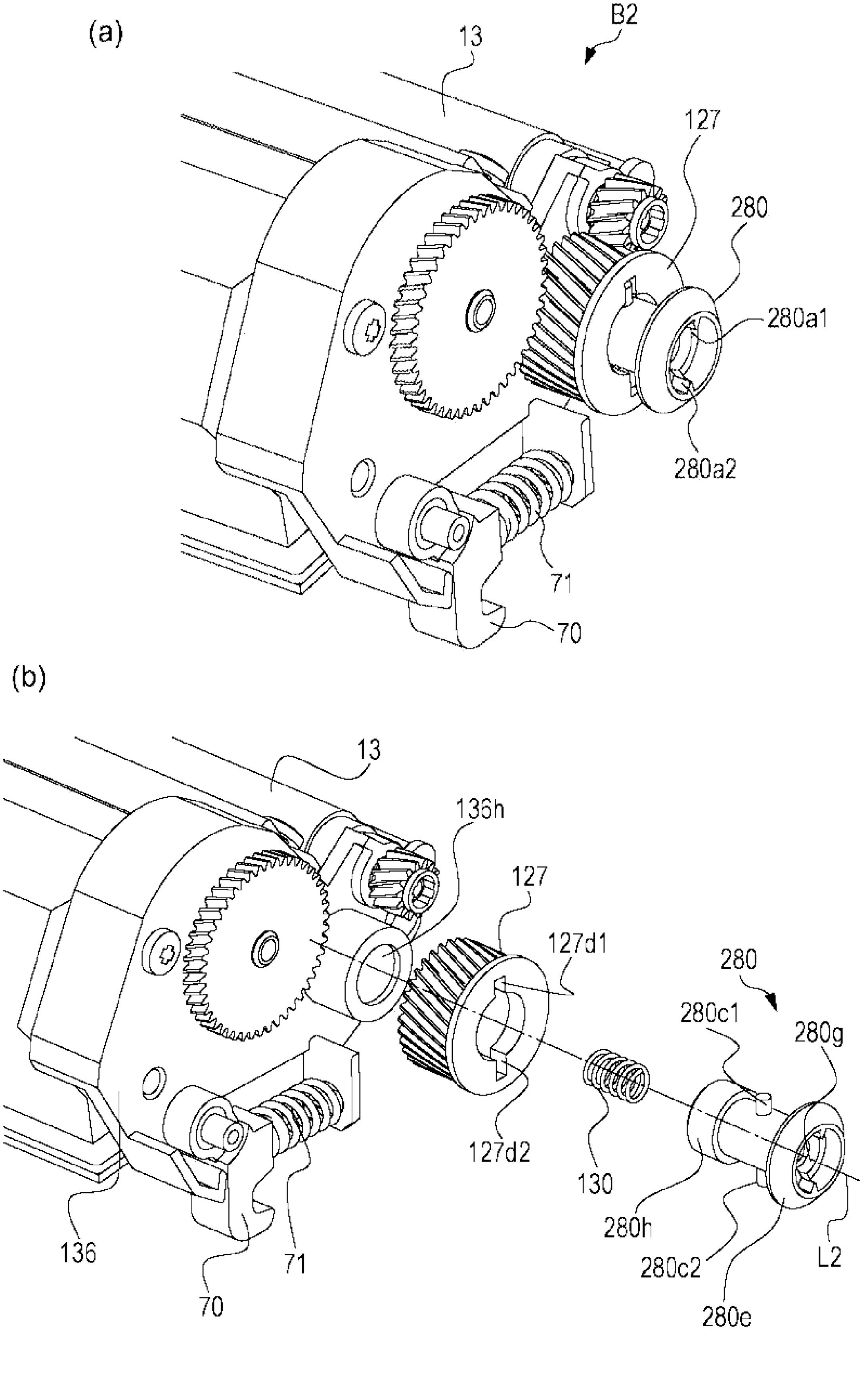
FIG. 55 includes perspective views at a driving side of a developing cartridge.

FIG. 55(*a*) is a perspective view illustrating a coupling member 280 provided to a developing cartridge B2 according to the present embodiment. The developing side cover 34 is omitted from illustration. FIG. 55(*b*) is a perspective view illustrating a state in which the coupling member 280 is being assembled.

The coupling member 280 is configured to be capable of advancing and retreating in the direction of rotational axis L2 of the coupling member 280 within the drive input gear 127. A biasing member 130 is disposed between the coupling member 280 and the drive input gear 127, and the coupling member 280 is constantly biased toward the outward side in the direction of axis L2. Rotational force receiving parts 280*a*1 and 280*a*2 provided to the coupling member 280 receive driving force from the main body side drive member 100 (see FIGS. 8(*a*) through 8(*e*)). Further, rotational force transmitting parts 280*cl* and 280*c*2 transmit driving to the developing roller 13 by transmitting driving force to rotational force transmitted parts 127*d*1 and 127*d*2 of the drive input gear 127.

An external conical face 280*e* is provided on the tip side of the coupling member 280. This part coming into contact with the tip end face of the main body side drive member 100 (see FIGS. 8(*a*) through 8(*e*)) causes retracting to the inner side in the direction of axis L2, and engagement with the main body side drive member 100. A conical part 280*g* is provided on the inner side of the external conical face 280*e*, in the same say as in the first embodiment, so coming into contact with the tip end face of the main body side drive member 100 causes retracting to the inner side in the direction of axis L2, and disengagement from the main body side drive member 100, in the same way.

According to the above configuration, engagement and disengagement to and from the main body drive member 100 that is rotating is enabled, without providing a clutch mechanism to the apparatus main body A1 side.

The driving-side coontacting/spacing lever 70 and driving-side developing pressure spring 71 are also provided in the same way as the first embodiment.

Figure 56:
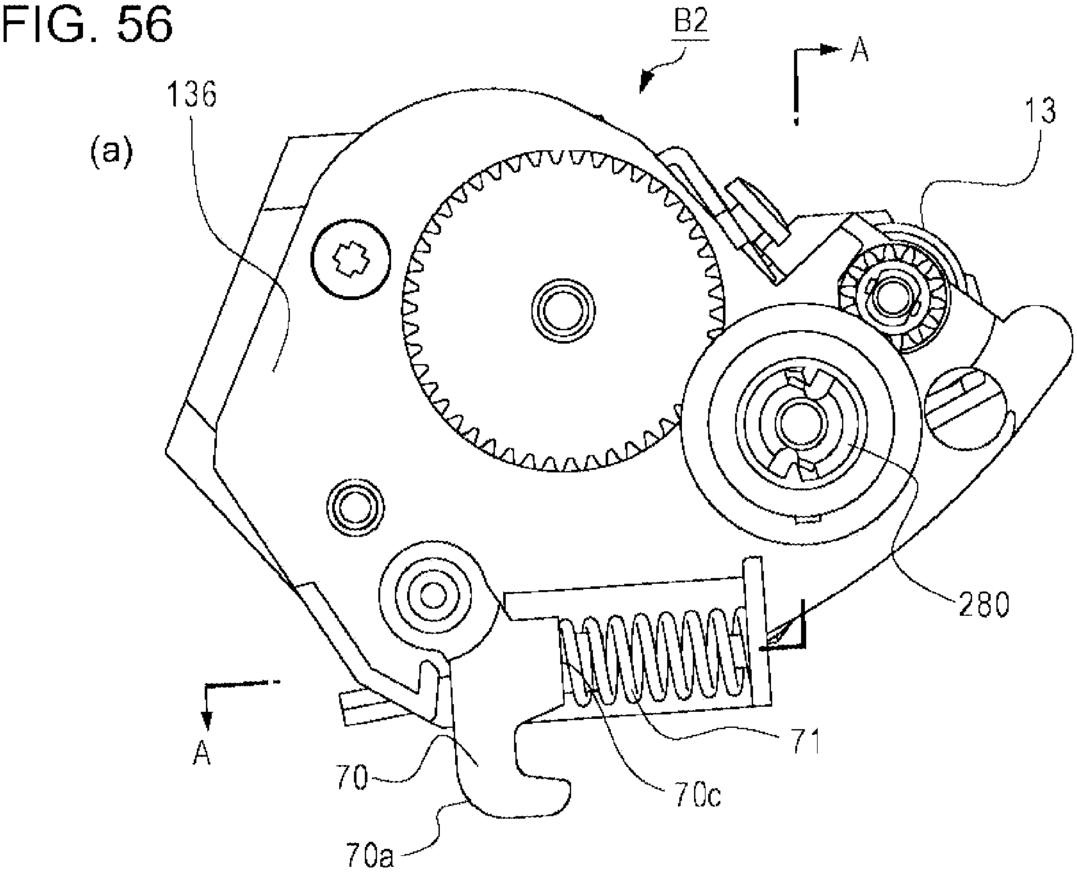
FIG. 56 includes a side view and cross-sectional view at a driving side of a developing cartridge.
Figure 56:
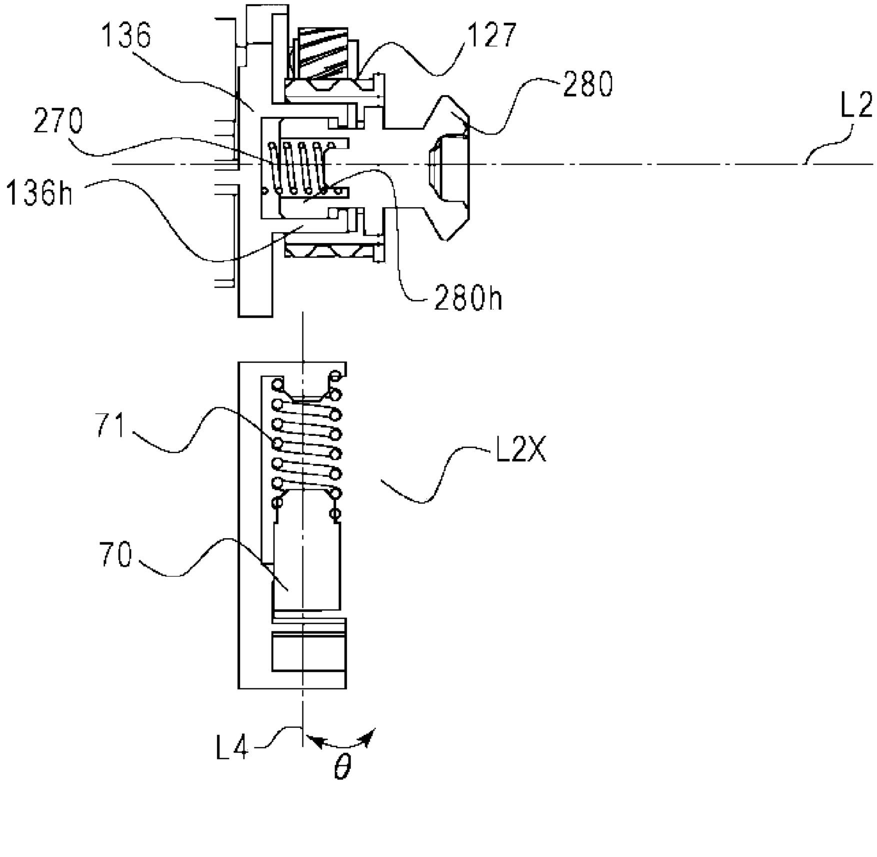

FIG. 56(*a*) is a frontal view of the present embodiment, and FIG. 56(*b*) is a cross-sectional view along A-A in FIG. 56(*a*).

The coupling member 280 is supported by the biasing member 130 so as to be movable in the direction of the axis L2. A cylindrical outer diameter part 280*h* (sliding part) provided to the coupling member 280 is slidably supported within a cylindrical inner diameter part (slid part) 136*h* within a driving-side developing bearing 136.

As illustrated in FIG. 56(*b*), the cylindrical outer diameter part 280*h* (sliding part) and the cylindrical inner diameter part (slid part) 136*h* are disposed overlapping at least partially with the driving-side developing pressure spring 71 in the direction of axis L2. Accordingly, moment that twists the driving-side developing bearing 136 being generated by the force that the driving-side developing pressure spring 71 generates, and this affecting deformation regarding the sliding parts 280*h* and 136*h*, can be suppressed. Thus, the advancing and retracting of the coupling member 280 in the direction of the axis L2 can be kept from being impeded.

Also, a plane L2X orthogonal to the biasing direction L2 of the biasing member 130 will be defined. Thus, the angle θ formed by the biasing direction L4 of the driving-side developing pressure spring 71 and the plane L2X preferably is in the range of $-45°\leq\theta\leq+45°$ (−45° or greater but +45° or smaller). Further preferable is $-10°\leq\theta\leq+10°$ (−10° or greater but +10° or smaller). Most preferable is $\theta\approx0°$ (0° or substantially 0°). Thus, the influence that the biasing member 130 has on the biasing force of the driving-side developing pressure spring 71 can be suppressed. That is to say, while the coupling member 280 is receiving transmission of driving from the main body side drive member 100, the biasing member 130 is constantly in a biasing state. At this time, the influence on the driving-side developing pressure spring 71 is reduced if the force component generated by the biasing member 130 does not act in the direction of the driving-side developing pressure spring 71 very much, and precision of pressuring force improves.

The configuration of the coupling member 280 according to the present embodiment can be applied to any of the above-described embodiments, and the relationship between biasing directions LA and L2 be realized as in the present embodiment.

Ninth Embodiment

A ninth embodiment where the present invention has been applied will be described with reference to FIGS. 57(*a*) and 57(*b*). The present embodiment differs from the above-described embodiments with regard to the point that it does not have a restricting part. Descriptions which are not explained are of the same configuration as the first embodiment.

The cartridge B1 according to the present embodiment does not have an equivalent member to the restricting part 36*b* in the first embodiment provided to a driving-side developing bearing 436. Accordingly, elastic force of a spring 471 is used in a case of spacing the developing roller 13 from the photosensitive drum 10.

Figure 57:
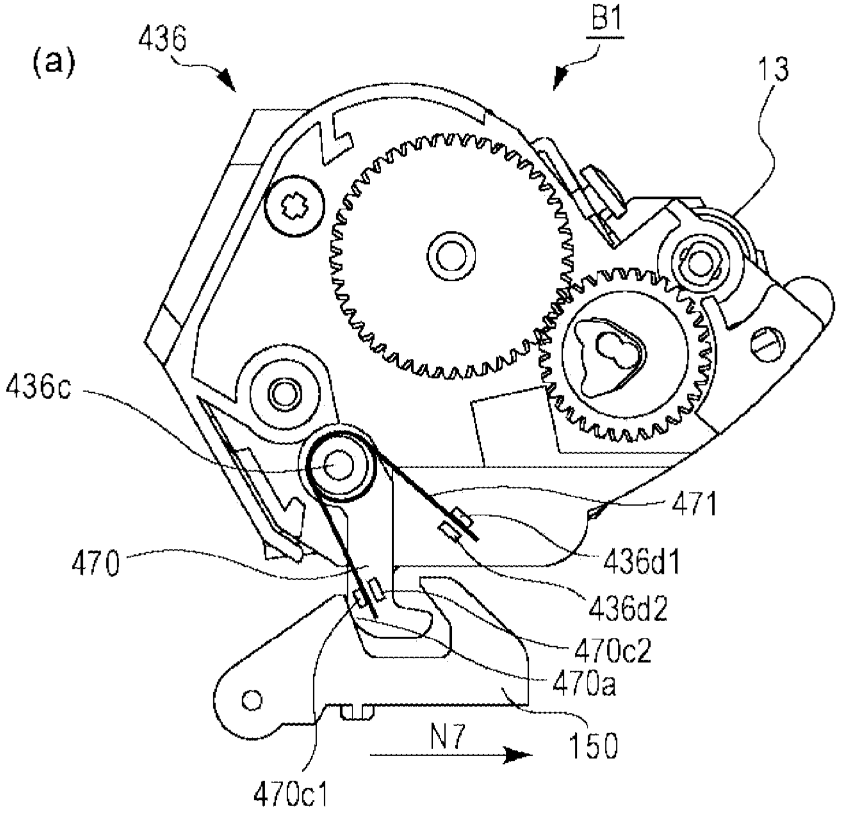
FIG. 57 includes a side view at a driving side and a side view at a non-driving side of a developing cartridge mounted to an apparatus main body.
Figure 57:
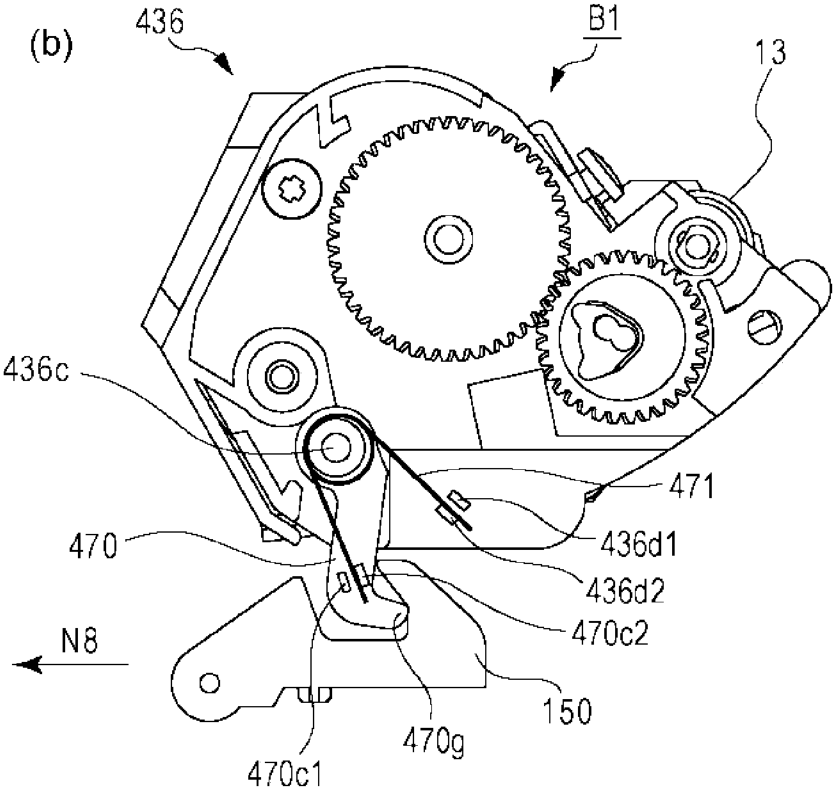

One end of the spring 471 that is a torsion coil spring engages the driving-side developing bearing 436 by being held between engaging parts 436*d*1 and 436*d*2 of the driving-side developing bearing 436 as illustrated in FIGS. 57(*a*) and 57(*b*). On the other hand, the other end of the spring 471 engages the driving-side coontacting/spacing lever 470 by being held between engaging parts 470*cl* and 470*c*2 of the driving-side coontacting/spacing lever 470.

FIG. 57(*a*) is a diagram illustrating a state where the developing roller 13 is in contact with a photosensitive drum omitted from illustration. A first contact face 470*a* of the driving-side coontacting/spacing lever 470 is pressed in the direction of N7 by the driving-side apparatus pressing member 150, so the developing roller 13 is in a state of being in contact with the photosensitive drum in a state where the spring 471 is compressed. At this time, one end of the spring 471 abuts the engaging part 436*d*1, and the other end of the spring 471 abuts the engaging part 470*cl*, so the driving-side coontacting/spacing lever 470 receives biasing force from the spring 471 via the engaging part 470*c*1. Accordingly, an appropriate contact pressure can be maintained between the developing roller 13 and photosensitive drum.

FIG. 57(*b*) is a diagram illustrating a state where the developing roller 13 is spaced from the photosensitive drum. The separated part 470*g* of the driving-side coontacting/spacing lever 470 being pressed by the driving-side apparatus pressing member 150 in the direction N8 causes one end of the spring 471 to abut the engaging part 436*d*2, and the other end of the spring 471 to abut the engaging part 470*c*2. Accordingly, the spring 471 is in a state of being stretched beyond its natural length.

Thus, the elasticity of the spring 471 can be used to move the driving-side developing bearing 436 to move in the direction of the developing roller 13 spacing from the photosensitive drum. Thus, the developing roller may be spaced from the photosensitive drum by using the elastic force of the spring, by stretching the spring beyond its natural length.

The configuration of the present embodiment can be applied to any of the above-described embodiments.

<Other Items>

Note that in the above-described embodiments, the configuration has been such that the developing cartridge B1 or B2 and the drum cartridge C are separated. That is to say, the configuration has been such that the developing device is formed as a cartridge, as the developing cartridge B1 or B2, space from the photosensitive drum 10, and mounted/detached to/from the apparatus main body of the image forming apparatus. However, the above-described embodiments are applicable to configurations other than these.

For example, each configuration of the above-described embodiments is applicable to a configuration where the developing cartridge B1 or B2 and the drum cartridge C are not separated. That is to say, this may be a configuration where a process cartridge, configured by rotatably joining the developing cartridge B1 or B2 (developing device) to the drum cartridge C, is mounted/detached to/from the apparatus main body of the image forming apparatus. That is to say, the process cartridge has the photosensitive drum 10 and a developing device. This process cartridge has the first movable member 120 and the second movable member 121, the same as each of the embodiments.

Figure 49:
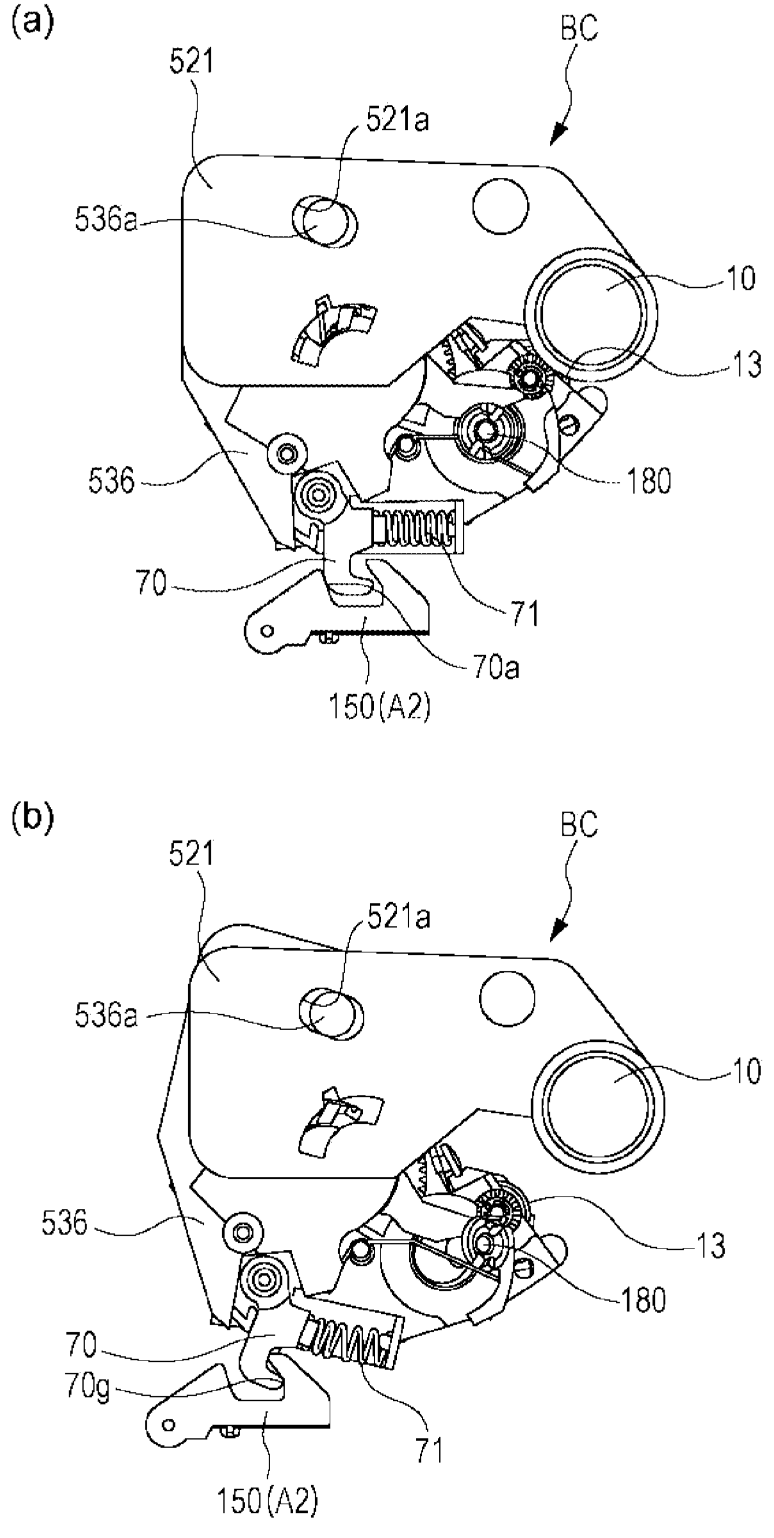
FIG. 49 includes side views at a driving side of a developing cartridge mounted to an apparatus main body.

An example of a process cartridge will be described below. FIGS. 49(*a*) and 49(*b*) are diagrams of a process cartridge BC mounted to an apparatus main body A2, viewed from the direction of the rotational axis of the developing roller 13. FIG. 49(*a*) illustrates a state where the developing roller 13 is in contact with the photosensitive drum 10, and FIG. 49(*b*) illustrates a state where the developing roller 13 is spaced from the photosensitive drum 10.

FIG. 49 illustrate the driving-side apparatus pressing member 150 as part of the apparatus main body A2. The apparatus main body A2 has the same configuration as the apparatus main body A1 described in the above-described embodiments, except for the point of having a guide member (omitted from illustration) to guide mounting/detaching of the process cartridge BC, and the point that there is no driving-side swing guide 80 or non-driving-side swing guide 81. The same non-driving-side apparatus pressing member 151 as that in the apparatus main body A1 is provided to the non-driving side of the apparatus main body A2, as a matter of course.

The process cartridge BC primarily has a driving-side developing bearing 536 serving as a developing frame, a photosensitive member supporting frame 521, and the coupling member 180. The driving-side developing bearing 536 supports the developing roller 13, driving-side coontacting/spacing lever 70, and non-driving-side coontacting/spacing lever 72 (omitted from illustration). The configuration of the driving-side developing bearing 536 is the same of the driving-side developing bearing 36 in the embodiments described above, except for the point that it has a boss 536*a* rotatably supported by a slot 521*a* of the photosensitive member supporting frame 521, so details of the same parts will be omitted. The photosensitive member supporting frame 521 supports the photosensitive drum 10.

The driving-side developing bearing 536 is rotatable with respect to the photosensitive member supporting frame 521, with the boss 536*a* as the center of rotation, due to the boss 536*a* being supported by the slot 521*a*. The driving-side developing bearing 536 is biased on a direction where the developing roller 13 comes into contact with the photosensitive drum 10, by an unshown spring connected therefrom to the photosensitive member supporting frame 521. Note that the slot 521*a* may be a circular hole.

In a state where the process cartridge BC is mounted to the apparatus main body A2, the photosensitive member supporting frame 521 is positioned by an unshown positioning part of the apparatus main body A2, and is fixed so as to not move. The first contact face 70*a* of the driving-side coontacting/spacing lever 70 is pressed by the driving-side apparatus pressing member 150 at the driving side, whereby the driving-side developing bearing 536 is rotated counterclockwise with the boss 536*a* as the center of rotation, as illustrated in FIG. 49(*a*). Accordingly, the developing roller 13 can be brought into contact with the photosensitive drum 10.

Also, the separated part 70*g* of the driving-side coontacting/spacing lever 70 is pressed by the driving-side apparatus pressing member 150 at the driving side, whereby the driving-side developing bearing 536 is rotated clockwise with the boss 536*a* as the center of rotation, as illustrated in FIG. 49(*b*). Accordingly, the developing roller 13 can be spaced from the photosensitive drum 10.

Thus, a configuration may be made in any of the above-described embodiments where the developing cartridge B1 or B2 is replaced with the process cartridge BC.

The invention is not limited to the disclosed exemplary embodiments, and various changes and modifications can be made. Therefore, in order to publish the scope of the invention, following claims are attached.

This application claims the benefit of Japanese Patent Applications Nos. 2014-242577 filed Nov. 28, 2014, 2014-242602 filed Nov. 28, 2014, 2014-242578 filed Nov. 28, 2014, 2014242601 filed Nov. 28, 2014 and 2015-231356 filed Nov. 27, 2015 which are hereby incorporated by reference herein in their entirety.

REFERENCE NUMERALS

13: developing roller
16: developing container
34: developing the side cover
36: driving-side developing bearing
46: non-driving-side developing bearing
70: driving-side coontacting/spacing lever
71: driving-side developing pressure spring
72: non-driving-side coontacting/spacing lever
73: non-driving-side developing pressure spring
A1: apparatus main assembly
B1: developing cartridge

The invention claimed is:

1. A cartridge comprising:
a developing roller rotatable about a rotational axis thereof, the developing roller including a surface configured to carry developer thereon;
a frame configured to support the developing roller;
a lever connected to the frame, the lever being movable relative to the frame, and a part of the lever protruding beyond the frame;
a spring deformable in response to a movement of the lever relative to the frame, the spring being positioned such that it is capable of exerting a first force on the lever and a second force on the frame;
a memory board; and
an electrode portion connected to the memory board,
wherein a part of the surface of the developing roller is exposed to outside of the frame,
wherein, when the cartridge is oriented with the lever and the electrode portion at a bottom portion of the cartridge, the protruding part of the lever protrudes downward from the frame and at least a part of the exposed part of the developing roller is positioned above the rotational axis, and
wherein the surface of the developing roller extends a longer distance in a direction of the rotational axis than a distance that the lever extends in the direction of the rotational axis.

2. The cartridge according to claim 1, wherein the spring is compressed as the lever moves closer to the developing roller.

3. The cartridge according to claim 1, wherein the frame includes a restricting part that contacts the lever pressed by the spring.

4. The cartridge according to claim 1, wherein the lever is rotatably supported by the frame and rotatable relative to the frame,
wherein the frame has a developer accommodation part that accommodates developer, and
wherein, as viewed in the direction of the rotational axis of the developing roller, a position of a rotational axis of the lever overlaps the developer accommodation part.

5. The cartridge according to claim 1, wherein a surface of the electrode portion is exposed to outside of the cartridge and intersects a direction in which the lever moves relative to the frame.

6. The cartridge according to claim 1, wherein the spring contacts the frame and the lever.

7. The cartridge according to claim 1, wherein the protruding part of the lever has a portion that is curved toward a side of the developing roller.

8. The cartridge according to claim 1, wherein the spring is compressed in response to the movement of the lever in a first direction, and the spring expands in response to the movement of the lever in a second direction.

9. The cartridge according to claim 1, wherein a part of the lever and a part of the electrode portion are positioned in a plane that is perpendicular to the rotational axis of the developing roller.

10. A cartridge comprising:
a developing roller rotatable about a rotational axis, the developing roller including a surface configured to carry developer thereon;
a frame configured to support the developing roller;
a lever connected to the frame, the lever being movable relative to the frame, and a part of the lever protruding beyond the frame;
a spring deformable in response to a movement of the lever relative to the frame, the spring being positioned such that it is capable of exerting a first force on the lever and a second force on the frame;
a coupling member configured to transmit a rotational force to the developing roller, the coupling member being rotatable about a rotational axis thereof;
a memory board; and
an electrode portion connected to the memory board,
wherein, when the cartridge is oriented with the lever and the electrode portion at a bottom portion of the cartridge, the protruding part of the lever protrudes downward beyond the frame,
wherein, as viewed in a direction of the rotational axis of the developing roller, the coupling member is positioned between the spring and the developing roller, and
wherein the surface of the developing roller extends a longer distance in the direction of the rotational axis than a distance that the lever extends in the direction of the rotational axis.

11. The cartridge according to claim 10, wherein the spring is compressed as the lever moves closer to the developing roller.

12. The cartridge according to claim 10, wherein the frame includes a restricting part that contacts the lever pressed by the spring.

13. The cartridge according to claim 10, wherein the lever is rotatably supported by the frame and rotatable relative to the frame,
wherein the frame has a developer accommodation part that accommodates developer, and
wherein, as viewed in the direction of the rotational axis of the developing roller, a position of a rotational axis of the lever overlaps the developer accommodation part.

14. The cartridge according to claim 10, wherein a surface of the electrode portion is exposed to outside of the cartridge and intersects a direction in which the lever moves relative to the frame.

15. The cartridge according to claim 10, wherein the spring contacts the frame and the lever.

16. The cartridge according to claim 10, wherein the protruding part of the lever has a portion that is curved toward a side of the developing roller.

17. The cartridge according to claim 10, wherein the spring is compressed in response to the movement of the lever in a first direction, and the spring expands in response to the movement of the lever in a second direction.

18. The cartridge according to claim 10, wherein the lever is positioned at an end portion of the frame, and wherein a part of the lever and a part of the electrode portion are positioned in a plane that is perpendicular to the rotational axis of the developing roller.

19. A cartridge comprising:

a developing roller rotatable about a rotational axis thereof, the developing roller including a surface configured to carry developer thereon;

a frame configured to support the developing roller;

a lever connected to the frame, the lever being movable relative to the frame, and a part of the lever protruding beyond the frame;

a spring deformable in response to a movement of the lever relative to the frame, the spring being positioned such that it is capable of exerting a first force on the lever and a second force on the frame;

a coupling member configured to transmit a rotational force to the developing roller, the coupling member being rotatable about a rotational axis thereof;

a memory board; and an electrode portion connected to the memory board, wherein, when the cartridge is oriented with the lever and the electrode portion at a bottom portion of the cartridge, the protruding part of the lever protrudes downward beyond the frame, wherein, as viewed in a direction of the rotational axis of the developing roller, the coupling member is positioned between the lever and the developing roller, and wherein the surface of the developing roller extends a longer distance in the direction of the rotational axis than a distance that the lever extends in the direction of the rotational axis.

20. The cartridge according to claim 19, wherein the spring is compressed as the lever moves closer to the developing roller.

21. The cartridge according to claim 19, wherein the frame includes a restricting part that contacts the lever pressed by the spring.

22. The cartridge according to claim 19, wherein the lever is rotatably supported by the frame and rotatable relative to the frame, wherein the frame has a developer accommodation part that accommodates developer, and wherein, as viewed in the direction of the rotational axis of the developing roller, a position of a rotational axis of the lever overlaps the developer accommodation part.

23. The cartridge according to claim 19, wherein a surface of the electrode portion is exposed to outside of the cartridge and intersects a direction in which the lever moves relative to the frame.

24. The cartridge according to claim 19, wherein the spring contacts the frame and the lever.

25. The cartridge according to claim 19, wherein the protruding part of the lever has a portion that is curved toward a side of the developing roller.

26. The cartridge according to claim 19, wherein the spring is compressed in response to the movement of the lever in a first direction, and the spring expands in response to the movement of the lever in a second direction.

27. The cartridge according to claim 19, wherein the lever is positioned at an end portion of the frame, and wherein a part of the lever and a part of the electrode portion are positioned in a plane that is perpendicular to the rotational axis of the developing roller.

* * * * *